United States Patent

Dauber et al.

[15] 3,675,217

[45] July 4, 1972

[54] SEQUENCE INTERLOCKING AND PRIORITY APPARATUS

[72] Inventors: Philip S. Dauber, Ossining, N.Y.; Russell J. Robelen, Palo Alto; John R. Wierzbiski, Saratoga, both of Calif.

[73] Assignee: International Business Machines Corporation, Armonk, N.Y.

[22] Filed: Dec. 23, 1969

[21] Appl. No.: 887,468

[52] U.S. Cl. ....................340/172.5

[51] Int. Cl. ....................G06f 13/00, G06f 9/18

[58] Field of Search ....................340/172.5

[56] References Cited

UNITED STATES PATENTS

| | | | |
|---|---|---|---|
| 3,310,785 | 3/1967 | Couleur et al. | 340/172.5 |
| 3,373,408 | 3/1968 | Ling | 340/172.5 |
| 3,377,579 | 4/1968 | Wissick et al. | 340/172.5 |
| 3,395,394 | 7/1968 | Cottrell, Jr. | 340/172.5 |
| 3,434,111 | 3/1969 | Schmidt et al. | 340/172.5 |
| 3,444,525 | 5/1969 | Barlow et al. | 340/172.5 |
| 3,456,244 | 7/1969 | Seichter et al. | 340/172.5 |

*Primary Examiner*—Gareth D. Shaw
*Attorney*—Hanifin and Jancin and Peter R. Leal

[57] ABSTRACT

Described is a sequence interlock generator and priority apparatus combination suitable for use in a storage control system for a two-level storage, wherein the storage system includes a high-speed storage against which requests for data are processed and a slower, larger-capacity main storage. Requests can be received and serviced concurrently at a plurality of request ports in the system where they are buffered in request stacks. A tag storage serves as an index to the data currently resident in high-speed storage and a directory storage acts as an index to data currently in main storage. The sequence interlock generator interlocks requests in the plurality of request stacks to insure that requests to the same storage area are performed in proper sequence to insure data integrity. A sequence interlock vector is computed when the request first enters its request port and is appended to the request until the request is clear to request service. A request is received in terms of a logical address. The logical address is transformed into a plurality of physical addresses in high-speed storage. The physical addresses are used to address corresponding tags from the tag storage to determine the contents of the desired addresses in high-speed storage. The priority apparatus essentially splits the request into two priority determinations, one for priority to access the tag storage and the second for priority to access the data storage. The ideal situation is for tags and storage to be accessed concurrently. However, the invention makes provision for action to begin upon the tags if the tag storage can be accessed due to conflicts for accessing the addressable entity in high-speed storage. As a consequence of the invention, initiation of service of a given request is begun at the earliest possible time.

11 Claims, 143 Drawing Figures

INVENTORS.
PHILIP S. DAUBER
RUSSELL J. ROBELEN
JOHN R. WIERZBICKI

BY Peter R. Leal
ATTORNEY

FIG. 3A FETCH
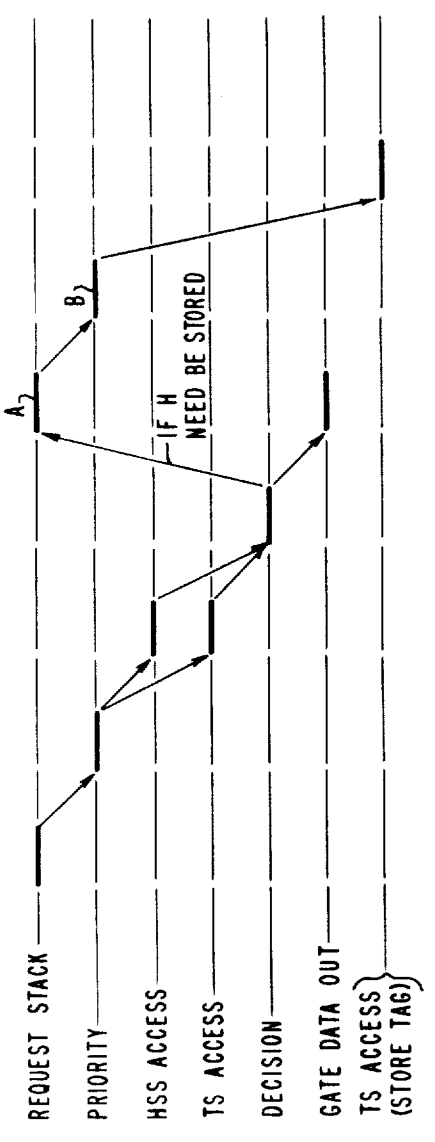
FIG. 3B STORE
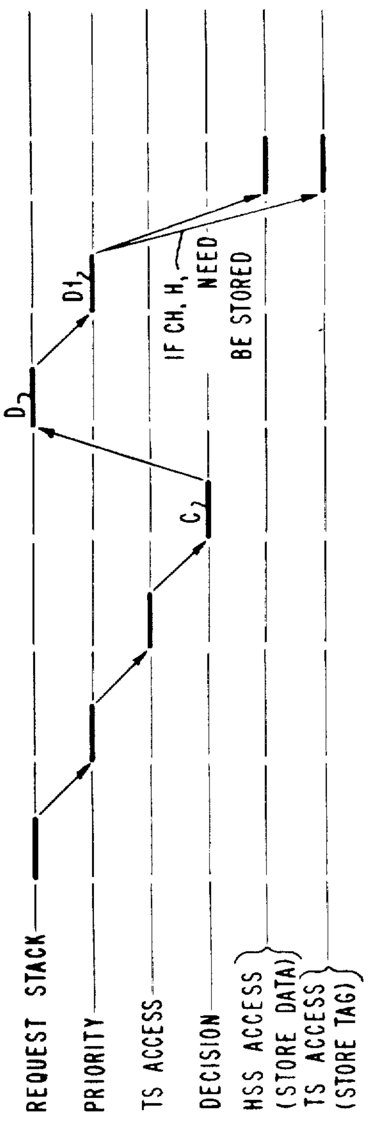

FIG. 3C FETCH WITH INTERSTORAGE TRANSFER
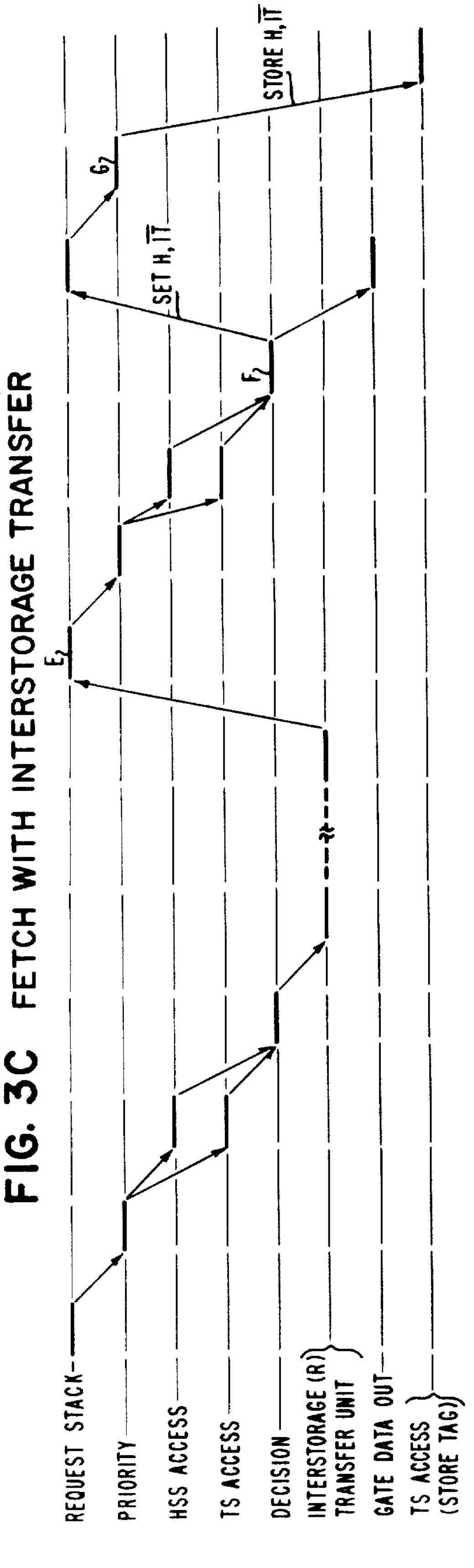
FIG. 3D STORE WITH INTERSTORAGE TRANSFER
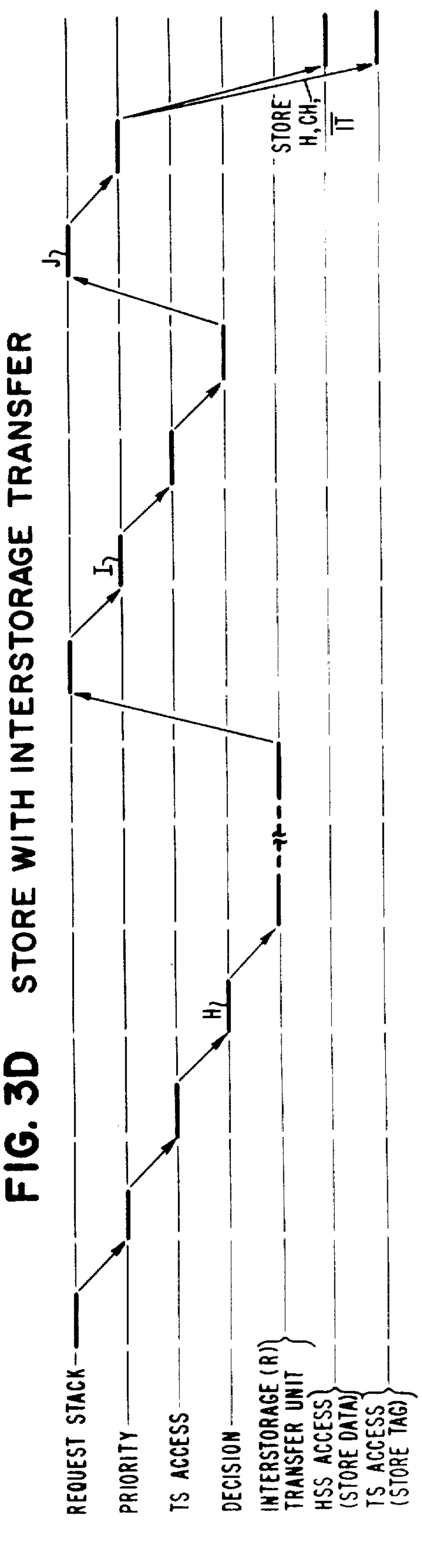

P REQUEST STACK

FIG. 8

| P REQUESTOR | | Q REQUESTOR | |
|---|---|---|---|
| STORE | α | STORE | α |
| FETCH | β | FETCH | β |
| STORE | α | STORE | α |
| STORE | α | FETCH | ε |
| STORE | δ | FETCH | η |
| FETCH | η | STORE | δ |
| FETCH | α | | |

FIG. 8A

| P STACK | | | | | Q STACK | | | | |
|---|---|---|---|---|---|---|---|---|---|
| LEVEL | REQUEST | AGE | INTERLOCKS | C | LEVEL | REQUEST | AGE | INTERLOCKS | C |
| P1 | STORE α | (1) | | | Q1 | STORE α | (1) | P1 | |
| P2 | FETCH β | (2) | | | Q2 | FETCH β | (2) | | |
| P3 | STORE α | (3) | | | Q3 | STORE α | (3) | P1,P3,Q1 | |
| P4 | STORE α | (4) | P1,P3,Q1,Q3 | | Q4 | | | | |

FIG. 8B

| P STACK | | | | | Q STACK | | | | |
|---|---|---|---|---|---|---|---|---|---|
| LEVEL | REQUEST | AGE | INTERLOCKS | C | LEVEL | REQUEST | AGE | INTERLOCKS | C |
| P1 | STORE δ | (4) | | | Q1 | STORE α | (1) | ~~P1~~ | |
| P2 | FETCH β | (1) | | | Q2 | FETCH ε | (3) | | |
| P3 | STORE α | (2) | | | Q3 | STORE α | (2) | ~~P1~~,P3,Q1 | |
| P4 | STORE α | (3) | ~~P1~~,P3,~~Q1~~,Q3 | | Q4 | | | | |

FIG. 8C

| P STACK | | | | | Q STACK | | | | |
|---|---|---|---|---|---|---|---|---|---|
| LEVEL | REQUEST | AGE | INTERLOCKS | C | LEVEL | REQUEST | AGE | INTERLOCKS | C |
| P1 | STORE δ | ③ | | | Q1 | | | | |
| P2 | | | | | Q2 | FETCH ε | ② | | |
| P3 | STORE α | ① | | | Q3 | STORE α | ① | P3,~~Q1~~ | |
| P4 | STORE α | ② | ~~P1~~,P3,~~Q1~~,Q3 | | Q4 | | | | |

FIG. 8D

| P STACK | | | | | Q STACK | | | | |
|---|---|---|---|---|---|---|---|---|---|
| LEVEL | REQUEST | AGE | INTERLOCKS | C | LEVEL | REQUEST | AGE | INTERLOCKS | C |
| P1 | STORE δ | ② | | | Q1 | FETCH η | ③ | | |
| P2 | FETCH η | ③ | | | Q2 | FETCH ε | ② | | W |
| P3 | | | | | Q3 | STORE α | ① | ~~P3~~,~~Q1~~ | |
| P4 | STORE α | ① | ~~P1~~,~~P3~~,~~Q1~~,Q3 | | Q4 | | | | |

FIG. 8E

| P STACK | | | | | Q STACK | | | | |
|---|---|---|---|---|---|---|---|---|---|
| LEVEL | REQUEST | AGE | INTERLOCKS | C | LEVEL | REQUEST | AGE | INTERLOCKS | C |
| P1 | FETCH α | ③ | P4 | | Q1 | FETCH η | ② | | |
| P2 | FETCH η | ② | | | Q2 | FETCH ε | ① | | W |
| P3 | | | | | Q3 | STORE δ | ③ | | |
| P4 | STORE α | ① | ~~P1~~,~~P3~~,~~Q1~~,~~Q3~~ | | Q4 | | | | |

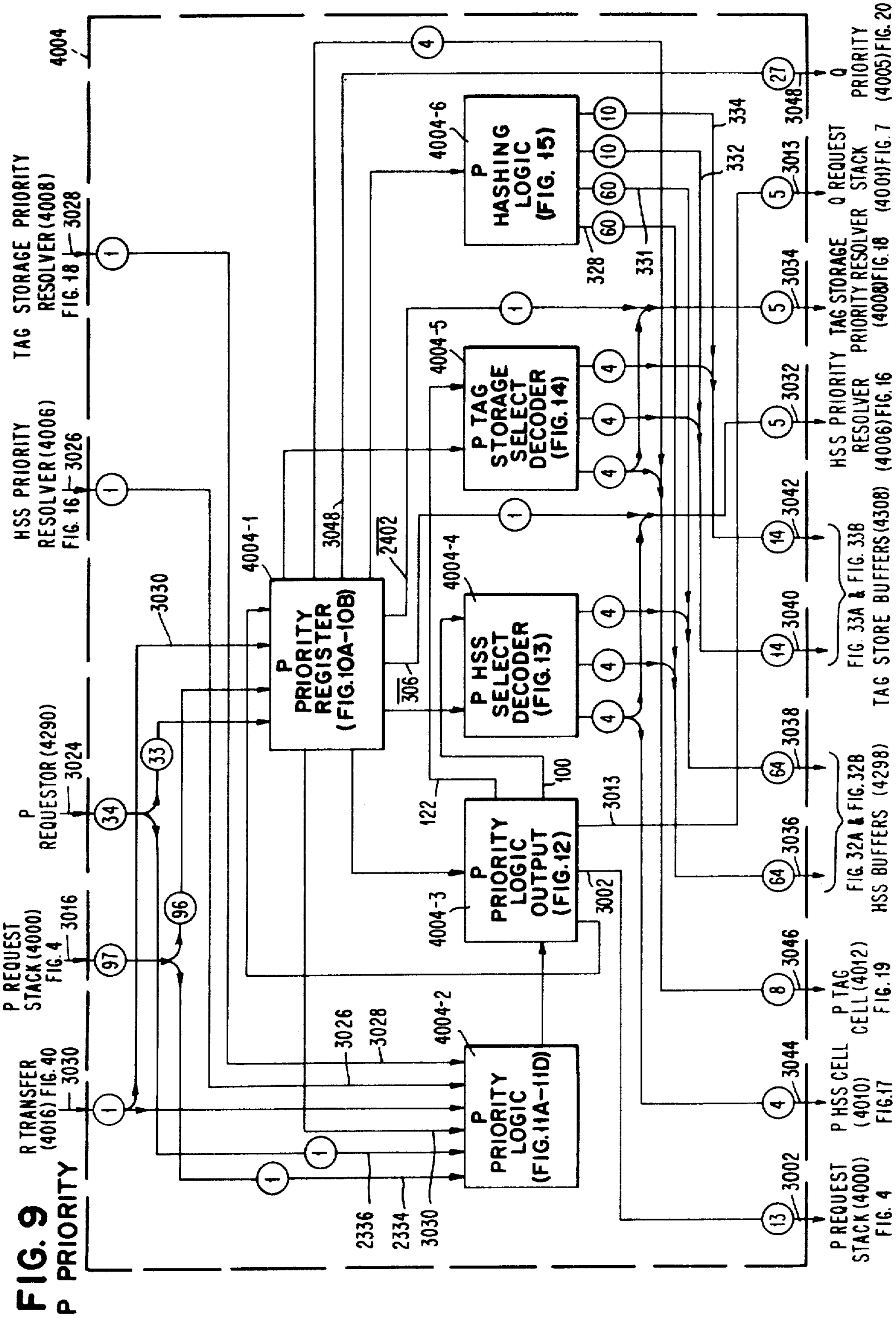
FIG. 9 P PRIORITY

P PRIORITY LOGIC OUTPUT

Q PRIORITY LOGIC OUTPUT

SEQUENCE INTERLOCKING AND PRIORITY APPARATUS

RELATED APPLICATIONS

This application is related to application Ser. No. 887,467 entitled "Interstorage Transfer Mechanism" by R. F. Arnold et al, and also to application Ser. No. 887,469 entitled "-Storage Control System" by G. M. Amdahl et al. Both applications are assigned to the assignee of the instant application and were filed on even date herewith.

BACKGROUND OF INVENTION

1. Field of the Invention

This invention relates to apparatus for controlling storage in a high-speed electronic digital computer. In particular, it relates to apparatus for concurrently receiving and servicing a plurality of requests for data from a digital computer data storage area.

2. Description of Prior Art

The need for the electronic processing of large amounts of data has become more apparent with each progressing year. To meet this need there has been developed various types of large-scale, ultra-fast, electronic digital computers which process data by processing sequences of instructions and data within the computer. To meet the ever increasing needs of data processing, speed in processing instructions and data is of the essence.

In data processing, availability of instructions and data from the storage system of the computer is of utmost importance. Prior art systems have attempted a software solution to the availability problem, but have proved inherently inefficient by requiring a large amount of programmer time planning overlays for a program which is larger than the available system storage. Also, inherent inefficiency lies in the requirement of execution time for the system to compute overlays between jobs in a multi-program environment. Further, such prior art systems do not allow uniform addressing of the storage system. Still further, because of the inherent serial nature of the fetching of the requested data or instructions from the storage area, prior art systems have been unduly slow in speed of performance. Much of this inefficiency has been due to the inability to keep an efficient history of the servicing of requests as they progress through the system. In these prior art systems it is necessary to recompute the request history each time the request contends for service or enters a service phase. Furthermore, much of this inefficiency is also due to the inability to provide an early resolution of conflicts which arise from attempted concurrent accesses to the same addressable entities within the system.

Accordingly, it is the general object of this invention to provide an improved sequence interlocking generator suitable for use in a storage system which may be of the two-level variety, but not necessarily limited thereto.

Another object of this invention is to provide a sequence interlock generator wherein the sequence interlock vector is computed only a single time for a given request and remains with a copy of that request as system action progresses.

Another object of this invention is to provide a priority apparatus to allow the most efficient concurrent handling of a plurality of requests.

It is a more specific object of this invention to provide a priority apparatus which splits a request into individual priority entities for allowing the earliest possible servicing of a request as measured from the time it enters the system.

The foregoing and other objects, features and advantages of the invention will be apparent from the following more particular description of the preferred embodiment of the invention as illustrated in the accompanying drawing.

BRIEF DESCRIPTION OF THE DRAWING

FIG. 3A shows a timing diagram of a fetch operation for our invention.

FIG. 3B shows a timing diagram of a store operation of our invention.

FIG. 3C shows a timing diagram for a fetch operation with interstorage transfer.

FIG. 3D shows a timing diagram of a store operation with interstorage transfer.

FIGS. 7A-7P, when placed adjacent each other as seen in FIG. 7AA, illustrate in detail the Q request stack and register control.

FIG. 8 shows a sequence of requests as transmitted by the P and Q requestors, respectively.

FIG. 8A-8E show one manner in which the requests of FIG. 8 may be serviced.

FIG. 9 shows a block diagram of the P priority apparatus.

FIG. 16A shows a block diagram of the high-speed storage or tag storage conflict resolver.

FIG. 16B shows the detailed logic of the high-speed store and the tag store conflict resolver.

FIG. 17 shows the P high-speed storage cell.

FIG. 18 shows the tag storage priority resolver.

FIG. 27 shows the Q high-speed storage cell.

FIG. 28 shows the Q tag cell.

FIG. 29 illustrates the basic storage module and addressing relations between main storage and high-speed storage.

FIG. 29A shows a conceptual representation of an interstorage transfer.

FIG. 29B shows the main storage data cell of our invention.

FIG. 30 shows the main store of our invention.

FIG. 30A shows the main store fetch data registers of our invention.

FIG. 31 shows the main store buffer of our invention.

FIG. 31A shows the directory buffer.

FIG. 31B shows the new directory register.

FIG. 31C shows the old directory register.

FIG. 32 shows an illustration of a single high-speed storage buffer.

FIG. 32A shows a representation of the even-numbered high-speed storage buffers, each buffer comprising hardware similar to that shown in FIG. 32.

FIG. 32B shows the odd-numbered high-speed storage buffers, each buffer comprising hardware similar to that shown in FIG. 32.

FIG. 32C shows the R fetch data registers.

FIG. 32D shows the P fetch data registers.

FIG. 32E shows the Q fetch data registers.

FIG. 33 shows a detailed representation of a single tag storage buffer.

FIG. 33A shows the even-numbered tag storage buffers, each buffer comprising detailed hardware similar to that shown in FIG. 33.

FIG. 33B shows the odd-numbered tag storage buffers, each buffer comprising detailed hardware similar to that shown in FIG. 33.

FIG. 33C shows the R fetch tag registers.

FIG. 33D shows the P fetch tag registers.

FIG. 33E shows the Q fetch tag registers.

FIG. 34 shows a block diagram of the P decision area of our invention.

FIG. 35 shows the manner in which FIGS. 35A and 35B should be placed adjacent each other.

FIGS. 35A and 35B show the decision register of the P decision area of our invention.

FIG. 36 shows the manner in which FIGS. 36A–36J should be placed adjacent each other.

FIGS. 36A–36J show the decision logic of the P decision area of our invention.

FIG. 37 shows the manner in which FIGS. 37A–37E should be placed adjacent each other.

FIGS. 37A–37E show the decision logic output of the P decision area of our invention.

FIG. 38 shows the cold generator.

FIG. 39 shows the transfer priority logic of our invention.

FIG. 40 shows a block diagram of the R transfer mechanism of our invention.

FIG. 41 shows the transfer register and transfer control register of the R transfer apparatus of our invention.

FIG. 42 shows the manner in which FIGS. 42A–42G should be placed adjacent each other.

FIGS. 42A–42G show the transfer logic of the R transfer apparatus of our invention.

FIG. 43 shows the manner in which FIGS. 43A–43C should be place adjacent each other.

FIGS. 43A–43C show the transfer logic output of the R transfer apparatus.

FIG. 44 shows a block diagram of the R priority area of the R transfer apparatus of our invention.

FIG. 45 shows the priority register and priority logic of the R transfer apparatus of our invention.

FIG. 46 shows the high-speed storage select decoder of the R transfer apparatus.

FIG. 47 shows the tag storage select decoder of the R transfer apparatus.

FIG. 48 shows the hashing logic of the R transfer apparatus.

FIG. 49 is a detailed representation of the R high-speed storage cell.

FIG. 50 is a detailed representation of the R tag cell.

FIG. 51 shows a block diagram of the Q decision area of our invention.

FIG. 52 shows the manner in which FIGS. 52A and 52B should be placed adjacent each other.

FIGS. 52A and 52B show the decision register of the Q decision area of our invention.

FIG. 53 shows the manner in which FIGS. 53A–53J should be placed adjacent each other.

FIGS. 53A–53J show the decision logic of the Q decision are of our invention.

FIG. 54 shows the manner in which FIGS. 54A–54E should be placed adjacent each other.

FIGS. 54A–54E show the decision logic output of the Q decision area of our invention.

DESCRIPTION OF PREFERRED EMBODIMENTS

Before proceeding further, it is proper at this point to introduce and define some of the terminology used in the description of our invention.

Virtual Address — An address which uniquely and logically defines a specific data quantity.

Physical Address — An address in HSS to which the Virtual Address corresponds. There is a primary and an alternate physical address for each virtual address.

Page — A 256 word-storage quantity. There are 16 lines in a page.

Line — A 16 word-storage quantity. There are 16 lines in a page.

Word — The addressable storage entity in HSS.

Tag Storage — The index to the lines which are currently resident in HSS.

Directory Storage — The index to the lines which are currently resident in MS.

Address Transformation (Hashing) — The transformation made on a virtual address to determine the physical storage address.

Line Identifier — The field in the tag entry which provides a unique identifier for the line currently represented by this tag entry. It is also the field in the directory entry which provides a unique identifier for the line address in M. S. currently represented by this directory entry.

MS Pointer — The field in the directory entry which specifies the address of the physical MS location where the referenced data resides.

Figure 1:
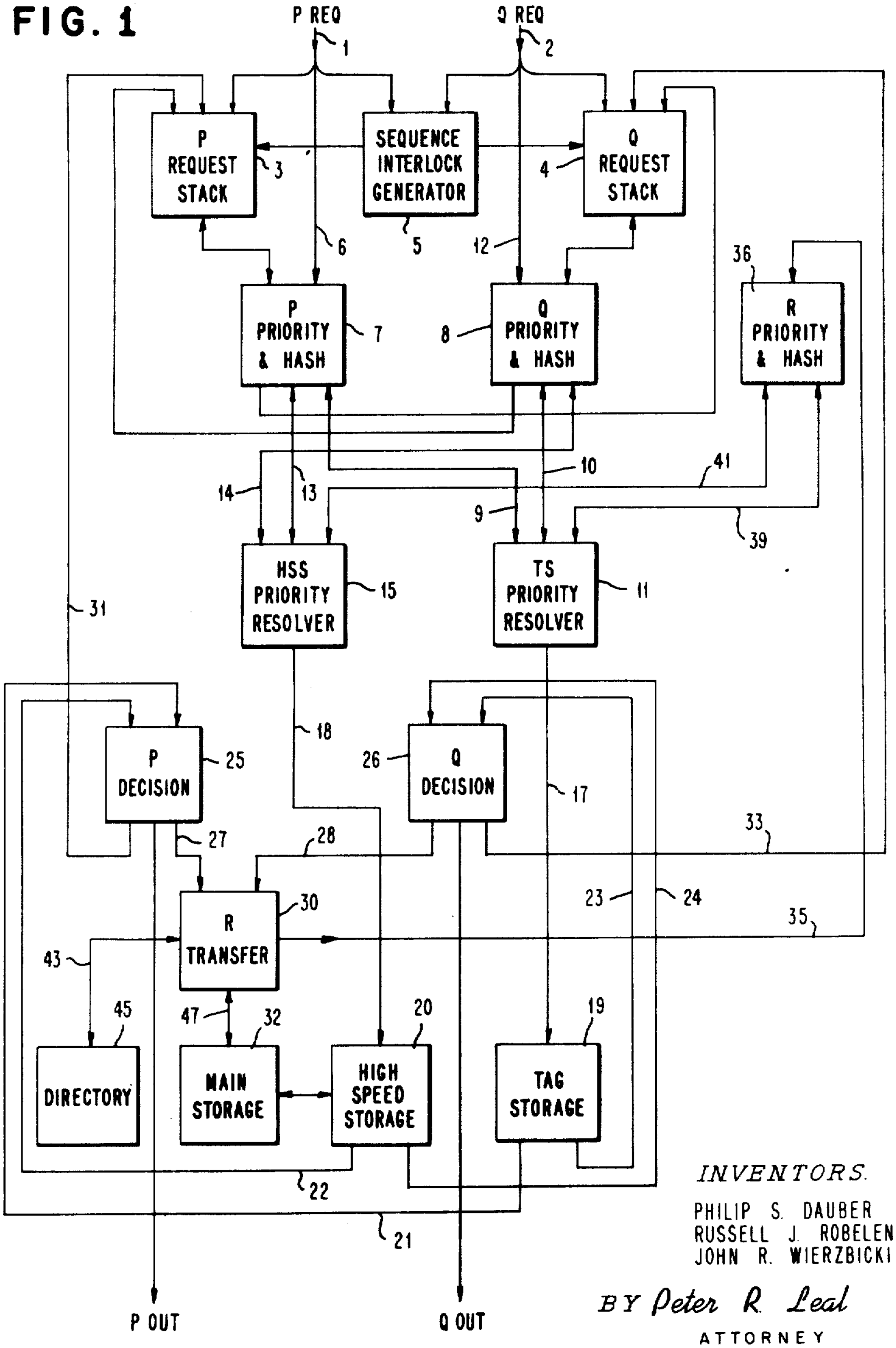
FIG. 1 is a generalized block diagram of one embodiment of our invention.
Figures 1A, 1B:
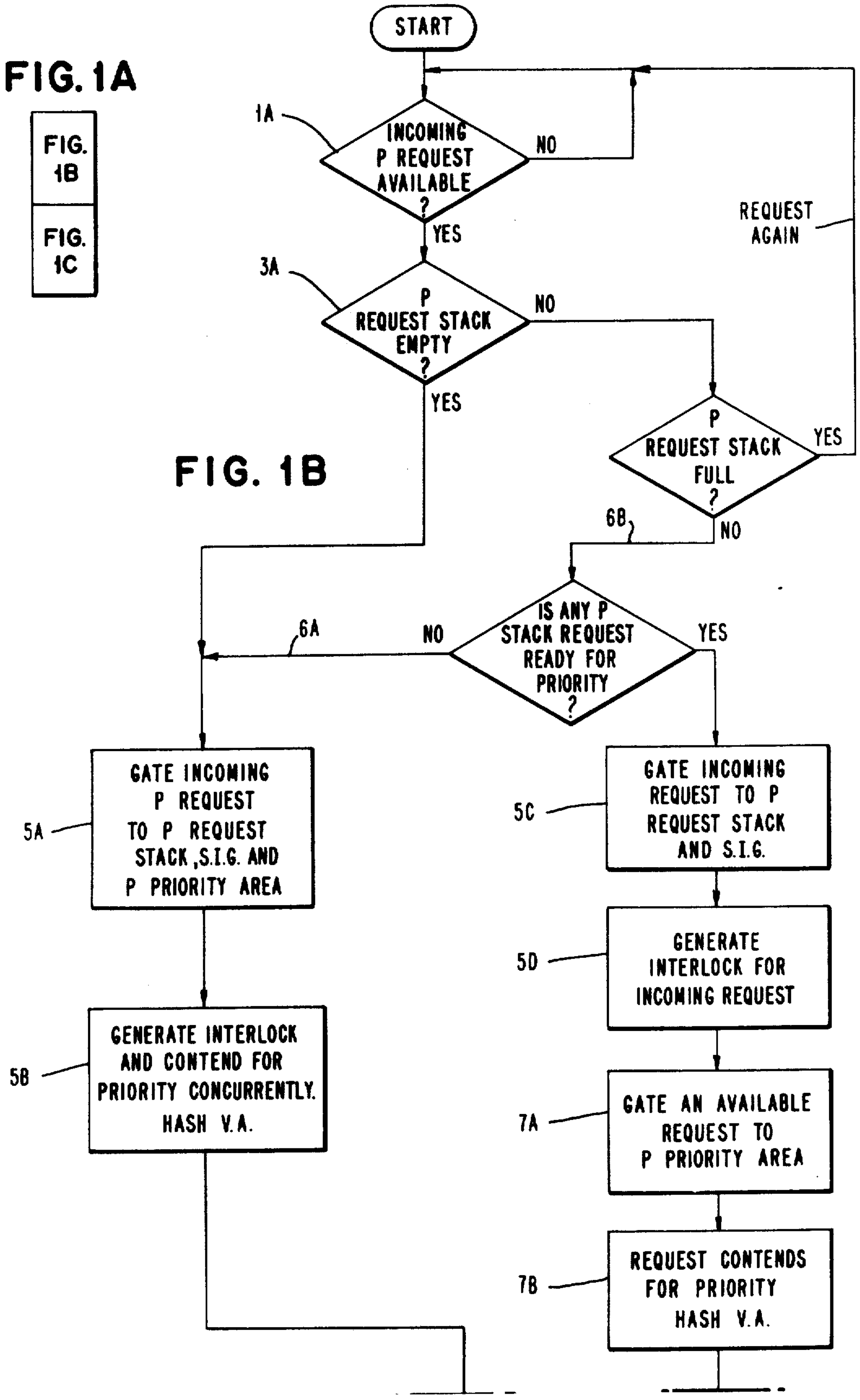
FIG. 1A shows the manner in which FIGS. 1B and 1C should be placed adjacent each other.
FIG. 1B and FIG. 1C, taken together, show a general flow chart of an aspect of the operation of our invention.

Our invention can be seen generally in FIG. 1, and the operation can be understood with concurrent reference to FIGS. 1 and 1A.

Referring to FIG. 1, it is seen that our invention will be described in terms of two request ports, namely, a P request port and a Q request port. With a thorough understanding of our invention, it will be apparent to the reader of ordinary skill in the digital computer art that our invention can be expanded to a storage system having more than two request ports. Seen in FIG. 1 are two sources of requests, namely, a P requestor and a Q requestor. The P source of request is connected via bus 1 to the P Request Stack 3, Sequence Interlock Generator 5, and P Priority Apparatus 7. P Request Stack 3 can be a group of registers for holding individual requests and keeping a history of their progress through the system of our invention from request through satisfaction of that request to the P requestor. Sequence Interlock Generator 5 is the apparatus which determines the sequence in which a request to the same address in storage must be performed. For example, if there is a fetch and a store arriving in the stated sequence to the same address, it is imperative that the fetch be processed before the store in order to obtain the proper data from storage. The Q requestor is connected via bus 2 to Q Request Stack 4, to Sequence Interlock Generator 5, and to Q Priority Apparatus 8.

P Priority Apparatus 7 is connected via bus 9 to Tag Storage Resolver 11 and via bus 13 to High-speed Storage Resolver 15. Q Priority 8 is connected via bus 10 to Tag Storage Resolver 11 and via bus 14 to High-speed Storage Resolver 15. Tag Storage Resolver 11 and High-speed Storage Resolver 11 and 15, respectively, are blocking AND gate circuits which will be explained in detail subsequently. It is apparent that requests to the same storage entity in high-speed storage or tag storage can be made concurrently by both the P and Q request under consideration at a given time. Therefore, it is the function of the tag storage resolver 11 and the high-speed storage resolver 15 to resolve conflicts arising from simultaneous requests to a given entity in either of these two storages. Tag Storage Resolver 11 is connected via bus 17 to the Tag Storage 19. High-speed Storage Resolver 15 is connected via bus 18 to High-speed Storage 20.

Tag Storage 19 contains tag entries which serve as an index to the contents of high-speed storage. These tags are in one-to-one correspondence with the physical line locations in high-speed storage. The tag entry corresponding to a given physical line location contains the line identifier for the data line currently in that line location. The individual control bits of the tag entry will be described in detail subsequently.

Concurrently with priority determination in a given port, the virtual address of a request is randomized, or hashed, into two physical addresses, each, for the tag storage and the high-speed storage. If priority is granted to the request, these physical addresses, hereinafter referred to as a primary and alternate physical address, are used to address two locations in the tag storage and two corresponding locations in the high-speed storage. The tags from the tag storage primary and alternate physical addresses and the data from the high-speed storage primary and alternate physical addresses are transmitted via buses 21, 23 and 22, 24 to the P decision unit or Q decision unit 25, 26, respectively, depending upon from which port the request under consideration originated. This can be done simultaneously for both ports if there is no conflict such as that mentioned above. In the decision unit for a given port, logic performs a comparison between the virtual address of the request and the tag identifiers for the physical and alternate high-speed storage locations. Concurrently, the data from these two locations are gated out of high-speed storage. If there is a match from one of these comparisons, the corresponding data, after inspection of certain control bits, to be described subsequently, is transmitted to the requestor. If it is determined that the requested virtual address is not in high-speed storage, and if the associated control bits so indicate, the original request and the tag entries are forwarded via bus 27 or 28 to the R Transfer Unit 30, which is an interstorage transfer unit. At this point it is necessary to relocate the required data from Main Storage 32 into high-speed storage where it can be processed against for this request. The request in the request stack is informed via buses 31 or 33 that this interstorage transfer is taking place, and action upon the request is suspended until the data is located and stored in high-speed storage. In the interim, other requests from the P or Q request stacks may take place. R Transfer Unit 30 is connected via bus 35 to R Priority and Hash Apparatus 37 which functions similarly to the P and Q priority and is likewise connected via buses 39 and 41 to the Tag Storage Priority Resolver 11 and the High-speed Storage Priority Resolver 15. Thus it can be seen that Tag Storage Resolver 11 and High-speed Storage Resolver 15 resolve conflicts to the same entity in tag storage and high-speed storage from either the P or Q request stack or for the R Transfer Unit. In the present embodiment of our invention, priority will be in the order R, P, Q. That is, if there is a request for access to the same TS and HSS storage entities by the R transfer unit, it is always given priority. If there is no R access request, than P is given priority over Q.

R Transfer Unit 30 is connected via bus 43 to and from Directory 45. The directory serves as an index to the data which are currently resident in Main Storage 32. A line of data is a sub-set of a page of data and is the basic entity which is transferred between high-speed storage and main storage. Since there is no implicit correspondence between a particular directory entry and a specific main storage page of data, it is necessary to explicitly name the main storage line within the directory entry. The directory can be viewed, in one sense, as an associative memory. Its entries associate the requested virtual address with the physical address in main storage which contains the line of data requested by the virtual address. When the R Transfer Unit 30 receives the information over buses 27 or 28, which include the virtual address requested, it searches the directory to find the page of data in which that virtual address is located in main storage. It then controls, via bus 47, the transfer of that data between main storage and high-speed storage. When the transfer is completed, the request which initiated the interstorage transfer is then given first priority to obtain its data.

The operation of the system, for a given port, can be understood more clearly with reference to FIG. 1A. It will be appreciated that FIG. 1A outlines action from the standpoint of the P request port. Concurrently with this action, the same type action will be going on with regard to the Q request port and also with regard to the R transfer apparatus which may be performing an interstorage transfer at the same time. If any of these activities refer to the same entity in high-speed storage, R is given priority over P which is given priority over Q. This is determined in the tag storage resolver and high-speed storage resolver, and the information is transmitted back to the respective priority areas which either give their respective request priority to access the tag storage and high-speed storage or hold up access priority, depending upon the designation of the particular port. That is, if, for example, a request from the P port is attempting to obtain priority from the P Priority and Hash Apparatus 7, and a similar activity is going on in the R Priority and Hash Apparatus 36 for the same high-speed storage entity, Priority Apparatus 36 will give priority to the R transfer request while Priority unit 7 will withhold priority to the P request.

Referring now to FIG. 1B, if a P request is available from the requestor at block 1A, then the Request Stack 3 of FIG. 1 is interrogated as indicated at 3A in FIG. 1A. On the one hand, if the P request stack is not empty, it is tested to determine whether it is full. If it is full, then the P requestor is so notified and presents the request again on a different cycle. On the other hand, if the request stack is neither full nor empty, as indicated by line 6B, then there are two possible courses of action. As will be made more clear subsequently, each request stack comprises a group of storage registers for storing a request along with control bits. Operation on the control bits will indicate the age of a request residing in a given storage register, or level, in the request stack. It will also indicate whether a given request is ready for operation at different parts of the system. For example, certain control bits in each level of a request stack will indicate whether a request is ready to go to the priority apparatus, or whether it is in a wait state awaiting the completion of an interstorage transfer. It may be, for example, that the stack is neither empty nor full, but that no request of those which are currently resident is ready to go to the priority area. If this is the case, then the incoming P request can be gated to an empty stack position and also be gated immediately to the priority area and, thus, bypass waiting in the request stack until other requests have gone to priority. This is accomplished by buses 6 and 12 in FIG. 1 for the P and Q request stacks, respectively, and is seen at line 6A of FIG. 1A. That is, the incoming P request is gated to the P request stack, to the sequence interlock generator and immediately to the P priority area.

Returning for the moment to the situation in which there is a request ready for priority from the P request stack, it is not necessary, then, for the incoming request to bypass the P request stack and go directly to priority. Therefore, the incoming request is gated directly to the P request stack and to the sequence interlock generator. This is seen at 5C of FIG. 1A.

The next step, seen at 5D, is to generate the interlock for the incoming request. An address interlock is required because storage requests are not always executed in the same order that they are accepted by the system. This creates a problem when stores and fetches to the same storage word are present in the system at the same time. For example, if the store for a particular word comes in before a fetch, the store must be executed before the fetch or it will result in the wrong data. Similarly, if a fetch request to a given word is awaiting operation in the request stack, and a store to the same word arrives later in the request stack, the fetch must be performed before the store or the wrong data will again result. Similarly, two stores to the same word must be done in order, in order to insure proper data in that location. Therefore, interlocks are generated to insure that these operations take place in the proper sequence. When a sequence interlock is generated, it is appended to the request in its level in the request stack by way of a sequence interlock vector which identifies all of the levels in either request stack to which a given request is interlocked. That is, the sequence interlock generator defines which requests in which levels must be performed before the given request to which the vector applies can be operated upon. This will be seen in more detail subsequently While the sequence interlock is being generated for the incoming request, an available request in the P request stack, which is ready to go to priority, is gated to the priority area as seen in 7A of FIG. 2. The request then contends for priority to the tag storage and high-speed storage, and at the same time the virtual address is hashed.

Returning now, for the moment, to the situation in which there is not a P request ready for priority, as seen at line 6A in FIG. 1A, the incoming request bypasses the request stack and is gated directly to the P priority area and to the sequence interlock generator, as well as to a level in the request stack where it will reside while the request progresses through the system. This is seen at 5A. In 5B, the interlock is generated at the same time in which the request which bypassed the request stack contends for priority and has its virtual address hashed. It is important to note the distinction between 5B and 5D of FIG. 1A. If the request does not bypass the request stack, then the interlock is generated before the incoming request ultimately goes to the priority area. This is seen at 5D. Thus an interlock will not let the incoming request compete for priority. An exception to this rule is when the request used the bypass route to the priority area as in 5A of FIG. 1A. That is, the request is allowed to compete for priority whether or not it is interlocked to another request in either of the request stacks since this contention happens before the interlock is discovered. Therefore, if an interlock is generated for this request, it is appended to the copy of the request which remains in the request stack. However, the request itself is already progressing through priority contention. In this case, the request is not held up or called back, but is allowed to progress all the way through to the decision function. At that point, and as will be explained in detail subsequently, a test is made to see whether an interlock did occur. If so, the request is invalidated, that is, required to contend for priority later on another cycle. This is an example of when the word interlock bit can be used as a history control.

Figure 1C:
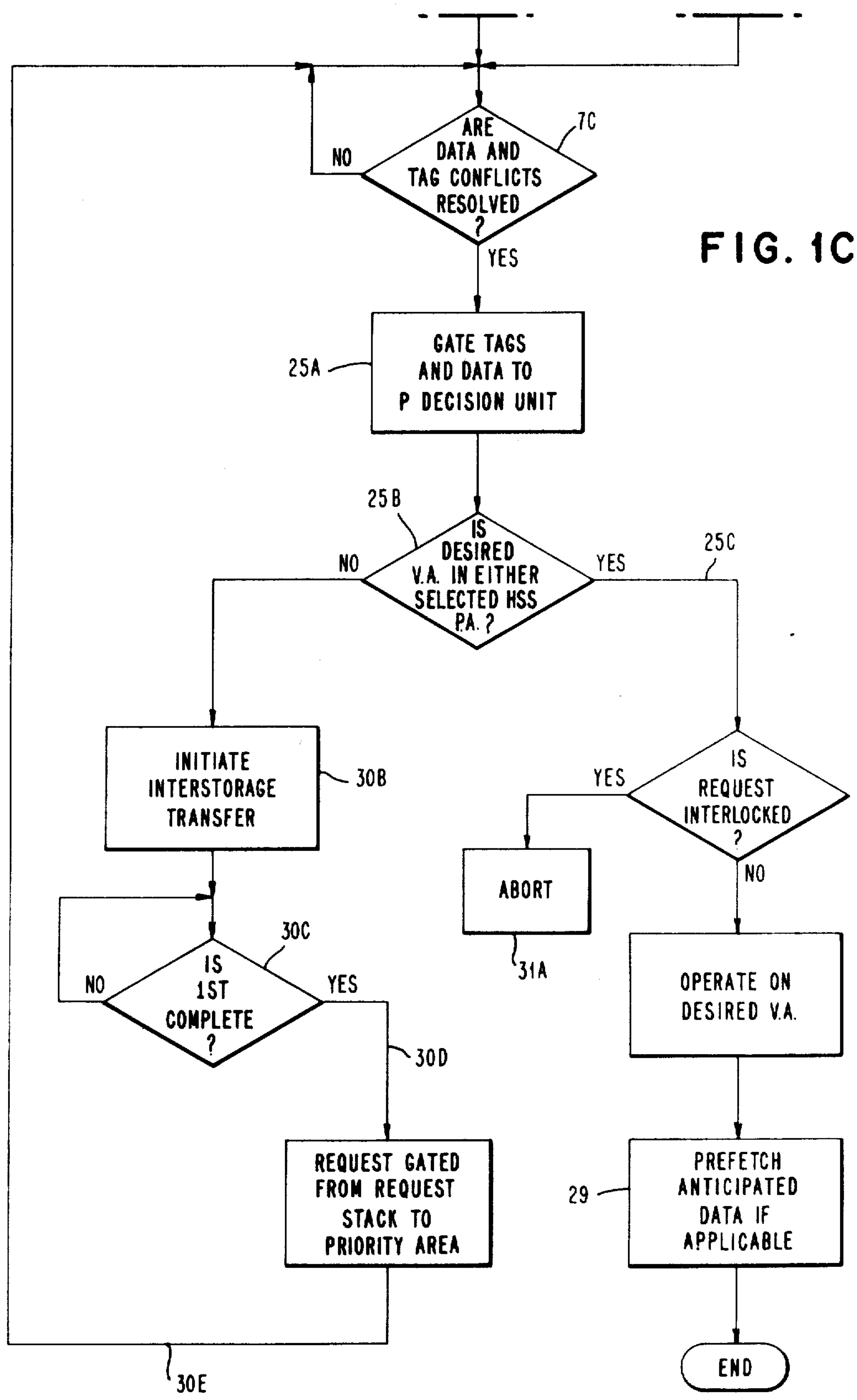

Turning now to block 7C in FIG. 1C, it is necessary to resolve data and tag conflicts. It will be recalled that we are discussing the situation in which a P request is contending for priority. It will further be recalled that an R transfer request has priority over a P request. It may be, then, that the R Transfer Unit 30 of FIG. 1 is requesting access to the same data and tag addresses as is the request currently in the P Priority Unit 7. If it is, the tag storage conflict resolver and the high-speed storage conflict resolver will give priority to the R transfer request and will withhold priority from the P request. As will be seen in more detail subsequently, this can be done on different cycles for data and tag priority. That is, it may only be necessary for the R transfer unit to store information in the tag storage at the completion of its operation. If so, the R transfer unit will request only tag priority, and not data priority. Therefore, on a given cycle, tag priority may be withheld from, while data priority may be given to, the P request. Therefore, on the next cycle, the P request will try again to obtain, not tag priority (which it already has), but data priority (which it is looking for). Finally, when both tag and data conflicts are resolved and priority is given to the request in the P priority area to access both tags and data, gating signals in the P priority area will gate the hashed primary and alternate physical addresses to the tag storage and high-speed storage over buses 9 and 13, respectively, to gate the tags and data to the P Decision Unit 25 via buses 21 and 22, respectively. This is seen at 25A in FIG. 2. As seen in 25B, the decision unit then determines whether the desired virtual address is in either the primary or alternate physical address in the high-speed storage. This is done by gating out the tags corresponding to the primary and alternate physical addresses of high-speed storage and comparing the virtual address contained in the tags to the virtual address of the request in question. If the desired virtual address is in one of these two high-speed storage physical addresses, then the interlock vector is inspected for the request in question. If the request is interlocked, it is because of the situation explained above in which the interlock was discovered after the request went to priority by way of the bypass route. Therefore, bus 31 sets in indication in the copy of that request in the request stack and essentially aborts the progress of the request, and it must go to priority again later. This is seen at 31A of FIG. 1A. On the other hand, if the request is not interlocked, it means that the indicated operation should be performed on the desired virtual address. If the operation is a store, the data which is to be stored is contained along with the request in the P request stack and is stored in the word of data which has been accessed from high-speed storage. On the other hand, if the operation was a fetch, then the word at the accessed high-speed storage address is gated to the P request.

At this point, data that is anticipated to be requested can be prefetched from main storage to be brought into high-speed storage, if it is not there. As was mentioned earlier, an interstorage transfer is initiated whenever a request is made for a virtual address which is not in high-speed storage. In addition, the system initiates interstorage transfers for virtual addresses which have a high probability of being requested. This is the prefetch operation. In general, there are 16 words in a line of data in high-speed storage. Whenever a data or instruction request is made for word zero of a line, the system checks to determine if the next-higher addressed line is in high-speed storage. If it is not, an interstorage transfer is initiated for the line in anticipation of its being required shortly. The prefetch operation is noted at 29 in FIG. 1A and is done by setting up a dummy request for the next-higher line back in the P request stack which will ultimately show up as a requirement for an interstorage transfer when the dummy request contends for priority. This will be explained in detail subsequently.

Returning to 25B of FIG. 1C, if the desired virtual address is not in either selected high-speed storage physical address, then an interstorage transfer will be initiated as in 30B. The specifics of the interstorage transfer operation will be explained in detail subsequently. In general, it can be explained as follows. If the requested virtual address is in neither the primary nor the alternate physical address in high-speed storage, then its whereabouts in main storage is determined by a search of the Directory 45 seen in FIG. 1. Further, Decision areas contain hardware which performs a replacement algorithm and choses either the primary or alternate physical address in high-speed storage as the address which is to receive the required virtual address.

During interstorage transfer, tag entry for the selected address is inspected. One of the tag entries is a bit which indicates whether the contents of that line have been changed. If the contents of that line in HSS have not been changed, it means that there is already a copy of that line in Main Storage 32; and it is permissible for the desired virtual address to be inserted directly over the entry which was previously resident in the selected physical address in high-speed storage. On the other hand, if the tag entry indicates that the data in the selected physical address in high-speed storage has been changed by storing into it, it is required to relocate this line of data back in the main storage to insure that a valid copy of this line of data remains resident in the system. After the changed line has been relocated in main storage, the desired virtual address can be moved in from main storage to the selected physical address in high-speed storage; and the request which initiated the interstorage transfer, hereinafter referred to as the interstorage transfer initiator, is then allowed to be the first request to contend for priority to insure that it gets the virtual address for which it initiated the interstorage transfer. This can be seen from line 30D of FIG. 1C. That is, after the interstorage transfer is complete, the request which initiated the transfer is gated from the request stack to the priority area. Line 30E indicates that this request contends in priority again and the next time test 25B is encountered, path 25C will be taken and the operation will ultimately be performed, or may be aborted for the single situation in which an interlock was detected after an incoming request bypassed the request stack.

DETAILED BLOCK DIAGRAM

Figures 2, 2A:
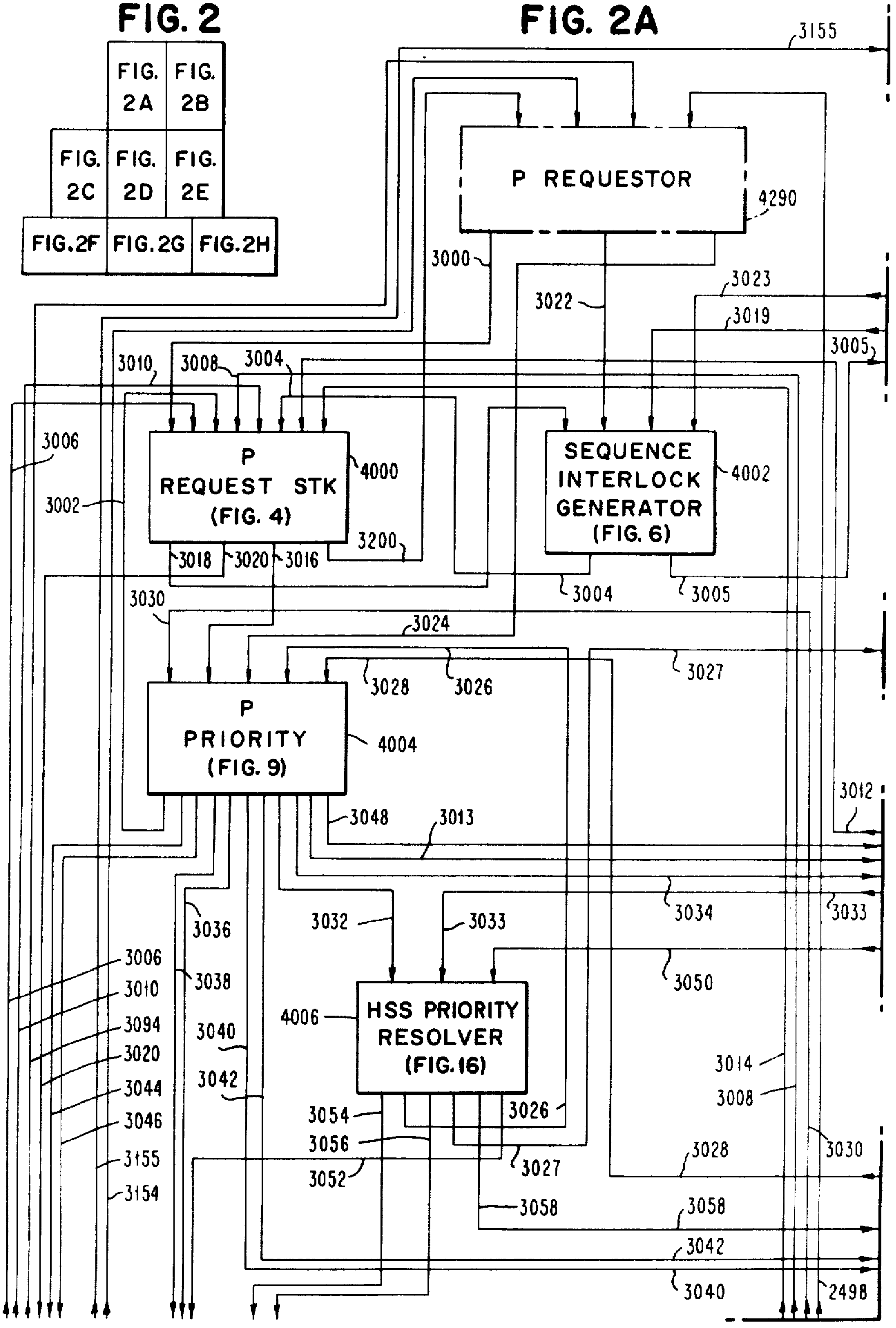
FIG. 2 shows the manner in which FIGS. 2A-2H should be placed adjacent each other.
FIGS. 2A-2H show a detailed block diagram of one embodiment of our invention.
Figure 2B:
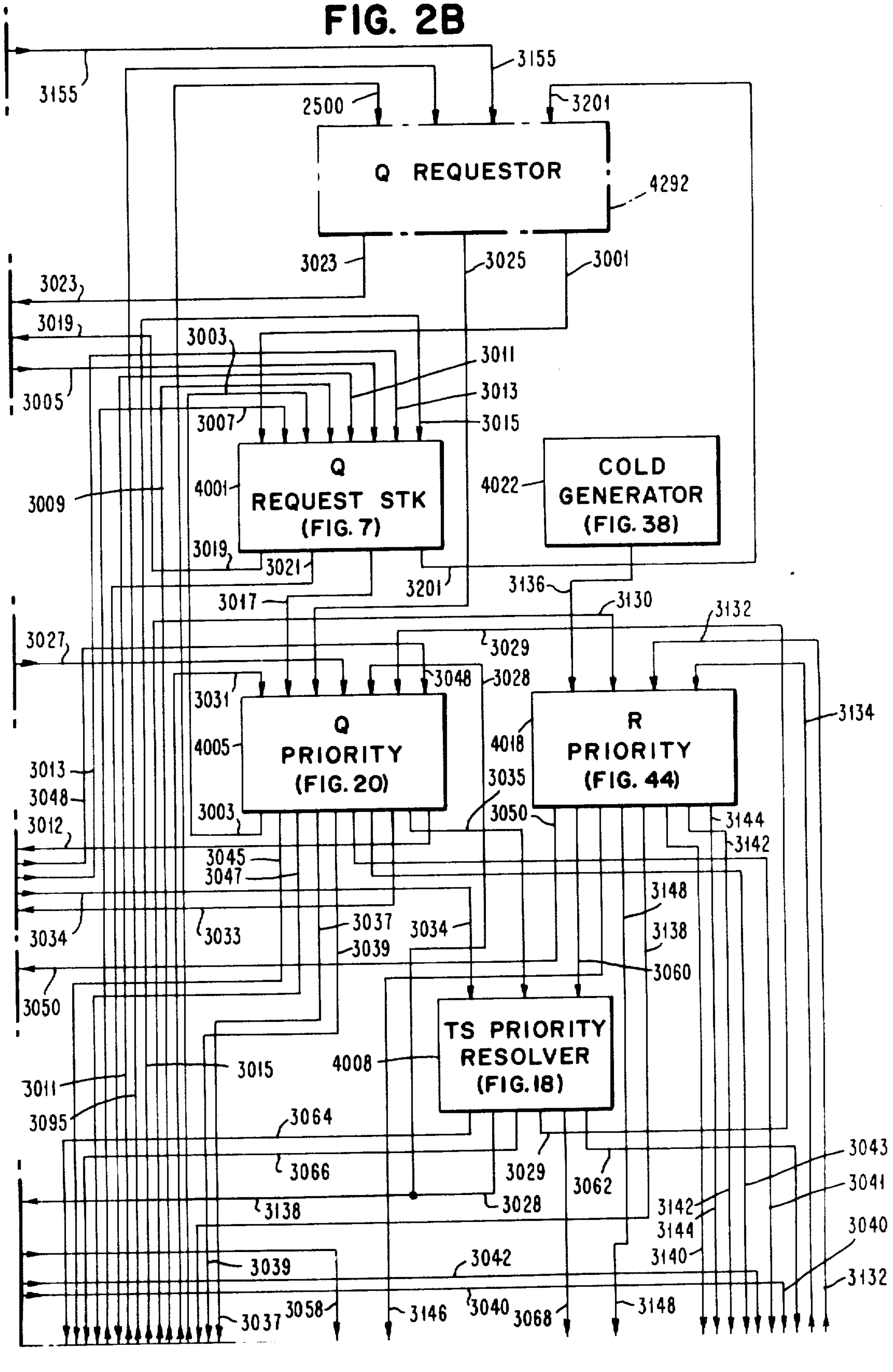
Figure 2C:
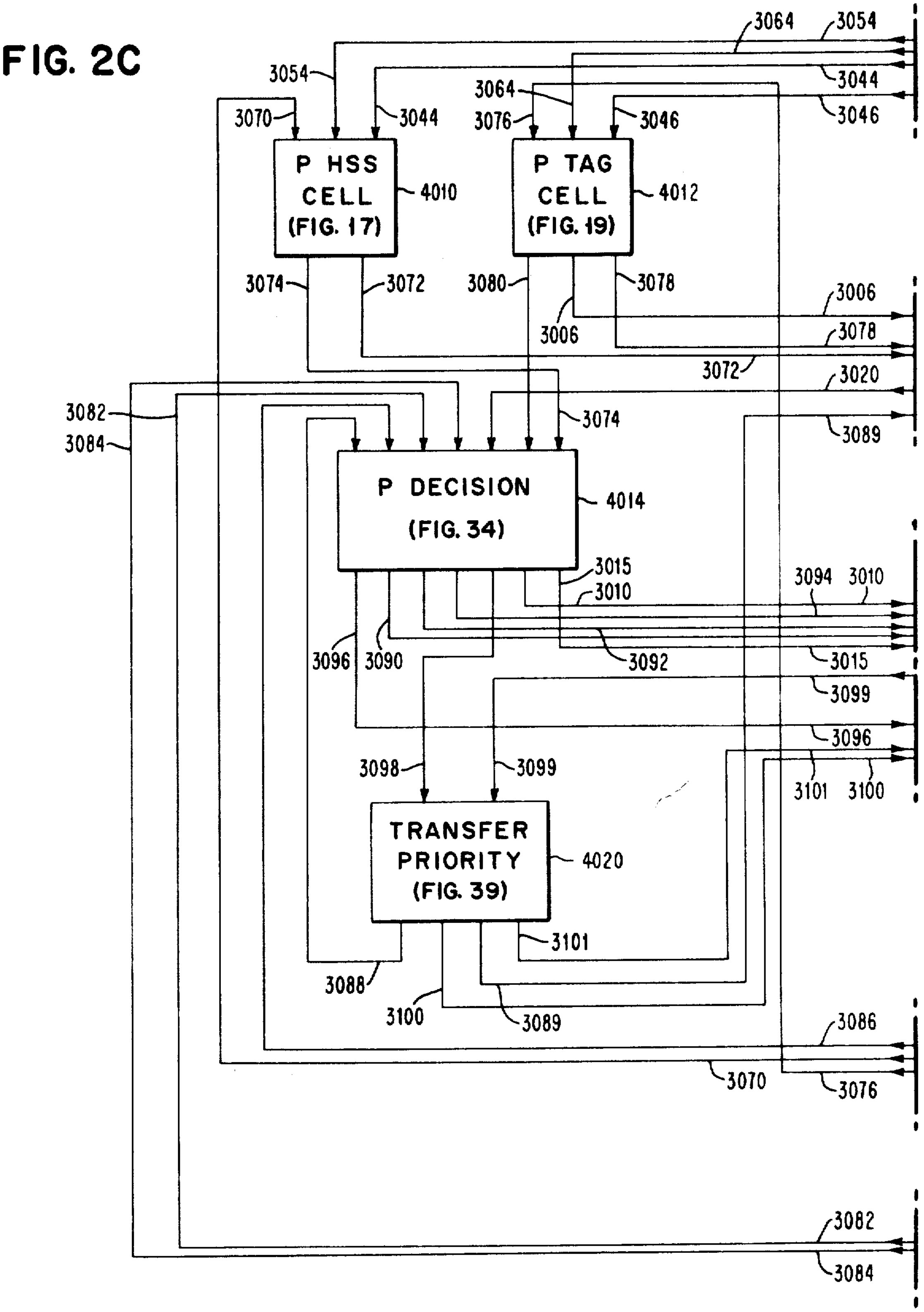
Figure 20:
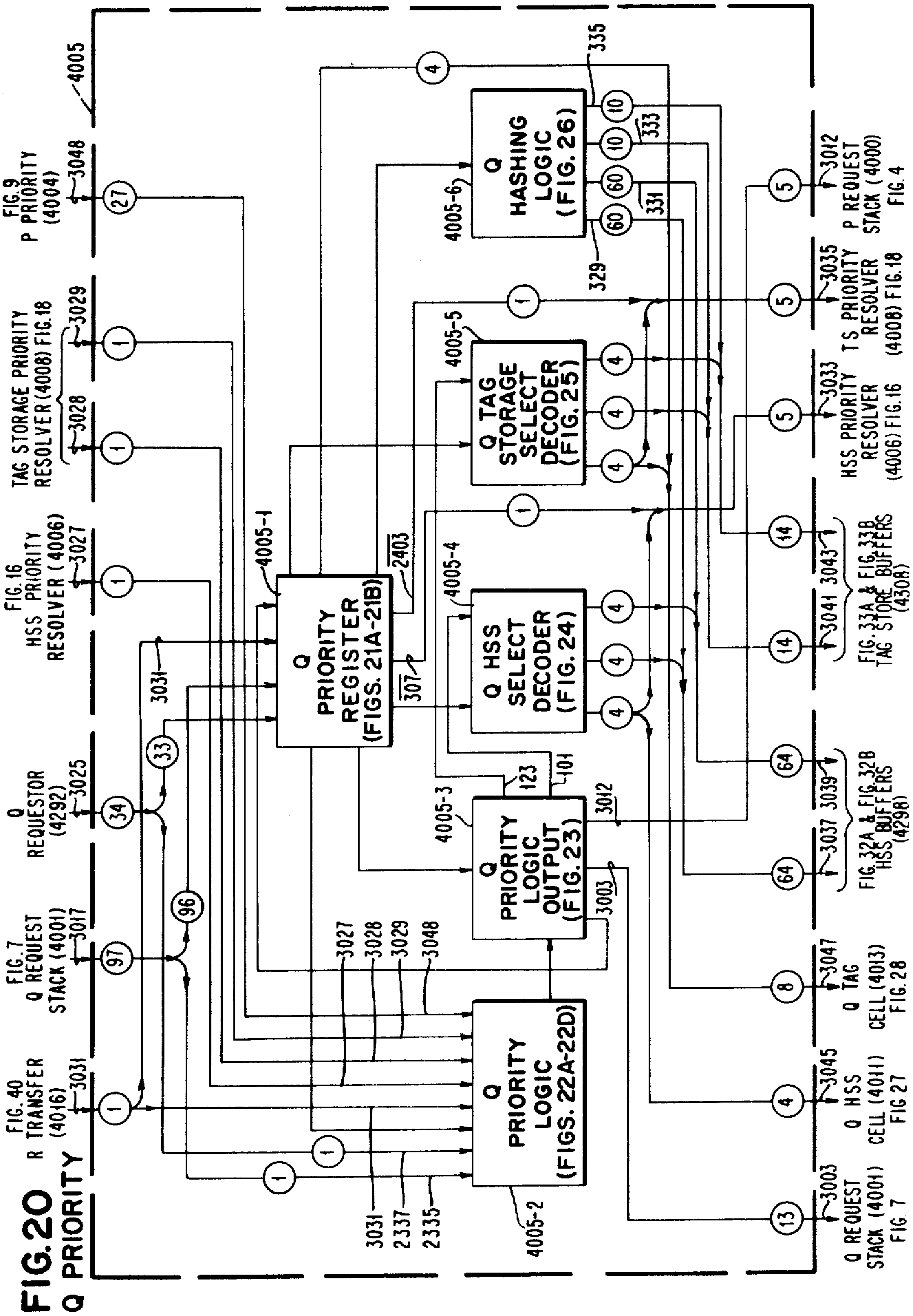
FIG. 20 shows a block diagram of the Q priority apparatus.
Figures 21, 21A:
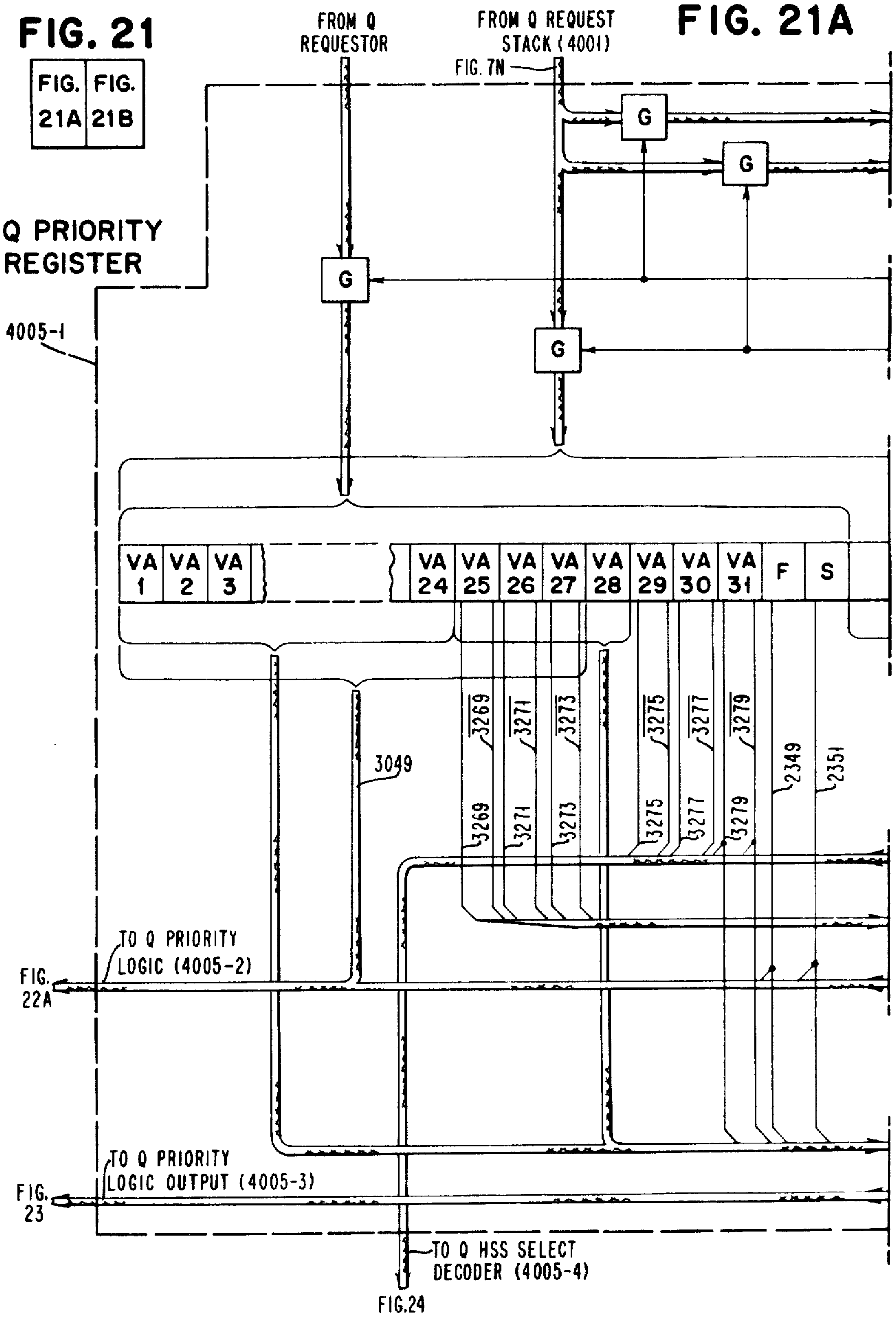
FIG. 21 shows the manner in which FIGS. 21A and 21B should be placed adjacent each other.
FIGS. 21A and 21B show the priority register of the Q priority apparatus of our invention.
Figure 21B:
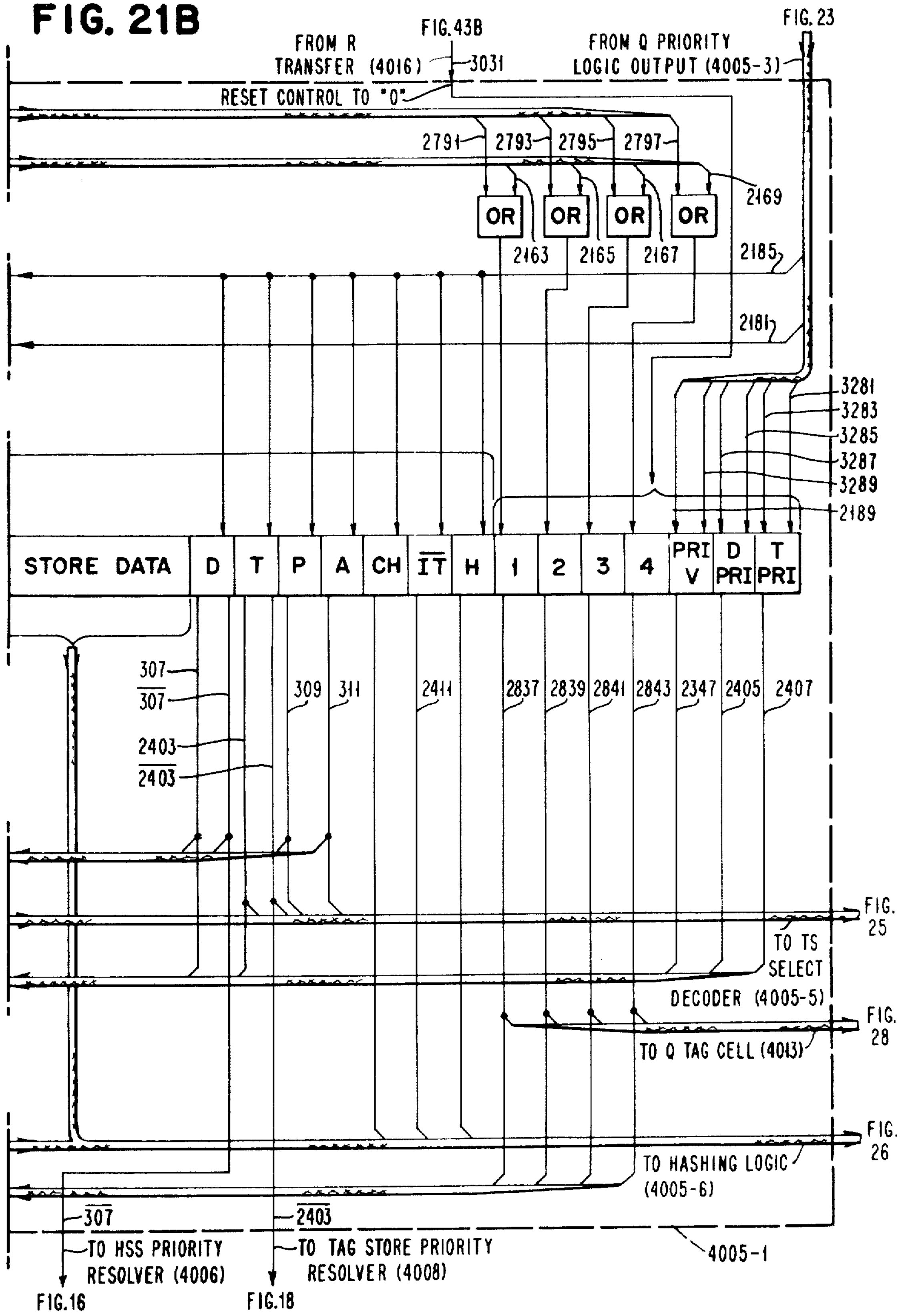
Figures 27, 28, 29, 30, 31, 32, 33, 34, 35, 36, 37, 38, 39, 40, 41, 42, 43, 44, 45, 46, 47, 48, 49, 50, 51, 52, 53, 54, 54E:
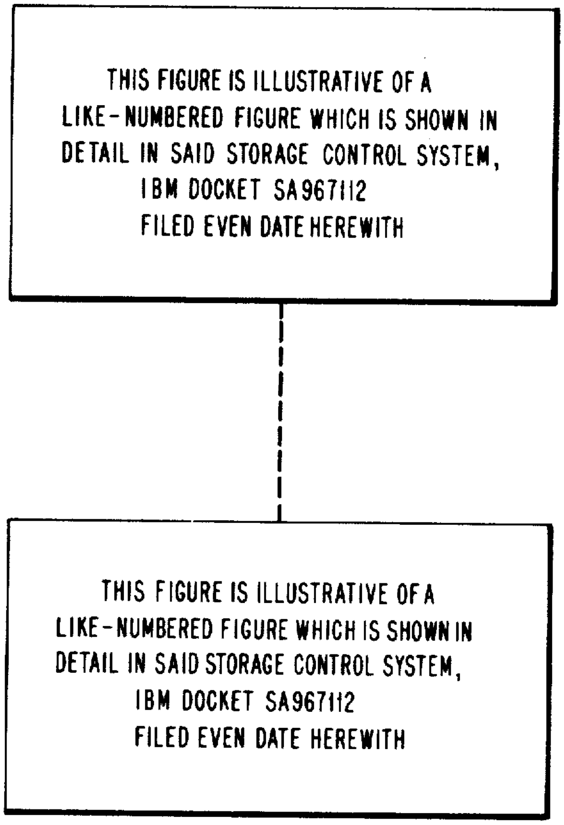

FIG. 2 shows the manner in which FIGS. 2A–2H should be placed adjacent each other in order to see the detailed block diagram of our invention. Referring to FIGS. 2A and 2B, there is seen the P requestor and Q requestor which may be input ports from individual digital computers or input ports from a single digital computer, or any combination of input ports of any type of information apparatus. The P requestor is connected by bus 3000 to the P request stack which is seen generally in FIG. 4 and the Q requestor is connected by buss 3001 to the Q request stack which will be seen in FIG. 7. Both ports are connected via buses 3022 and 3023, respectively, to the sequence interlock generator which will be seen in FIG. 6. The P request stack and P requestor are also connected to the P priority and hashing apparatus of FIG. 9, while the Q requester and Q request stack are connected to the Q priority and hashing apparatus of FIG. 20. The P and Q priority areas are connected by buses 3032 and 3033, respectively, to the high-speed storage priority resolver of FIG. 16. The P and Q priority areas are also likewise connected to the tag store priority resolver of FIG. 18. The high-speed storage priority resolver is connected to both the P, Q and R high-speed storage cells of FIGS. 17, 27 and 49, while the tag storage priority resolver of FIG. 18 is connected to the P, Q and R tag cells of FIGS. 19, 28, and 50. The tag cell holds gating information for tag storage accesses. Tag storage locations are accessed by information in the tag storage buffers of FIGS. 33A and 33B. The various tag cells each contain a time-out delay in order to allow the information to be accessed from the tag store and thereafter provide gating signals to the P, Q and R fetch tag registers of FIGS. 33E, 33F, and 33D, respectively, to gate the tag outputs into the appropriate fetch tag registers. Similarly, the P and Q high-speed storage cells contain a one HSS-cycle access delay to allow the desired information in the high-speed storage which was accessed by an address in the high-speed storage buffers of FIGS. 32A and 32B, to be accessed from high-speed store, and thereafter provides signals for gating the information into the P and Q fetch data registers. The R high-speed storage cell functions similarly. In addition, the P and Q high-speed storage cells are connected to the P and Q decision areas of FIGS. 34 and 48, while the R high-speed storage cell is connected to the R transfer unit of FIG. 40. The P and Q fetch tag registers of FIGS. 33E and 33F are connected, respectively, to the P and Q decision areas as shown. Likewise, the R fetch tag register is connected to the new directory buffer of FIG. 31A, the R transfer unit of FIG. 40, and the R priority unit of FIG. 44.

Figure 2D:
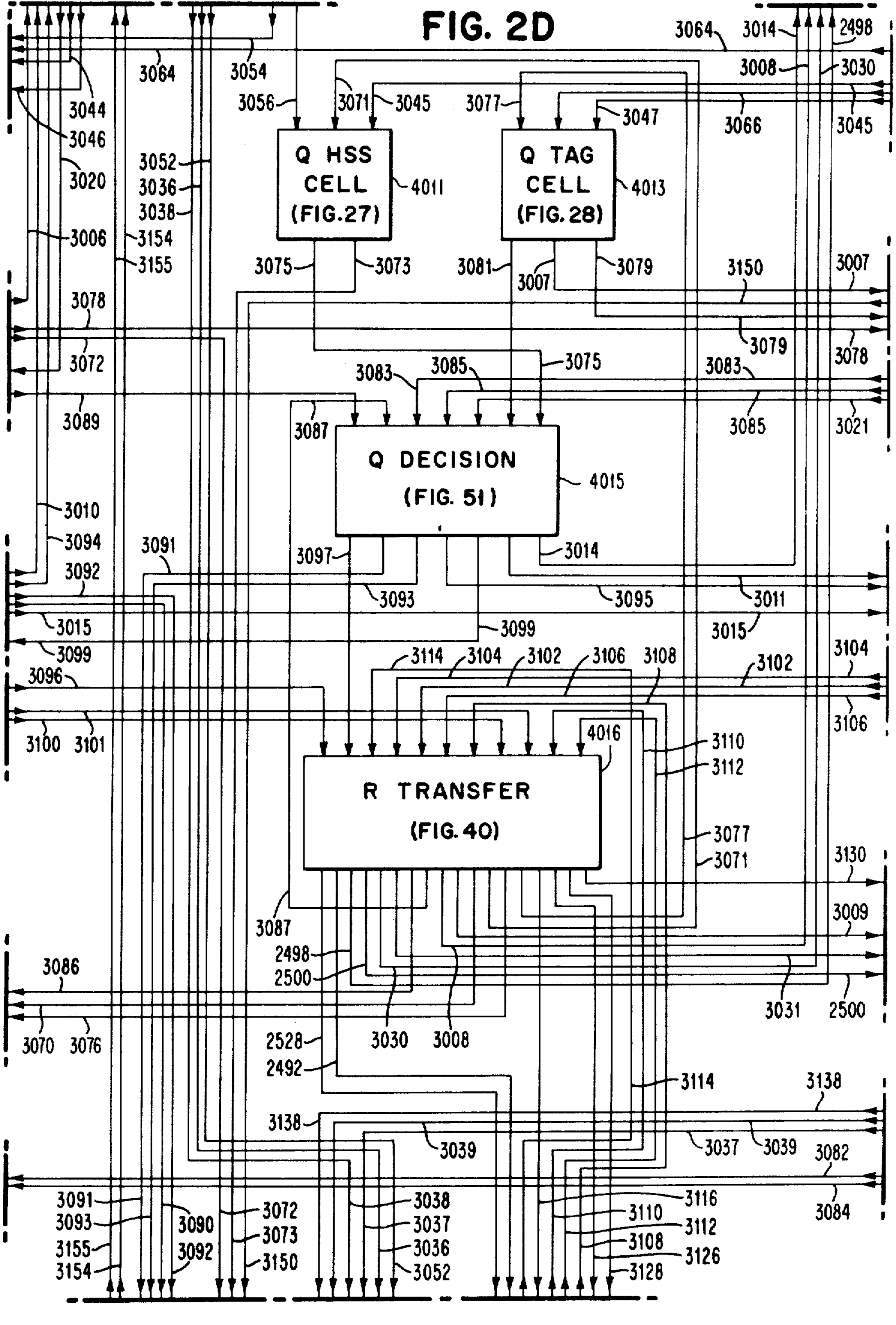
Figure 2E:
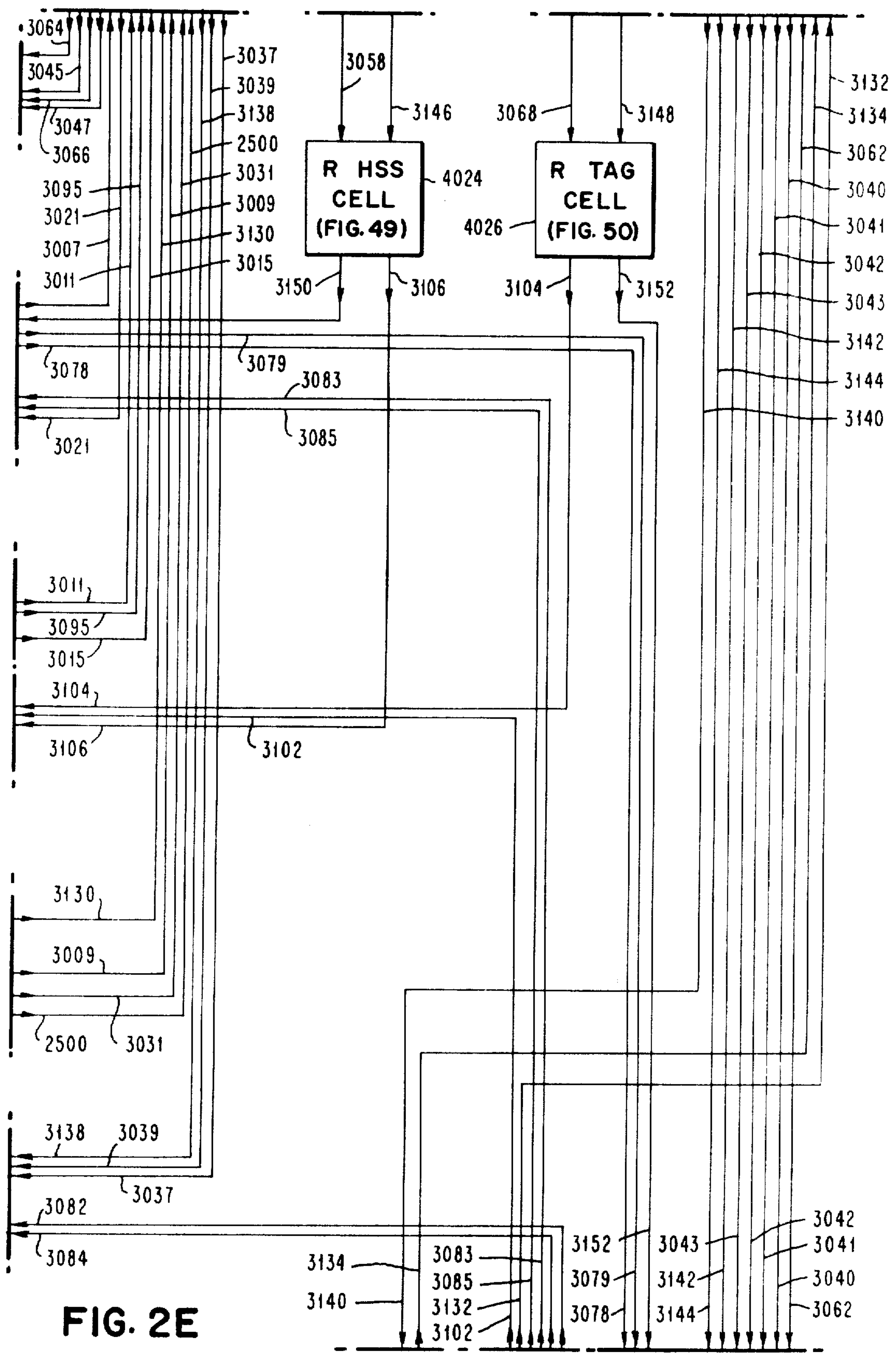
Figure 2F:
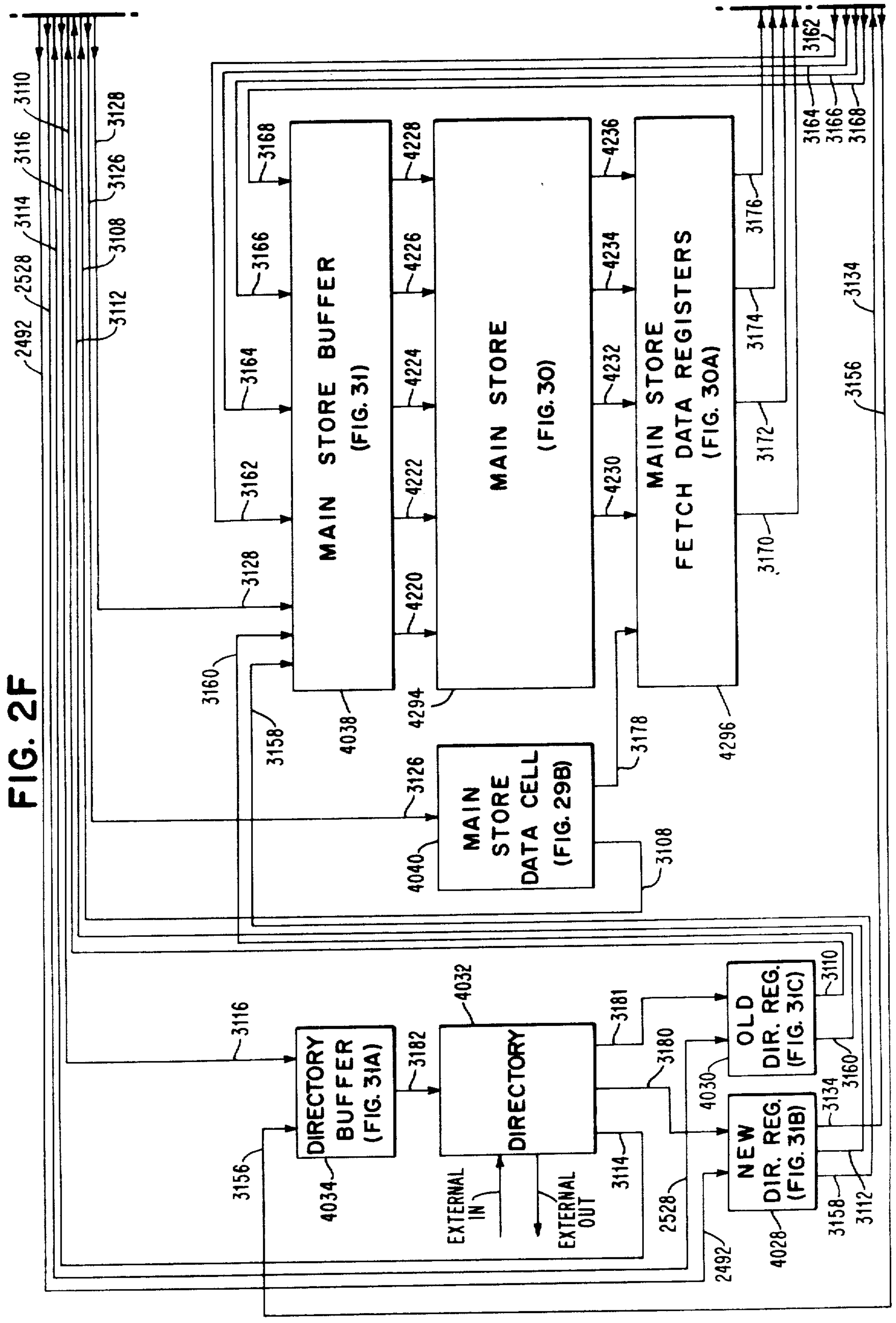
Figure 2G:
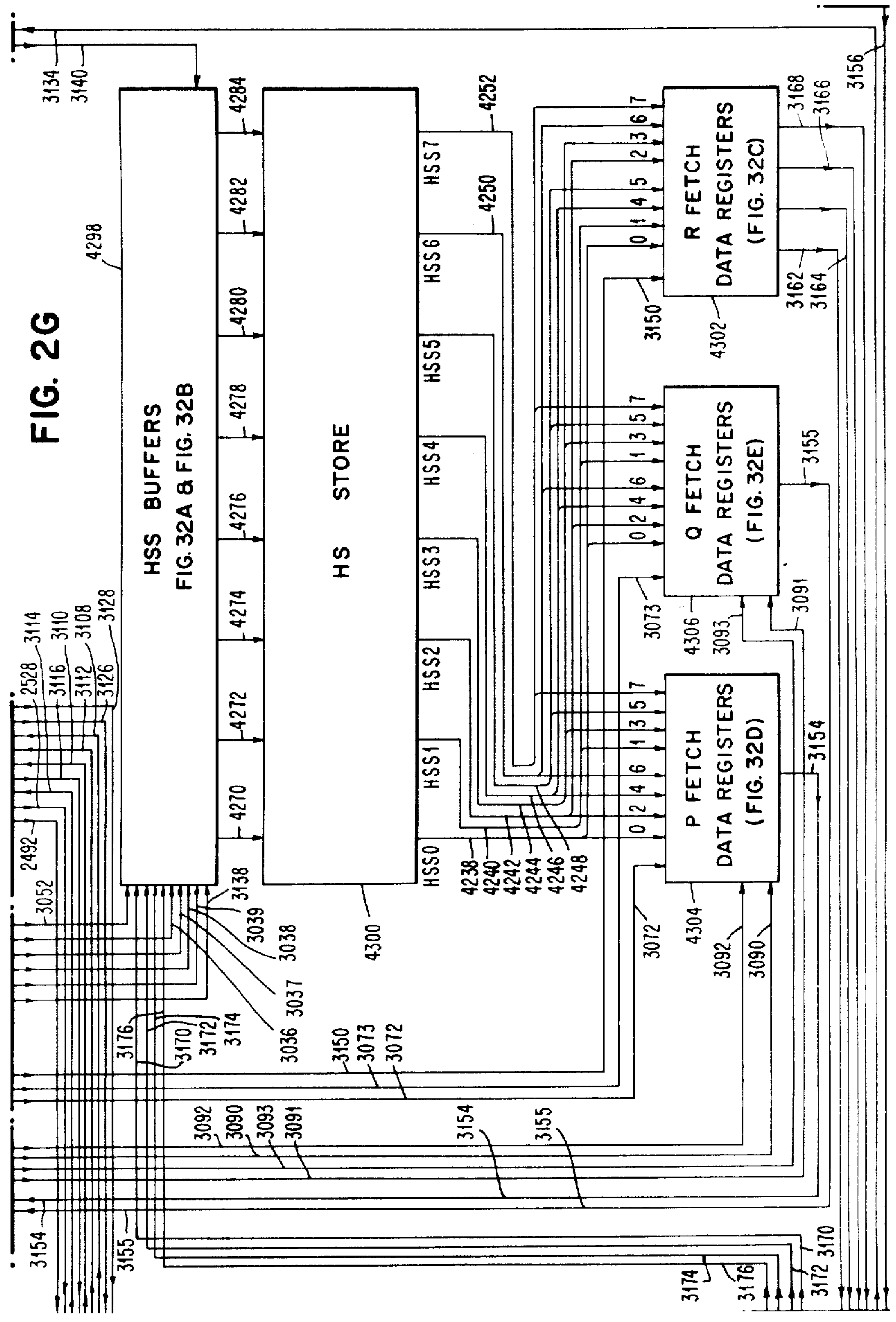

The directory seen in FIG. 2F is essentially an associative memory having its contents supplied (external in) and retrieved (external out) from a supervisory program, for example. The directory will be used as an index to the lines of data in the system. For example, the directory will serve as an index of what line of data in MS corresponds to a virtual address used in the storage system of our invention when that virtual address is not currently in HSS. The directory buffer register of FIG. 31A serves as an input to the directory, while the new directory register of FIG. 31B provides addressing information relating to new data, that is, data which is to be transferred from main storage into the high-speed storage, while the old directory register of FIG. 31C provides addressing information relative to old data, that is, data which is being relocated from high-speed storage back into main storage.

The main store buffer of FIG. 31 provides apparatus for accessing the main store of FIG. 30, as well as providing buffer storage for words of data which are to be stored into main store. The Main Store data cell of FIG. 29B receives input information relative to the configuration in which information is to be gated out of the main store and also contains one main store access time delay to time out the main store before providing gating signals for the main store fetch data registers of FIG. 30A. The main store fetch data registers are then connected back to the high-speed storage buffers of FIGS. 32A and 32B for locating new data from main storage into high-speed storage.

Referring to FIGS. 3A and 3B, there is seen a timing sequence diagram of the basic operation of our invention. It is assumed, relative to FIGS. 2A-2H, that for explanation of FIGS. 3A – 3C there are requests in the request stacks ready to begin their contention for access. Each request stack, as will be described subsequently, will be interrogated to find the oldest request therein ready to contend for priority to access the high-speed storage or tag storage, or both. It will be appreciated by the reader that servicing of requests in both request ports, as well as an interstorage transfer by the interstorage transfer unit may all be going on concurrently. However, in order to illustrate the situation, operation will be described with respect to the P port alone, it being understood that concurrent operation may be underway in the Q port and in the interstorage transfer unit. Resolutions of priority conflicts among the P and Q ports and the (R) interstorage transfer units will be pointed out with particularity.

Assuming the fetch of FIG. 3A, a fetch request from the P request stack is gated to the P priority register where it contends for priority to access the HSS and tag store. The virtual address is hashed or randomized into a primary and an alternate physical address and priority logic determines whether the particular entity to be addressed in high-speed or tag storage is being accessed by a higher priority request such as, in this case, an interstorage transfer. If it is not, the fetch request in the P priority apparatus is given priority to access the high-speed and tag stores. This determination of priorities is done by resolving conflicts in the high-speed storage resolver and the tag storage priority resolver of FIGS. 2A and 2B. If no higher priority area is accessing the high-speed or tag storage entities of interest, then priority is given to this fetch request and the physical address is gated from the priority area tag storage buffers and to the high-speed storage buffers to access the primary and alternate physical addresses represented by the virtual address of this request. Information is also gated to the P high-speed storage cell and P tag cell relative to which fetch data registers and which fetch tag registers should be gated into from the high-speed store and the tag store. Also included in the tag and data cell is a built-in delay to essentially time-out the access from the high-speed and data stores, after which the proper information is gated to the proper fetch data and fetch tag registers. As seen in FIG. 3A, the P decision unit then inspects the tags from the primary and alternate addresses. If either tag compares with the requested virtual address, then when the data is valid at the appropriate fetch data register, it is gated out to the requestor. If the tags need updating, this information is sent back to the request in its appropriate request stack level, and the request stack level again competes for priority. When priority is obtained, it then accesses the tag store and stores away the updated tags.

As seen in FIG. 3B, action is somewhat similar for store, the request in the P request stack gaining access to the P priority unit. When priority is granted to access the tag store, the primary and alternate address tags are gated to the decision unit. Again, the P tag cell comes into play in a manner similar to the fetch operation, the tags are inspected and if either one compares with the virtual address in the request, then the request in the appropriate request stack level is informed that it can go ahead and store its data away. Furthermore, if the tag requires updating this information is also stored in the request in the request stack. The request stack then obtains entrance to the priority apparatus a second time; and when priority is gained to access either or both, as the case may be, of the high-speed store and tag store, then the store data is stored. If the tag requires updating, the updated tag is stored in the tag store.

On the other hand, if the line identifier in neither tag compares with the virtual address of the current request, then the decision unit decides into which of the primary or alternate lines the requested line of data is to be moved into from main storage.

As can be seen from FIG. 3C, for a fetch with interstorage transfer, the decision unit notifies the interstorage transfer (R) unit that an interstorage transfer is about to take place. If the interstorage transfer unit is not busy, it proceeds with the interstorage transfer. This may entail both moving data out of high-speed storage and into main storage, as well as transferring data from main storage to high-speed storage. This is indicated by the broken line in the timing chart. At the completion of interstorage transfer, the request stack is notified by having the wait (W) bit turned off for this request as at E in FIG. 3C. The request ultimately again contends for priority and the high-speed storage and tag storage are both accessed. The decision unit again inspects the tags as at F in FIG. 3C. While it is theoretically possible for another request to have caused a second interstorage transfer to the HSS address under consideration between the time the first interstorage transfer is comp and the time the decision unit inspects the tags, this will occur on only a negligible percentage of requests. Whenever it does occur, procedures to be explained subsequently will insure data integrity. Therefore, the decision unit will ordinarily indicate, after the second inspection at F, that the desired data is now resident in HSS. The data is then gated out to the requestor, and the request in the request stack is updated by setting bits which are to be used in updating the tags. The request again contends for priority as at G in FIG. 3C; and when priority is granted, the request accesses the tag store to store therein the updated tag information.

Referring to FIG. 3D, there is seen a timing chart for a store operation with interstorage transfer. The store proceeds normally until the decision area is encountered the first time at H. If the decision area indicates that the desired virtual address is not in high-speed storage, the interstorage transfer unit is brought into play. At the completion of interstorage transfer, the request in the request stack is updated by resetting the W bit to zero, enabling the initiating request to contend for priority as at I. After successful priority contention, the request is allowed to access the tag storage. The decision unit then inspects the tags, one of which will normally contain the proper line identifier. The request stack is then notified as at J, and the request again contends for priority. When priority is given to access the high-speed and tag stores, the store data is stored and the tag is updated.

It will be theoretically possible during a store request that the desired line of data may be moved out of high-speed storage by another request after the decision unit has indicated to the request in the request stack that the desired virtual address is present in high-speed storage as at D in FIG. 3A. However, when moving out this data the interstorage transfer unit will go back to the request stack and turn off the control bits which would normally have allowed all requests to contend for priority the second time (D1 in FIG. 3A). Therefore, it is assured that a store operation will never store data into a virtual address which has been removed from HSS since the last time the decision unit inspected the tags. The same condition holds for the store part of the fetch (after B in FIG. 3A). In either case, the request will begin all over again by requesting priority, and the decision unit will determine that the desired virtual address is not in high-speed storage and will initiate an interstorage transfer. The request will ultimately be serviced with the proper data.

DETAILED STRUCTURE

Request Stacks and Gating Control Therefor

The P and Q request stacks and the sequence interlock generators, seen generally at 3, 4, and 5, respectively, in FIG. 1, will now be described in detail. The P Request Stack is seen in block diagram form in FIG. 2 and includes P Request Stack and Register Control 4000–1, P Gate Control 4000–2, and associated control lines and buses.

P Request Stack and Register Control 4000–1 comprises a group of registers for holding a request and associated control information which is updated as the request passes through the storage system. A Q request stack is similarly comprised. As will be seen in more detail subsequently, the function of the request stacks is to hold each request until it can be acted upon and to keep a running record of the progress of the access initiated by the request. During the processing of the request, it may be necessary to hold up action on the request until some other operation, such as an interstorage transfer, has been completed. To this end there are various control fields in each of the stack registers which can be set in order to indicate the status of such a request for access until it is finally completed.

P Gate Control 4000–2 includes both in-gate control and out-gate control. Requests coming into the system can be ingated to any of the request stack positions with no reference to order. They also never have to change positions in the request stack.

The ingate control logic also handles data stores. Normally, a request is generated before the appropriate store data is available. There is at least one cycle between the time the request is sent and the time the store data is sent, but there may be many cycles. The single requirement is that the store data be sent to the port in the same sequence as the store request. When the data arrives, the in-gate control selects the oldest store in the request stack which requires data and places the store data into it. Thus, if the store data comes in sequence as required, the first store data will be appropriate for the oldest store request requiring store data in the request stack.

The outgate control logic selects the oldest request to be outgated to the priority apparatus. Normally, it is necessary to determine the priority of the plurality of accesses being requested. Therefore, this logic will gate the oldest request which is ready to request access to the priority apparatus on any given cycle. The outgate control logic remembers the order of request inputs. The logic generates a priority request, scans the active requests and allows the oldest active stack position to be gated to the priority area. It will be appreciated subsequently that this outgate control allows requests to be removed from the request stack with no relation to age, and requests can be resident for any number of cycles.

Figure 4:
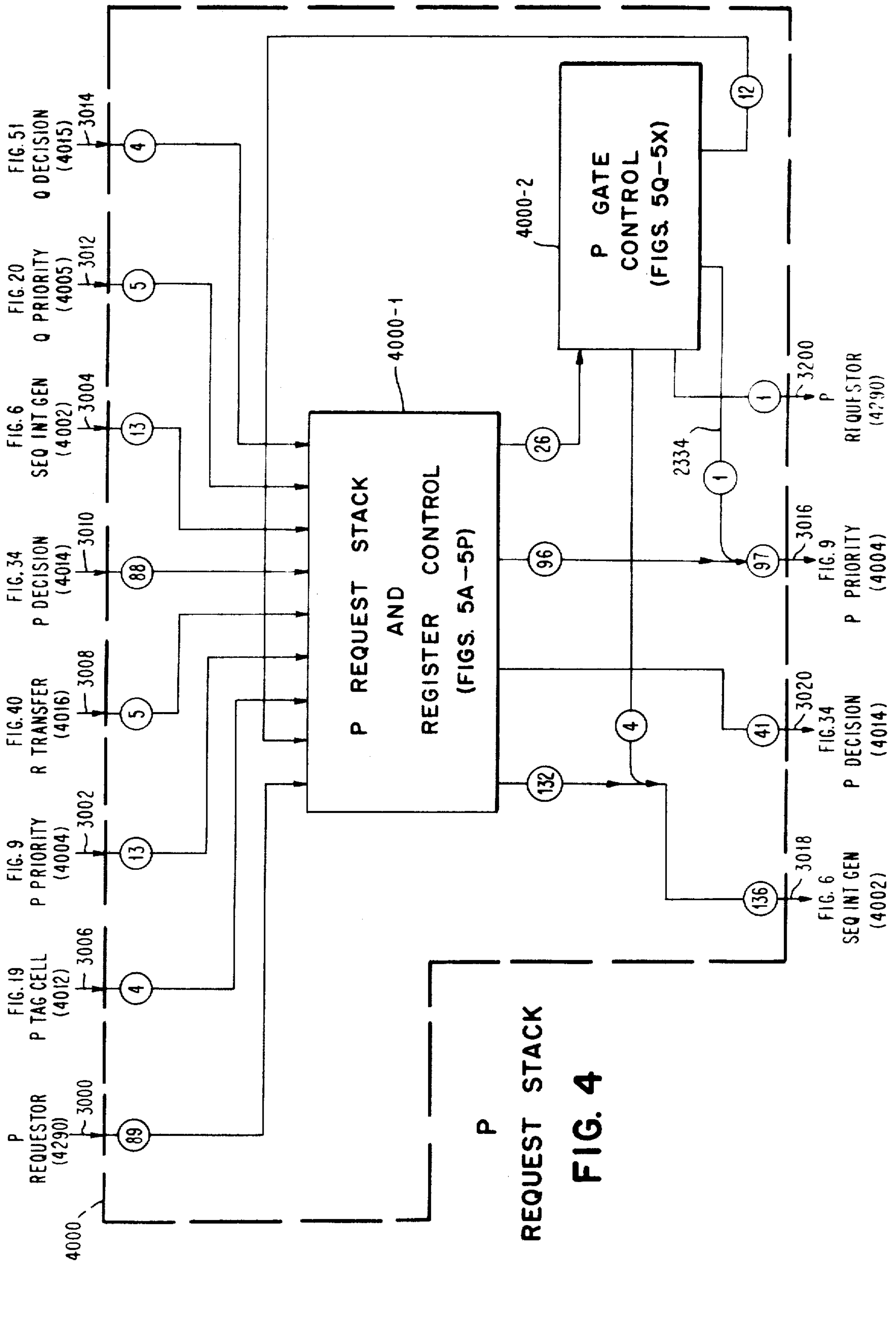
FIG. 4 shows a block diagram of the P request stack, including the P gate control.

With continued reference to FIG. 4 requests from the P requestor are connected to the P request stack by Bus 3000 which transmits the virtual address; an indication that the request is valid; an indication of the operation type, whether fetch or store; the destination of the operand if the operation is a fetch; the store data, if the operation is a store; and an indication that the store data is valid.

P Request Stack 4000–1 is connected to Sequence Interlock Generator 4002 by Bus 3018. Bus 3018 transmits the virtual address from each of the registers in the request stack, an indication of whether the operation is a store for each of the registers in the request stack, and whether the request in a given register is valid.

P Gate Control 4000–2 is connected to Sequence Interlock Generator 4002 by lines 2790 to 2796. These lines transmit the ingate signal for each register in the request stack to the Sequence Interlock Generator 4002. P Gate Control Logic 4000–2 is connected to P Request Stack and Register Control 4001-1 by Bus 4000P–OUT. Bus 4000P–OUT transmits in gating signals to gate requests from the requestor area to individual registers in the request stack. P Gate Control 4000–2 is connected to the P request area via line 3200 which is an indication to the requestor that the request stack is currently full and can accept no more requests. P Request Stack and Register Control 4000–1 is connected to the P Decision Unit 4014 by bus 3020. Bus 3020 transmits to the P Decision Unit the virtual address, an indication of whether the operation is a fetch or a store, the destination if the operation is a fetch, an indication that the request is interlocked, and a line that indicates that the request has initiated an interstorage transfer. Also, the P Request Stack and Register Control is connected by bus 3016 to the P priority unit 4004. Bus 3016 transmits the virtual address, an indication of whether the operation is a fetch or a store, an indication that the stack position from which the request is being transferred is valid, the store data, various control bits, and ingate and outgate lines for gating requests between the request stack and the priority unit.

P Tag Cell 4012 is connected via bus 3006 to P Request Stack and Register Control 4000–1. The P Tag Cell functions to delay gating signals for one cycle so that they can be used for switching the proper tag storage modules to the fetch tag registers which hold the tags which are gated out of the tag storage. It further serves to outgate the proper request stack level to the decision unit and ingate the stack source number to the decision register of the decision unit. This will be described in detail subsequently. Bus 3002 from the P Priority Unit 4004 is also connected as an input to the P Request Stack and Register Control 4000–1. This bus contains lines which set the Priority Accept (PX) bit for each register level, which bit, as will be explained, indicates that the request resident at that level has been accepted for priority contention. This bus also contains lines for setting various stack controls and for setting bits in the stack levels which indicate that a given request is waiting for interstorage transfer. Finally, this bus contains lines which reset bits in the interlock vector for a given request to indicate which requests of those to which a given request are interlocked are complete.

The R Transfer Unit 4016 is connected to the P Request Stack and Register Control 4000–1 by bus 3008. This bus contains a line to reset various control bits in the levels of the request stack. It also contains lines to reset the Wair (W) bit in each request level after an interstorage transfer.

The P Decision Unit 4014 is connected via bus 3010 to P Request Stack and Register Control 4000–1. This bus contains lines to reset the interlock identifier bits in the interlock vector in each stack level, to set bits in each level indicating that the request resident therein requires either data or tags to be stored, and sets control bits in each level to indicate whether the last-named data or tags to be stored is in the primary or alternate addresses of the tag or data storages. This bus 3010 from the P decision unit also contains lines which set control bits in the requests at the different levels of the request stack, which indicate the status of the request and of the data which is indicated by the request. Furthermore, bus 3010 contains lines for transmitting the prefetch address and associated ingating into the requests in the request stack. Sequence Interlock Generator 4002 is connected to the P Request Stack in register controls via bus 3012. Bus 3012 contains lines for setting the sequence interlock vector for each request, a line for setting an indicator that a given request is sequence interlocked (hereinafter referred to as the sequence interlock bit) and also associated ingating signals. The Q priority apparatus 4005 is connected via bus 3012 to the P request stack, and the Q Decision Apparatus 4015 is connected via bus 3014 to the request apparatus. Bus 3012 resets the Wait control bit in the various requests in the request stack and also resets appropriate bits in the sequence interlock vector. Bus 3014 similarly resets appropriate bits in the sequence interlock vector.

P Request Stack and Register Control

Figure 5:
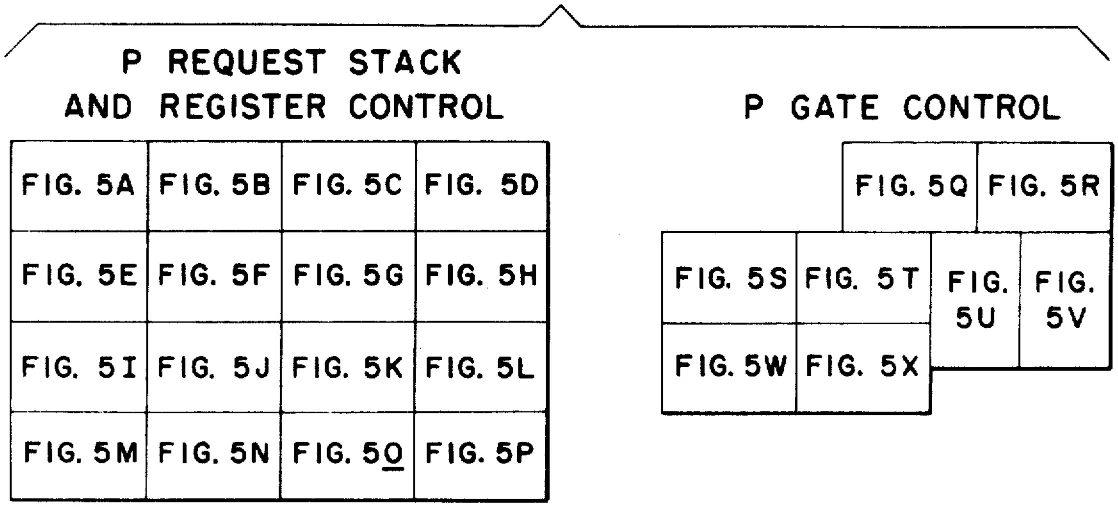
FIG. 5 shows the way in which FIGS. 5A-5P and 5Q-5X should be placed adjacent each other.
Figure 7A:
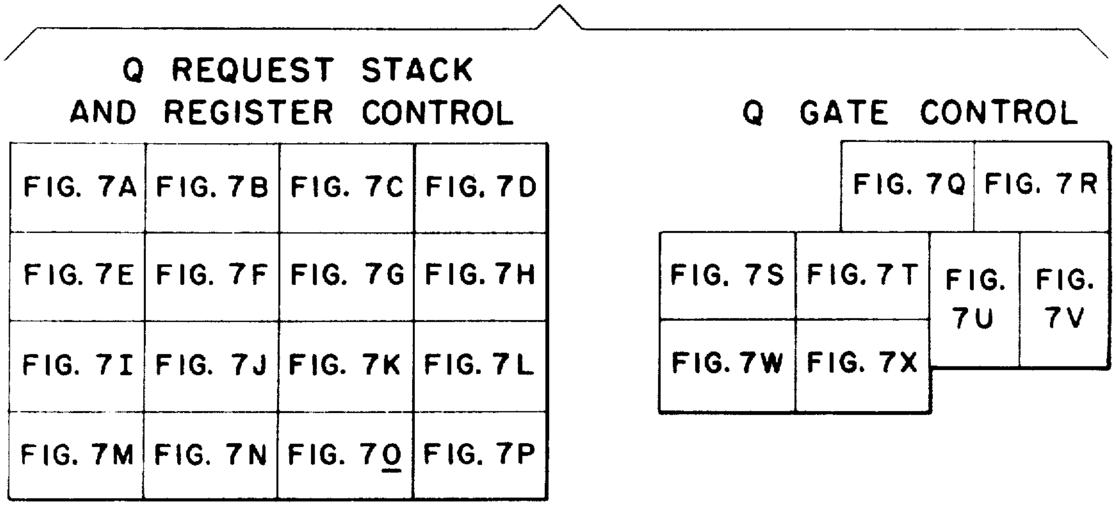
FIG. 7AA shows the manner in which FIGS. 7A-7P and 7Q-7X should be placed adjacent each other.
Figure 5A:
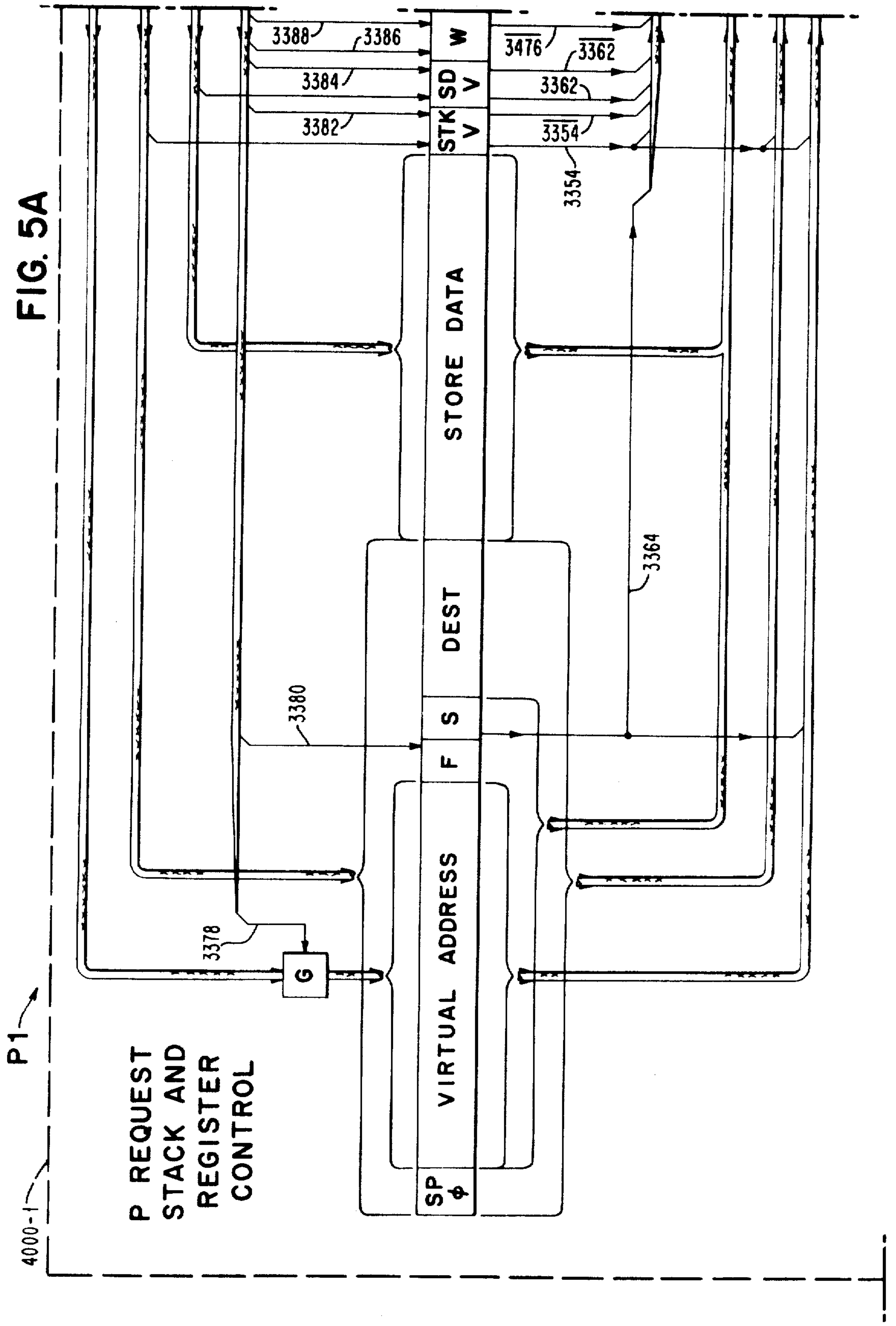
FIGS. 5A-5P show a detailed representation of the P request stack.
Figure 5B:
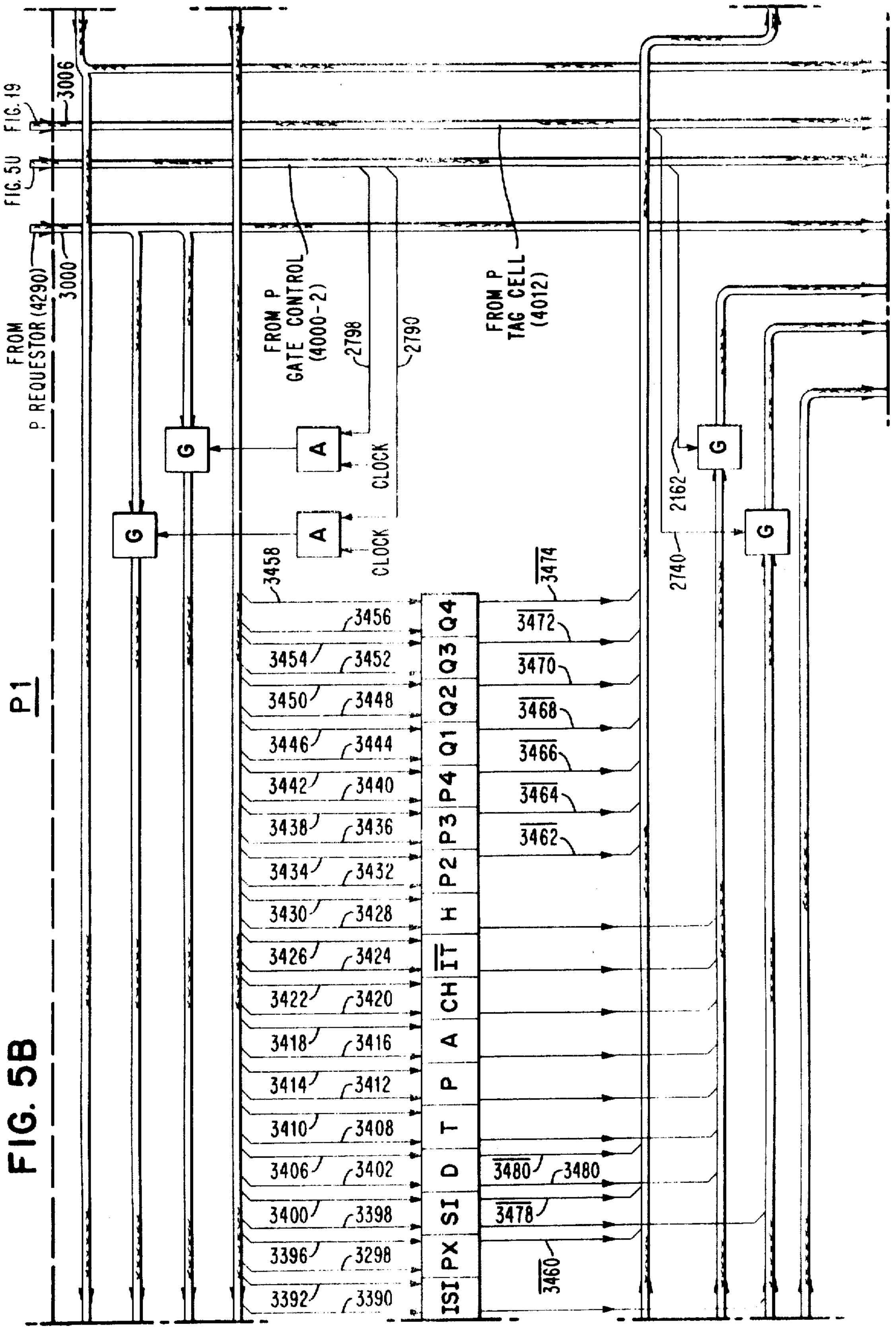
FIGS. 5Q-5X show a detailed representation of the P gate control.
Figure 5C:
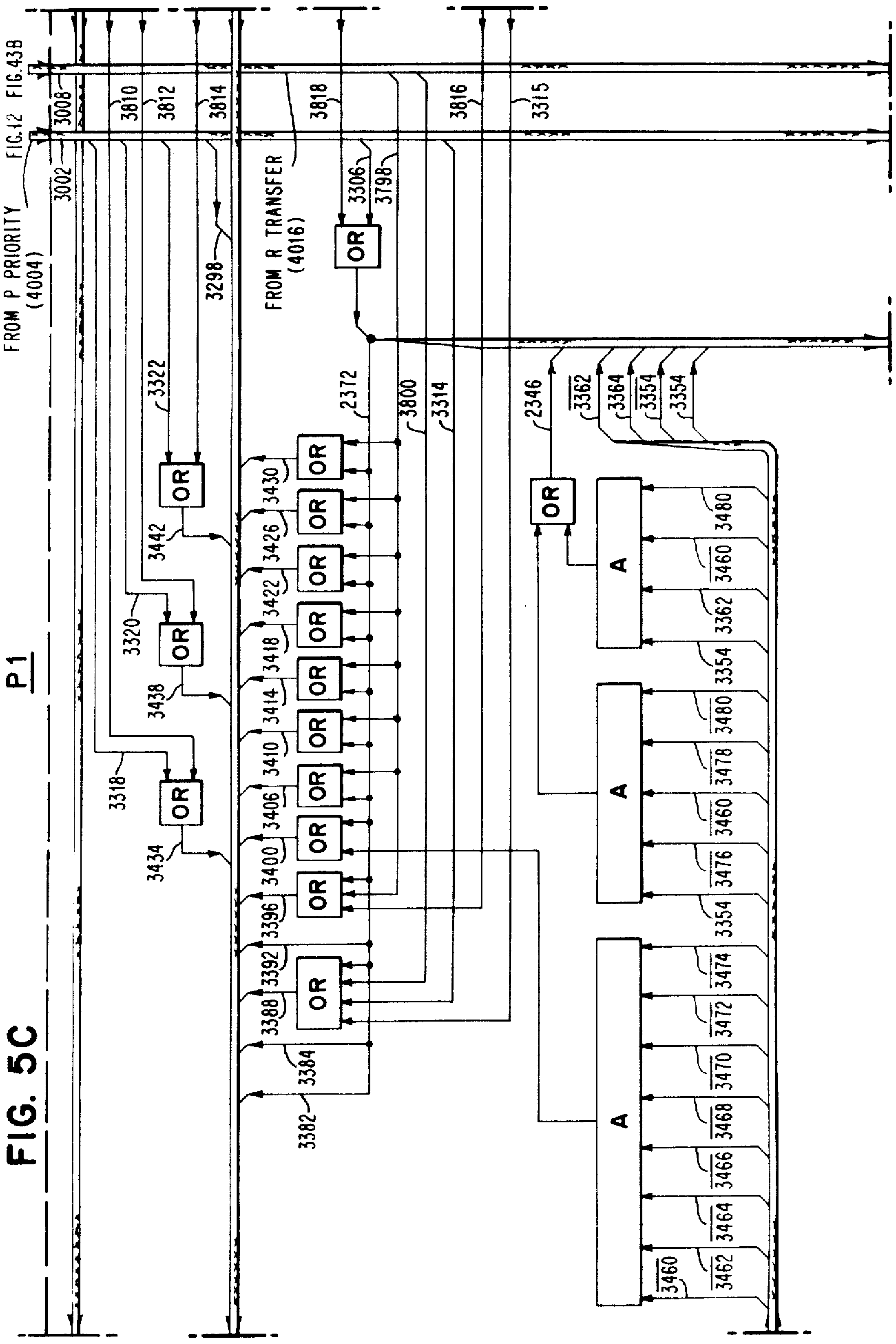
Figure 5D:
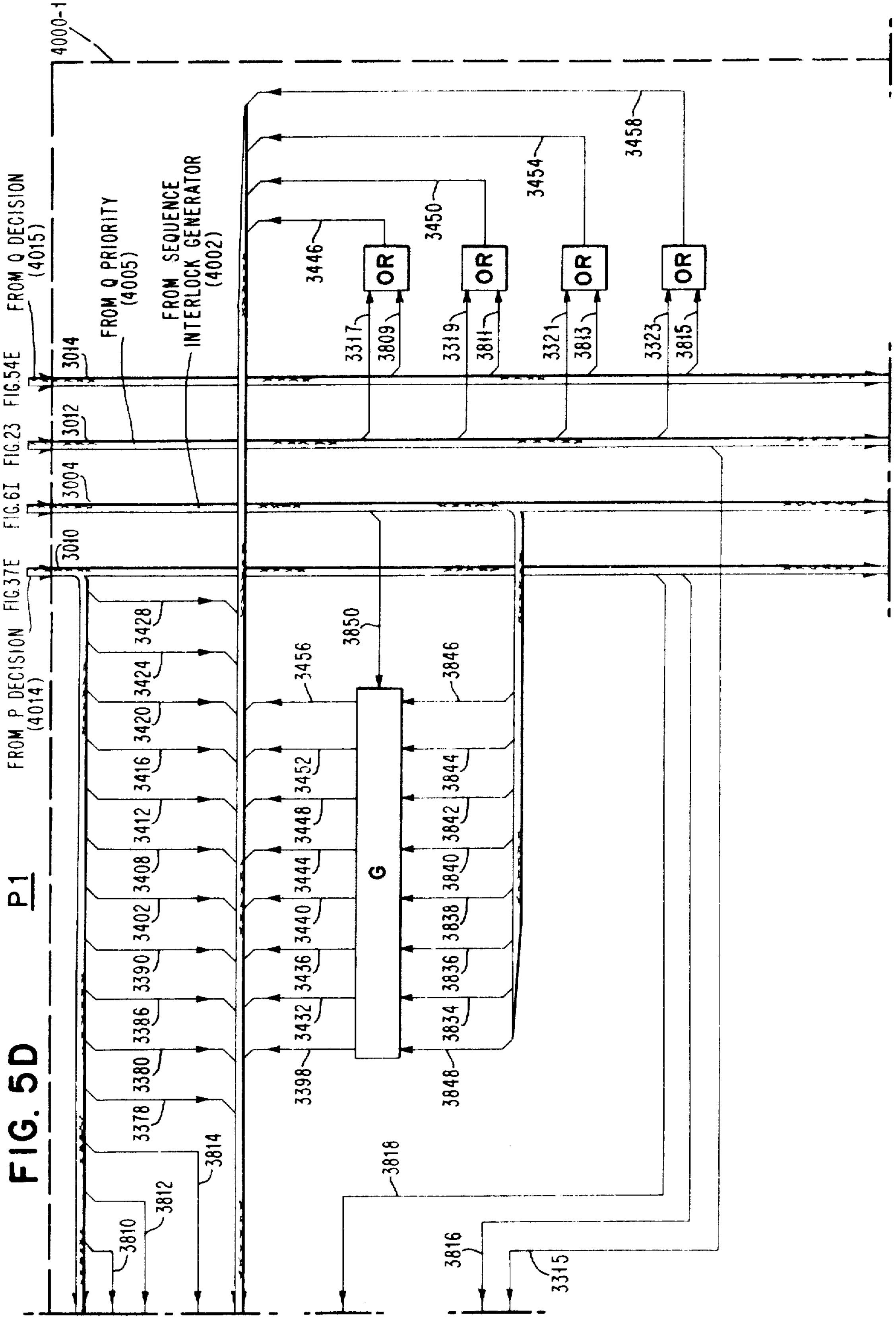
Figure 5E:
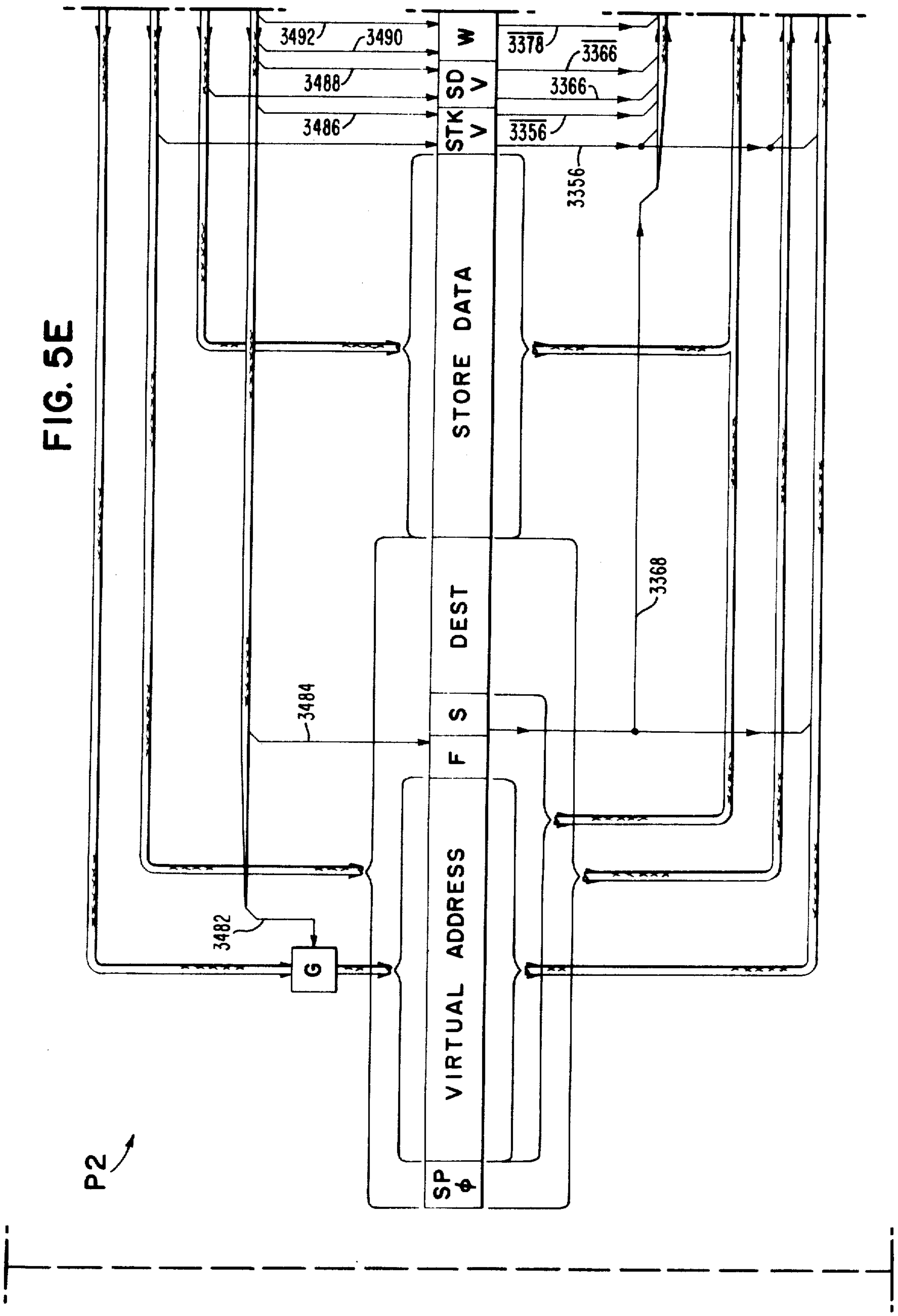
Figure 5F:
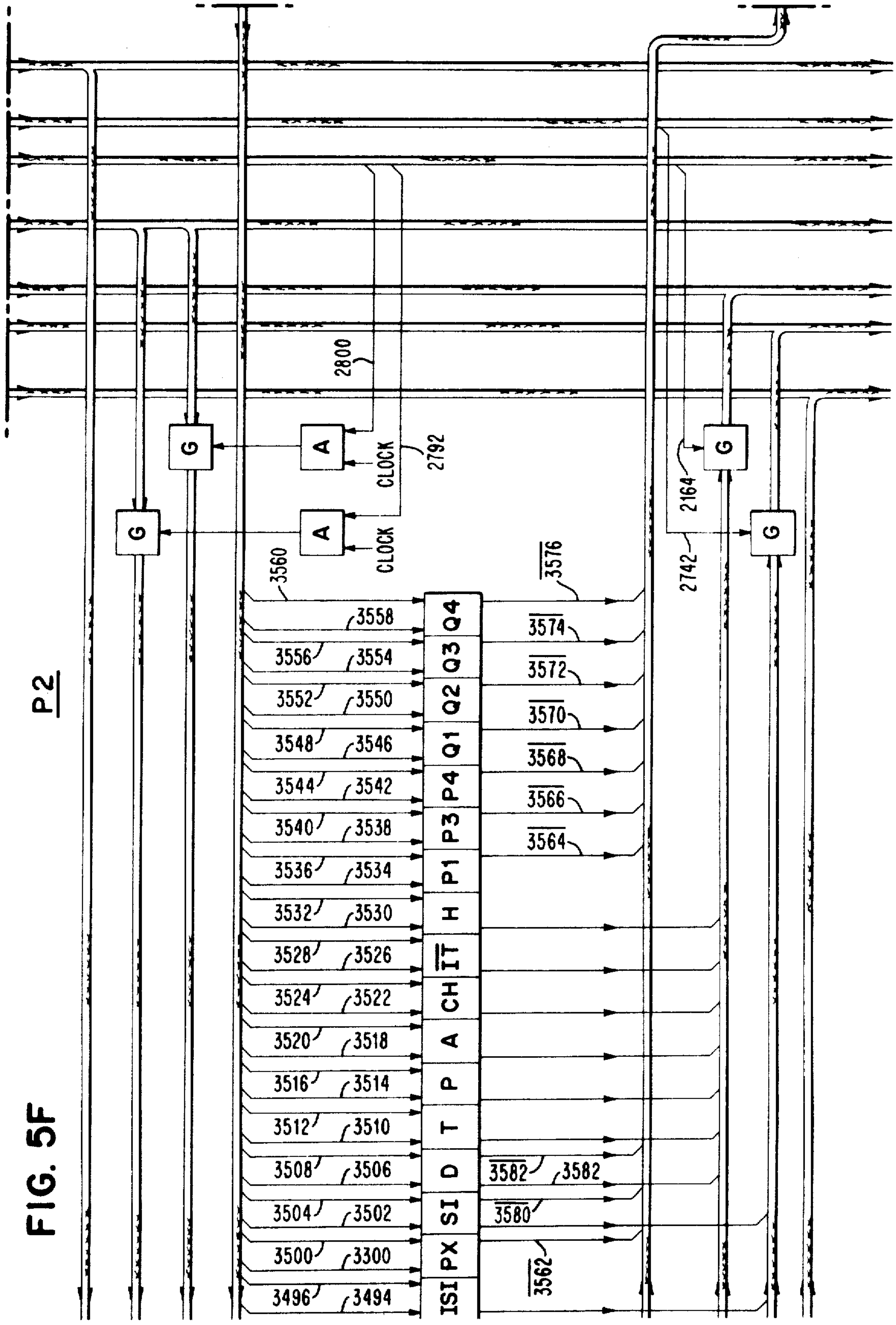
Figure 5G:
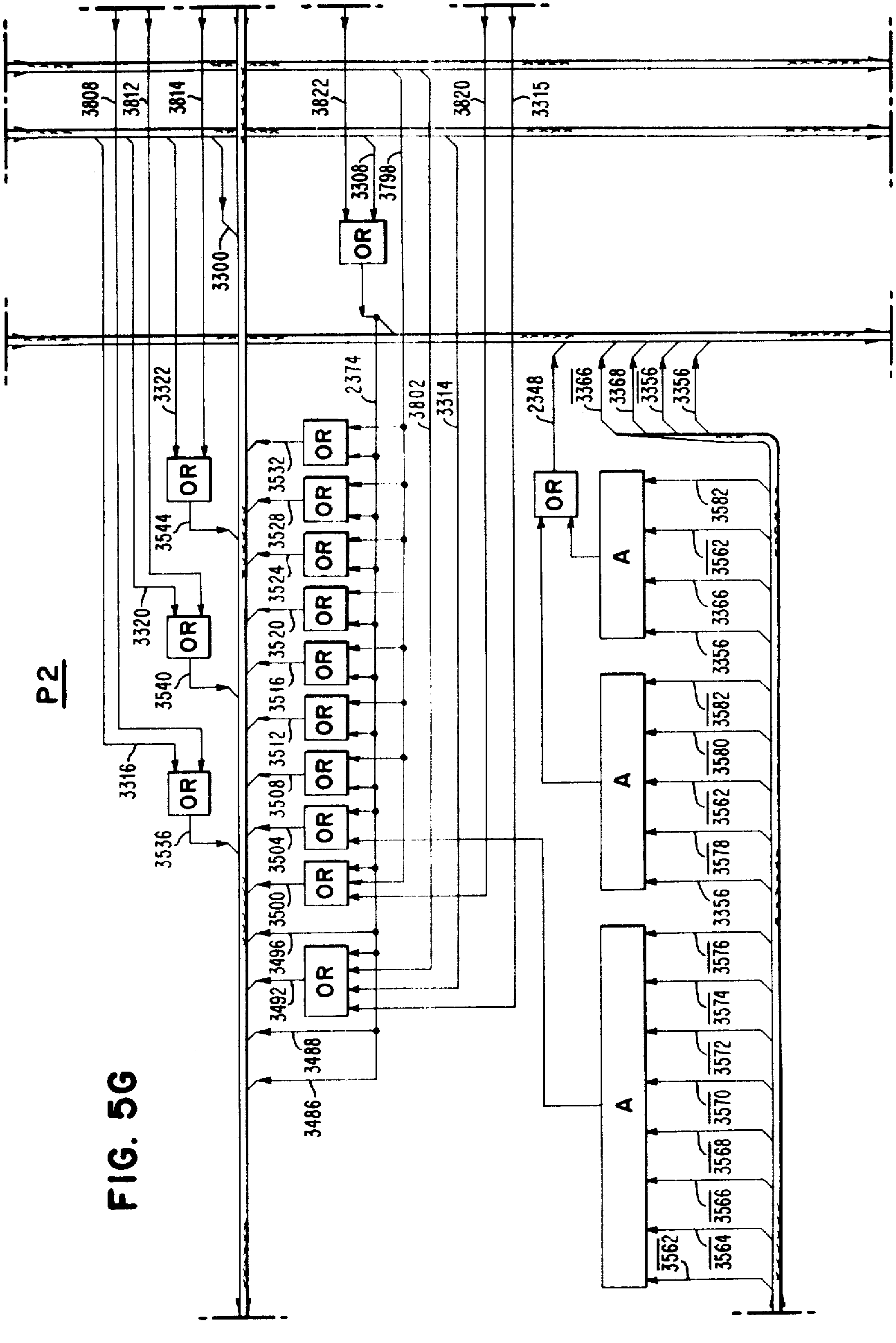
Figure 5H:
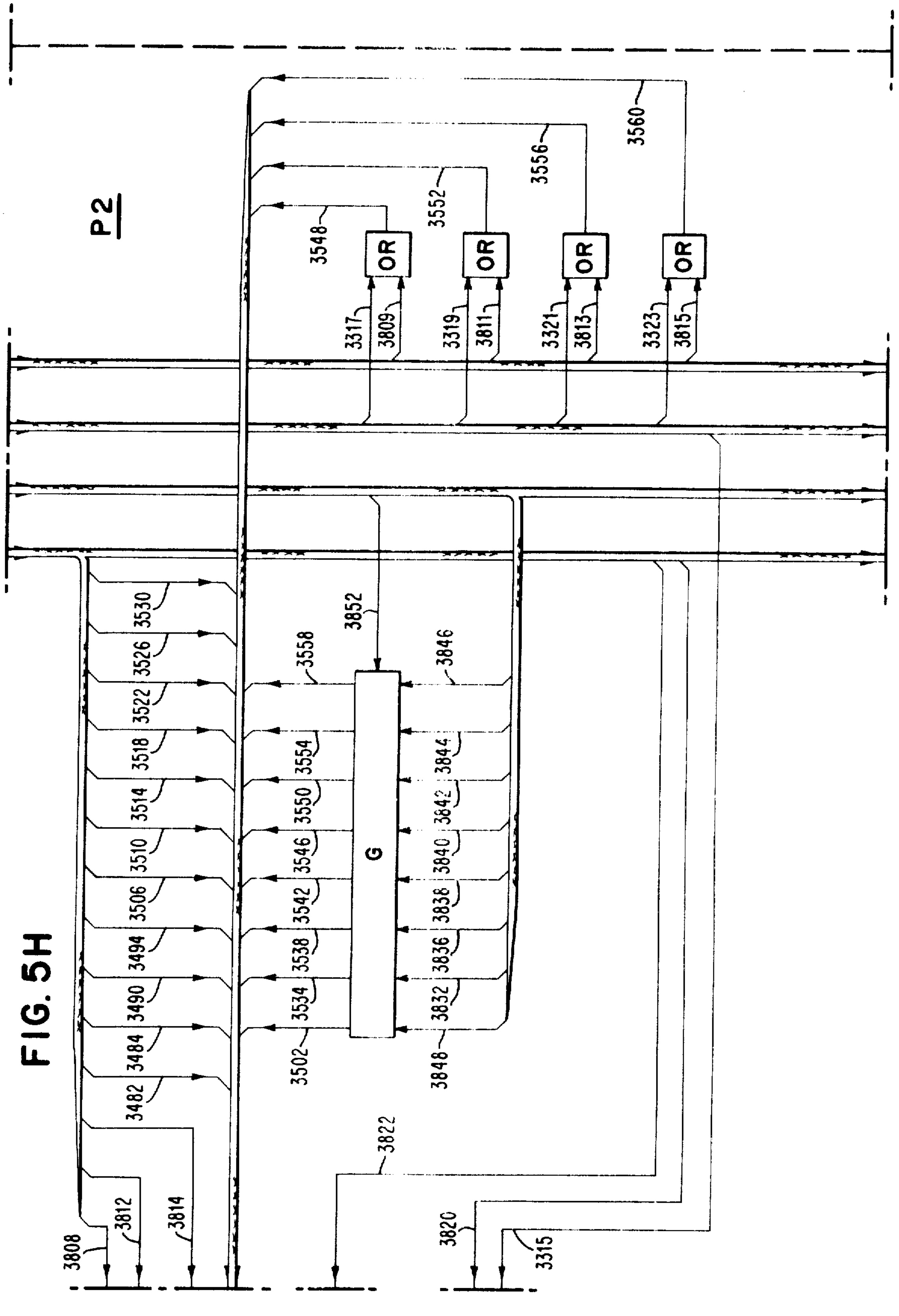
Figure 5I:
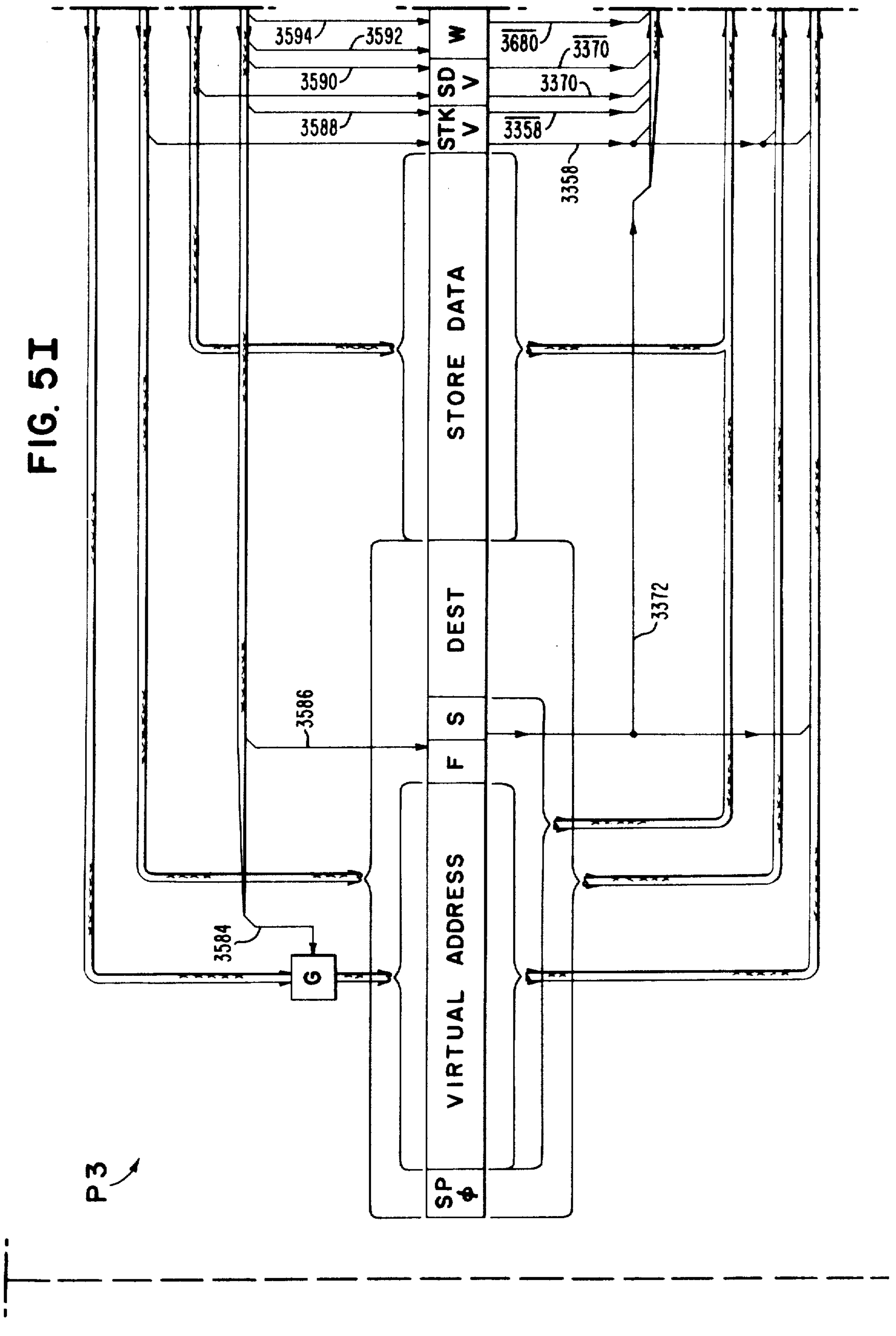
Figure 5J:
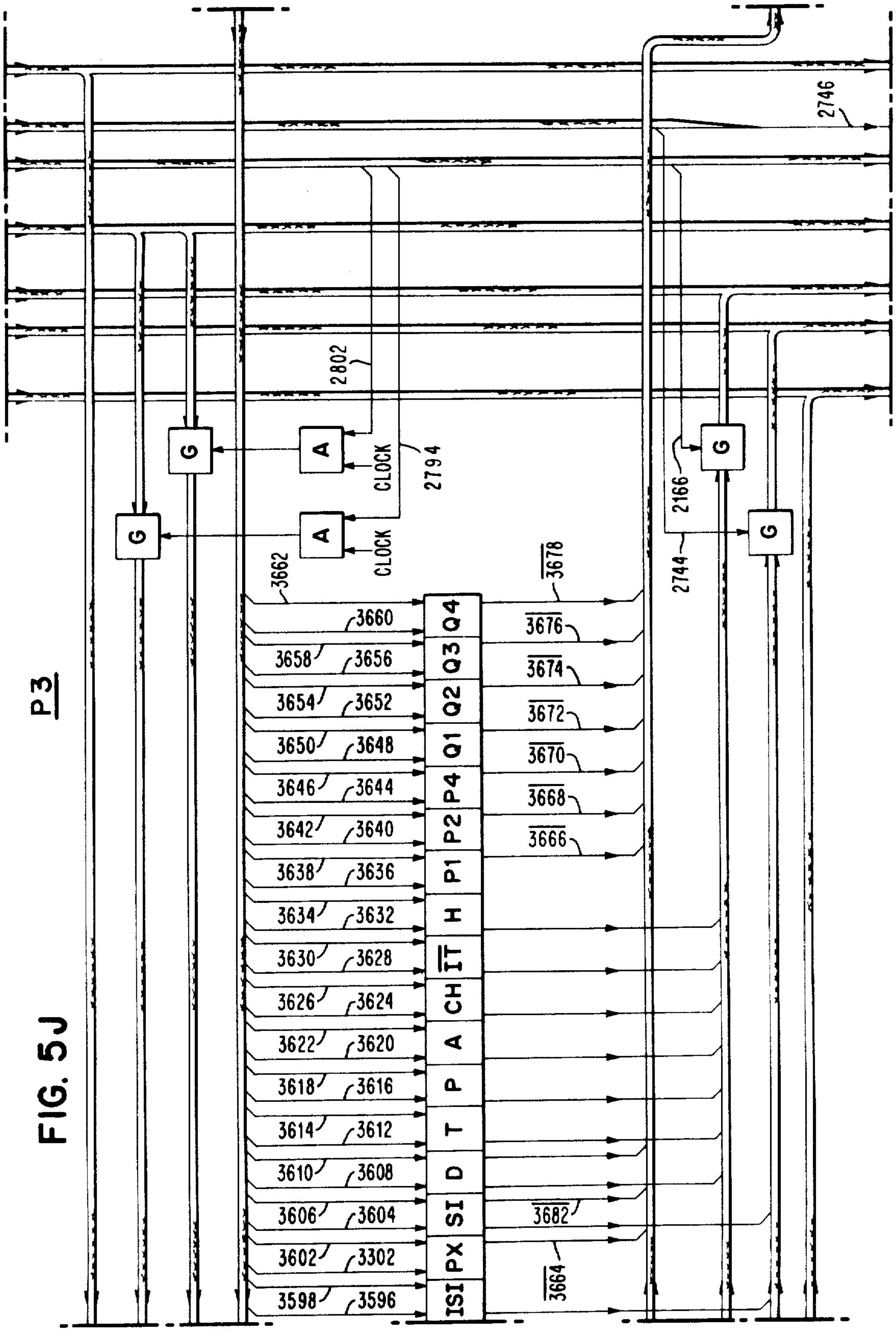
Figure 5K:
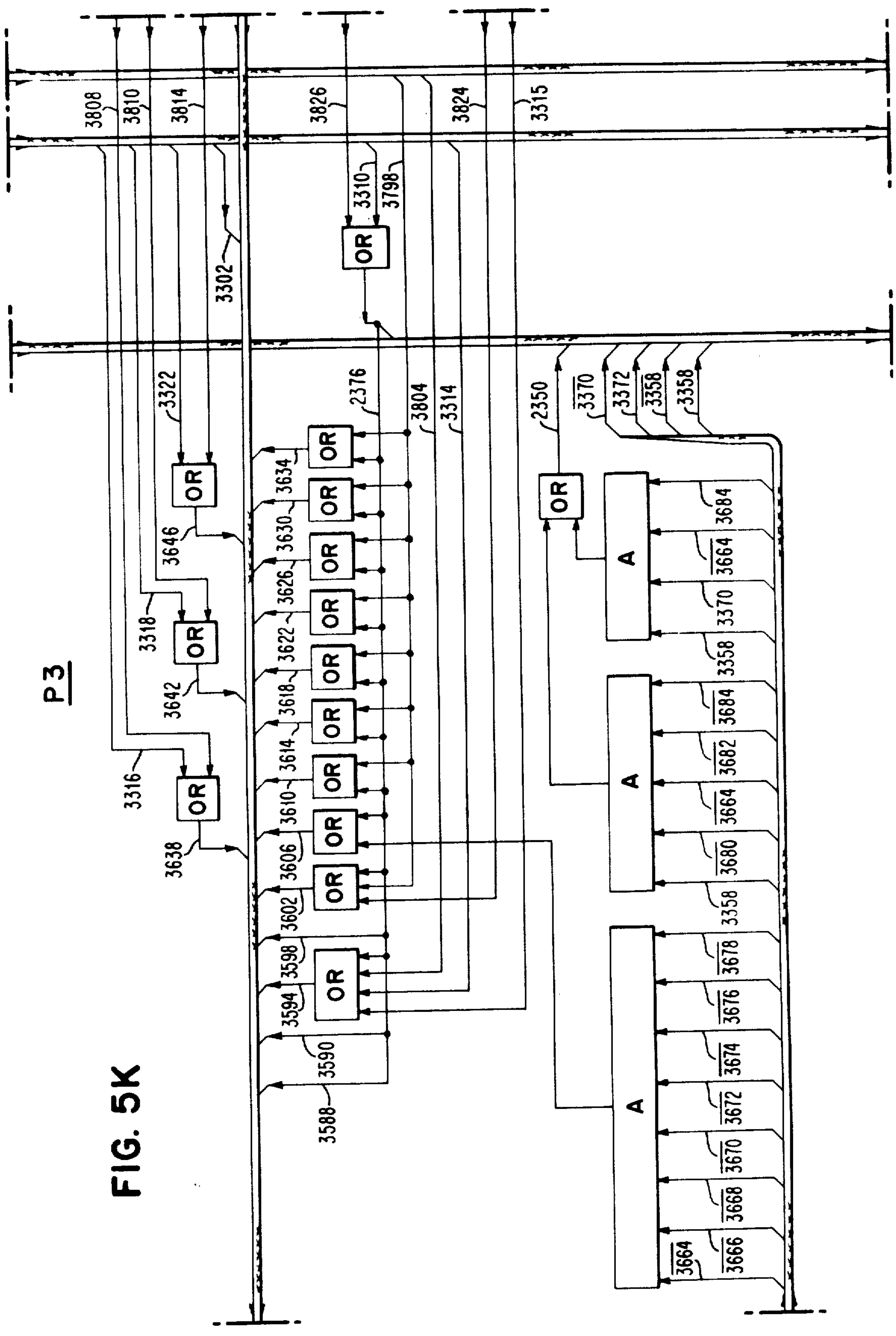
Figure 5L:
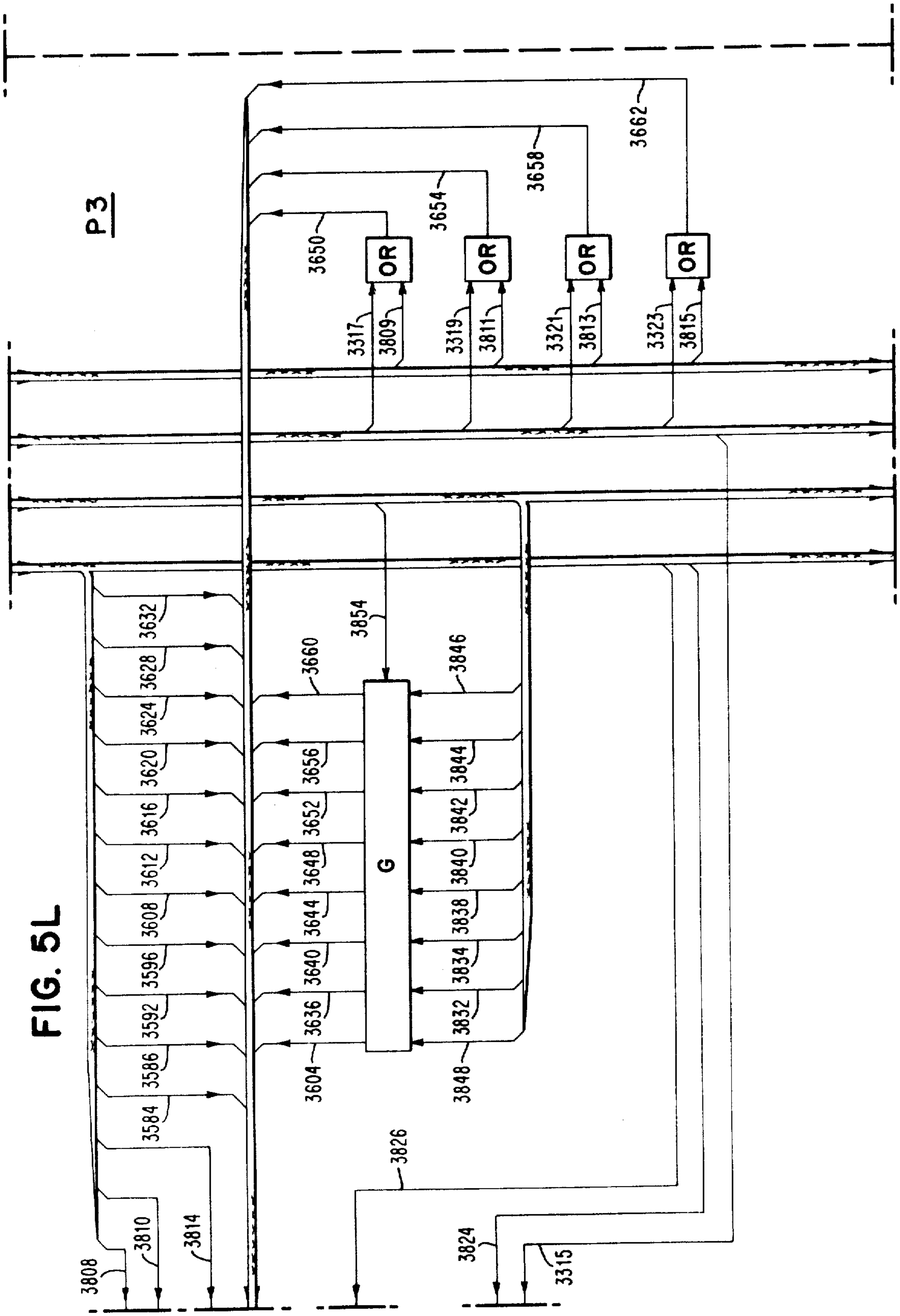
Figure 5M:
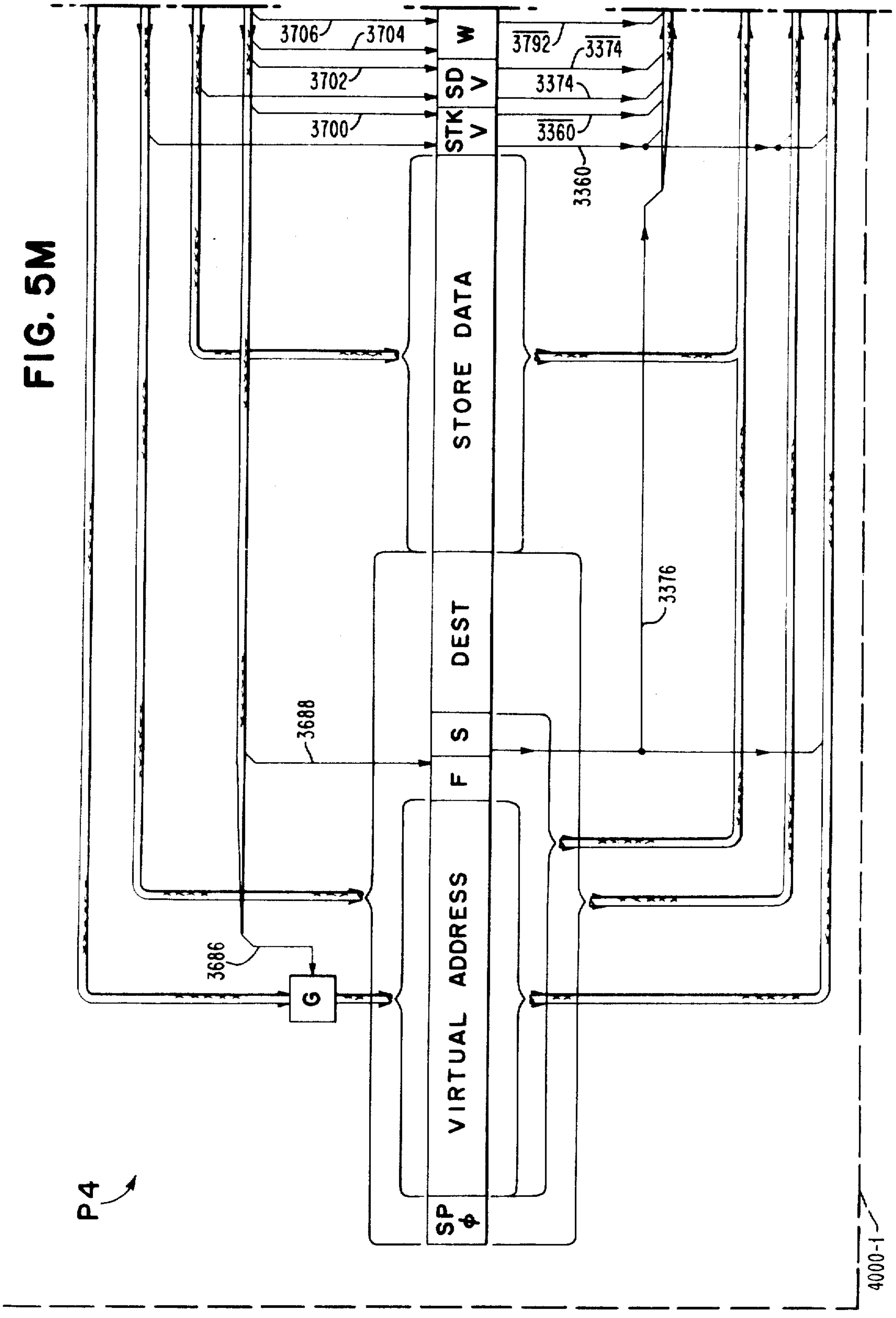
Figure 5N:
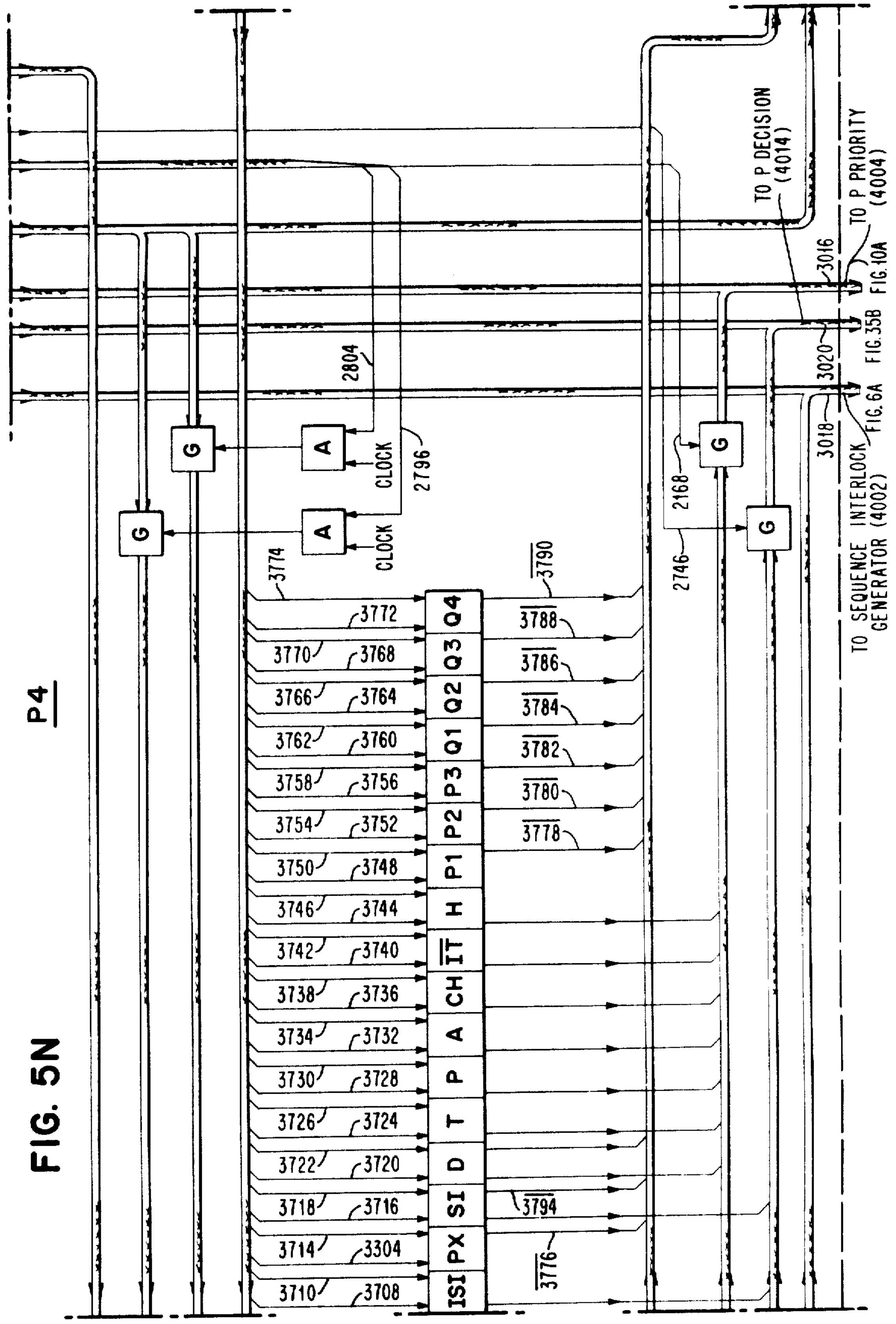
Figure 5O:
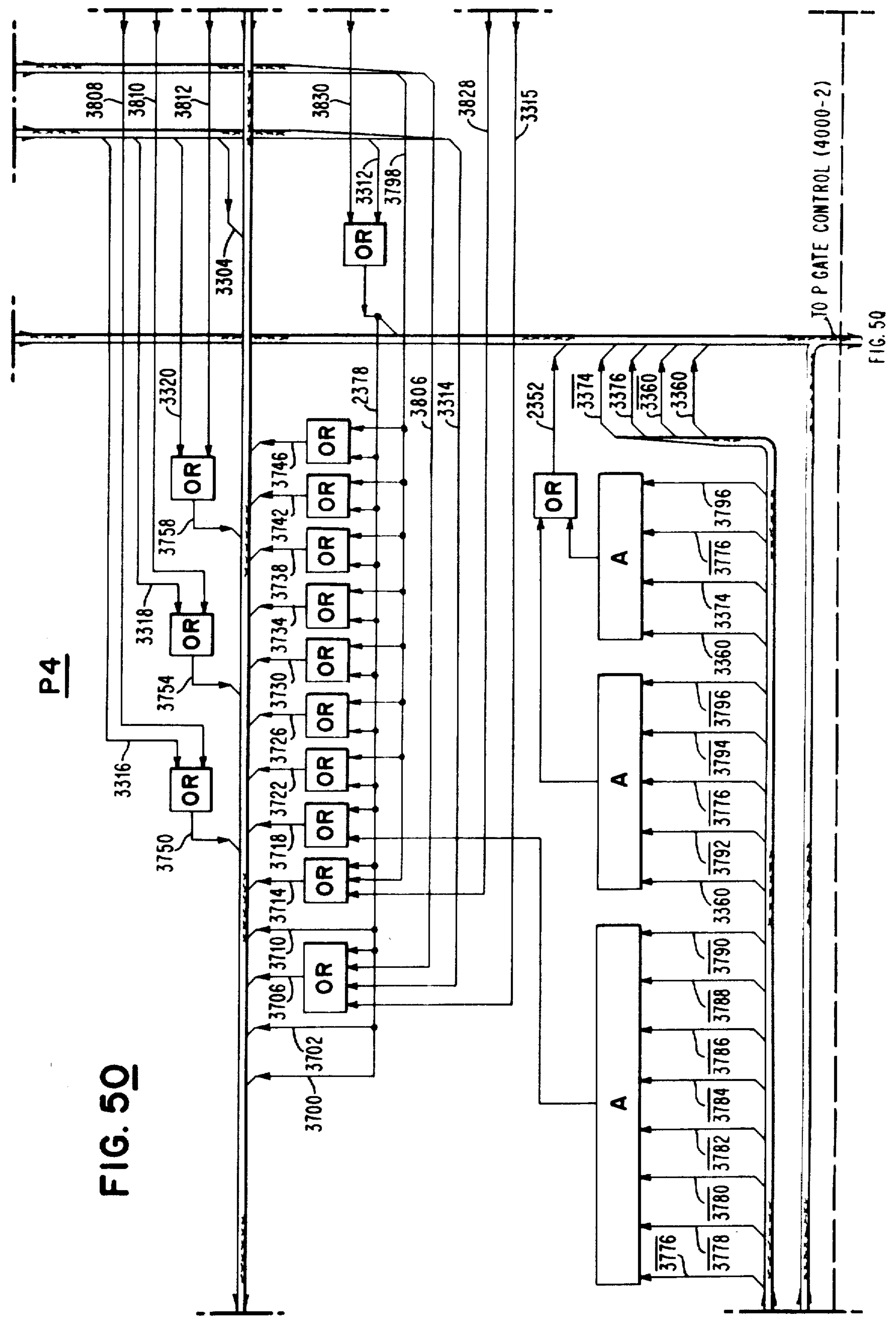
Figure 5P:
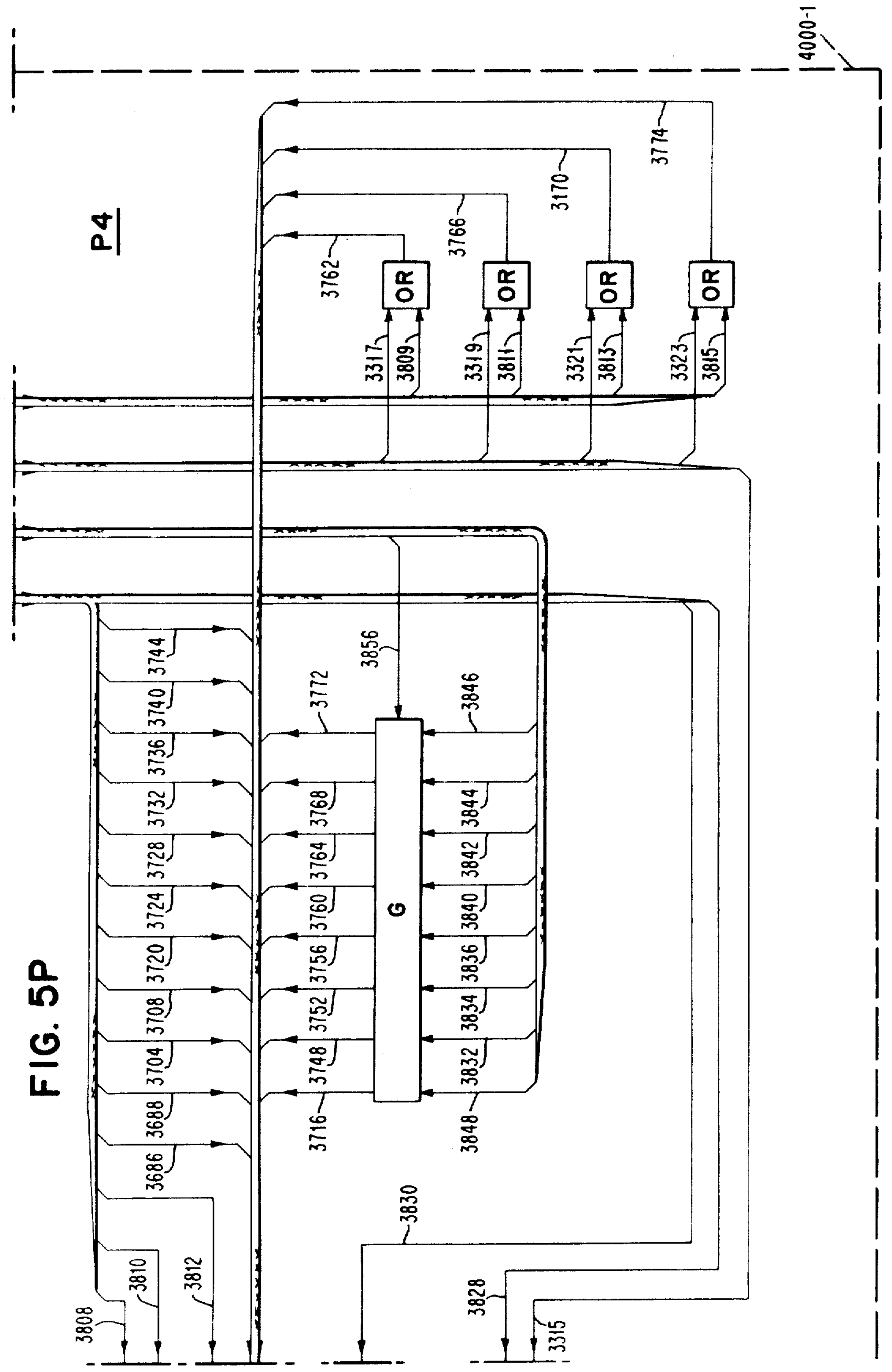
Figure 5Q:
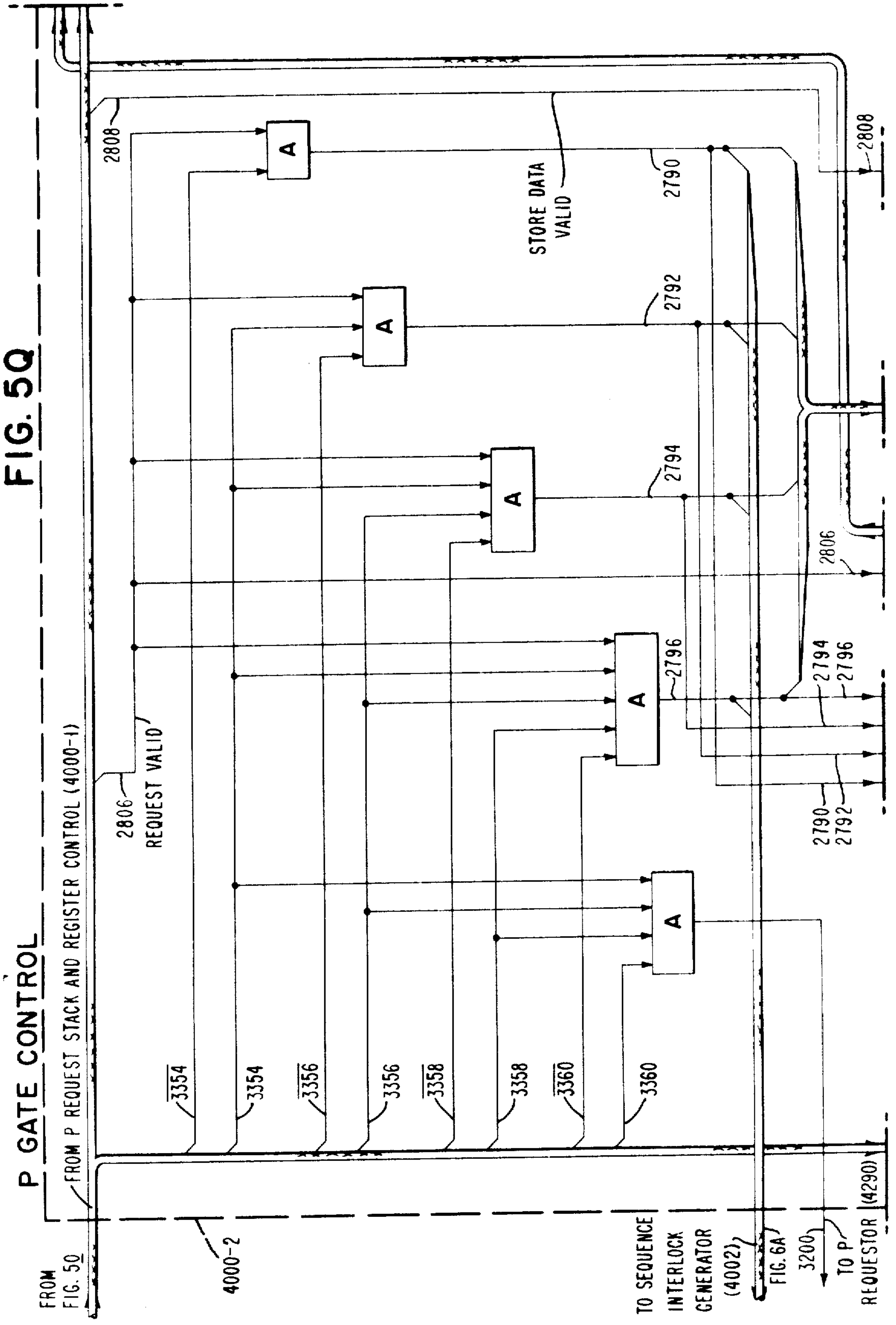
Figure 5R:
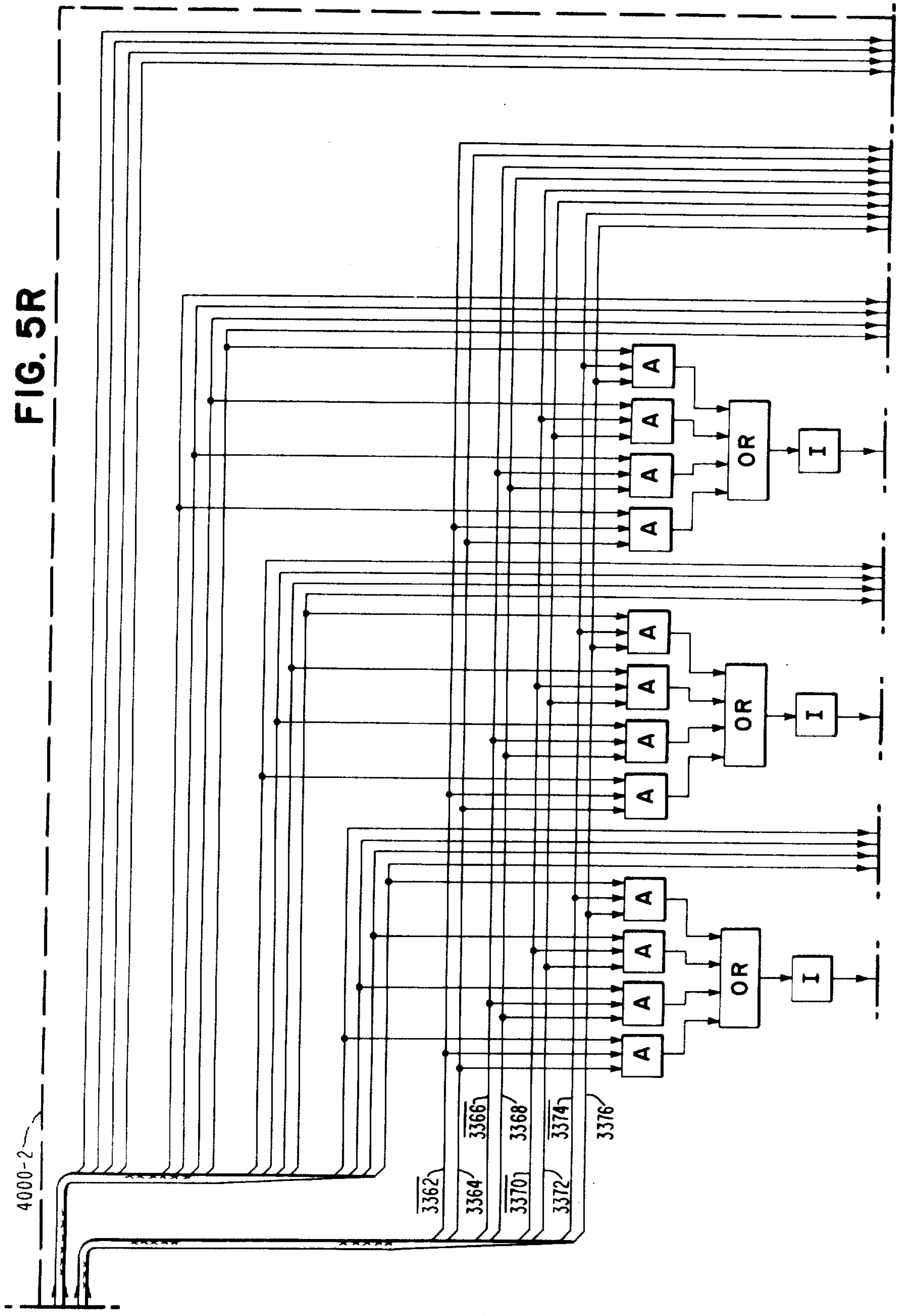
Figure 5S:
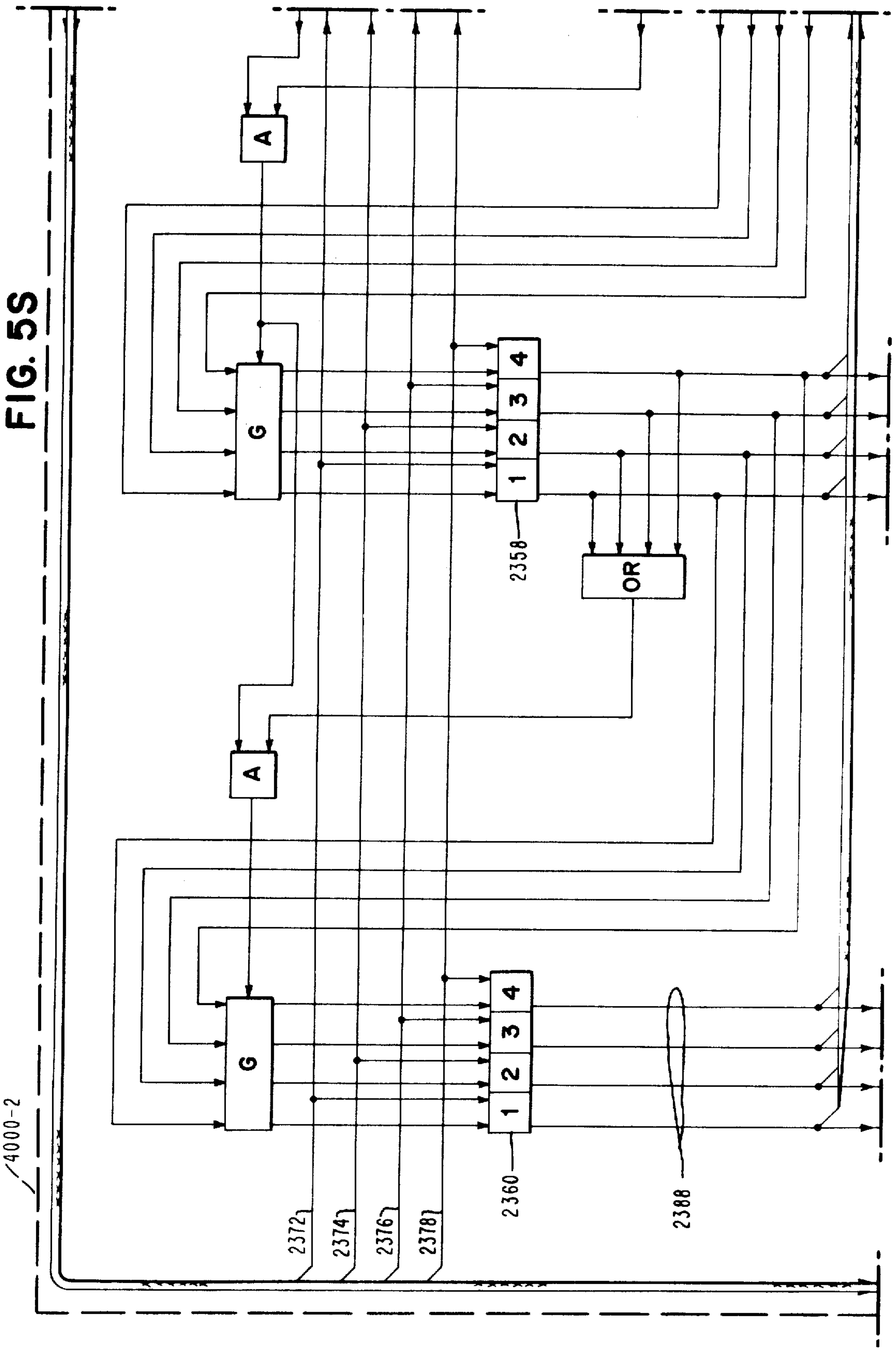
Figure 5T:
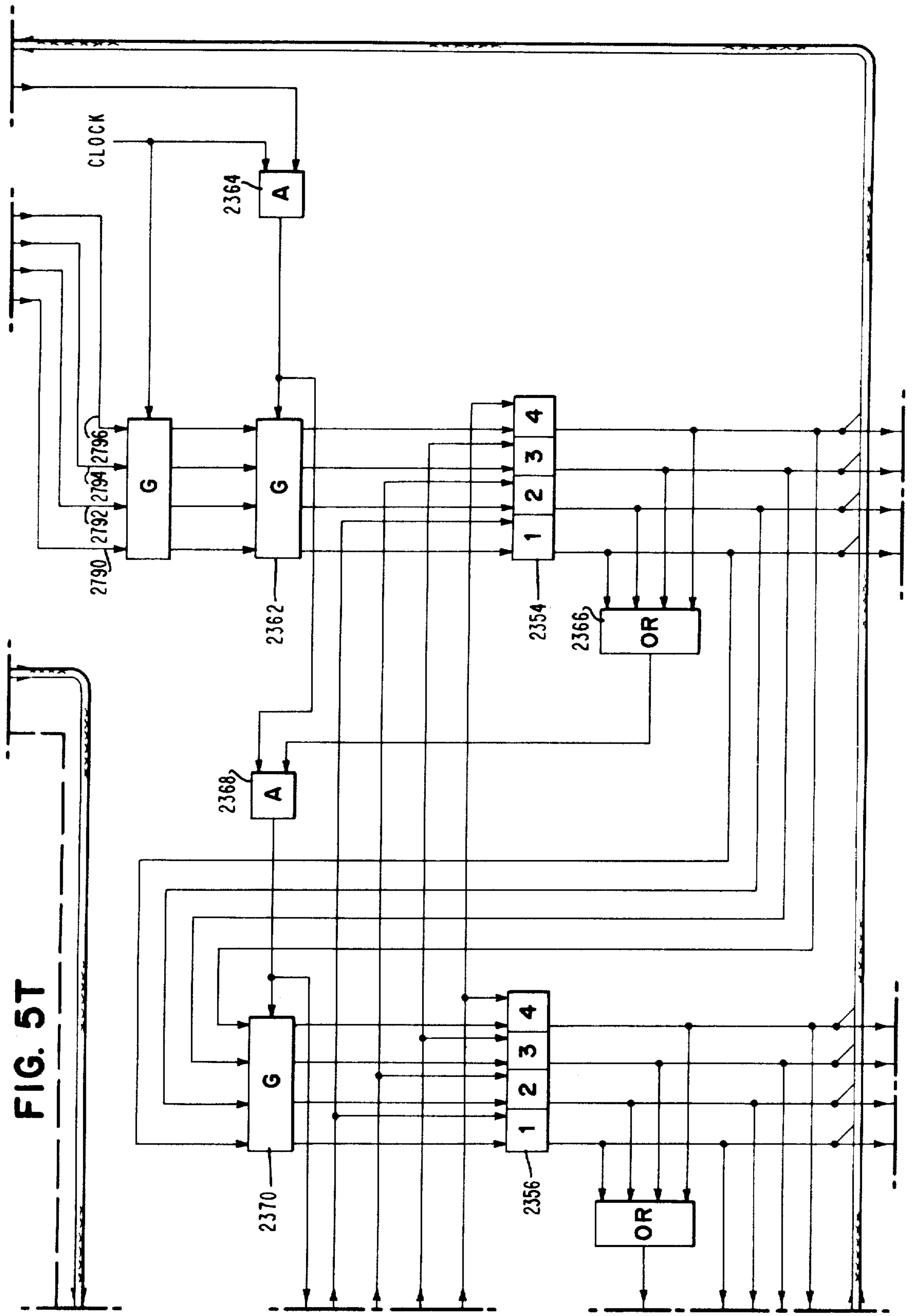
Figure 5U:
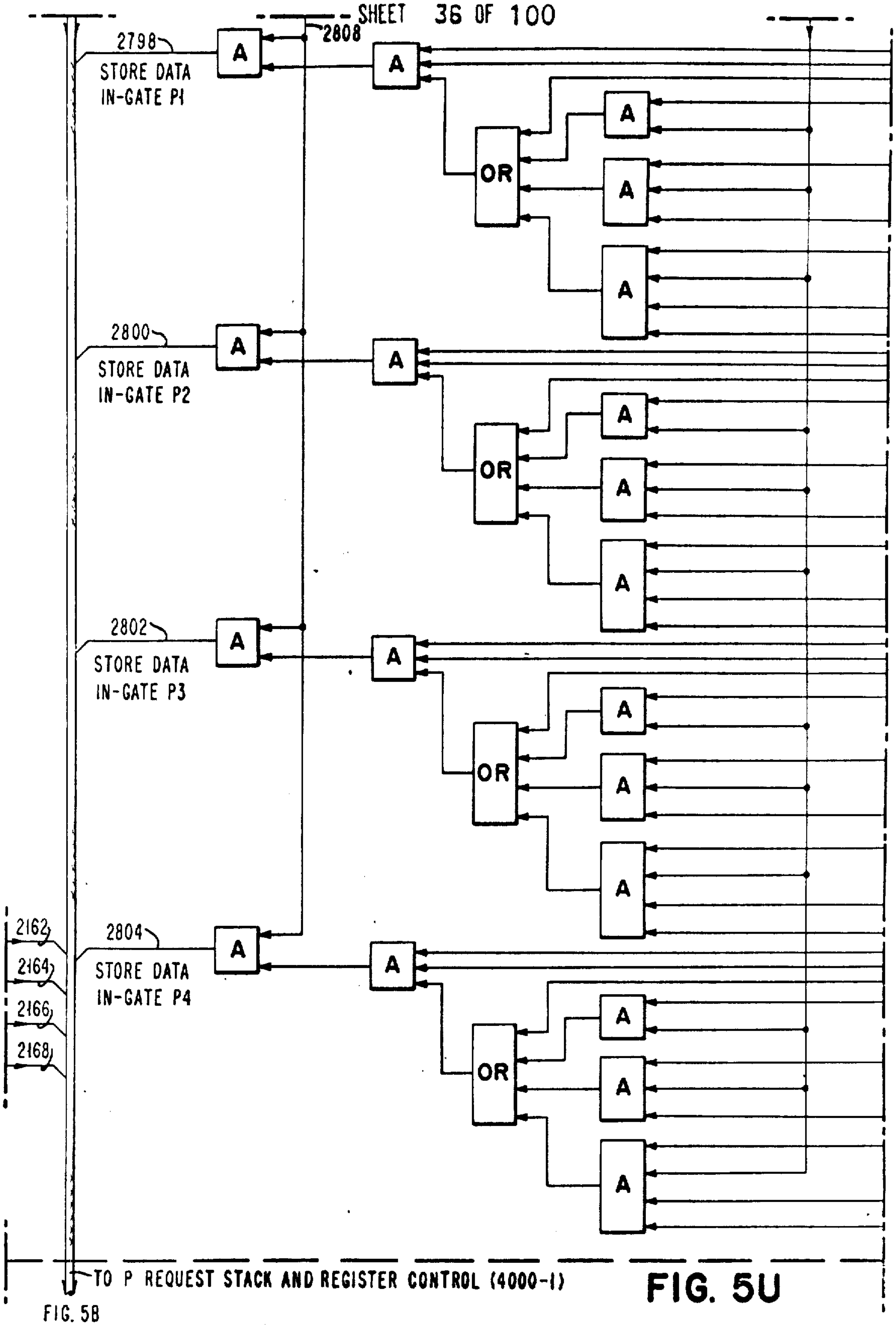
Figure 5V:
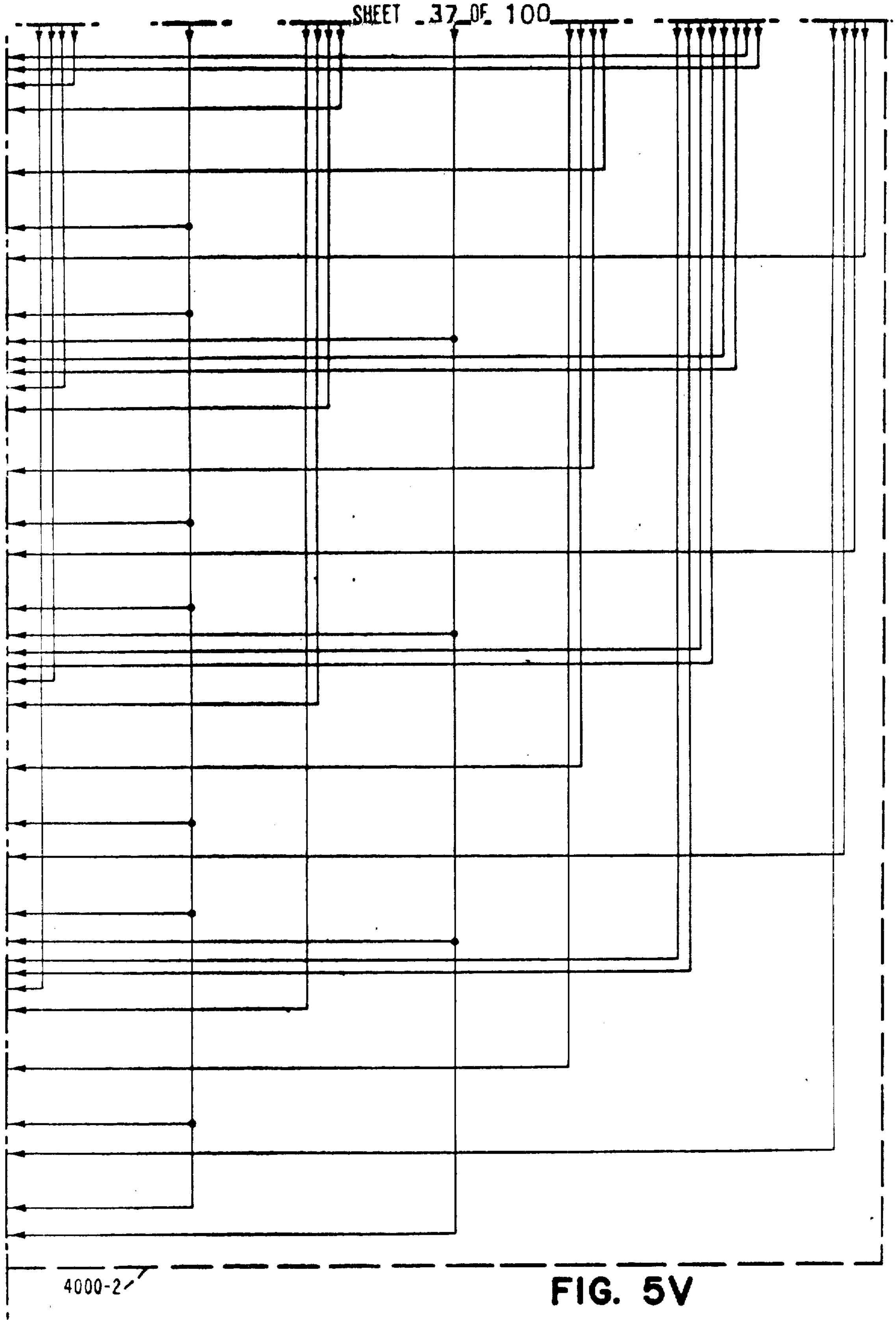
Figure 5W:
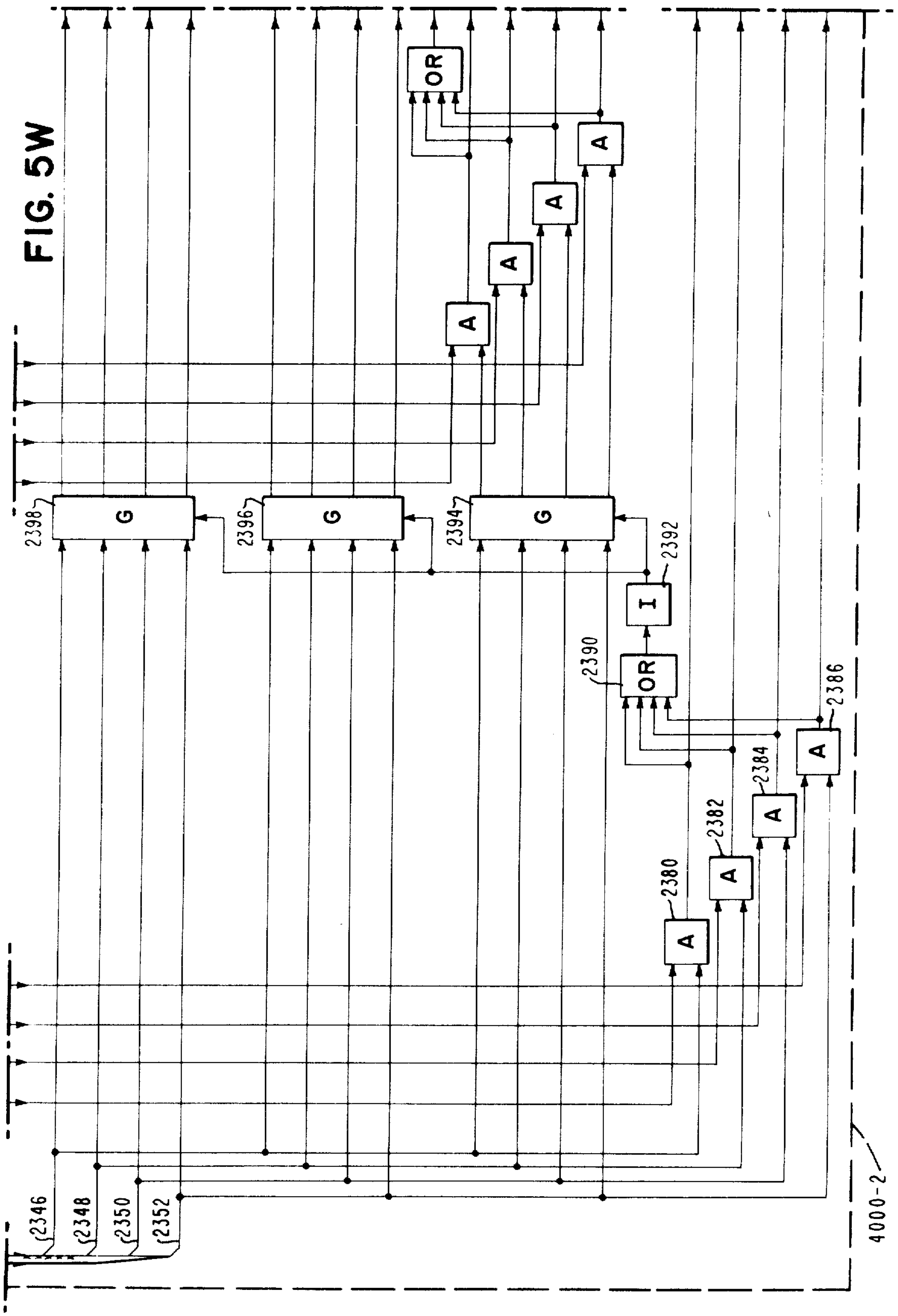
Figure 5X:
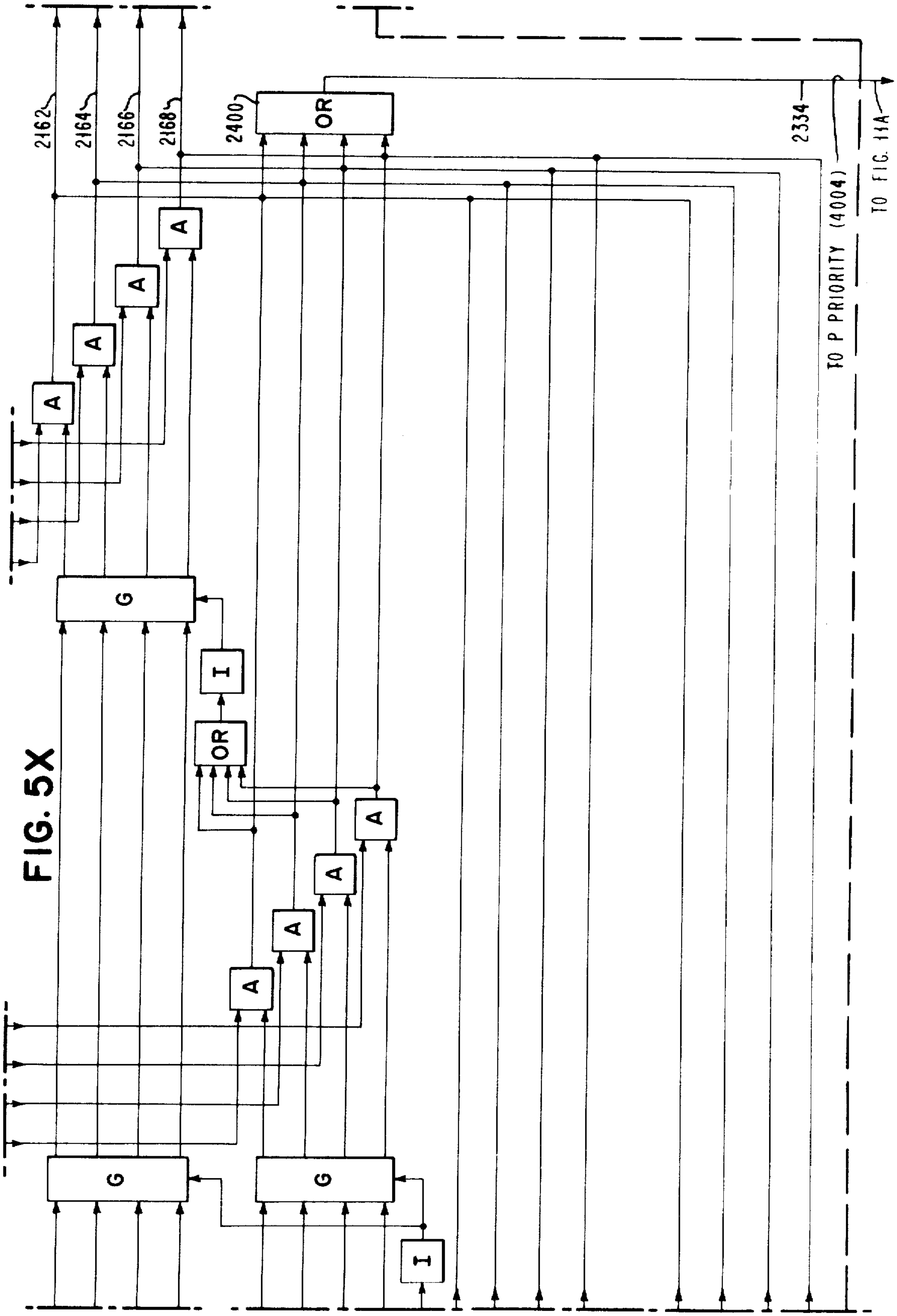

Referring to FIGS. 5A–5X, placed adjacent each other as seen in FIG. 5, there is seen the P Request Stack and Register Control which was seen generally in FIG. 4. Referring to the aforesaid figures, it is seen that the request stack comprises, but is not limited to, four registers, P1, P2, P3, P4, and associated busing and gating. The various buses come into and emanate from the P request stack as seen in FIG. 4. Bit zero may be for storage protection, if desired, and is designated SPO. A virtual address field is provided to receive the virtual address from the P requestor via Bus 3000 by way of gate 37. Also, the prefetch address can be supplied from the P decision unit by Bus 3010, via a gate which is gating by line 3378 in FIG. 2A. Bits F and S, respectively, indicate whether the requested operation is fetch or store. If a fetch, the indication can be set directly from the incoming request. Line 3380 resets the F bit from the Decision Unit as part of a prefetch. The store indication is set directly from the incoming request. A destination field indicating the destination to which the data, if the operation is a fetch, is to be sent is also set directly from the incoming request from the requestor. A store data field is provided which is the data to be stored into the storage system if the operation is a store. It will be appreciated that the store data may arrive after the store request and therefore is gated through a different gate, namely, 37A from Bus 3000. Various control bits are provided in each request stack register. These bits, and their explanations are as listed below.

STK V — This bit indicates that this register position in the stack is valid. That is, it contains a request for storage access.

SD V — This bit indicates that the store data has arrived, if this request is a store, and is valid.

W — This is the Wait bit and indicates that this request is awaiting an interstorage transfer, that is, a replacement of data between main storage and high-speed storage.

ISI — This is the interstorage transfer initiator bit. It indicates that if there is an interstorage transfer in progress, it was initiated because of a request in this register. This request will be given priority to the transferred data before other requests to this data, and when complete will cause all W bits to be reset.

PX — This bit is the Priority Accept bit and means that this request has been accepted for priority contention by the priority apparatus, and an attempt will be made to honor it.

SI — This is the Sequence Interlock bit and indicates that the request at this particular level of the request stack is to be performed in a certain sequence and is interlocked until such time as the request which should be performed previously to it is complete. The level in either the P stack or Q stack to which this register is interlocked is indicated in the interlock vector, to be explained subsequently.

D — This is the Store Data Bit and indicates that data is to be stored in high-speed storage.

T — This is the Store Tag Bit. When the T bit is set to a 1, it indicates that the particular tag into which control bits for this operation are stored is to be stored into.

P — This is the Primary Physical Address Bit. If the D bit is set to a 1 and the P bit is set to a 1, it means that data will be stored at the primary physical address. The T and P bit combination functions similarly.

A — This is the Alternate Physical Address bit. Its use is similar to the P bit.

Ch — This is the change bit. If this bit is set to a 1, it means that the requested line of data in the high speed storage has had its contents changed by having data stored into it. Therefore, that line of data is different from its image in main storage. Hence, if the change bit is on, it means that if an inter-storage transfer into this line is HSS is necessary, this line of data must first be rewritten into main storage to keep a record of it for future purposes. This CH bit will ultimately be stored in the tag storage.

$\overline{IT}$ — This is the Not-In Transit bit. This bit is ultimately stored in the tag storage. If this bit is a 1, it means that the word in the line of data in the storage area can be processed against inasmuch as it is not in transit between high-speed storage and main storage.

H — This is the Hot bit. This bit will ultimately be stored in tag storage. It indicates that the line of data in the high speed storage to which the request of this particular stack refers is, or has recently been, processed against and is, therefore, "hot." This bit finds use in a replacement algorithm, to be explained subsequently, in which an attempt is made to replace unused, or cold, blocks of data, but not to replace currently-used, or hot, blocks of data in the high speed storage.

IV — This is the Interlock Vector in each stack level and comprises bits which identify those levels to which a request is interlocked. When one of these bits is on, the sequence interlock bit will also be on, and this will indicate that the currently-referred-to stack level is interlocked to that stack level whose identifier bit is a 1 in the IV field of the current level.

The control bits are set as indicated by following the set lines, which appear on the left side, and the reset lines, which appear on the right side of each bit, back through their buses. Stack Valid is set directly from the requestor through gate 37 and is reset by line 3382 which comes ultimately from line 3372 which, in turn, is a result of the OR function of lines 3818, 3306 and 3798. These latter three lines are control lines from the P decision area via Bus 3010, the P priority area via Bus 3002, and the R transfer area via Bus 3008, respectively. Each function to reset stack level control bits when a request is complete.

The Store Data Valid Bit is set by line 2808 which comes directly from the requestor via gate 37a. Store Data Valid is reset by line 3384 which comes through Bus 4498 from line 3782. This line is also the OR function of lines 3818, 3306, and 3798, as was line 3372.

The Wait bit is set by line 3386 which ultimately comes from the P decision area via bus 3010. When set, it indicates the requested data is not in HSS and this request must await an interstorage transfer. The Wait bit is reset by line 3388 which results from the OR function of lines 2372, 3800, 3314, and 3315 of FIG. 5C. Line 2372 was explained previously. Line 3800 comes from the R transfer via Bus 3008 and indicates that requested data is now available within the storage system. Line 3314 comes from the P priority area and indicates that after an interstorage transfer, the interstorage transfer initiator has been awarded priority and therefore any other requests awaiting this data can be released to content for priority. Line 3315 comes from Q priority via Bus 3012 and operates similarly to line 3314.

The ISI bit is set by line 3390 which proceeds through Bus 4998 from Bus 3010 from the storage system decision area and is reset by line 3392 which proceeds from line 2372 which was explained previously. The priority Accept bit (PX) is set by line 3298 which proceeds through Bus 4998 from P priority Bus 3002, and is reset by line 3396 which proceeds from Bus 4998 and is the OR function of line 2372, previously explained, and line 3816. Line 3816 is a control input from the P decision area via bus 3010.

The sequence interlock bit, SI, is set by line 3398 which proceeds through Bus 4998, ultimately being from the sequence interlock generator via Bus 3004 when an interlock is discovered. The SI bit is reset by line 3400 which proceeds through Bus 4998 and comes from the OR function of line 2372 and the line which is the output of AND gate 2338. It will be noted that the input to AND gate 2338 is from the 0 side of the Priority Accept bit and the 0 side of every bit of the Interlock Vector. When all of these conditions are satisfied, it means that priority is granted and that the request is not interlocked to any register in the request stacks and, therefore, the sequence interlock bit, if on, would be reset by line 3400.

The Store Data bit D is set by line 3402 which proceeds from Bus 4998, ultimately being from the P decision unit via Bus 3010, and is reset by line 3406 which ultimately comes from line 2372, as previously explained. When set, it means the request is clear to store its data after the next priority cycle.

The Store Tag bit T is set by line 3408 which ultimately proceeds from the P decision Bus 3010 and is reset by line 3410 which proceeds from previously explained line 2372. When set, it means that the request should store updated control information in the appropriate tag when it stores its store data.

The Primary Physical Address bit P is set by line 3412 which comes from the P decision unit via Bus 3010 and is reset by line 3414 which proceeds through previously explained 2372. Likewise, the Alternate Physical Address bit A is set by line 3416 from the decision unit and is reset by line 3418 from line 2372. These two bits are set after decoding the appropriate bits in the virtual address. Whether the requested data is in the Primary or Alternate Physical Address in HSS depends upon where it was placed by the interstorage transfer mechanism of the two-level storage system during replacement. The Change bit is set by line 3420 which proceeds from P decision Bus 3010 and is reset by line 3422 which emanates from line 2372. When set to one, it means this data line has been stored into since being brought into HSS from MS and therefore must be stored back into MS before any new data line can be brought into this HSS location.

The Not-In Transit bit ($\overline{IT}$) is set by line 3424 from the P decision bus 3010 and is reset by line 3426 which comes from line 2372. The Hot bit is set by line 3428 from P decision Bus 3010 and is reset by line 3430 from line 2372. When set to 1, it means that although the data line in question was determined to be in transit between MS and HSS, nevertheless, the next time this request gets through priority, it will have done so by virtue of the interstorage transfer of this line being complete. Therefore, the $\overline{IT}$ is set on in the stack level.

All these tag control bits will then be stored in the tag on the next tag access.

Each bit of the Interlock Identity Field is set by an input line which emanates from the bus from the sequence interlock generator, namely, Bus 3004, the setting lines being gated by line 3850. The bits in the Interlock Vector are reset by lines 3434, 3438 and 3442 for the P stack registers and lines 3446, 3450, 3454, and 3458.

Line 3434 represents the OR function of lines 3318 of FIG. 5C and 3810 of FIG. 5D. These lines come from the P priority Bus 3002 and the P decision Bus 3010, respectively. Line 3438 is the OR function of line 3320 of FIG. 5C and 3812 of FIG. 5D, which lines come from the P priority and P decision areas of the storage system respectively. Likewise, line 3442 is the OR function of lines 3322 and 3814, which also respectively come from the P priority and P decision areas of the storage system. The reset lines for the Q interlock bits, namely, 3446, 3450, 3454 and 3458, can be seen at the right-hand side of FIG. 5D as being the OR function of control signal lines individually emanating from the Q priority and decision areas of the storage system. If the request in a particular level of a stack is a fetch, its completion is made when the decision unit of the storage system determines that the data is available and sends it to the requestor, updates tag information, if any, in the stack level and stores the updated information on the next priority cycle. The line from the priority area then resets the appropriate IV bits for that level. If there is no updated tag information, the decision area directly resets the IV bits. If the operation is a store, then the operation is completed by the priority area after it is determined that the requested line, and tags if appropriate, are available for storing into. The line from the priority area then resets the appropriate IV bits for that level.

The outputs of the control bits of the individual registers of the request stack serve as inputs to AND gates 2338, 2340, and 2342, and also as inputs to the E Bus 4000 PI, which is an input to P gate control 4000–2. The input to AND gate 2338 of FIG. 5C is the 0 side of the Priority Accept bit and the 0 side of all bits of the IV field. When all of these bits are in their 0 state, it indicates that the request in the request stack is not interlocked and has been accepted for priority. Therefore, the output of AND gate 2338 via line 3400 will reset the sequence interlock bit. The inputs to AND gate 2340 are the stack valid bit, 3354, and the 0 side of the Wait bit, Priority Accept bit, Sequence Interlock bit, and Store Date bit. When all these inputs to AND 2340 are active, OR 2344 will be activated as a priority request from this register of this request stack, which will be transmitted to the gate control to develop a priority request for the oldest register in this request stack which has a request ready to go to the priority determination area of the storage system. Similarly, the inputs to AND gate 2344 are the Stack Valid bit, 3354, the Store Data bit, 3362, the 0 side of the Priority Accept bit and the 1 side of the Store Data bit. When these inputs to AND 2342 are active, it means that the stack is valid, that data is to be stored, that the store data is valid, and that the request has not yet been accepted for priority. Therefore, this request is ready to go to priority and the output of AND 2342 is connected via OR 2344 to line 2346 which again acts as a priority request.

Other inputs to Bus 4000–PI, which are seen at FIG. 5C, are inputs from the 0 side of store data valid for register P1, an indication that the request in level P1 is a store (line 3364), and lines coming from both the 1 and 0 sides of the stack valid bit for register P1. These lines will be gated to the P gate control 4000–2 in order to form gating signals to ingate requests and store data to the proper register in the P request stack and register control.

Referring to FIGS. 5A and 5B, it is seen that the virtual addresss is transmitted to the sequence interlock generator via Bus 3018 to determine proper sequence of instructions, as will be explained subsequently. Also included in Bus 3018 is line 3364 indicating whether or not the requested operation is a store.

The virtual address, the fetch or store indication, and the destination of the data if the operation is a fetch is transmitted via gate 41A, which is gated by line 2740 from the P gate control over Bus 3020 to the P decision area of the system. This will be used to compare the requested virtual address with those in the primary and alternate tags, during the decision function. Also, the virtual address and the fetch or store indication, as well as the store data, is transmitted via gate 41, after gating by line 2162 from the P gate control, over line 3016 to the P priority area of the storage system where it will compete for access priority.

The control bits are transmitted to AND gates 2338, 2340 and 2342 and to Bus 4000–PI, as explained previously.

Levels 2, 3, and 4 of the P request stack, as well as similarly numbered levels of the Q request stack, are structured as was described for level 1 of the P request stack in register control 4000–1.

P Gate Control

The P gate control of FIGS. 5Q – 5X comprises three functional areas —Request Stack In-Gate Control, Store Data In-Gate Control and Request Stack Registers to Storage System Area Gating Control.

Request Stack In-Gate Control

Referring to FIG. 5Q, there is seen that area of the P Gate Control which serves as a request stack ingate control. Request valid line 2806 proceeds over Bus 4000–PI from the request area and indicates that a request is waiting to be gated into a level in the P request stack. The gating to be described will gate this request into the top-most available stack, where it will reside until the request is completely serviced. If all registers are full, a signal is generated on line 3200 for the P requestor. The request valid line 2806 is connected to each of AND gates 2790A, 2792A, 2794A, and 2796A. The 0 side of the stack valid bit for level 1 of the P request stack, line $\overline{\mathbf{3354}}$, is connected to AND gate 2790; and an output from that AND gate indicates that the P–1 level is empty. Similarly, the inputs to AND 2792A, excluding the request valid line, is the 0 side of the stack valid bit level P–2 and the 1 side of the stack valid for level P–1. An output over line 2792, therefore, indicates that the top-most available level is P–2. Circuitry is similar for gates 2794A and 2796A. The inputs to AND 3200 are the 1 side of the stack valid bit for each of the levels of the request stack so that an output on line 3200 to the P requestor indicates that the stack is full; and, therefore, the valid request must continue to wait until a stack becomes available.

Request Stack Gating to Priority

Referring momentarily to FIGS. 4A through 4H on the request stack, it will be recalled that the virtual address associated with a given request is gated to the priority area via gates 41, 42, 43 and 44. These gates are enabled by lines 2162, 2164, 2166 and 2168, respectively. With continued reference to the P request stack of the register control figures, and with particular reference to FIG. 5C, it will be recognized that AND gate 2340 will have an output when a request is ready to be sent to the priority area. That is, inputs to AND gate 2340 indicate that the stack is valid (3354), the area to which data is to be stored in storage system is not waiting for inter-storage transfer ($\overline{\mathbf{3476}}$), that priority has not yet been accepted ($\overline{\mathbf{3460}}$), that there is no Sequence Interlock ($\overline{\mathbf{3378}}$), and that the store data bit is not yet set (3480). Similarly, the output of gate 2342 indicates that the operation is a store and is ready to go to the priority area to compete for access to store data. Thus, these outputs are OR'd together in OR 2344; and the output is line 2346, which serves as a priority request. There is a priority request from each level in each stack. Therefore, in FIG. 5W there is seen inputs 2346, 2348, 2350 and 2352, which are lines which will contain, when active, priority requests from individual levels in the request stack.

The circuitry on FIGS. 5S, 5T, 5W, and 5X is concerned with finding the oldest request in the request stack having a priority request up, in order to out-gate it to the priority apparatus. As can be seen, there are four 4-bit reigsters labeled 2354, 2356, 2358 and 2360. In each of these reigsters there are bits numbered 1–4. These numbers correspond to the numbers of the request stack registers with which the gate control is associated and are, thus, request indicators. Lines 2790, 2792, 2794 and 2796 are developed from the request stack in-gate control logic of FIG. 5Q and also go to in-gate requests into the individual levels of the request stack. For example, if a request is in-gated into stack level P1, a pulse will appear on Line 2790. Likewise, pulses on 2792, 2794, and 2796 will appear for in-gating to positions P2, P3, and P4, respectively. These gate lines are gated through gate 2362A and 2362 to register 2354. The gating pulse for gate 2362A is a clock line, while the gating pulse for gate 2362 is the AND function from AND 2364 of the clock line and the request for valid line 2806. The in-gate outpus from gate 2362 are connected to the respective register positions in register 2354. The outputs of register 2354 are connected, respectively, through OR 2366, the output of which is one input to AND 2368, having as a second input the output of AND 2364. The output of register 2354 is also connected as an input to gate 2370 which has as a gating pulse the output of AND 2368, mentioned just previously. The output of each preceding gate down the line is connected as input ot its associated register, and the output of the associated register is connected as input to the next gate down the line, as shown. The gating function to each following gate is an AND of the previous gating function and the output of the previous register stage. Thus, recapitulating, if any of the flip flops numbered 1, 2, 3, or 4 in register 2354 were set to a one state by the enabling o gate 2362, the active state of this flip flop would extend through OR circuit 2366 to AND 2368. The output of AND circuit 2364 is also applied to AND circuit 2368 so that if there were a setting in the register 2354 at the time that AND circuit 2364 is enabled, this setting would be transferred via gate 2370 to the register 2356 at the time that register 2354 is loaded. An examination of all associated circuitry will show that if there is a setting in register 2356 at the time it is loaded, this setting will be transferred to register 2358; and if there is a setting in register 2358 at the time that it is loaded, this setting will be transferred to register 2360. In this manner, each request indicator is moved in succession from register 2354 to register 2356, to register 2358 and to register 2360 each time a new request is in-gated. Therefore, in this group of four registers, the left-most register that has a bit set to one will be the oldest request in the request stack. The number-one bit in each of registers 2354, 2356, 2358, 2360 is reset by line 2372 which comes from the first level of the P request stack and, when active, indicates that the request has been serviced. Likewise, the number-two bits of the registers are reset by line 2374 which is a similar line from the second level of the request stack. Bits 3 and 4 of the registers are set by lines 2376 and 2378, which are similar lines from the third and fourth levels of the request stack, respectively.

Referring to the circuitry in FIGS. 5W and 5X, there is seen a static logic network which settles down and has an output according to the inputs supplied to it by the just-described registers 2354, 2356, 2358, 2360, and also from lines 2346, 2348, 2350, and 2352, which are priority requests coming from levels 1 through 4, respectively, in the request stack. For example, each of the outputs 1 through 4 of register 2360, indicated in bundle 2388, forms one input to AND gates 2380, 2382, 2384, and 2386, respectively. The other input to each AND gate is from line 2346, 2348, 2350 and 2352, respectively. The output of each AND gate is supplied to OR 2390, the output of which is inverted by inverter 2392 and supplied as gating lines to gates 2394, 2396, 2398. The inputs to gates 2394, 2396, 2398 are lines 2346, 2348, 2350 and 2352. As can be seen, the rest of the logic proceeds similarly as just explained. For example, the one state output of the positions of register 2358 form inputs along with the output of gate 2394, which is essentially the same lines as 2346, 2348, 2350 and 2352, to AND gates 2380A, 2382A, 2384A and 2386A. The outputs of these AND gates are OR'ed together and the output of the OR is inverted to form gating lines to gates 2396A and 2398A, as seen in FIGS. 5W and 5X. It is seen that the outputs of the next bank of AND gates 2380B–2386B form inputs to OR 2400, the output of which is line 2334 which is a line to the priority apparatus. This line, when active, indicates that the virtual address being transmitted over priority bus 3016 is requesting entrance to the priority area. The final bank of AND gates 2380C through 1386C have inputs from the positions of register 2354, and also inputs ultimately gated from lines 2346 through 2352. The output of this last bank of AND gates are lines 2162, 2164, 2166 and 2168 which proceed through Bus 4000PO, which is connected back to the request stack and provides out-gating signals for gates 41, 42, 43 and 44 to gate selected requests from respective levels to the priority area of the storage system.

Figure 7:
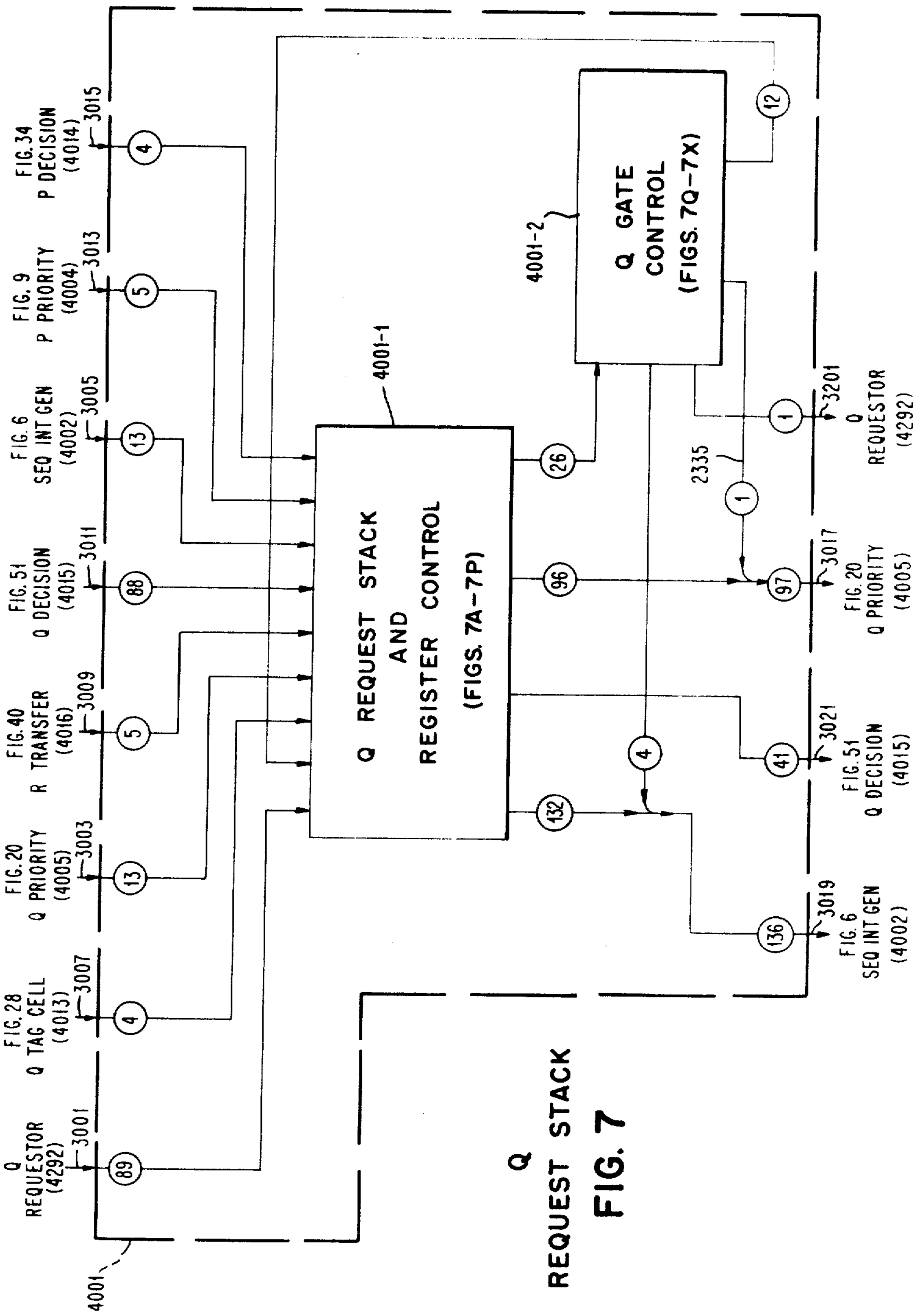
FIG. 7 shows a block diagram of the Q request stack including the Q request stack and register control and the Q gate control.
Figure 7A:
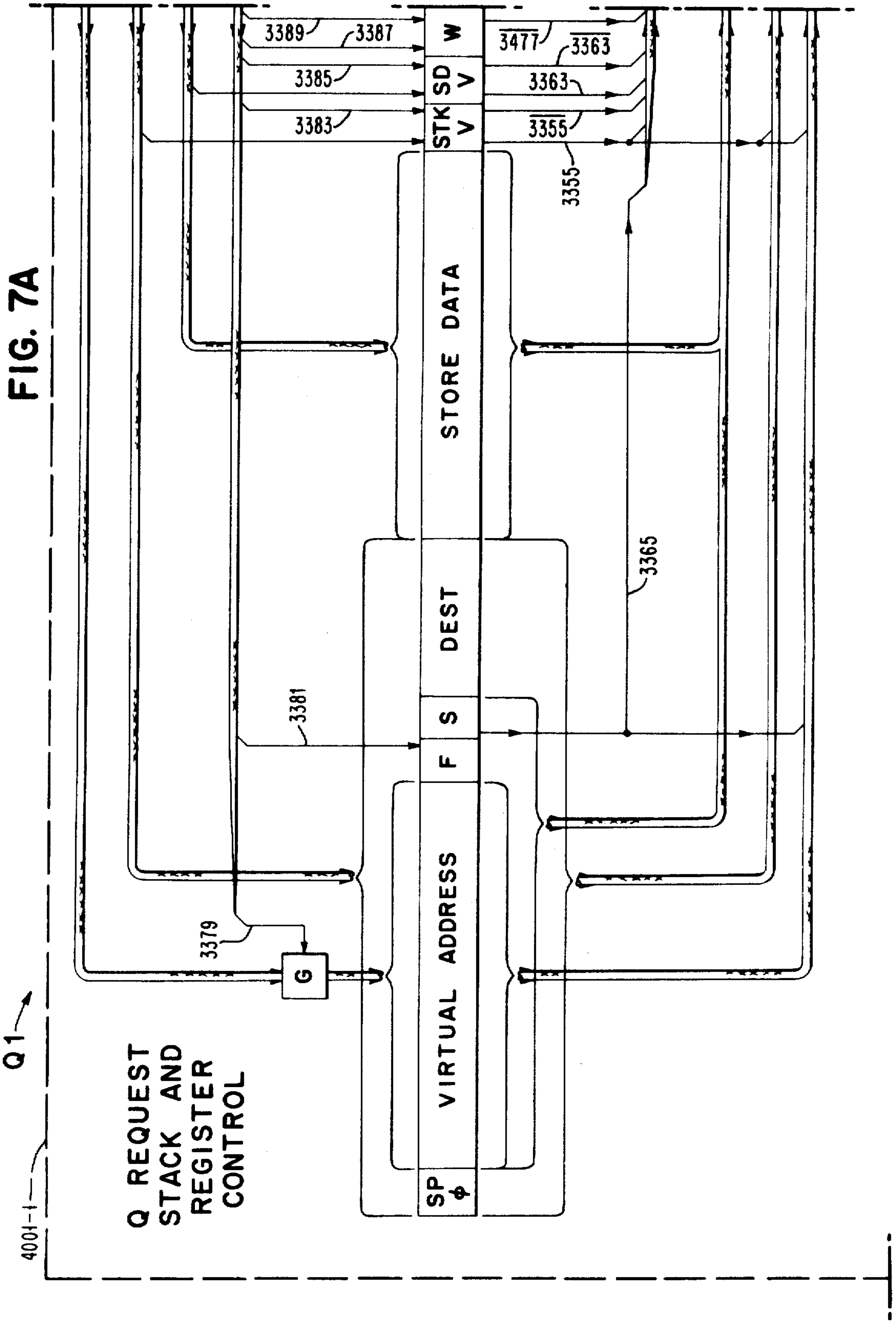
Figure 7B:
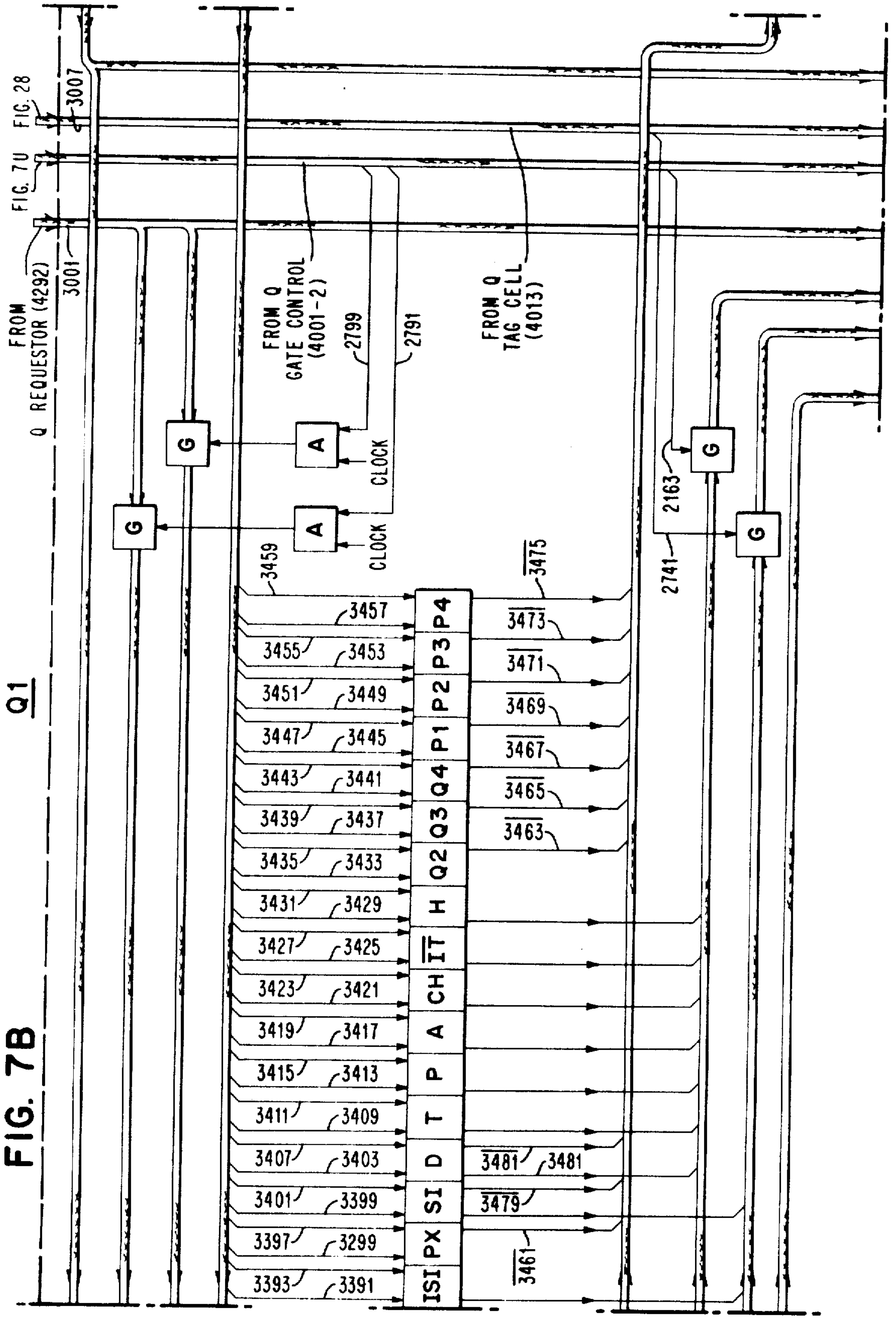
Figure 7C:
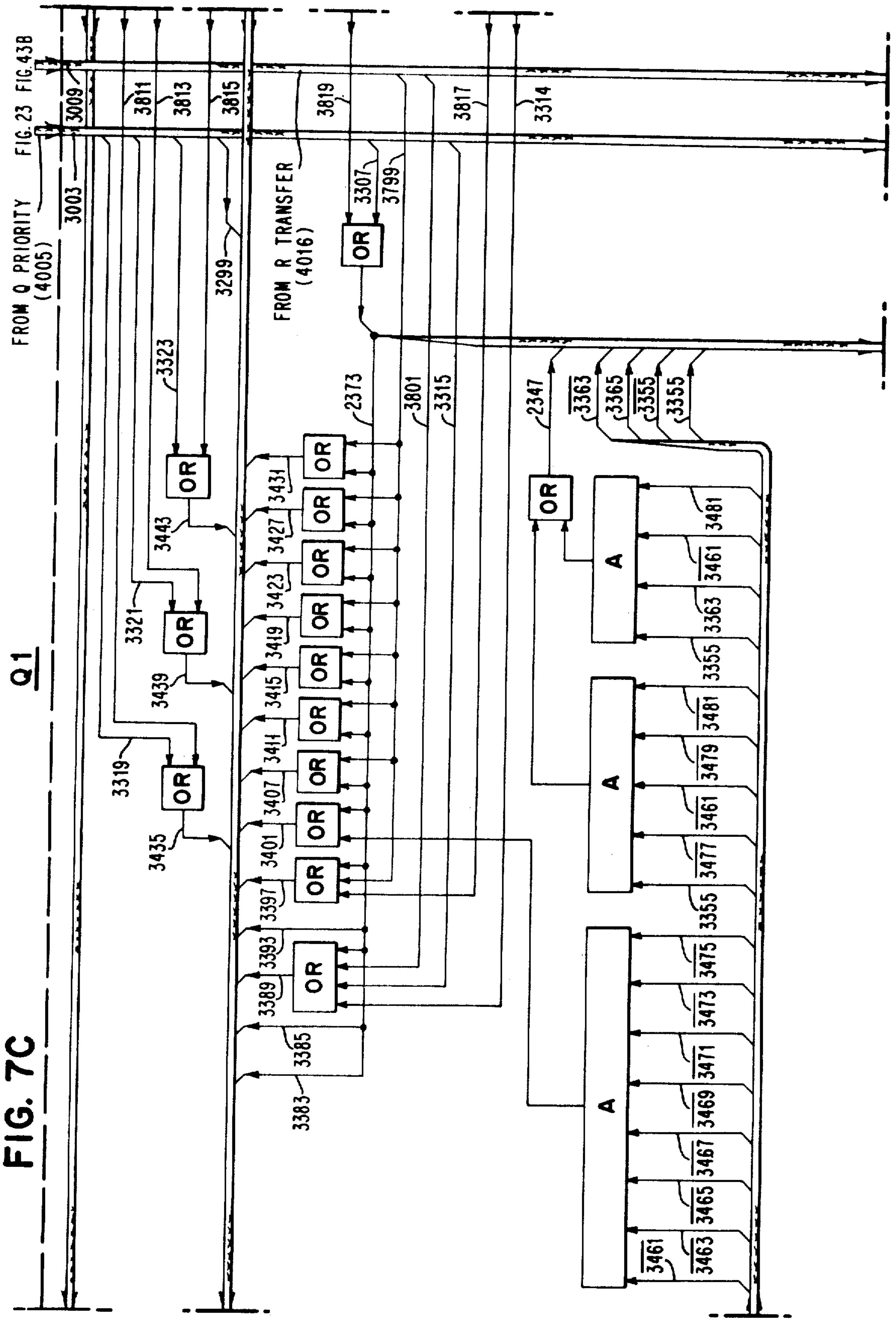
Figure 7D:
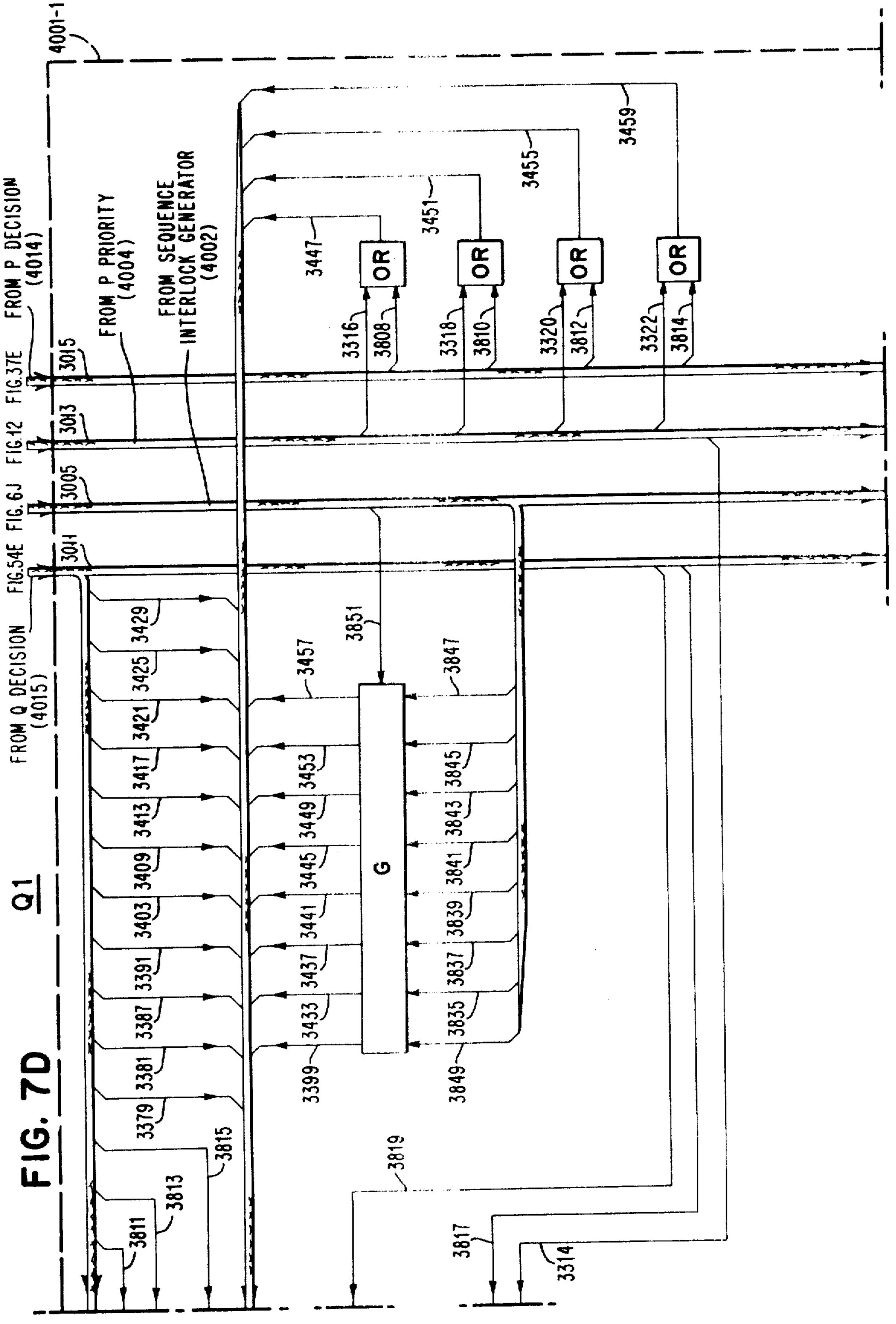
Figure 7E:
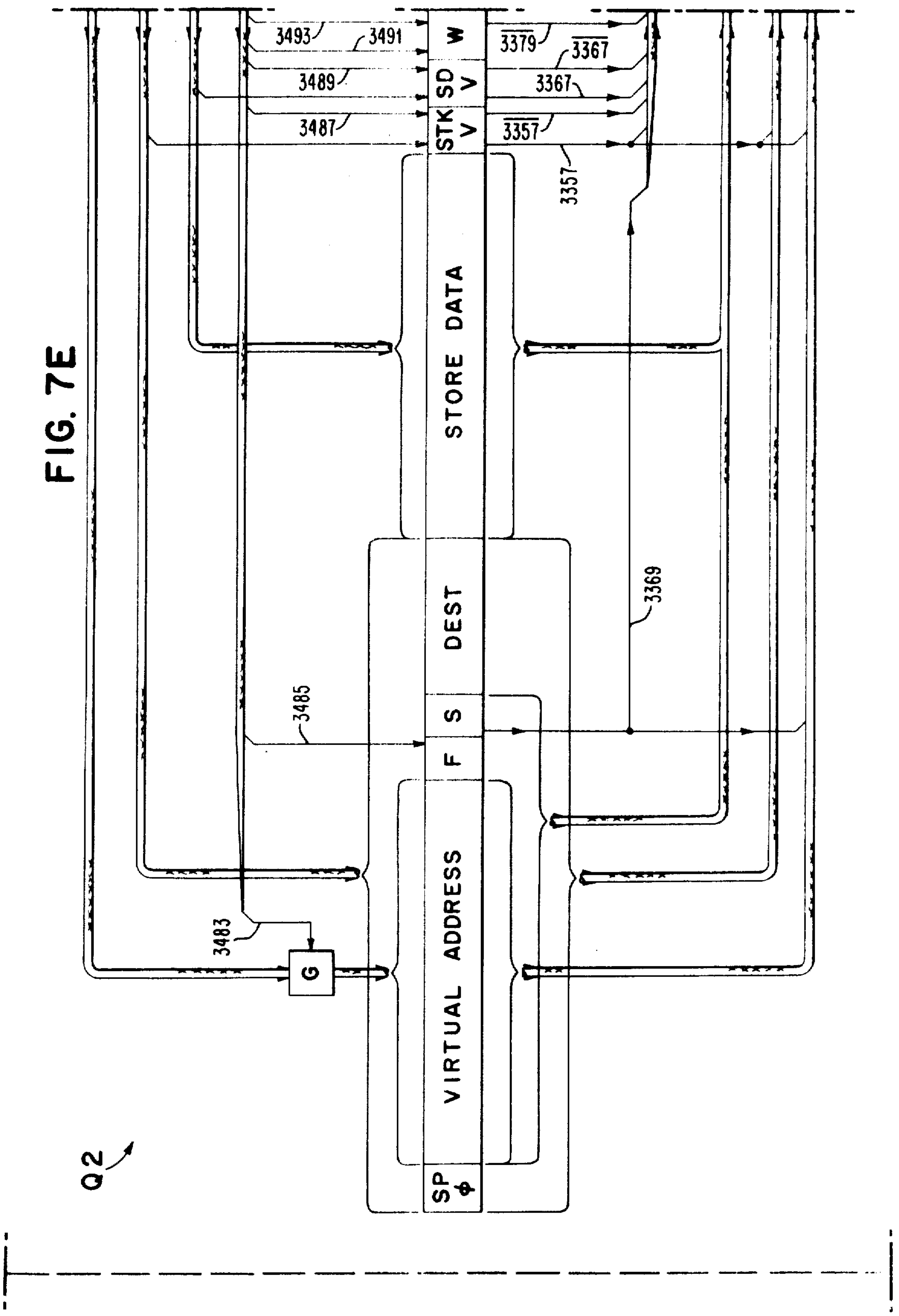
Figure 7F:
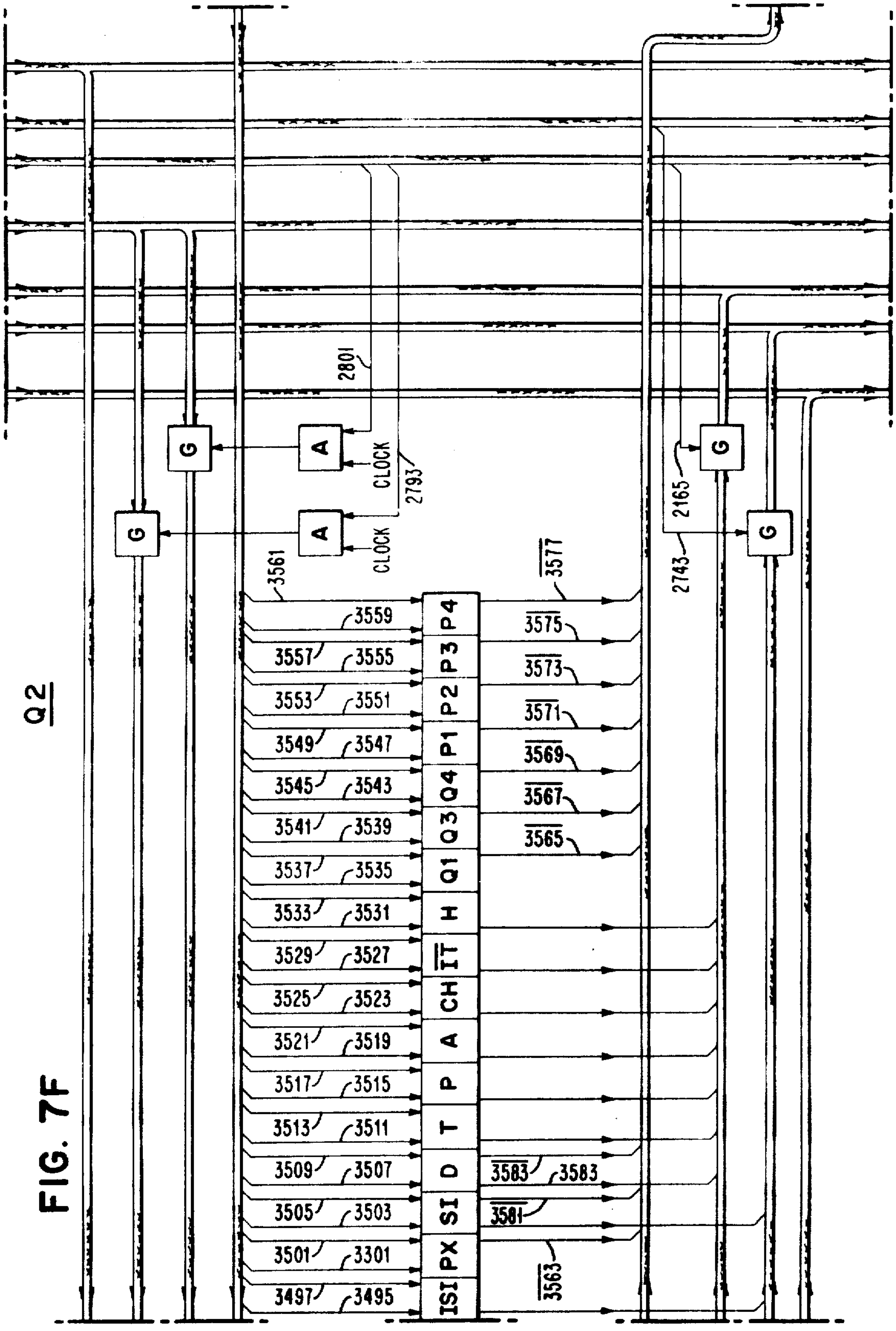
Figure 7G:
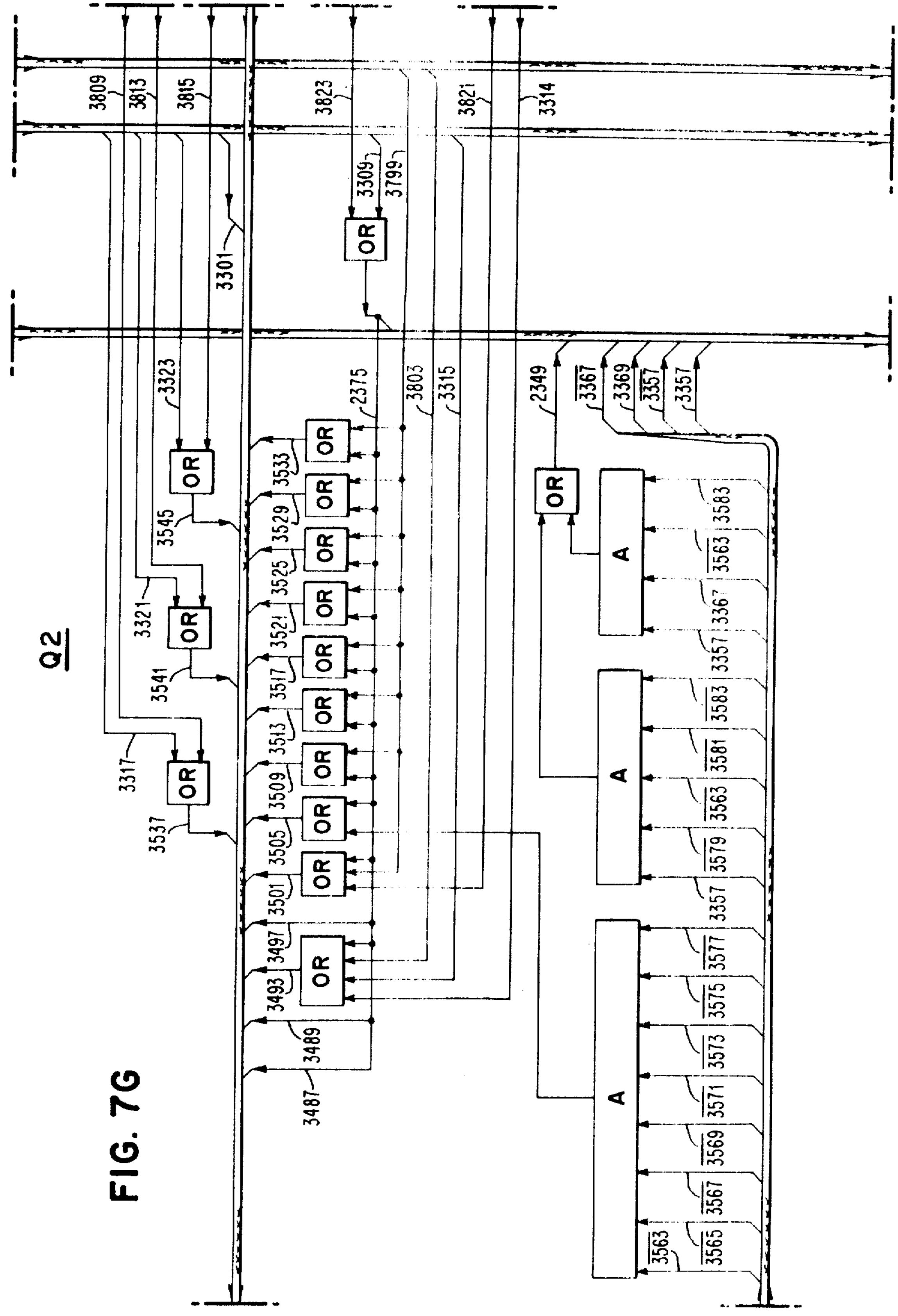
Figure 7H:
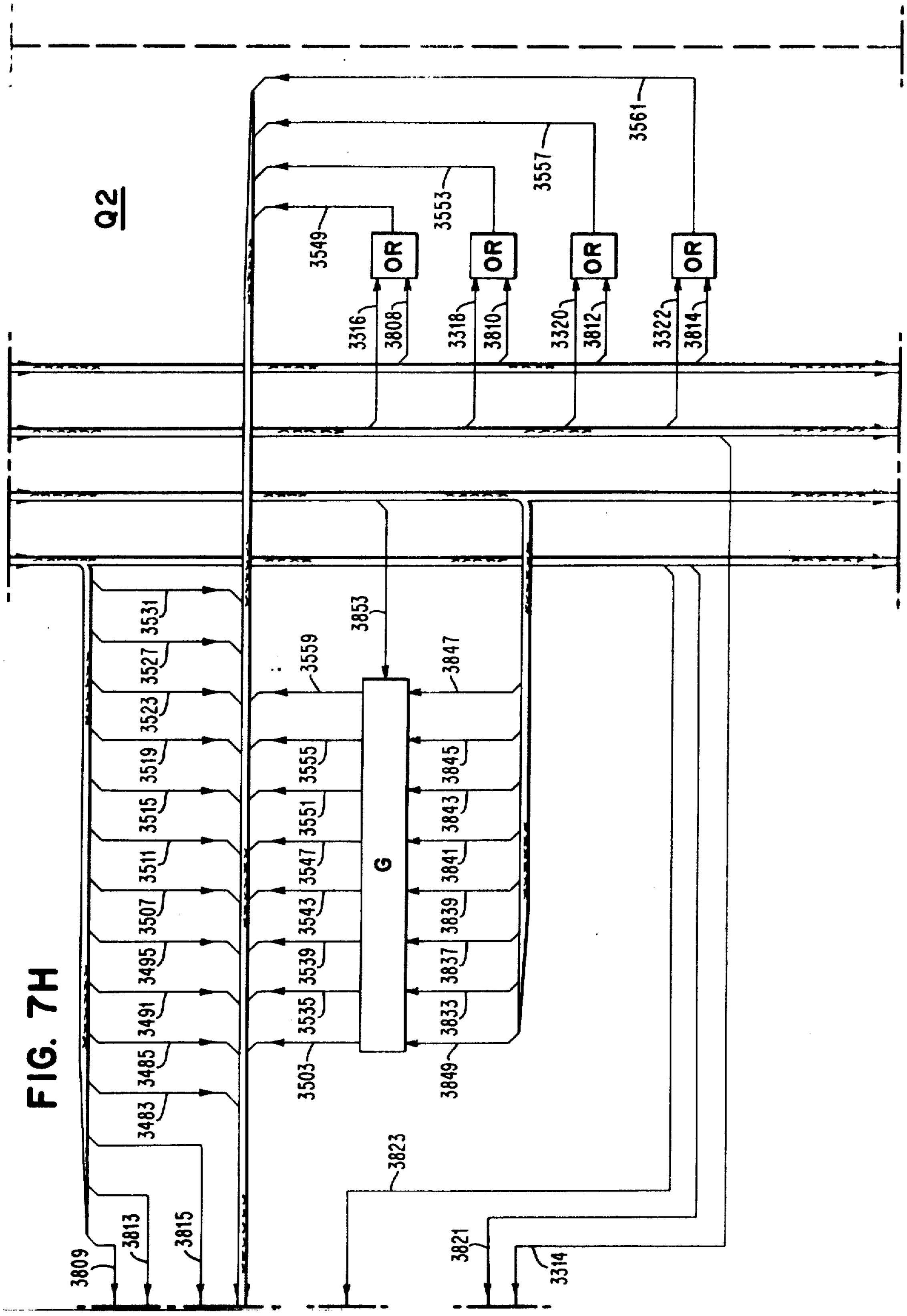
Figure 7I:
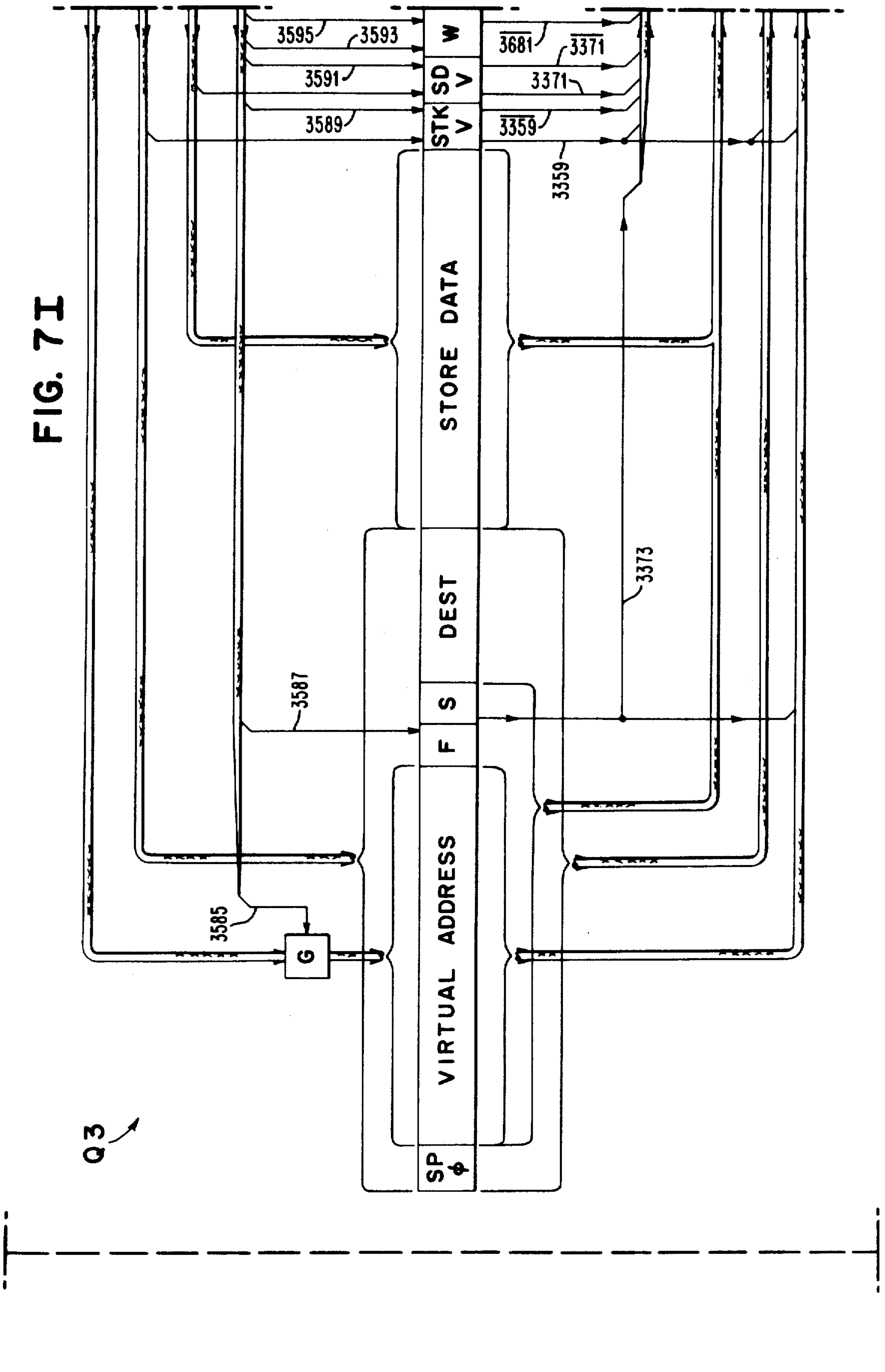
Figure 7J:
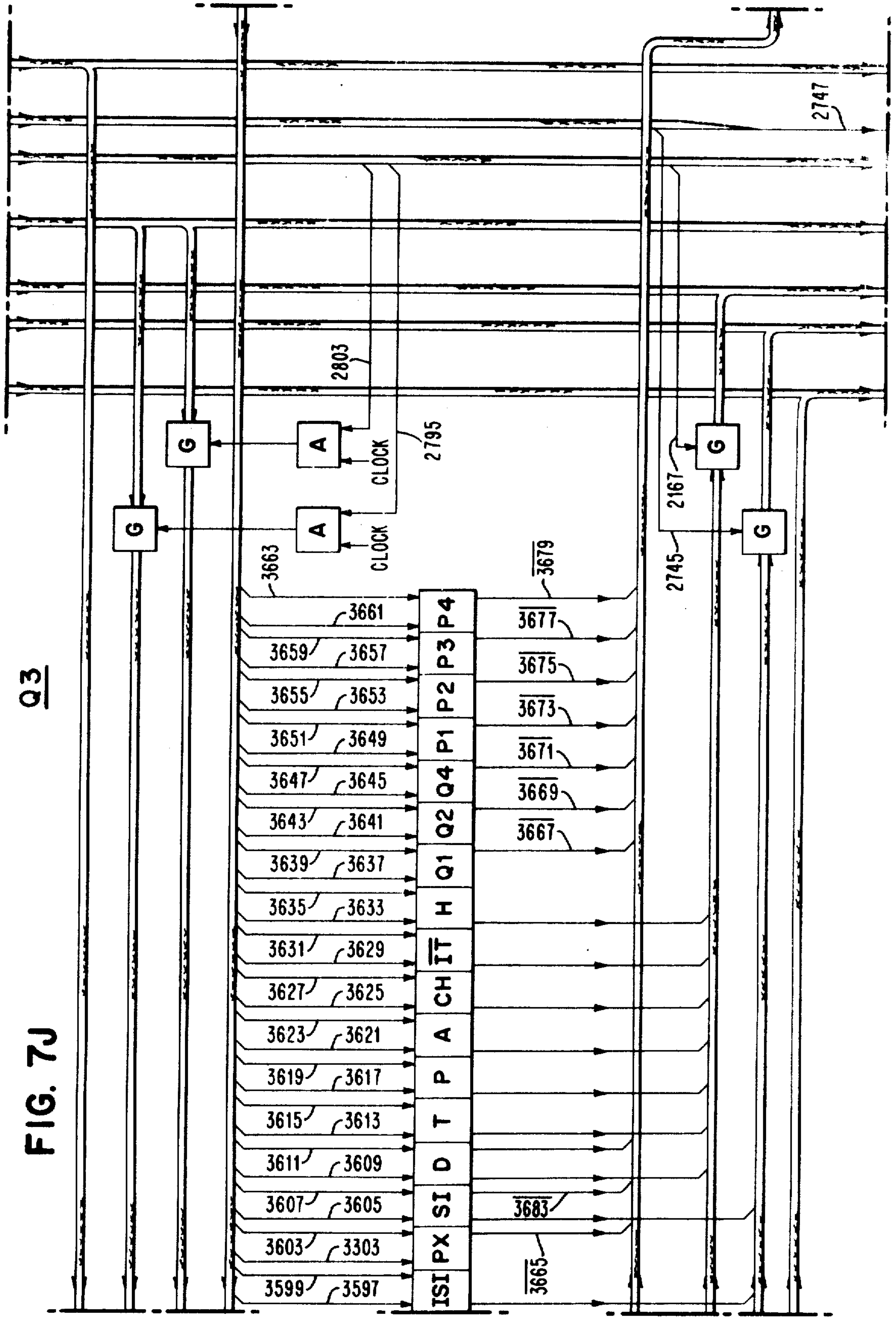
Figure 7K:
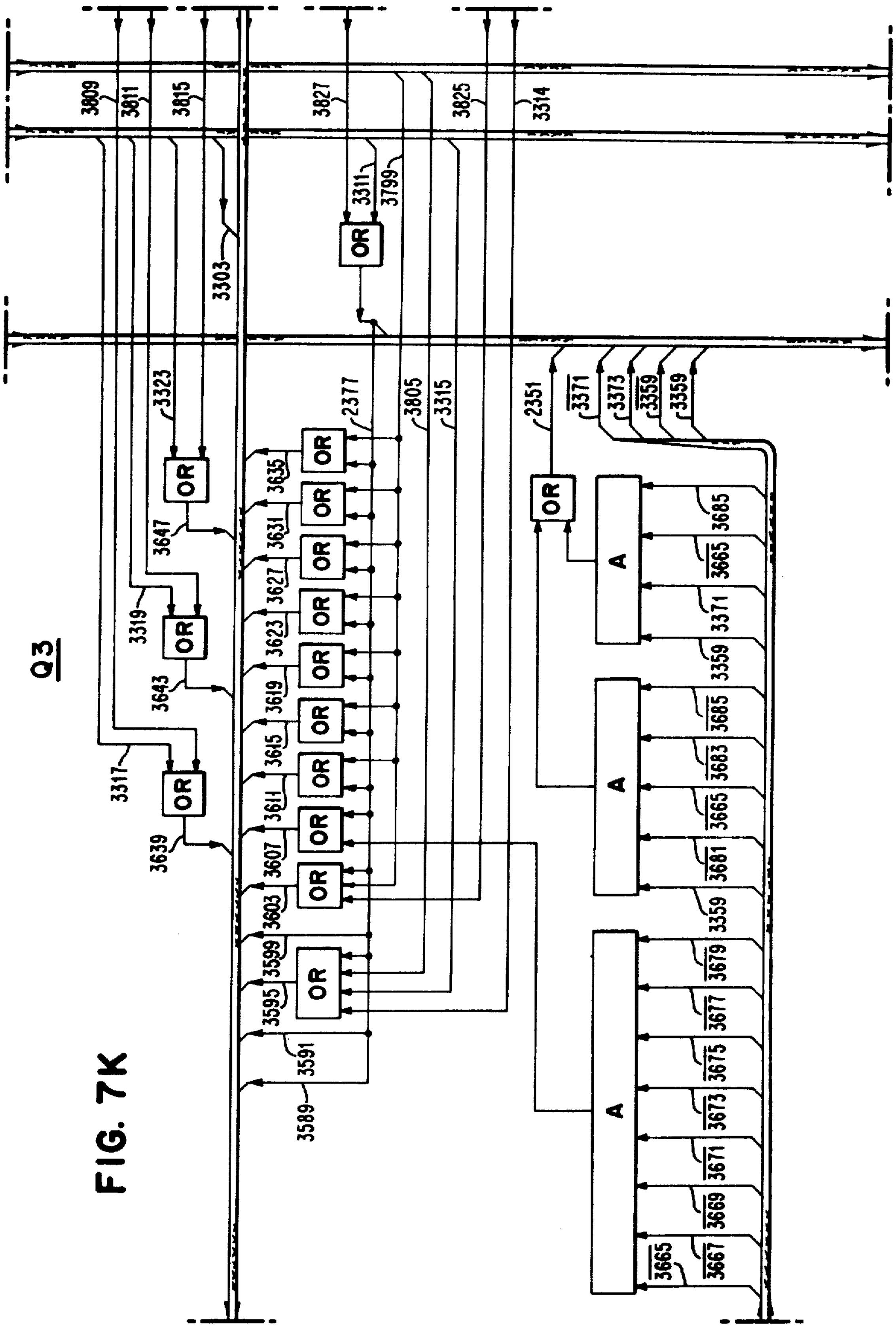
Figure 7L:
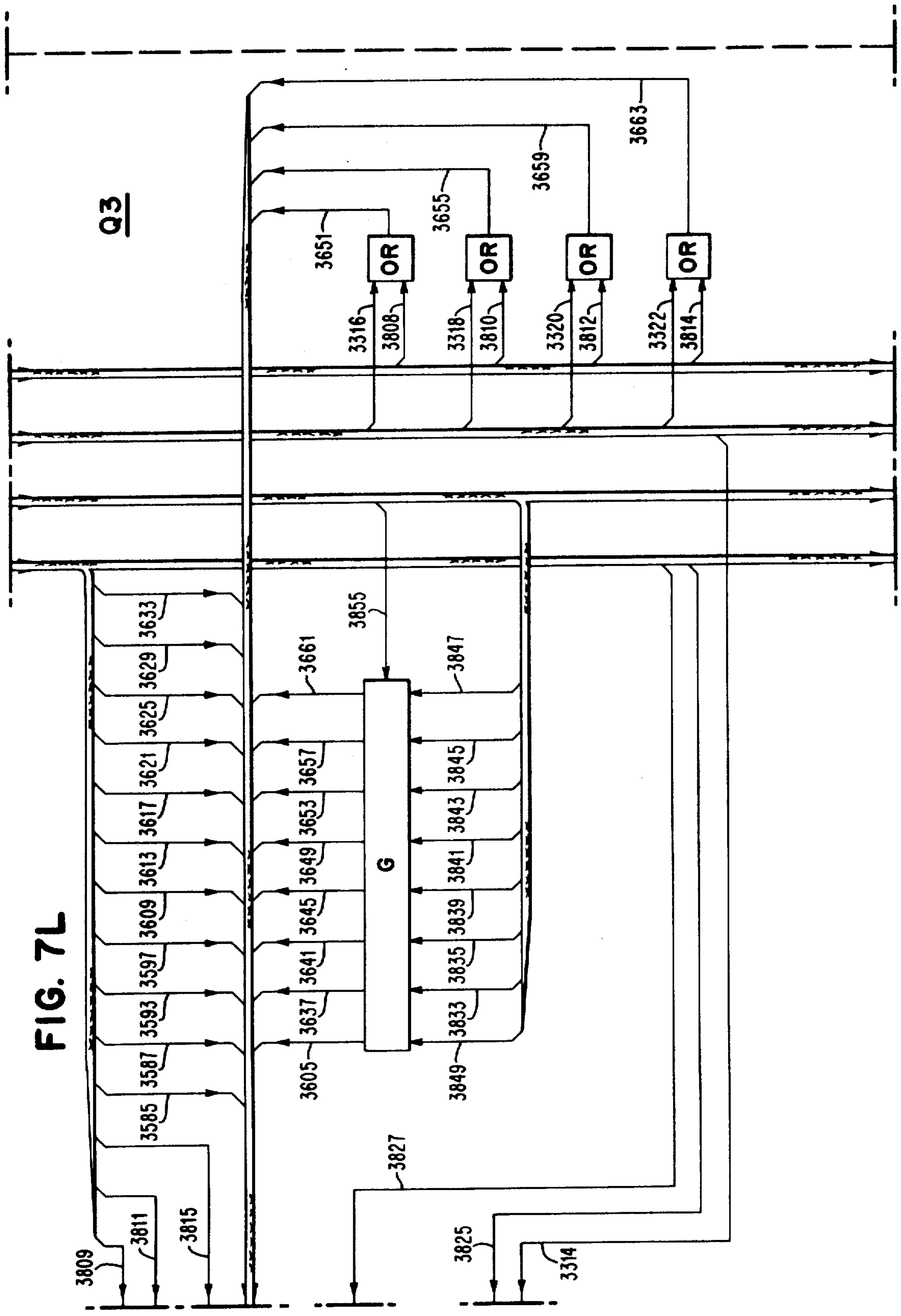
Figure 7M:
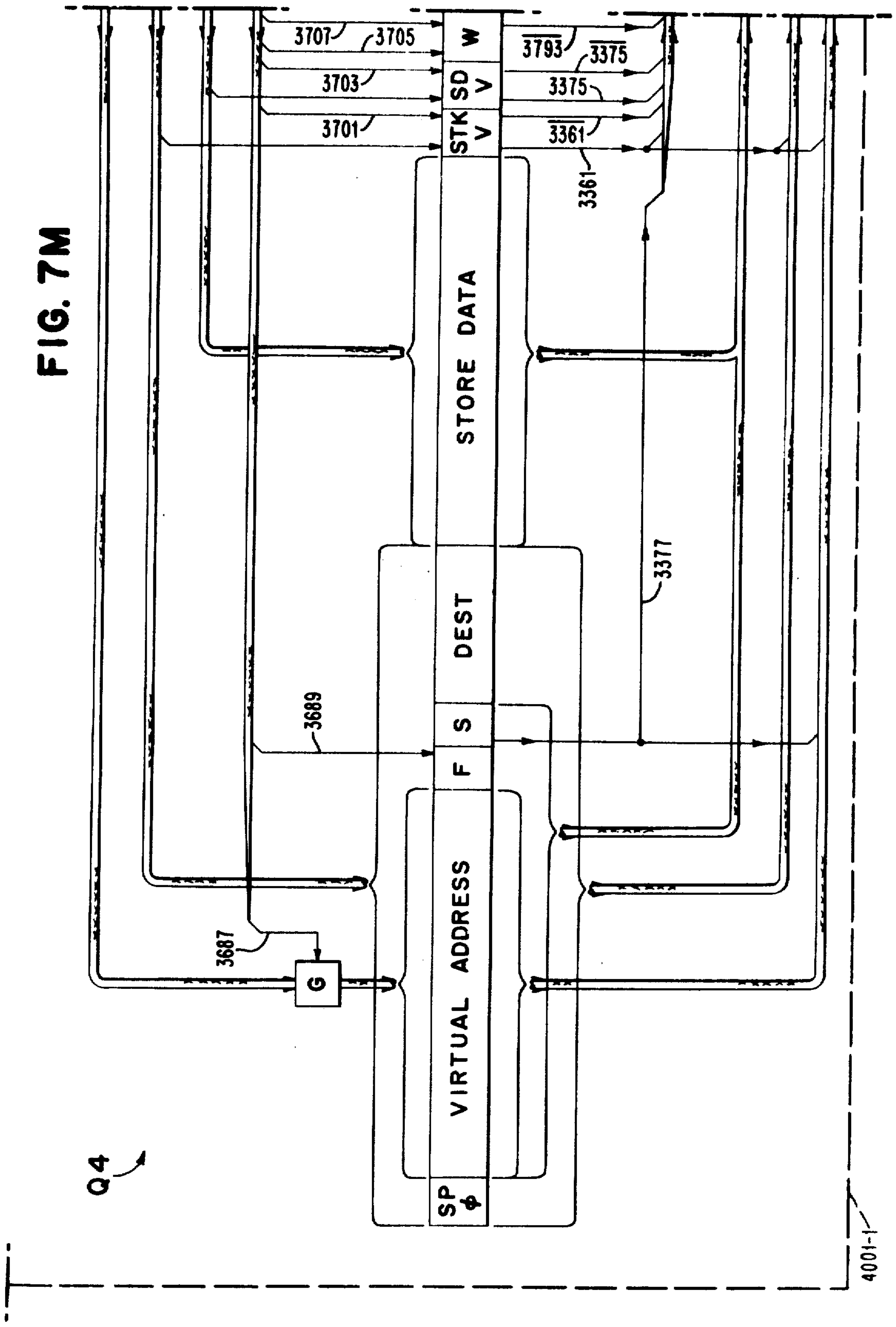
Figure 7N:
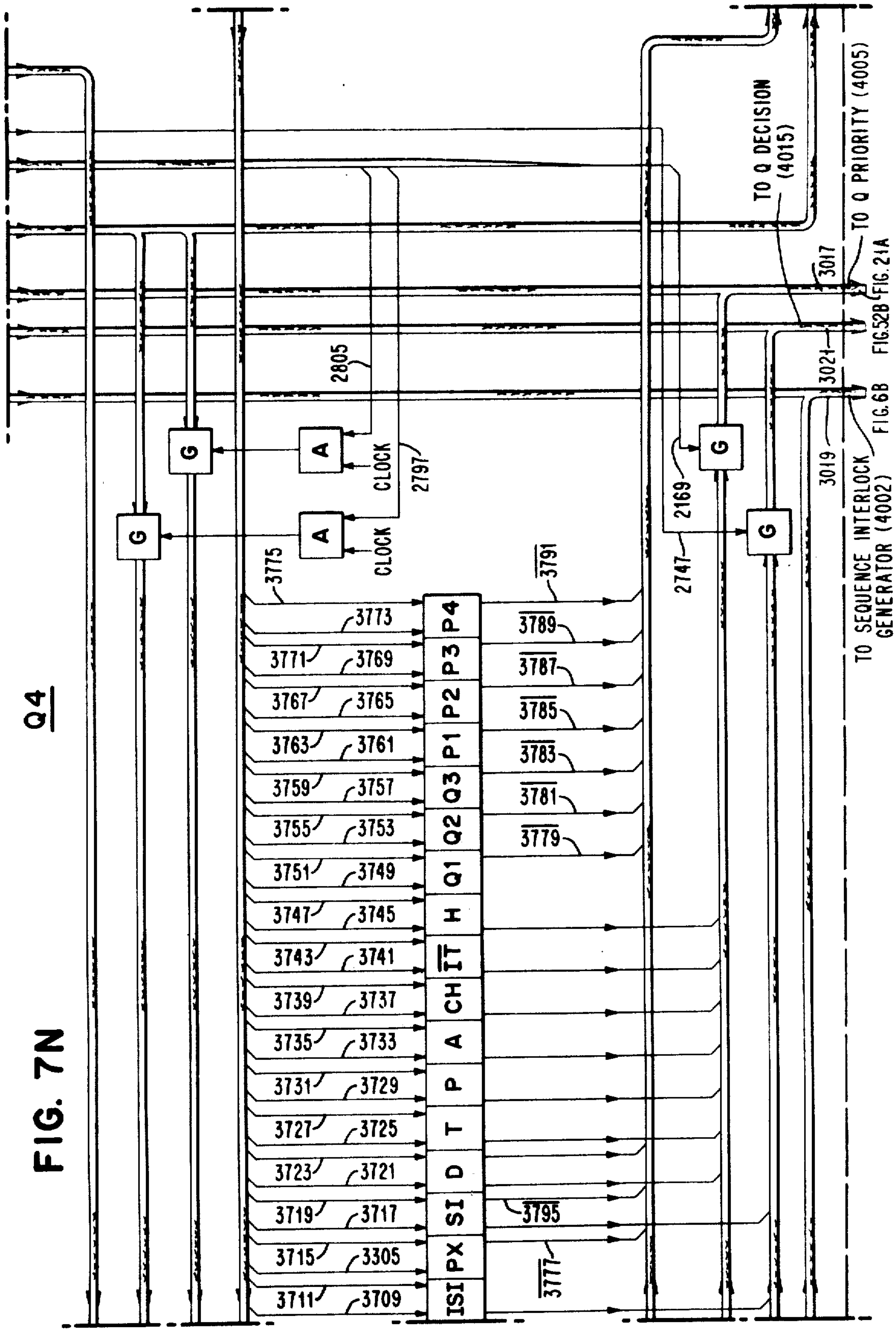
Figure 7O:
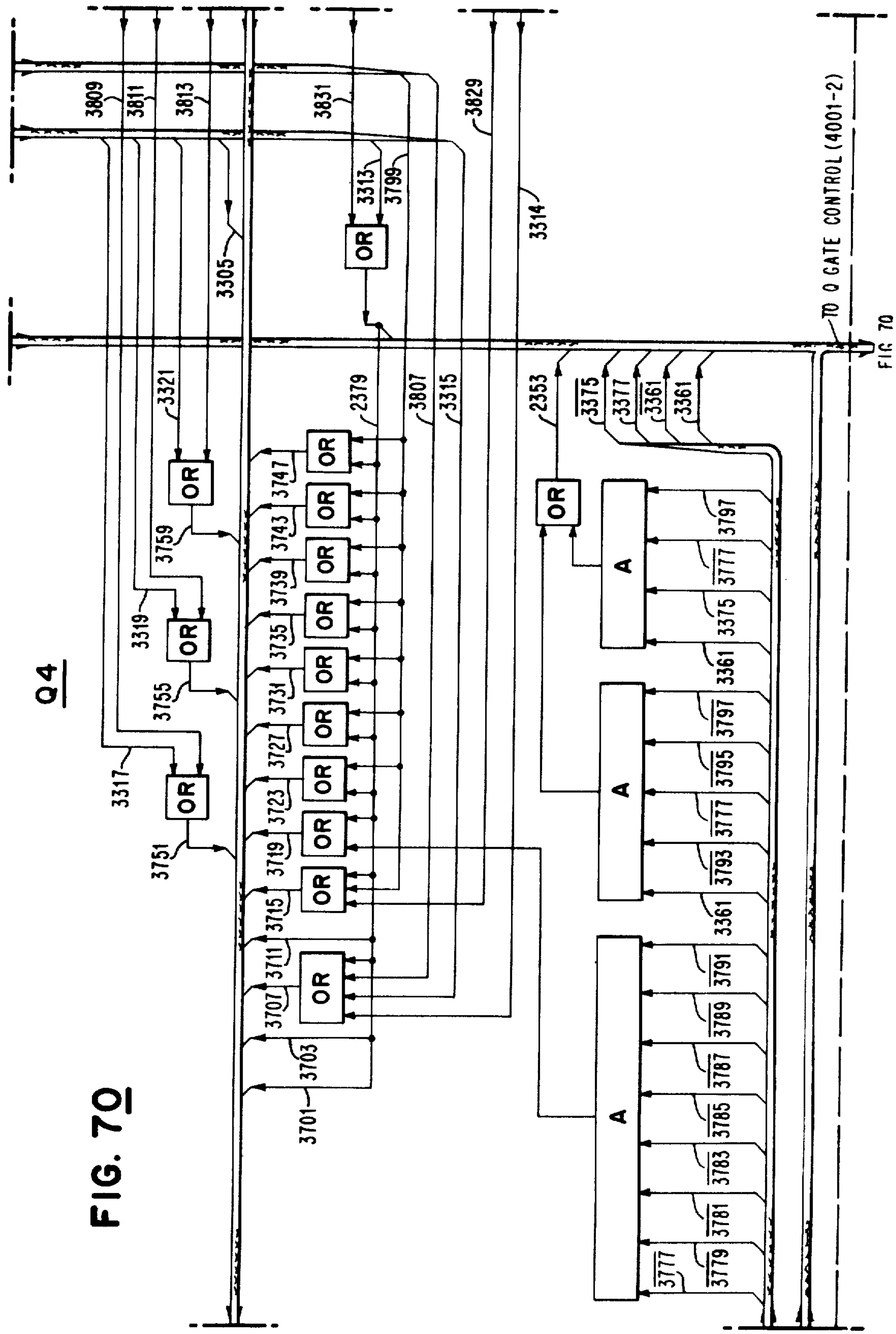
Figure 7P:
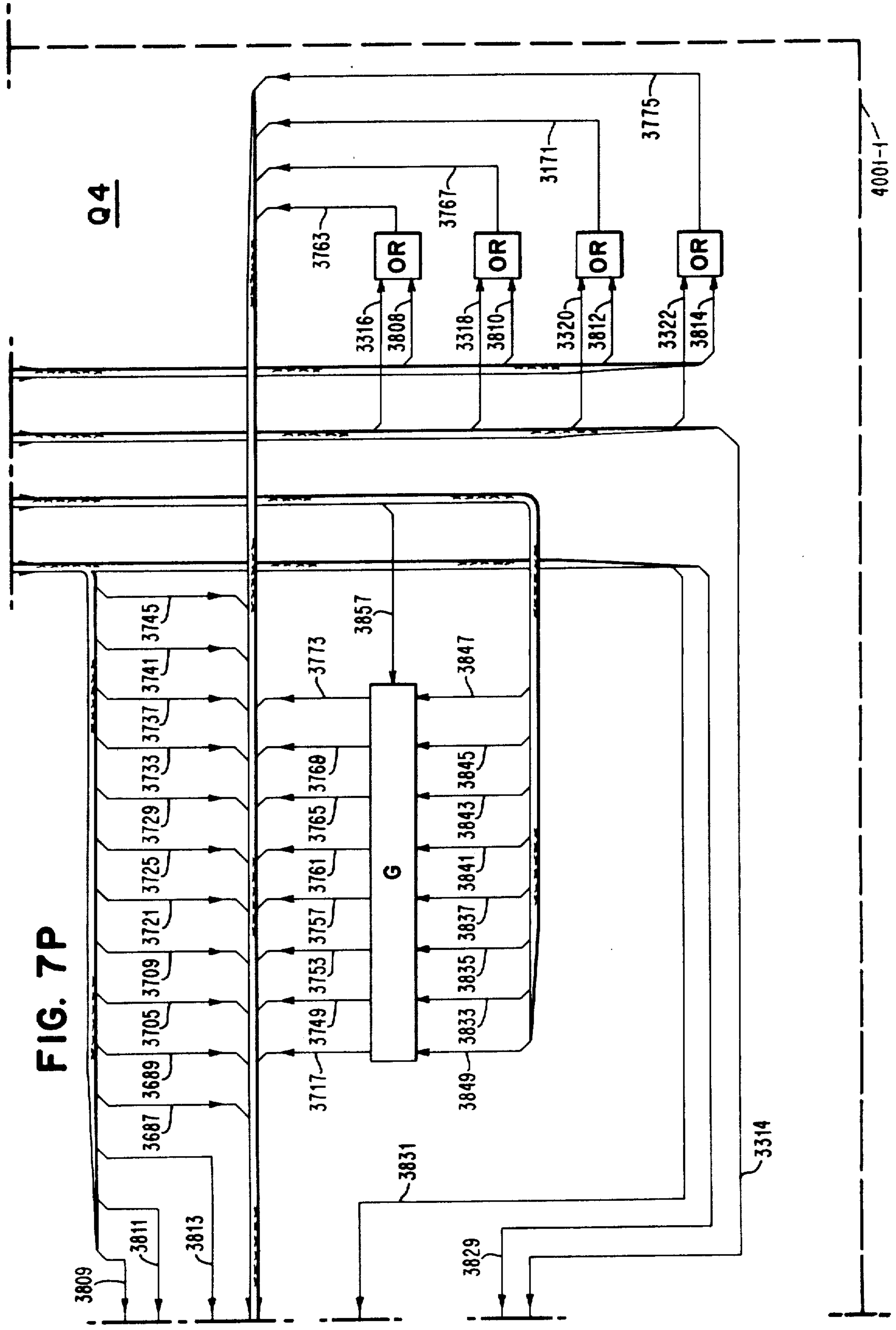
Figure 7Q:
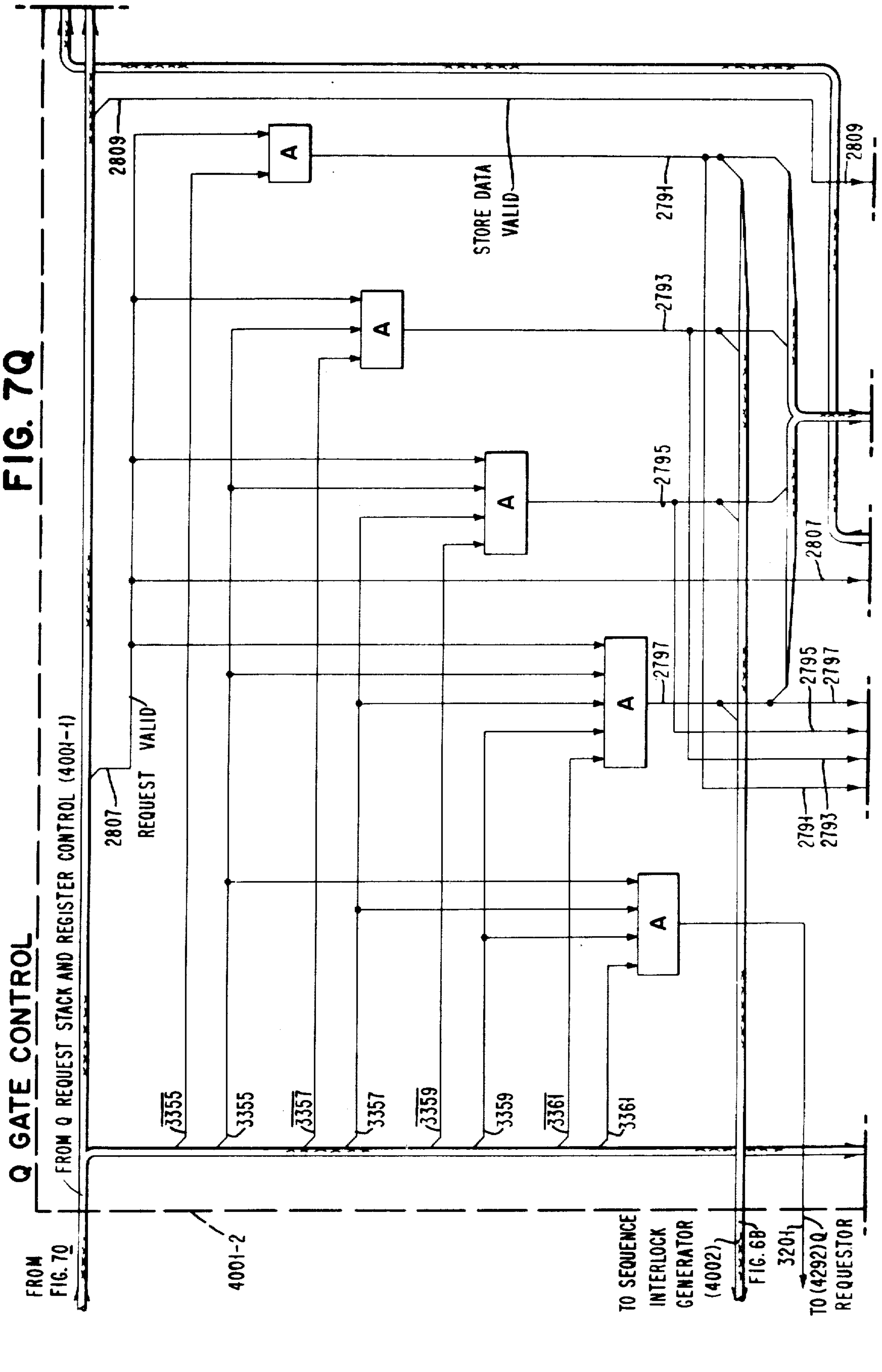
FIGS. 7Q-7X, when placed adjacent each other as seen in FIG. 7AA, illustrate in detail the Q gate control.
Figure 7R:
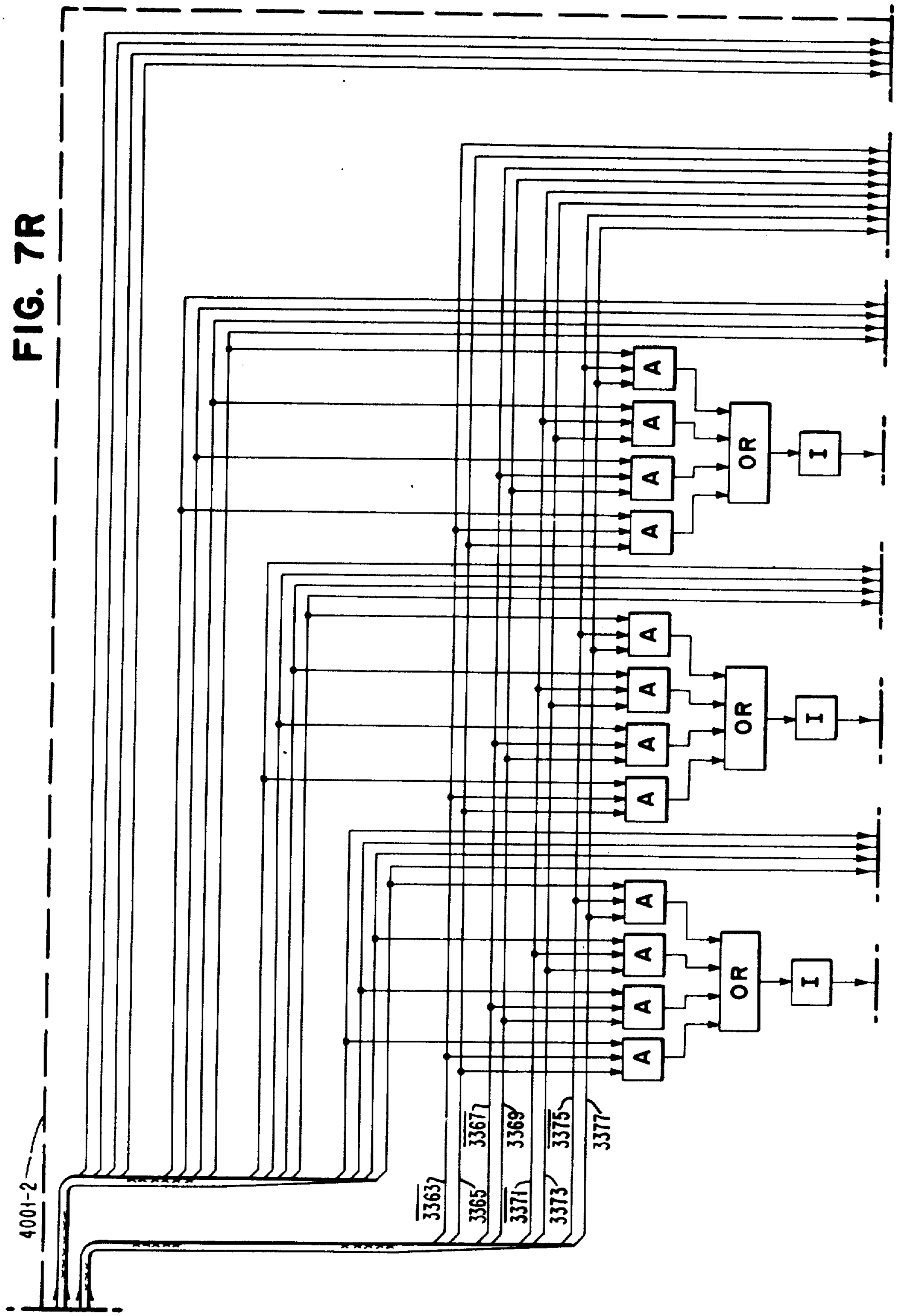
Figure 7S:
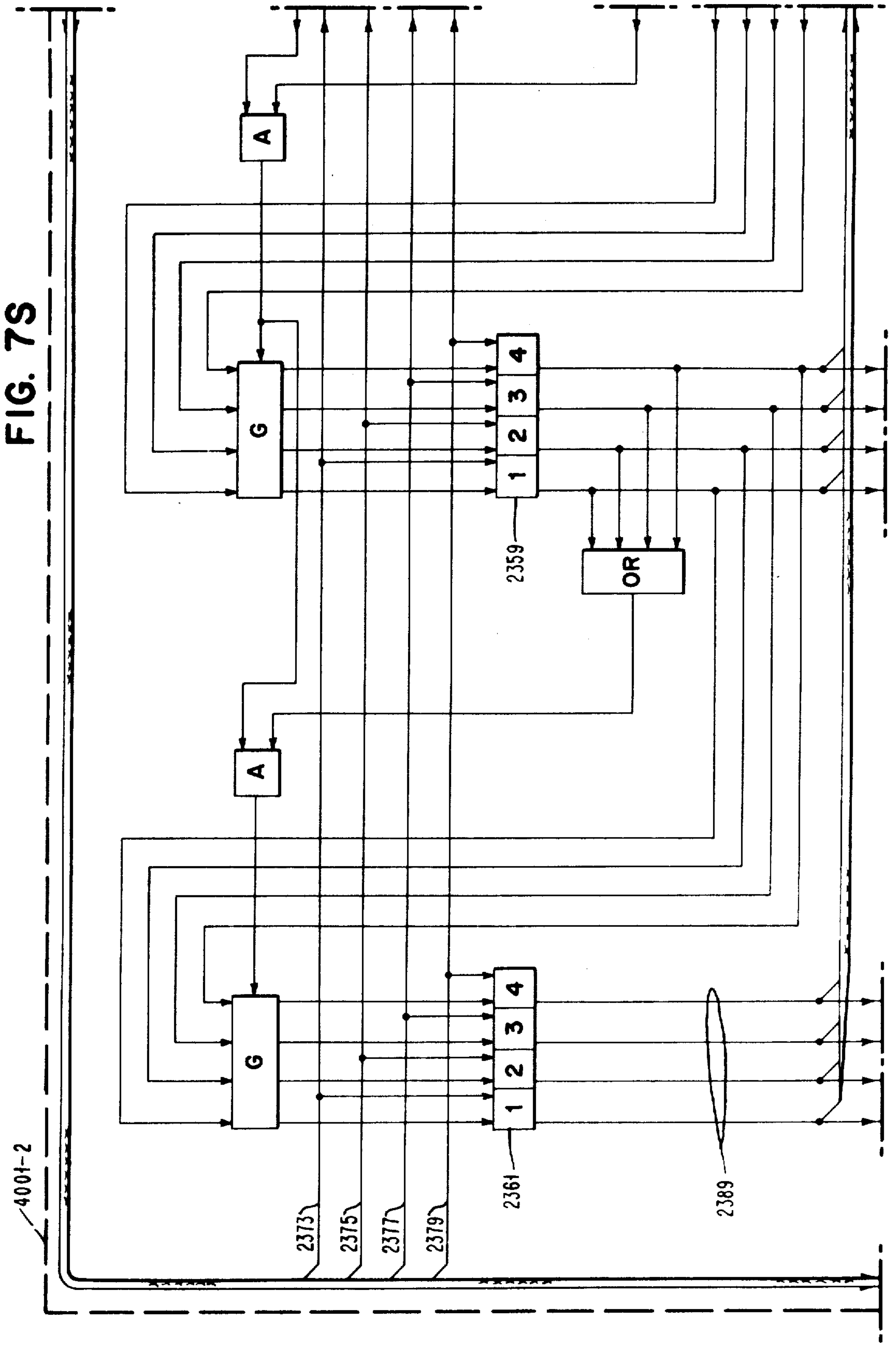
Figure 7T:
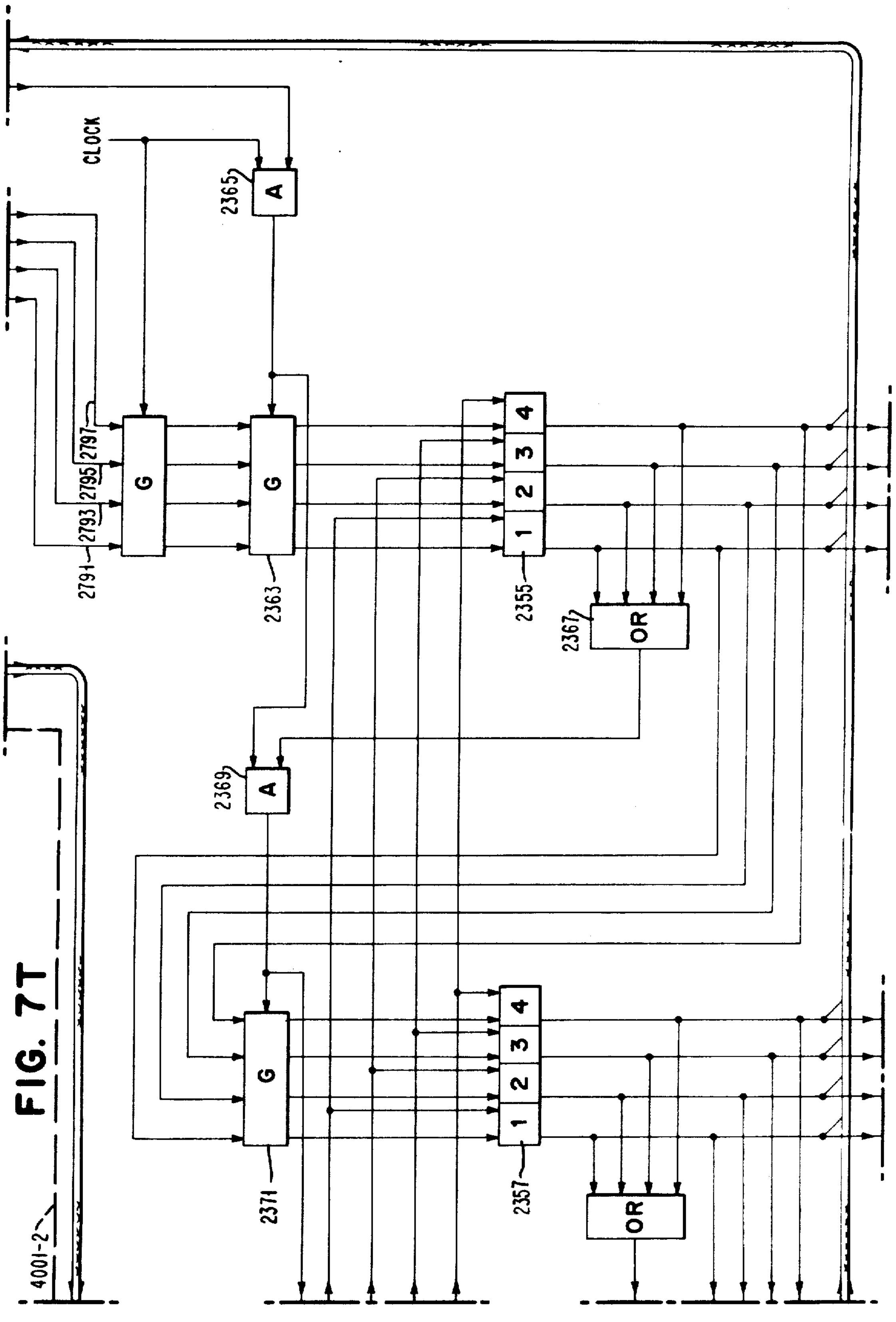
Figure 7U:
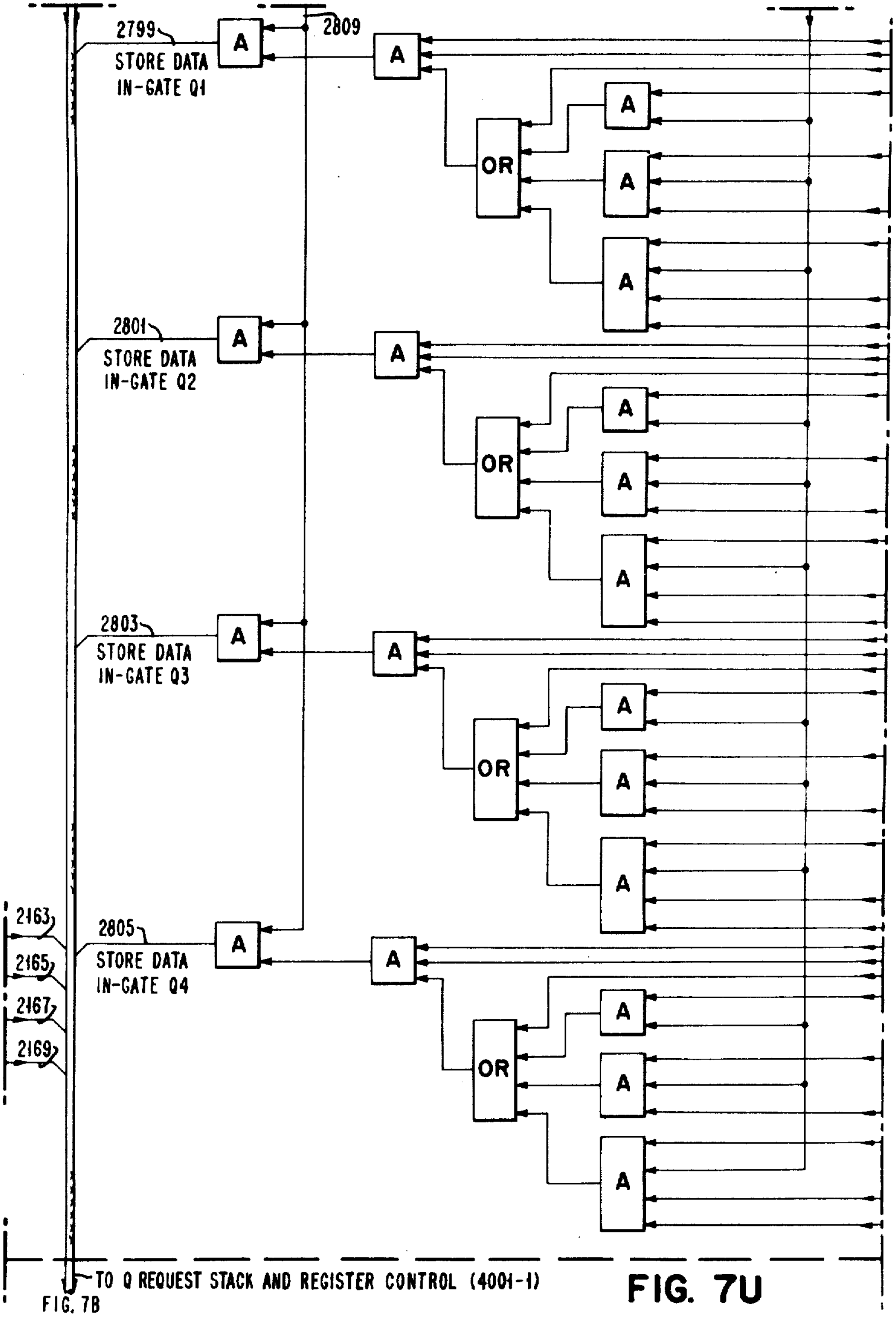
Figure 7X:
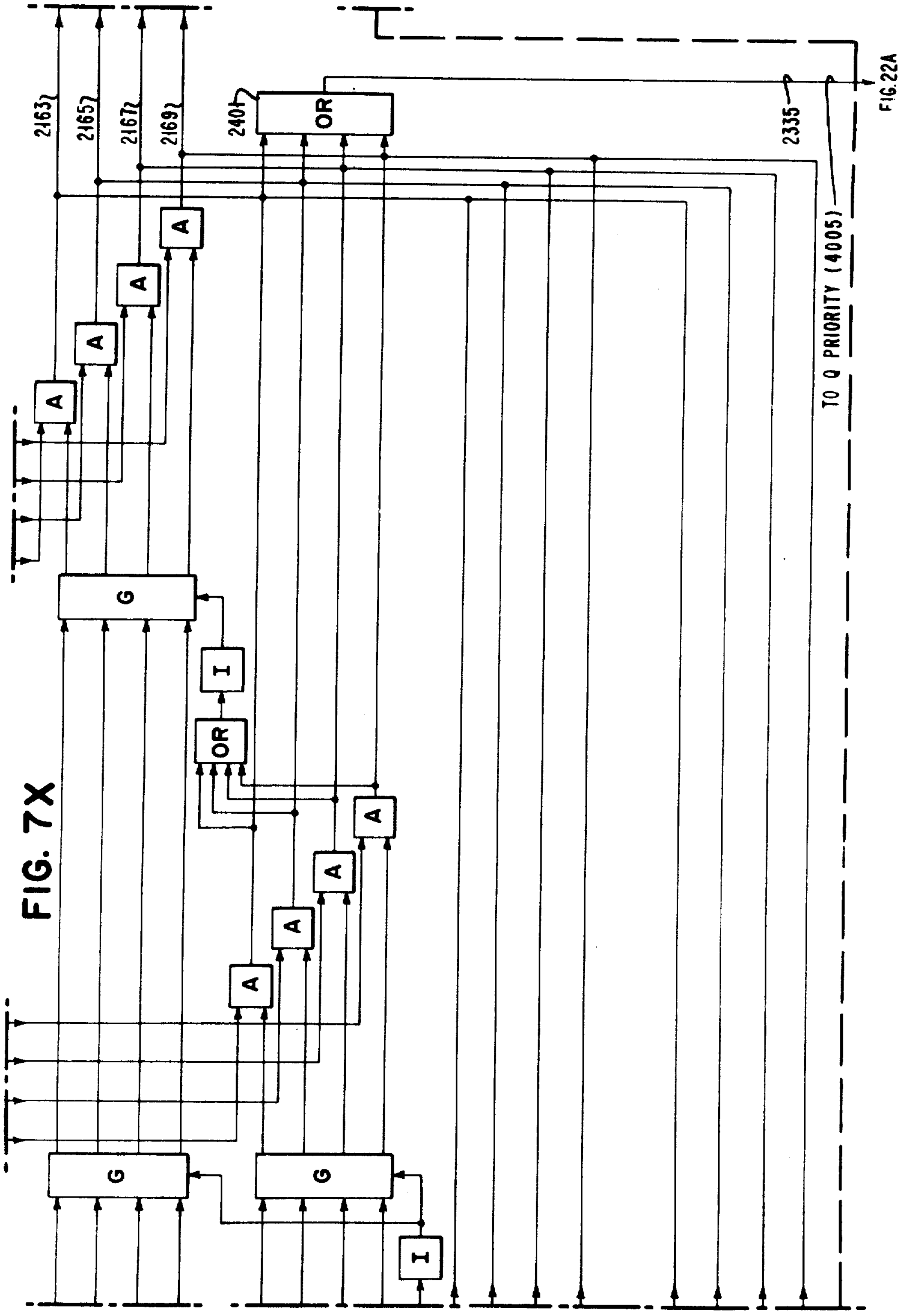
Figure 7V:
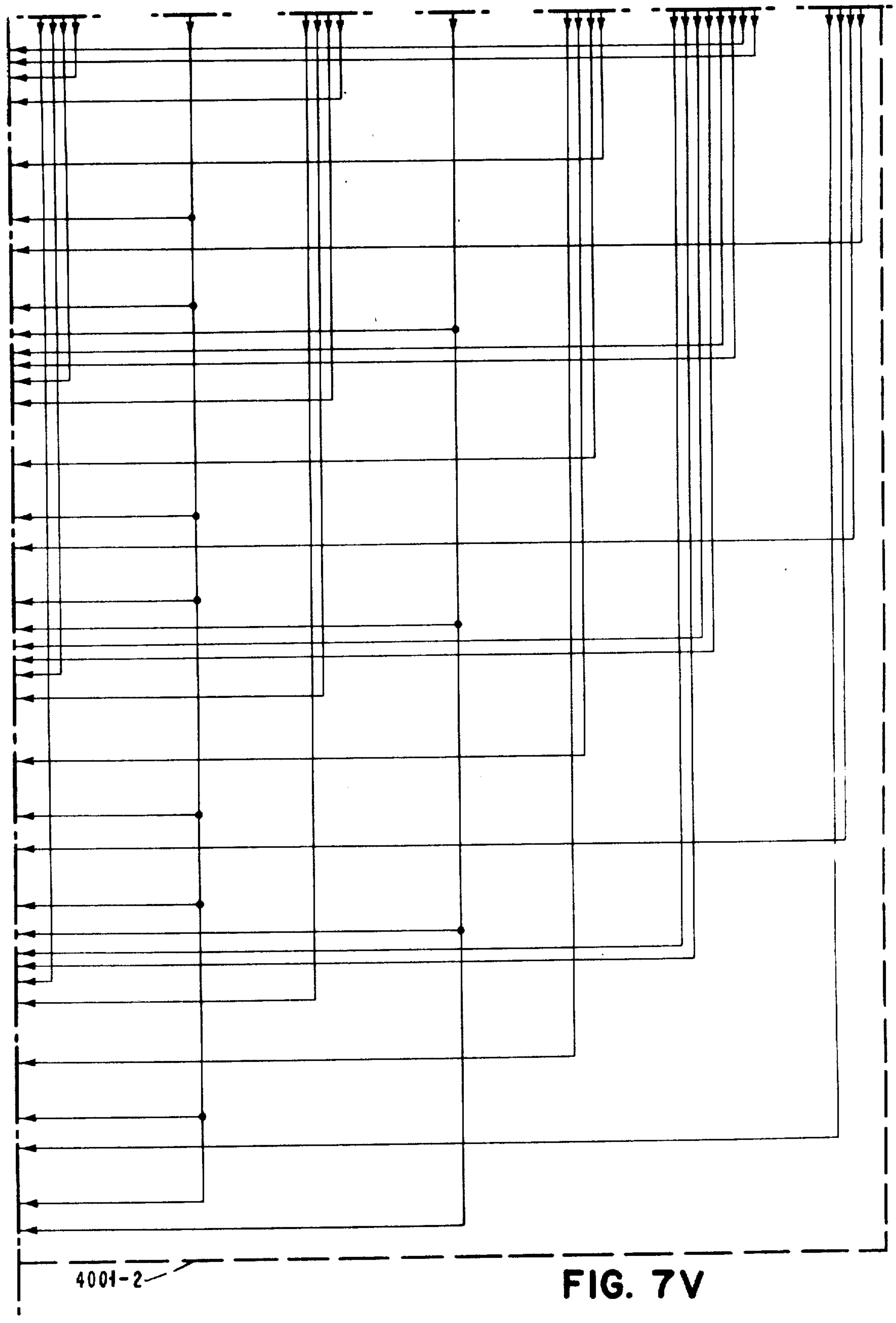
Figure 7W:
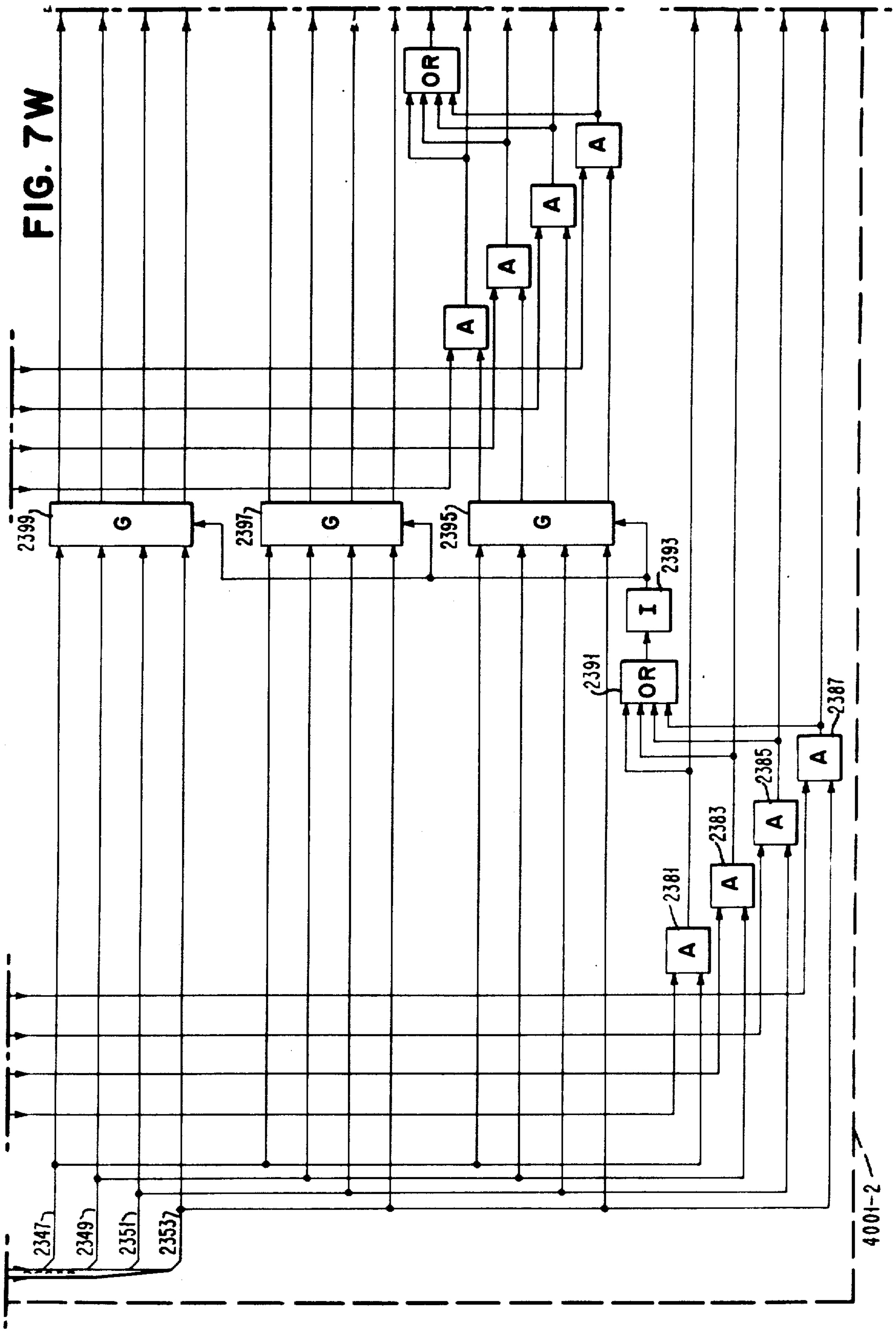

Operation of this area of the P gate control can be understood by noting that the active state of the wires 2346 to 2352 is applied to the AND circuits 2380 through 2386. More than one of these wires may be active at one time, inasmuch as there may be more than one request in the request stack ready to access priority. It will further be recalled that each time the request is in-gated to the request stack by one of lines 2390 through 2396, this information is gated through gates 2362A and 2362 to gate 2354, and, concurrently, any active bit position in the register 2354 is transferred through OR gate 2366 to serve as an enabling input to AND 2386. Concurrently, and similarly, any input which was in 2356 will be likewise gated into 2358; and any input into 2358 will likewise be gated into 2360. In this manner, the left-most register of the group of four, just mentioned, which has an active bit position, will indicate that the position which is active is the oldest request in the request stack. Therefore, for example, if position 3 is the active position in register 2360, it indicates that P3 is the oldest request in the request stack. If P3, according to control bit conditions, is ready to request acceptance from priority, then line 2350 will be active. This will cause AND gate 2384 to be active, which will cause an output at line 2166 on the far right-hand side of FIG. 5Q, and also cause an output on line 2334 through OR gate 2400. Concurrently, the output of AND 2384 will cause OR 2390 to activate inverter 2392 and cause the absence of a gating pulse and thus block gates 2398 and 2396. Therefore, level P3 of the P request stack will be the only one gated out, namely, by line 2166, which proceeds through Bus 4000-PO back to the request stack as a gating signal to gate that request from the request stack to the priority area of the two-level storage system. When the access has been completely accomplished with this request, which is resident in level P3 of the request stack, line 2376 of FIG. 7K will reset all the pertinent control bits thereby clearing the stack level for a new request, and concurrently line 2376 will reset all of the number 3 bits in registers 2354, 2356, 2358, 2360 of the P gate control thus clearing the control of that entry.

It will be recalled that, due to the structure of the present circuitry, an active bit position in the leftmost register having a bit position active will indicate the oldest request in the stack. For example, assuming no bits were active in registers 2360 and 2358, but that bit position 2 was active in register 2356, and bit position 1 was active in 2354, it would indicate that there are requests in level P2 and level P1, and no requests in 3 and 4, and that level P2 and has the older request. Therefore, if the control bits in level P2 indicate that level P2 is ready to request priority, line 2348 will be active. Since none of the outputs of register 2360 is active, all AND gates 2380 through 2386 will have no output and inverter 2392 will therefore have an output which will gate lines 2346 through 2352 via gates 2394, 2396, and 2398. Since there is no output from any bit position of register 2358, as hypothesized, there will be no outputs from AND's 2380A through 2386A. Therefore, inverter 2392A will have an output which will gate lines 2346 through 2352 via gates 2396A and 2398A. Since it is assumed that bit 2 in register 2356 (corresponding to level P2) is active, the inputs to AND 2382B will be fulfilled so that OR gate 2400 will activate line 2334 for a priority request and also a signal will appear on line 2164 to outgate the appropriate part of the request in level P2 to the priority. Concurrently, inverter 2392B will not have an output and will block gate 2398B from gating lines 2346 through 2352 any further.

Store Data In-Gate Control

FIGS. 5Q, 5R, and 5V of the overall arrangement show the store data in-gate control section of the P gate control. This section is needed in order to handle delayed store data on a store operation. Normally, the request for a store operation is generated before the data is available. There is at least one cycle between the time the request is sent and the time when the data is sent, but there can be many cycles between the two. The only requirement is that the data is sent in the same sequence as the requests for store operations. When the data arrives, the store data in-gate control selects the oldest store operation in the request stack which requires store data, and places the incoming store data into that level of the request stack register.

Referring to FIG. 5Q, there is seen groups of lines 2360A, 2358A, 2356A, and 2354A, which were the same group of lines seen on FIGS. 5S and 5T. Proceeding downwardly from the top of each group, each line proceeds from position 1, 2, 3, and 4, respectively, of its associated register in FIGS. 5S and 5T. Also seen in FIG. 5R is the zero side ($\overline{3362}$) of the SDV bit for each level, indicating that store data is not present in that level of the stack, and also the one side (3364) of the S bit which indicates that the request in that particular level is a store. Therefore, when both these pairs of lines for each individual level in the P request stack are active, it means that there is a request in that level, that the request is a store, but that the store data is not yet valid. These lines for each level act as two input lines to a bank of four AND gates followed by an OR gate whose output is inverted. The third input to each of these AND gates is from one of the position numbers of one of registers 2360, 2358, or 2356, via groups of lines 2360A, 2358A, and 2356A. For example, two inputs to AND 5001 are the zero side of the store data valid bit for level P1 and the store indication bit for level P1. The corresponding inputs for AND's 5002, 5003, and 5004 are the corresponding bits for levels P2, P3, and P4, respectively. The third inputs to AND's 5001 through 5004 is the 1,2,3, and 4 position bit, respectively, from register 2360 via group of lines 2360A. Inputs to the second and third group of AND's are the same respective bits for groups of lines 2358A and 2356A, respectively. With reference to FIGS. 5U and 5V, the store data in-gate for each level is from the respective lines 2798, 2800, 2802, and 2804, 2798 is for level P1 and the others are, respectively, for levels P2, P3, and P4. Referring to the Store Data In-Gate signal for P1 generated on line 2798, it is seen that the input to AND 5012 is the Store Data Valid line 2808 and the output of AND 5011. The inputs to AND 5001 are lines $\overline{\mathbf{3362}}$ and 3364 which are the zero side of the store data valid bit for P1 and the store indication bits for level P1. The third input for AND 5011 is the output of OR 5010. The input of OR 5010 is line 1 from group of lines 2360 which indicates, if active, that the oldest request in the request stack is in level P1. Other inputs to OR 5010 are the outputs of AND's 5007, 5008, 5009, whose inputs are the one bit from each of the groups of lines 2358A, 2356A, and 2354A. Another input to each of AND's 5007, 5008, and 5009 is the output of inverter 5006. The same pattern of inputs, but associated with bits 2, 3, and 4, respectively, from registers 2358, 2356, and 2354, generate signals on lines 2800, 2802, and 2804, which are the store data in-gates for levels P2, P3 and P4, respectively.

In operation, if register 2360 of FIG. 5C has an active bit, for example bit 2, it means that level P2 is the oldest request in the request stack. Referring to FIG. 5R, it is seen that line 2 of group 2360A will be active. If, further, the request in level 2 is a store (3368 active), and if the store data is not yet valid in the request ($\overline{\mathbf{3366}}$), then AND gate 5002 will be active, causing inverter 5006 to be inactive, thus inhibiting the entire vertical line of AND gates beginning with 5007 in FIG. 5U. Concurrently, the line 2 of group 2360A will activate OR 5016, and lines $\overline{\mathbf{3366}}$ and 3368 will also enable the output of AND 5017 which will generate a store data in-gate for P2 on line 2800 via AND 5018. All other in-gates will not be active by virtue of the lack of output from inverter 5006.

As another example, if the left-most active register in FIGS. 5S and 5T is 2356 and has, say, bit 4 active, it means that the oldest request in the request stack is the request at level P4. Therefore, and with reference to group of lines 2356A in FIG. 5R, it will be seen that line 4 and the outputs of inverters 5006 and 5013 will activate AND 5026. The output of AND 5026 will activate OR 5028. If, in addition, the request in level 4 is a store and store data is not yet valid, lines $\overline{\mathbf{3374}}$ and 3376 from FIG. 5B will also be active at the input to AND 5029, along with the output of OR 5028. This will activate AND 5029 which, along with the signal on line 2808, will activate AND 5030 to generate a store data in-gate for level P4 over line 2804. All other AND gates in the line of vertical AND gates in FIG. 3E beginning with 5007 will be inhibited due to the fact that at least one input to each AND gate will not be satisfied.

Sequence Interlock Generator

A sequence interlock generator is used in our invention because storage requests may not always be executed in the same order in which they are accepted from a requestor in order to expedite requests for which data is available in the storage system, as compared to requests for which data is not available for one reason or another. This creates problems when the stores and fetches to the same storage word are present in a request stack at the same time. For example:

Time-Request Sequence

| | 1 | 2 | 3 | 4 |
|---|---|---|---|---|
| $T$ | Store $\alpha$ | Fetch $\alpha$ | Store $\alpha$ | Fetch $\alpha$ |
| $T+\Delta$ | Fetch $\alpha$ | Store $\alpha$ | Store $\alpha$ | Fetch $\alpha$ |

In sequence 1, if the fetch is executed before the store, it will get the wrong data. This is true also in sequence 2 if the store $a$ is done before the fetch from address $a$. Sequence 3 will result in the wrong data in location $a$ if the stores are done out of order. No error can result from sequence 4 even if they are executed out of order.

If any of the above-mentioned sequences are present in the request stacks, it will result in a word interlock in request T+Δ. that is, request T+Δ will be interlocked to request T. Until the first request has completed its operation in the storage system, no action will take place for the interlocked request.

Each request stack register level contains an interlock vector and an interlock control bit. The interlock vector was described previously and contained bits representative of each level in the request stacks exclusive of the particular level under consideration. Also, a sequence interlock, SI bit is provided in each stack level, which, when set to a one state, indicates that the request in that level is interlocked to the particular level, or levels, active in the IV field. When a request is completed in either of the request stacks, the bit position in the IV field corresponding to that request is reset in every stack position. Each stack level monitors its IV field; and when it contains no active IV bit, it resets the SI bit, thereby taking the request out of an interlocked state.

The SI bit being set to one inhibits the particular request under consideration from being gated to the priority section of the storage system where it would contend for priority to a given storage location. An exception to this rule is when the request bypasses the request stack to the priority area, which happens before the interlock is discovered. Later, when this request enters the decision function, and the sequence interlock is discounted, the request is invalidated and must again go to the priority area. This is when the SI bit is used as a history control.

Figures 6, 6A:
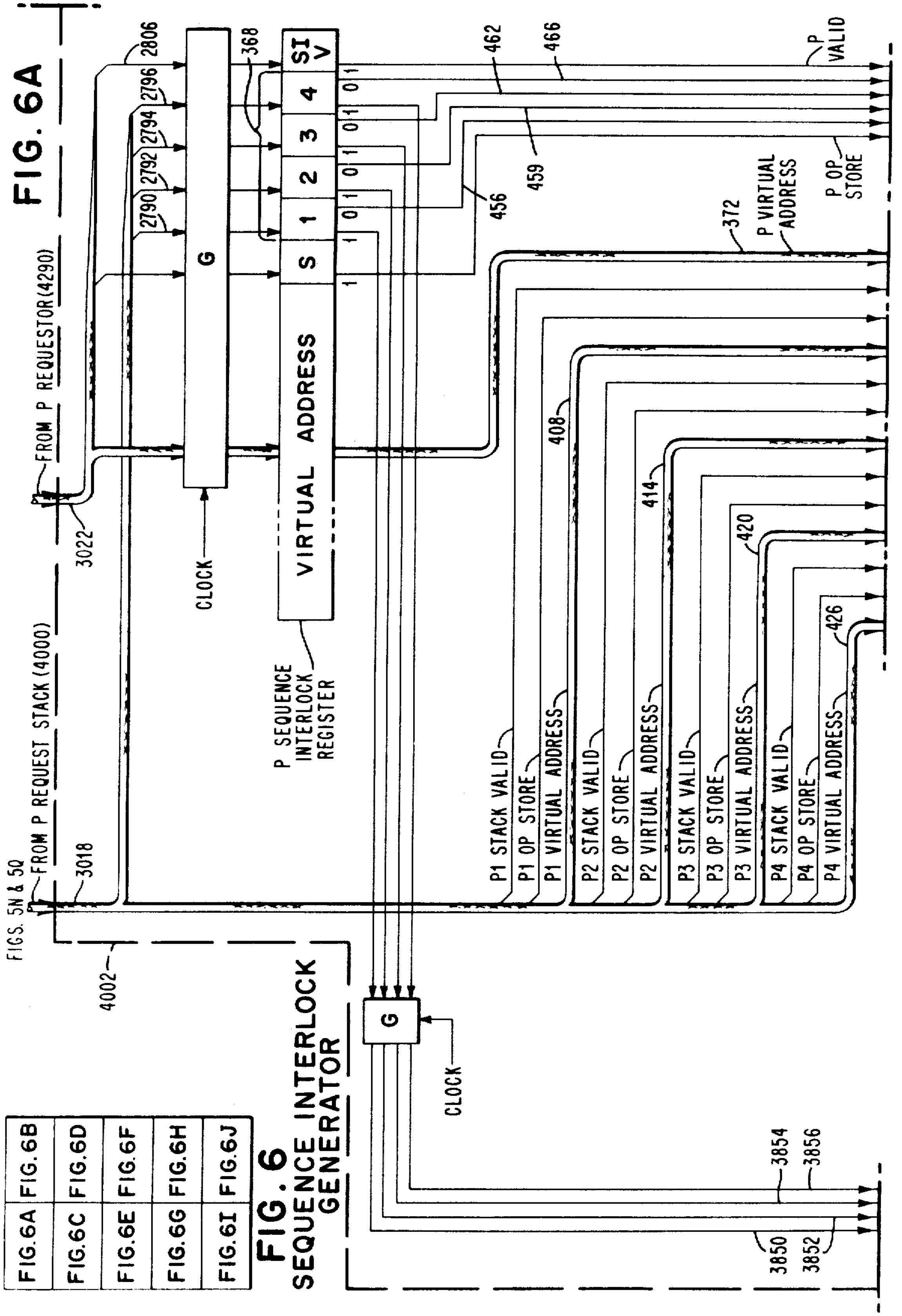
FIG. 6 shows the manner in which FIGS. 6A-6J should be placed adjacent each other.
FIGS. 6A-6J, when placed together as seen in FIG. 6, show a detailed representation of the sequence interlock generator of our invention.
Figure 6B:
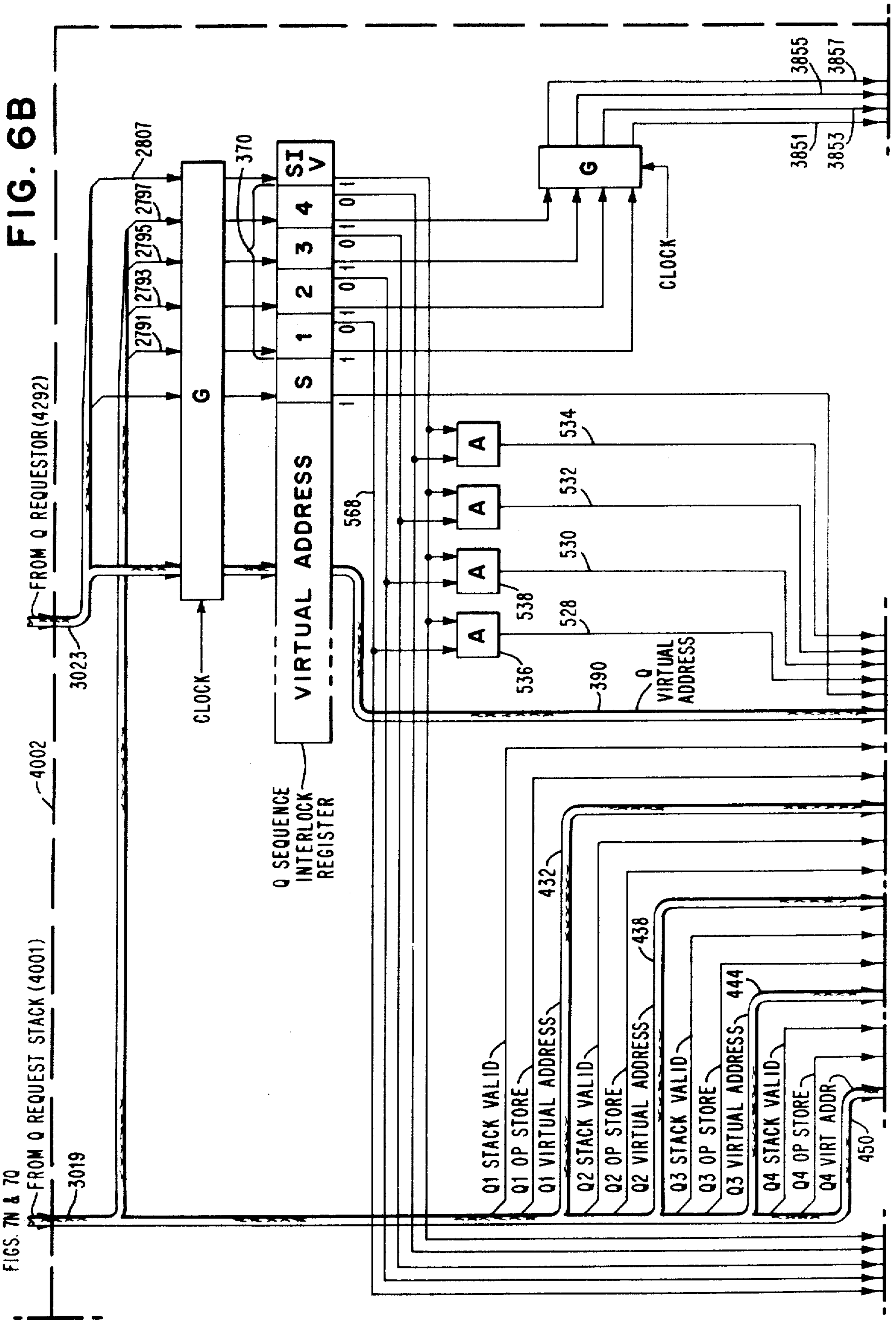
Figure 6C:
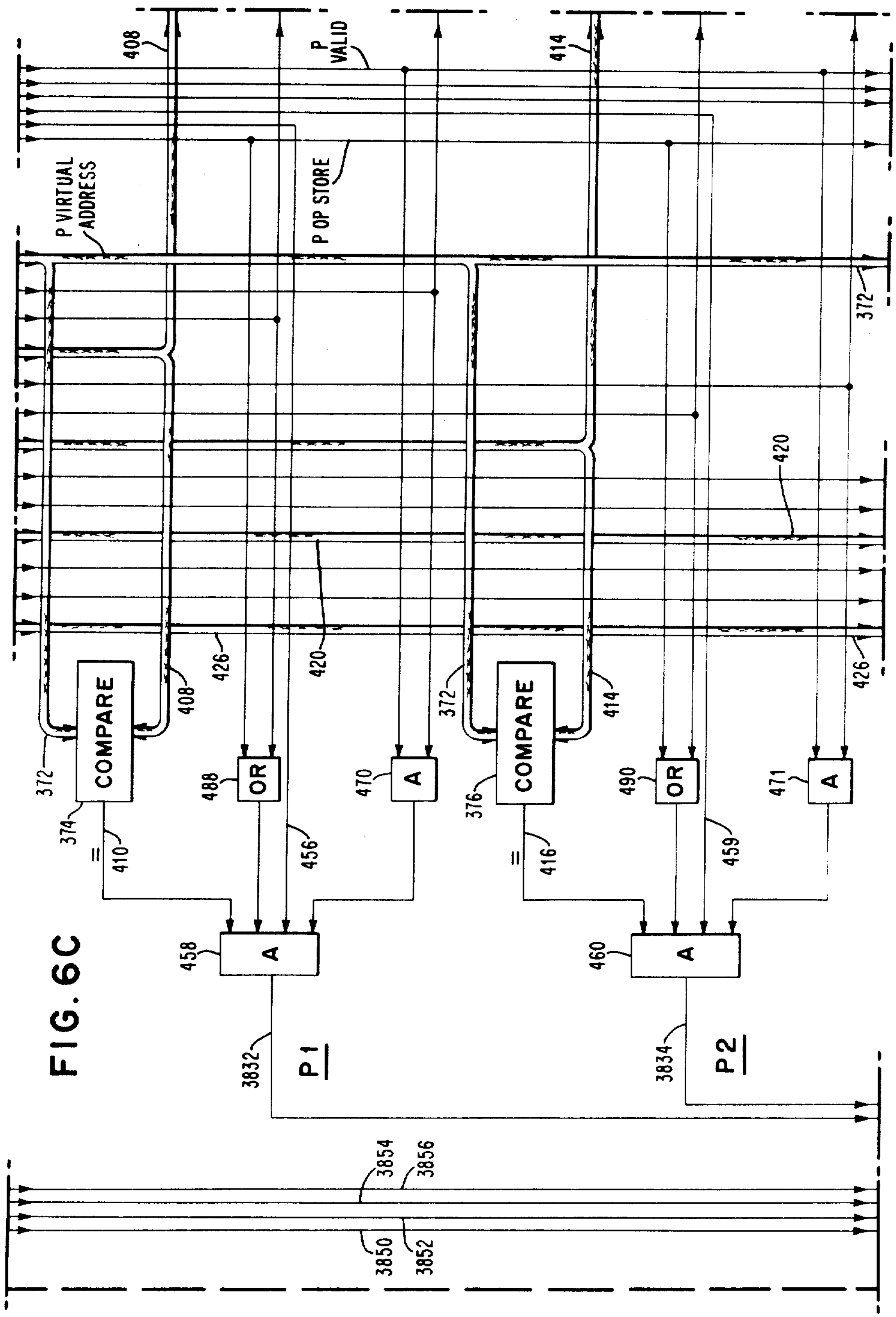
Figure 6D:
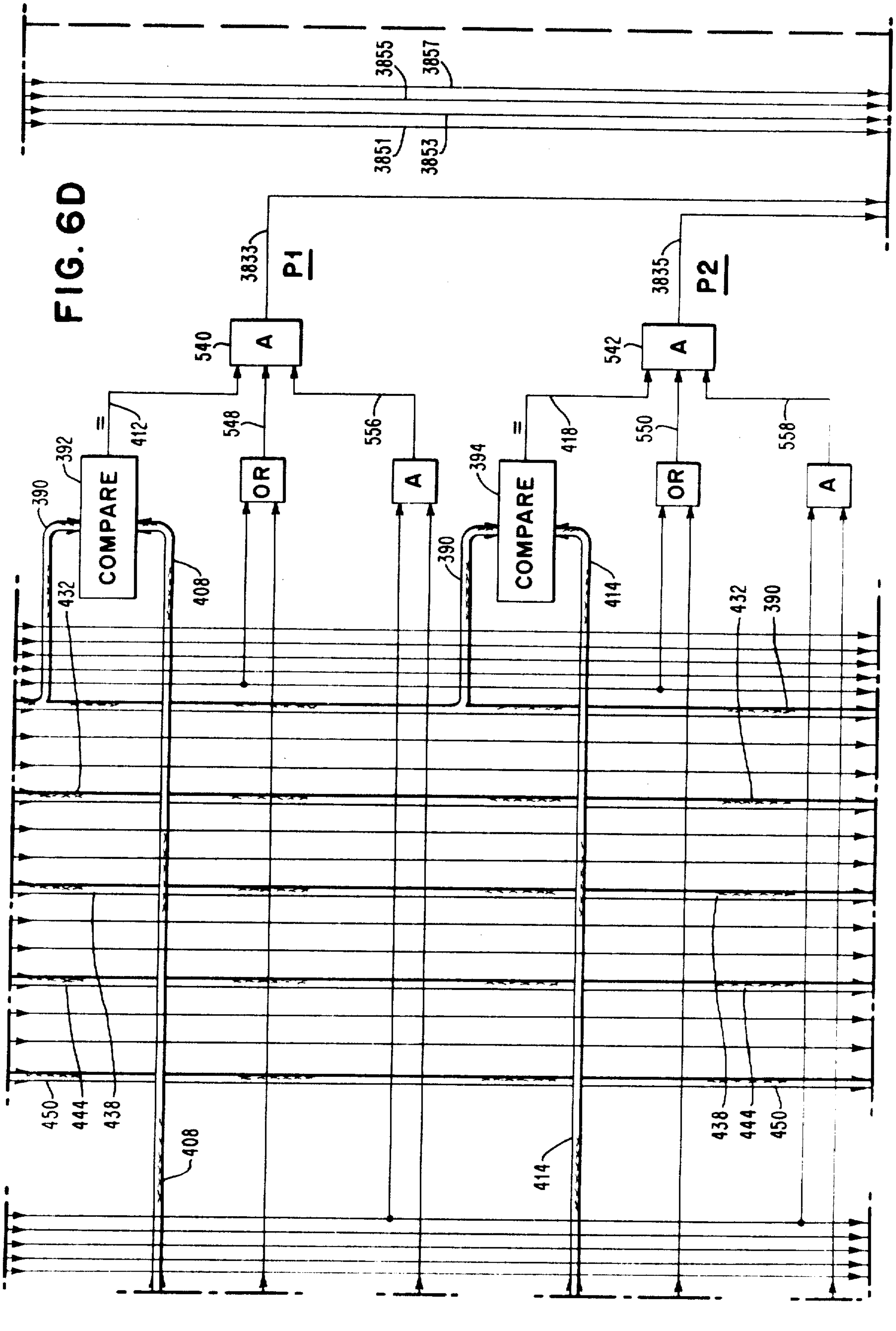
Figure 6E:
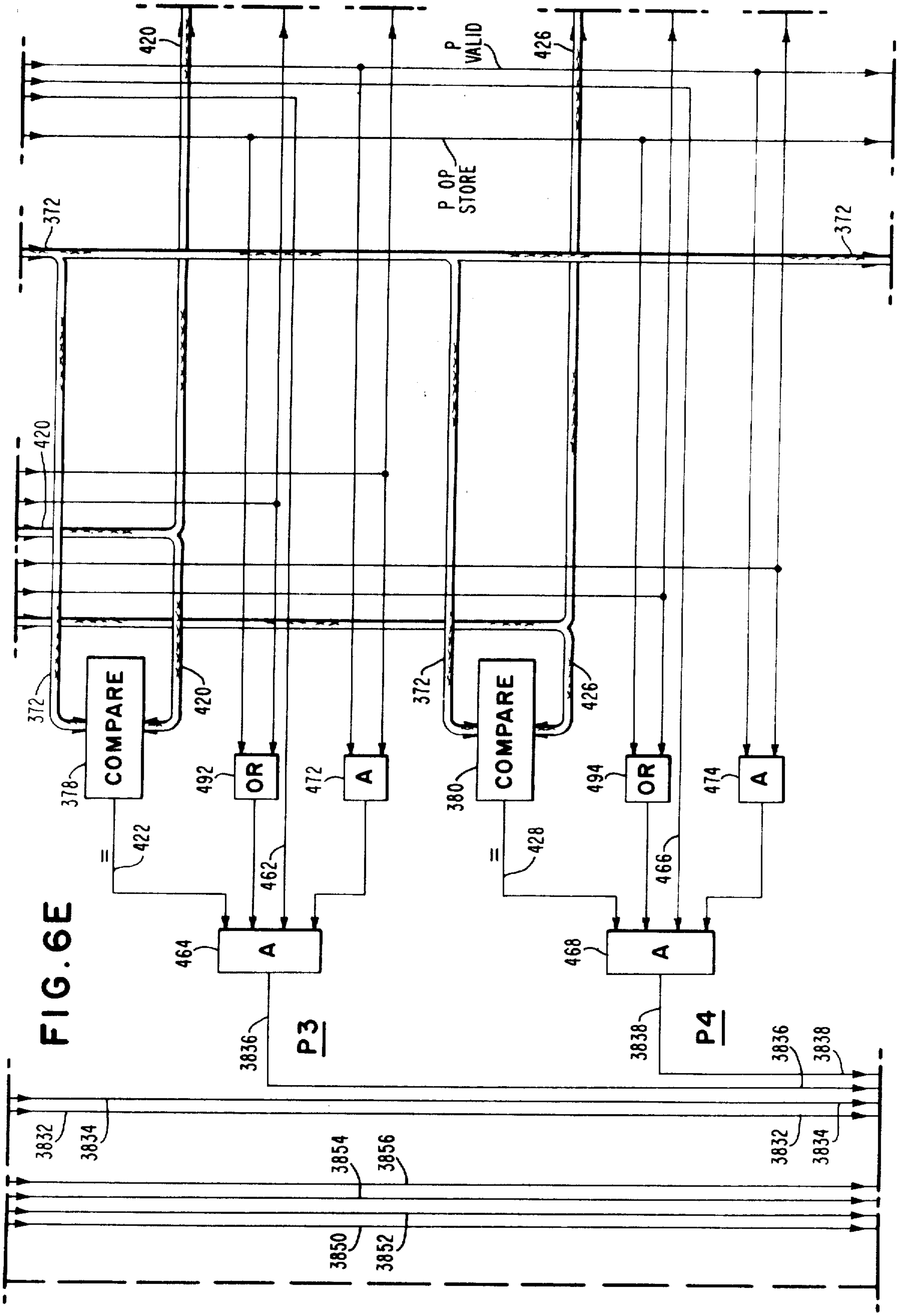

Turning now to FIGS. 6A through 6J, placed adjacent each other as seen in FIG. 6, there is seen the structure of one embodiment of the sequence interlock generator. In those figures are seen P Sequence Interlock Register and the Q Sequence Interlock Register. Entering each register, respectively, is Bus 3022 from the P requestor and 3023 from the Q requestor. The contents of these buses are similar and so only Bus 3022 will be explained. Bus 3022 contains the virtual address of the request currently being gated from the requestor to one of the levels in the P request stack. Also included is a line indicating whether or not the operation is a store, S, and a line originally seen as line 2806 of the gate control, indicating that the request is valid. This line is gated to the P Sequence Interlock Register to set the Sequence Interlock Valid bit, SI V. Also entering the sequence interlock generator are buses 3018 and 3019 from the P and Q request stacks, respectively. Bus 3018 contains line 2790, 2792, 2794 and 2796, which are the in-gates to levels P1, P2, P3 and P4, respectively, of the P request stack. These lines are gated to positions 1, 2, 3 and 4, labeled as 368, which is the stack source field of the P Sequence Interlock Register. Thus, when a P request is gated into one of the P request levels, the same virtual address is gated to the P Sequence Interlock Register. The in-gate signal is also gated to the Stack Source Field level in the stack in which the virtual address which is being gated into the P Sequence Interlock Register is resident. Thus, both the P and Q Sequence Interlock Registers store information of an in-gated request during the time it is tested to see if it should be interlocked. All request stack levels in each request stack will then send to the interlock generator their virtual address and request valid bit. Each virtual address from each level will be compared in parallel to the virtual addresses in the P and Q Sequence Interlock Registers, and other control information is used to determine whether the currently in-gated request should be interlocked to a request resident in one of the other levels in either the P or the Q request stack.

Continuing with FIGS. 6A through 6J, it is seen that the virtual address from the P Sequence Interlock Register forms one input to compare apparatus 374, 376, . . . ,388, the other input being supplied respectively by the virtual address in each level of the P and Q request stacks over buses 408, 414, 420, 426, 432, 438, 444 and 450. The Q Sequence Interlock Register has similarly-connected compare circuitry.

For the P side of the sequence interlock generator, OR gates 488, 490, . . . ,502 receive inputs from the store indications for their respective request stack levels and from the store indication of the current request in the P Sequence Interlock Register. Similarly located OR gates on the Q side of the sequence interlock generator receive similar inputs. AND gates 470, 471, 472, 474, 476, . . . ,482 receive inputs respectively from the bit in each individual stack level, which indicates that the stack is valid (STK V), and from the sequence interlock valid bit (SI V) from the P Sequence Interlock Register. Similarly located AND gates for the Q side of the sequence interlock generator receive similar inputs. The equal output, line 410, of compare 374, as well as the output of OR 488 and AND 470, and line 456 from the number one bit position of the stack source field are enabling inputs to AND gate 458. The output of AND gate 458 is line 3832. Structure and operation of the hardware of FIGS. 6A through 6J can be explained with reference to these last-named AND gates, OR gate, and compare apparatus, since each group of this similar type apparatus functions similarly for each stack level as related to each port. For example, line 3832, when active, indicates that the request whose virtual address is in the P Sequence Interlock Register must await operation until after the request currently resident in the P1 level of the P request stack is completed. This is because all inputs to AND 458 are active, which indicates, respectively, that the address in the P Sequence Interlock Register is the same as that in the P1 level (line 410 is active); that either the operation of the currently in-gated request is a store (from the S bit in the P Sequence Interlock Register) or the operation currently resident in the P1 level of the P stack is a store, and thus the output of OR 488 is active; that the source of the virtual address in the P Sequence Interlock Register is not the same as the level to which line 3832 refers, so that the request in the P Sequence Interlock Register is not interlocked against itself, (i.e., line 456 which comes from the zero side of the numer one position of the stack source field is active); and that both the P1 level of the P request stack and the information in the P Sequence Interlock Register is valid (the output of AND 470 is active). When all of these conditions are fulfilled as inputs to AND 458, line 3832 will be active and will be gated via Bus 3004 to set P1 in the Interlock Vector of the stack source level to indicate that the request which was just gated into that request stack level, and whose virtual address is in the P Sequence Interlock Register, is interlocked to level P1 in the P Sequence Interlock Register. Correspondingly, line 3834 would indicate an interlock to level P2, 3836 to P3, 3838 to P4, 3840 to Q1, 3842 to Q2, 3844 to Q3, and 3846 to Q4. Each of these lines are connected to an OR gate 3848A whose output is 3848 on FIG. 6I and which is transmitted in Bus 3004 as a sequence interlock signal.

Returning to AND gate 3858, operation can be visualized by noting that if either the request which was just in-gated to the P request stack, the virtual address of which is now in the P Sequence Interlock Register, is a store, or if the operation of the request in the P1 level of the P request stack is a store, the output of OR 488 will be active. If the output of compare apparatus 374 is active, it means that both of these stores are to the same location. Therefore, they cannot be taken out of order or error in operands will result. However, it will also be noted that the virtual address in the P Sequence Interlock Generator will always agree with at least one virtual address in one of the P request stack levels since the virtual address in the P Sequence Interlock Generator has also just been gated into one of the P request stack levels. Therefore, it is required not to interlock a request on itself. Hence, line 456 is provided which, if active, indicates that the virtual addresses which have been compared are from dissimilar levels of the request stack and can be interlocked; if inactive, it indicates that the compared virtual addresses are from the same level and cannot be interlocked. Finally, the activation of the output of AND 470 indicates that a comparison is being made against levels which are both valid, that is, which both have requests awaiting access to the storage system.

It may be, for example, that the virtual address in the P sequence interlock will be interlocked against one or more levels in each of the P and Q request stacks. Thus, more than one of the lines 3832, 3834, . . . , 3846, may be active at one time; and the same is true of the similar lines for the Q side of the sequence interlock generator.

In FIG. 6A, stack source return lines 3850, 3852, 3854, 3856, proceed, via suitable gating, from the 1 side of each positions 1, 2, 3, 4, respectively of the stack source field. Similar lines are provided for the Q side of the sequence interlock generator. Whenever an interlock signal over line 3848, seen in FIG. 6I, is generated, the stack source return line will also be gated in bus 3004. Referring momentarily to FIG. 4D, it is seen that the sequence interlock line 3848 from FIG. 6I and also the lines from appropriate output AND gates of the sequence interlock generator are inputs to gate 3850A. This gate is gated by line 3850, just mentioned, which serves to gate lines to set the proper bits in the interlock vector, as well as to set the sequence interlock bit if line 3848 is active. It will be noted that line 3832, the interlock identity bit for the P1 level of the P request stack, is not included in the Interlock Vector for level P1 since, as mentioned previously, a level cannot be interlocked against itself. Similar interlock identity lines are omitted for similar stack levels proceeding downwardly through each stack.

Thus, when a request is gated into a particular level in either of the request stacks, its virtual address is compared against all other virtual addresses in each request stack and an interlock generated if, because of sequencing, this request must await completion of another request resident in either of the request stacks. Thus, for example, and as mentioned above, it is required to interlock an incoming request to an old request in either of the stacks under the following 3 sequences of instructions: Store $\alpha$, Store $\alpha$, Fetch $\alpha$, Store $\alpha$, Store $\alpha$, Fetch $\alpha$. If the sequence of two instructions is Fetch $\alpha$, Fetch $\alpha$, then there can be no data error, regardless of the order in which these instructions are carried out. On the other hand, in case of the three other sequences, the second request will be interlocked to the level in the stack containing the first request until such time as the first request is satisfied. For example, and with reference to OR gate 488 which is typical for all interlock identity lines for both sides of the sequence interlock generator, it will be noted that the inputs to OR circuit 488 are the 1 side of the S bit in its respective P level in the request stack and also the 1 side of the S bit in the P Sequence Interlock Register. The S bit indicates a store. Thus, if both requests are fetches, there will be active inputs to OR 488 and no output for that circuit; and AND gate 458 will be disabled so that there will be no interlock identity signal on line 3832. On the other hand, if both instructions are store, then both inputs to OR 488 will provide an enabling signal from the output of 488 to AND 458. Therefore, if all other interlock conditions are satisfied, an interlock identity signal will be generated for level P1. Likewise, if the request in level P1 is a fetch and the request just in-gated and indicated in the P sequence interlock generator is a store, or if the condition is vice versa, one of the two inputs to OR 488 will be active and there will be an output for that circuit which will enable AND 458 to generate an interlock identity signal, if all the other conditions for an interlock to this level are satisfied. It will be recognized that ORs 496, 498, 500 and 502 operate similarly but have their input from the Q stack level and from the Q sequence interlock register. As mentioned previously, it is necessary to compare the incoming requests with requests which are valid in all levels of each port.

It is further desired when two requests enter the system simultaneously, one in the P port and one in the Q port, that if these requests should be interlocked to each other, then the Q request must be interlocked to the P request; but the P request is never interlocked to the Q request. This is because it is desired to give priority in tie situations to the P request stack. It will be recalled that when a request is gated into a given request stack level, it is also gated into the corresponding sequence interlock register. Therefore, the virtual address resides in the sequence interlock register for that side of the sequence interlock generator and also in one of the stack levels. To insure, for two concurrently arriving requests that should be interlocked to each other, that the Q request is always interlocked to the P request, and not vice versa, lines 528, 530, 532, and 534 form enabling inputs to AND 520, 522, 524, and 526. These last name lines, respectively, are from the AND function of the sequence interlock valid (SI V) bit of the Q sequence interlock register and the 0 side of the respective bit positions of the stack source field of the Q sequence interlock register. Thus, whenever the virtual address of the request in the Q sequence interlock register compares with the virtual address in the P sequence interlock register, the Q request is interlocked to the P request as follows. Assume, for example, that two interlockable requests are entered, one in each port, a first in level P1 and a second in level Q2. The virtual address of these respective requests are concurrently gated to the P and Q sequence interlock registers. The P sequence interlock register will therefore compare against the virtual address in the Q2 level via compare apparatus 384. However, line 530, which is the AND function of the Sequence Interlock Valid of the Q sequence interlock register and the 0 side of the number 2 position of the Q stack source field 370, will be inactive since the stack source for the Q port is bit position 2 which will be set to its 1 state. Therefore, line 530 will be inactive and will inhibit AND gate 522 from issuing a Q2 interlock for the request in the P sequence interlock register. On the other hand, the virtual address in the Q sequence interlock register will compare with the virtual address in the P1 level in compare apparatus 392. It is assumed that lines 548 and 556 are active since it was assumed these requests are interlockable. It will be noted that there is no inhibiting line for AND gates 540, 542, 544, and 546, as there was for AND's 520, 522, 524, and 526. This insures that in the present situation line 3833 will generate an interlock to level P1 for the request in the Q sequence interlock register. Thus, the request which entered the Q port is interlocked to the request which entered the P port, but not vice versa. It will also be noted that the incoming request in the Q sequence interlock register will be interlocked to any interlockable requests already resident in the P request stack; and the incoming request in the P sequence interlock generator will be interlocked to any interlockable request already resident in any of the Q sequence interlock registers. It is only for the case when two interlockable requests arrive at their respective ports concurrently that P is given preference over Q.

Request Stack In-Gating and Out-Gating Operation, And Sequence Interlock Vector Generation Referring now to FIG. 8A and also FIGS. 5A through 5X, as well as 6A through 6J, an example of operation of the sequence interlock generator will be given. In FIG. 8A is seen a group of requests, each request instruction for a given stack becoming valid for gating to the stack in the order shown by the arrow. It is further assumed that the storage system priority area is occupied on a function which will not allow it, for the time being, to accept priority requests so that an example of filling, and operation of, the request stacks, can be shown. Gating examples will be given with respect to the P port only since gating for the Q port is similar.

Turning to FIG. 8A, it is first assumed that all control bits in all registers of the request stacks are initially set to the 0 state. The first requests, namely, Store $\alpha$, each become valid for gating from their respective requestors to their respective request stacks. Thus, referring to FIG. 5A, request valid line 2806 becomes active. Concurrently, line 3354 will be active since the STK V bit of level P1 is not yet active. Therefore, AND gate 2790A will be active, and, indeed, will be the only AND gate of the group having its inputs satisfied. Therefore, line 2790 will be active and will be transmitted via bus 4000–PO to the request stack to activate gate 37 at an appropriate clock time to gate the request from the P requestor via bus 3000 into the P1 level of the P request stack. Similar gating is generated for the Q requestor. Concurrently, both requests from the P and Q port are gated to their respective sequence interlock registers in the sequence interlock generator. Therefore, since each is in its respective first level, namely P1 and Q1, the virtual address in the Q Sequence Interlock Register will compare with the virtual address in the P1 level by comparison apparatus 392 so that line 412 will be active as one input to AND gate 540 in FIG. 6B. Concurrently, the virtual address in the P Sequence Interlock Register will also compare with the address in the Q1 level in compare apparatus 382 of FIG. 6G, so that line 436 will be active as an input to AND gate 520. Since the Sequence Interlock Valid and Stack Valid bit for P1 are each active, AND 476 of FIG. 6G will have an active output to enable AND gate 520. Similarly, output 556 of the AND gate in FIG. 6D will have an output. Since both requests are stores to the same address, OR gate 496 of FIG. 6G will be activated to form a third enabling input to AND 520; and output 548 of the OR gate in FIG. 6D will activate AND 540. AND 540 will, therefore, have all of its inputs active and will emit a signal on line 3833 to set the P1 bit in the Interlock Vector of the Q request stack and to cause line 3849 to set the sequence interlock bit in that level. However, and referring to FIG. 6G, it is seen that input line 528 to AND 520 is inactive because the inputs to AND 536 of FIG. 6B are not satisfied. That is, since the request has just been gated into the Q1 level, the zero side , first position of the stack source field 370 will be inactive and the one side will be active. Therefore, AND 520 of FIG. 6G is inhibited from sending a signal over line 3840 which would have interlocked the P request to the Q request. This is an example of the ground rule wherein if a P request and a Q request which are interlockable enter the request ports at the same time, the Q request is interlocked to the P request, and not vice versa, therefore giving the P request priority over the concurrently-entering Q request.

Returning now to FIG. 5Q, it will be recalled that when the request was gated into level P1, line 2790 was active. Line 2970 in FIG. 5T is, therefore, gated via gates 2362A and 2362 into register 2354 to set the number one position to a one. Therefore, the left-most register in the P gate control having an active input is register 2354, with its number one position active. This indicates that the request in level P1 is the oldest request in the P request stack. In the present example, it also happens to be the only request in the request stack; but the efficacy of the rippling register scheme will become evident as more requests are gated into the stack.

Returning now to FIG. 5C, it will be seen that all the inputs to AND 2340 are satisfied and, therefore, line 2346 will be active. Line 2346 is transmitted over Bus 4000–PI to FIG. 5W. Since there are currently no active bit positions in registers 2356, 2358 and 2360, AND gates 2380–2386, 2380A–2386A and 2380B–2386B will not have an output and will cause inverters 2392, 2392A and 2392B to each have no output to gate the signal on line 2346 through gates 2398, 2398A and 2398B. Line 2346, along with the line from the currently-active, number one bit position of register 2354 will then activate AND 2380C to cause a priority request over line 2334, via OR gate 2400 to the priority area of the storage system. This also activates line 2162 which is transmitted back to FIG. 5B to gate the appropriate part of the request to the storage system. As was mentioned previously, it is assumed for the present that the priority area is presently occupied, and, therefore, does not gate a signal back over line 3298 from Bus 3002 of FIG. 5C to set the PX, or priority accept, bit in the P1 level. Therefore, this request has not been accepted by priority and will try again subsequently to gain acceptance.

Referring back to FIG. 8A, it is seen that the second requests, namely Fetch βFetch β, become valid to be gated to their respective stacks. Age of a request in the stacks will be indicated by the encircled number next to the request, 1 being the oldest, 2 the next oldest, etc. Turning to FIG. 5Q, it will be seen that AND 2792A will be the only AND gate in the in-gate generating AND gates to have all of its inputs active; and, therefore, line 2792 will be activated and transmitted back to the P request stack in FIG. 4F to gate this second request over Bus 3000 via gate 38 to the P2 level of the request stack. Concurrently, a similar action gates the second request into level Q2 in the request stack. Since both requests are fetches from the same storage location, no sequence interlock will be generated, inasmuch as no data error will result regardless of the order in which these requests are honored. Referring again to FIG. 5T, it is seen that line 2792 will be gated to the number 2 position of register 2354. Concurrently, the one position of register 2354 will activate OR 2366, and the output of AND 2364 will be active so that both inputs to AND gate 2368 will be active. This will open gate 2370 to ripple the number one position of register 2354 to register 2354 to register 2356. The left-most register now having an active bit position is register 2356; and the active bit position is number one, which indicates that the oldest request in the P request stack is at level P1. The next oldest is in level 2, indicated at position 2 of register 2354. Lines 2346 and 2348 will both be active. Lines 2346 comes from AND 2340 of FIG. 5C, and line 2348 is activated by virtue of the similar AND gate in FIG. 5G. Referring to FIGS. 5W and 5X, it will be seen that the absence of activation of any of AND's 2380 through 2386 will ultimately cause the activation of gates 2394, 2396, and 2398 via inverter 2392. The absence of activation of any of the AND gates 2380A through 2386A will cause the activation of gates 2396A and 2398A. The activation of the number-one bit in register 2356 will cause an input to be present at AND 2380B. The gating via gate 2396A of the line originally from line 2346 of FIG. 5W will also cause the activation of the second input to AND 2380B. The output of this AND gate will cause the priority request via OR 2400 over line 2334. This output will also serve to inhibit the gating of 2398B so that line 2348 will not have a chance to activate AND 2382C and cause a second priority request. Therefore, the request at level P1 of the request stack has again requested acceptance from the storage system. However, since the storage system is assumed busy, it will not be accepted and will have to try again.

Referring again to FIG. 8A, it is seen that the third requests, namely, Store α, from the individual P and Q requestors, are available for gating to the P and Q request stacks, respectively. In a manner similar to that explained for the previous two requests, these respective requests are gated into levels P3 and Q3, respectively, and concurrently gated to the P and Q Sequence Interlock Registers of the Sequence Interlock Generator. As noted in FIG. 8A, the request gated into level P3 will become interlocked to the request in level P1 and to the request in level Q1. It will be recalled that the request in level Q1 was previously interlocked to the request in level P1. Therefore, the request in level P1 will be performed before the request in level Q1 which, in turn, will be performed before the request in level P3. It will be noted that the request in level P3 will not be interlocked to the request in level Q3 since they are concurrently arriving interlockable requests, in which case the Q request will be interlocked to the P request. Therefore, the request gated into Q3 will be interlocked to the request gated into P3, as well as being interlocked to like requests already resident in levels P1 and Q1. This can be seen with reference to the Sequence Interlock generator of FIGS. 6A through 6J and concurrent reference to FIG. 8A. The request gated into P3 will also be gated into the P Sequence Interlock Register, while the request gated into Q3 will also be gated into the Q Sequence Interlock Register. The virtual address in the P Sequence Interlock Register will therefore compare with the virtual addresses in level P1 at compare apparatus 374 of FIG. 6C, level P3 at compare apparatus 378 of FIG. 6E, level Q1 at compare apparatus 400 of FIG. 6H, and level Q3 at compare apparatus 404 of FIG. 6J. All inputs to AND 458 of FIG. 6C will be active so that line 3832 will be activated to set the P1 bit in the interlock identity field of level P3. Line 462 of FIG. 6E will inhibit AND 464 from allowing the currently in-gated request in level P3 to the interlock against itself. All inputs to AND 520 on FIG. 6G will be active so that line 3840 will set the Q1 bit in the interlock identity field for level P3. However, to illustrate how a request at the P port concurrently arriving with a request of the same virtual address at the Q port is not interlocked to the Q port request, it is seen that AND 524 of FIG. 6I will be inhibited by line 532, even though all other inputs to AND 524 are satisfied. This is because line 532 is the AND function, seen in FIG. 6B, of the sequence interlock valid bit and the zero side of the number 3 position of the Q stack source field. However, since the source of the request whose virtual address is in the Q Sequence Interlock Register was the third level of the Q request stack, and because the present point in our example is that at which the third pair of requests enter their respective stacks and are gated into the respective third levels, line 532 will, therefore, be inactive; and the request in P3 will not be interlocked to the request in Q3.

Figure 6F:
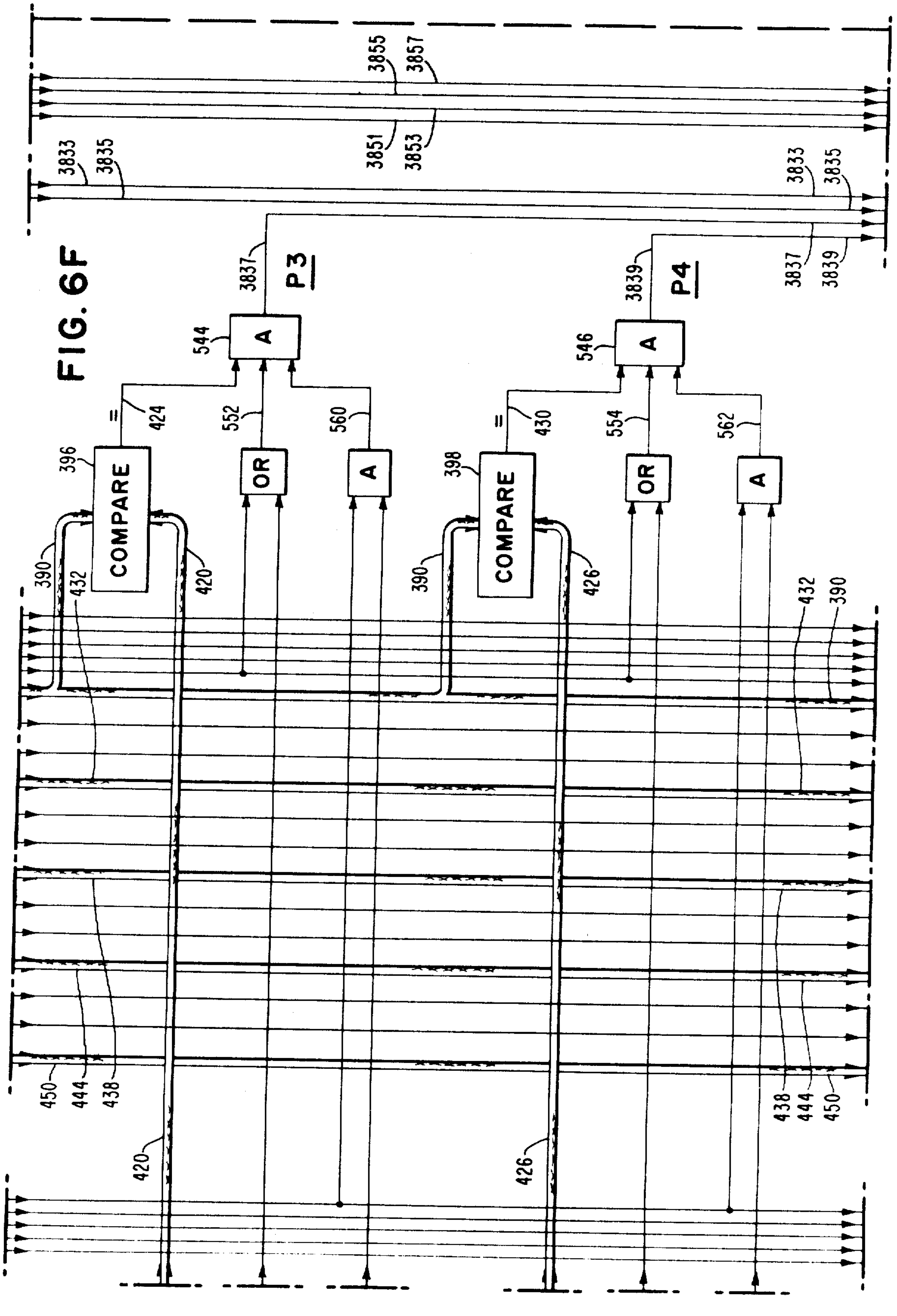
Figure 6G:
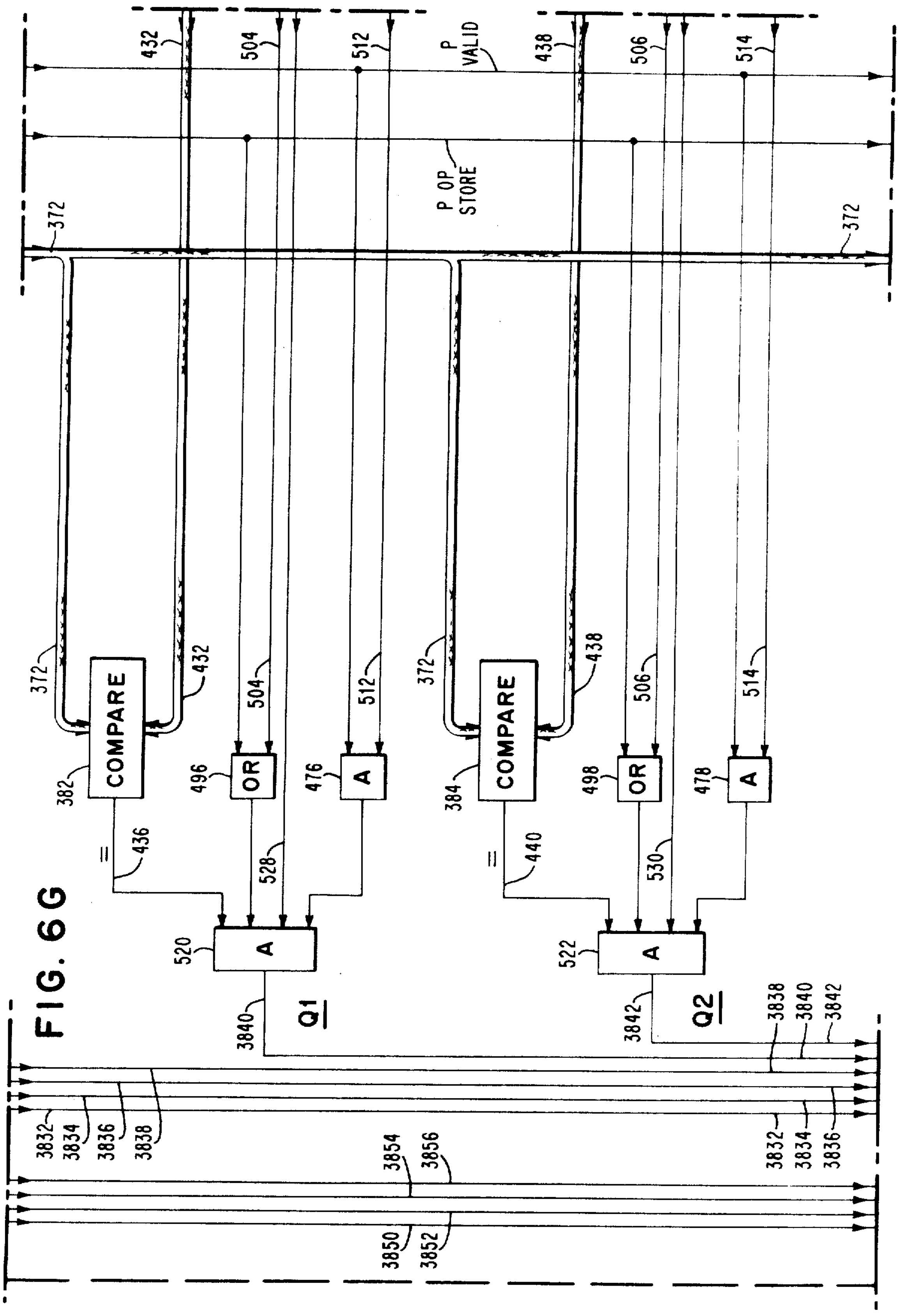
Figure 6H:
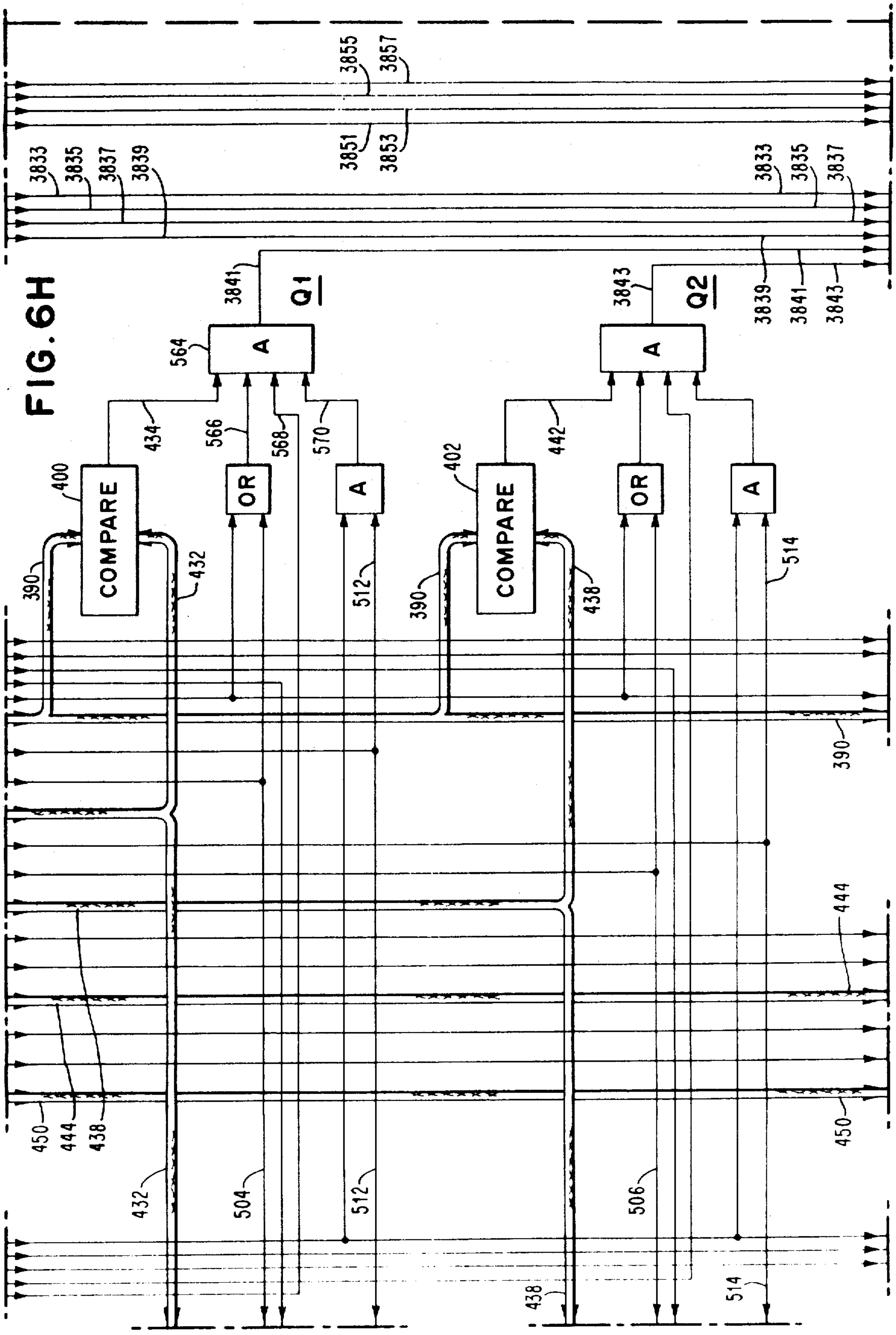
Figure 6I:
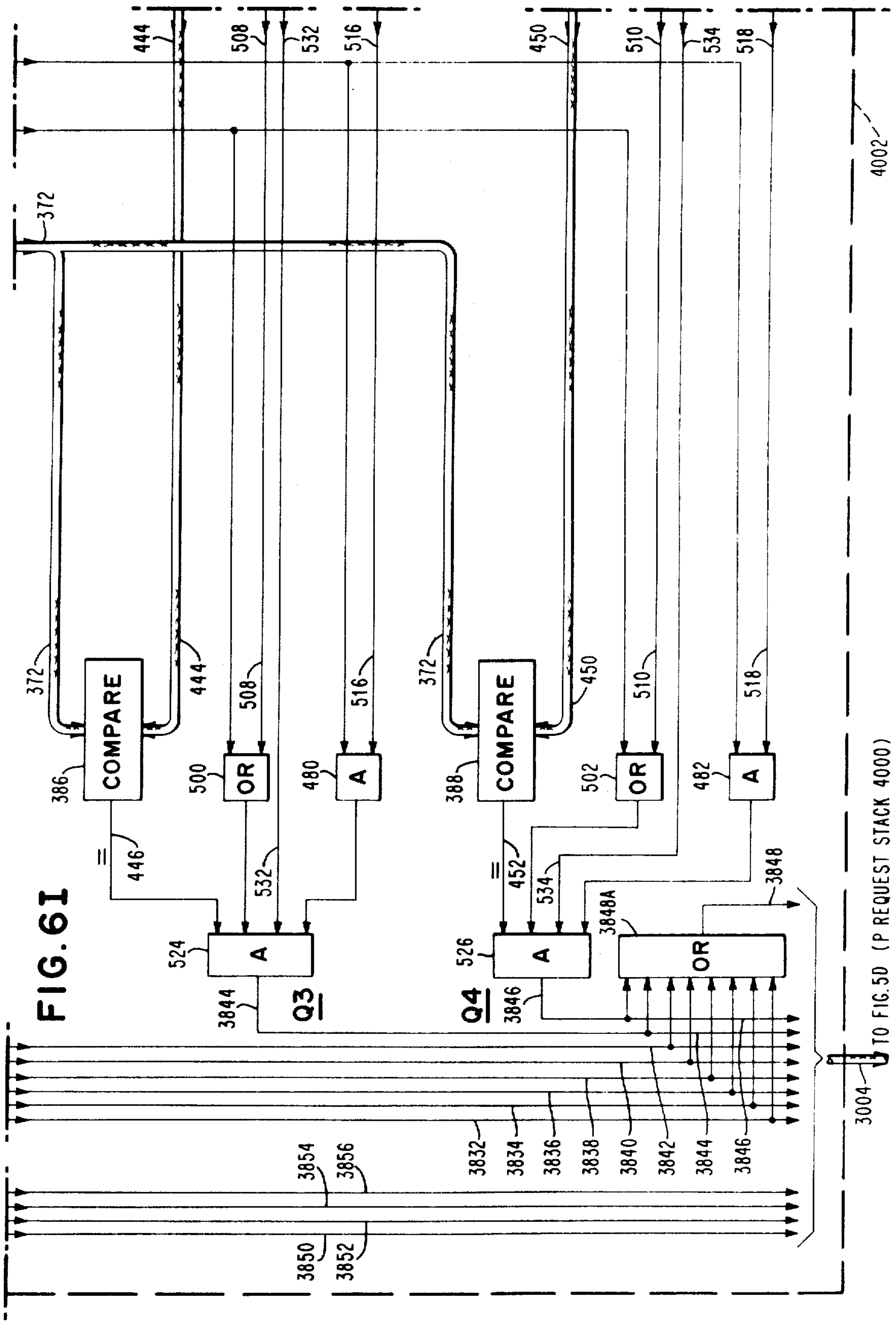
Figure 6J:
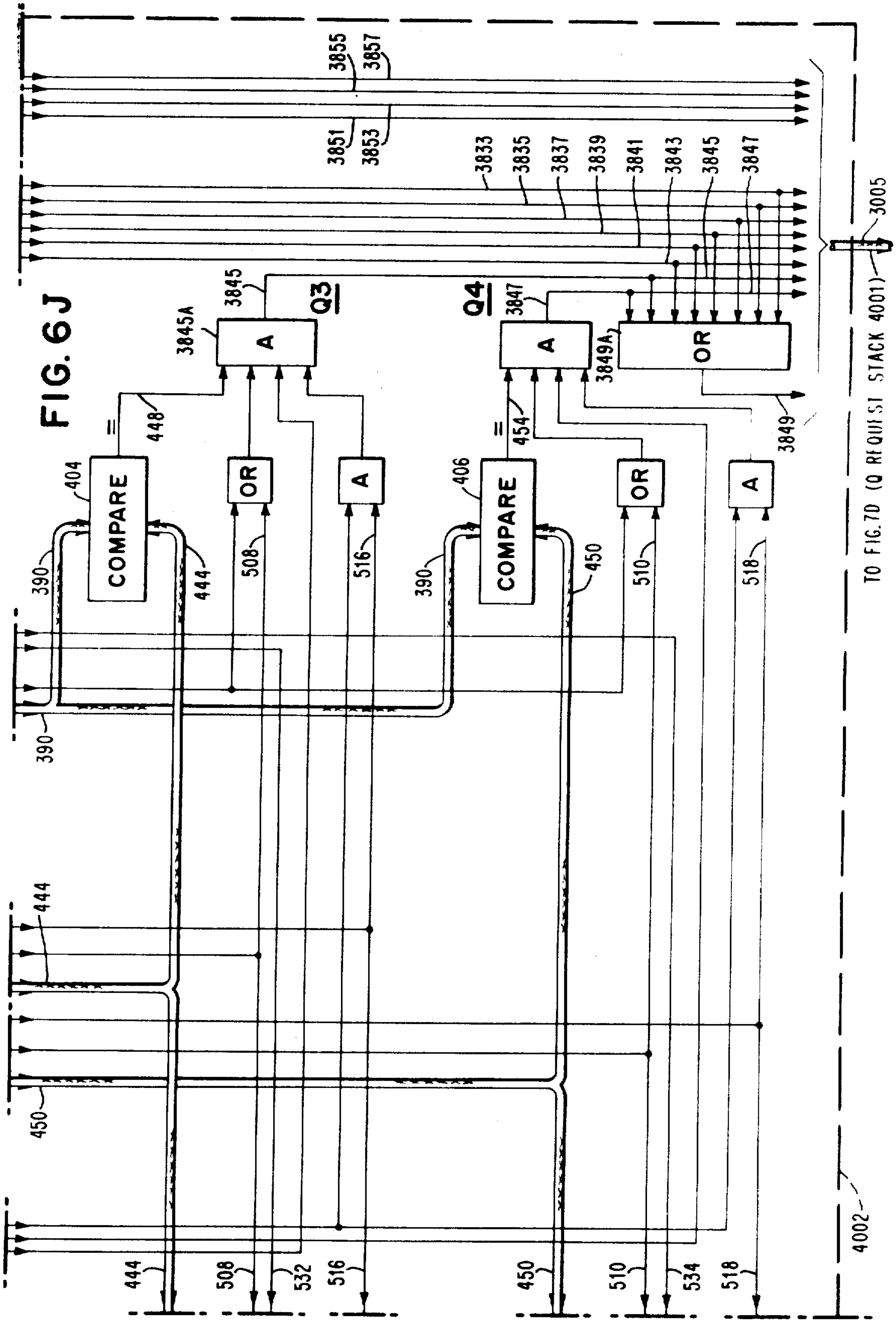

However, and focusing on the interlock set for the request in the Q3 level of the Q request stack, it will be seen that the virtual address in the Q Sequence Interlock Register compares with the virtual address in the P1 level of the P request stack via compare apparatus 392 of FIG. 6B, that in level P3 in compare apparatus 396 of FIG. 6F, the request in level Q1 in compare apparatus 400 of FIG. 6H and with that in level Q3 in compare apparatus 404 of FIG. 6J. Line 3845 will not be active since AND gate 3845A will be inhibited, it is not desired to interlock a request upon itself. However, all other levels containing virtual addressed with which the virtual address in the Q Sequence Interlock Register compares will cause the respective stack level in the interlock identity field for the Q3 level to be set. For example, line 3833 from AND 540 of FIG. 6D will cause the P1 bit to be set in the Interlock Victor of Q3. Line 3837 from AND gate 544 of FIG. 6F will cause the P3 bit in the Interlock Vector to be set; and this is an example of how the Q request of two concurrently arriving interlockable requests in the respective ports will be interlocked to the P request.

Referring back to FIGS. 5Q through 5X, it will be seen that when line 2794 of FIG. 5T gates the third request into the P3 level, the output of AND gate 2364 causes the number 3 bit in register 2354 to be set to 1, the number 2 bit in register 2354 to ripple downward to register 2356, and the number 1 bit in register 2356 to ripple down to register 2358. Line 2346 on the left-hand side of FIG. 5G will again cause a priority request over line 2334 of FIG. 5H in a manner explained subsequently; and as assumed previously, this request will not be honored.

Referring again to FIG. 8A, request number 4 from the P request store is now available for gating into the P request stack and becomes gated into level P4 in the same manner in which the previous requests were gated into their respective levels. In a manner explained previously, Interlock Vector bits, P1, P3, and Q3, will be set for level P4, which means that the request in level P4 will not be honored before the aforementioned levels, whose bits are set in the P4 IV field, which requests are also interlocked to other requests as explained above.

P Priority and Hashing Apparatus

Referring now to FIG. 9, there is seen the P Priority and Hashing Apparatus 4004, which was originally seen generally at 7 in FIG. 1. This apparatus includes P Priority Register 4004–1, P Priority Logic 4004–2, P Prioriry Logic Output 4004–3, P High-speed Storage Select Decoder 4004–4, P Tag Storage Select Decoder 4004–5 and P Hashing Logic 4004–6. The P Priority Apparatus 4004 has inputs from the R Transfer Unit via bus 3030 which connects to the P Priority Logic and the P Priority Register; the P Request Stack from bus 3016 which connects to the P Priority Logic and the P Priority Registers; from the P Requestor via bus 3024 which is connected to the P Priority Logic and the P Priority Register; from the High-speed Storage Priority Resolver via line 3026 which connects to P Priority Logic 4004-2 and from the Tag Storage Priority Resolver 3028, which is also connected to the P Priority Logic. Priority and Hashing Apparatus 4004 has outputs to the P Request Stack via bus 3002 from the P Priority Logic Output 4004–3; to the P High-speed Storage Cell via bus 3044 from the P High-Speed Storage Select Decoder 4000–4; to the ingating for the high-speed storage buffers via bus 3036 and 3038 from the P High-speed Select Decoder and the P Hashing Logic; to the tag buffers via buses 3040 and 3042 from the P Tag Storage Select Decoder and P Hashing Logic; to the High-speed Storage Priority Resolver via bus 3032 from the High-Speed Storage Select Decoder and from the P Priority Register; to the Tag Priority Resolver via bus 3034 from the P Tag Storage Select Decoder and the P Priority Registers; to the Q Request Stack via Bus 3013 from the P Priority Logic Output; and to the Q Priority and Hashing Apparatus via bus 3048 from the P Priority Register.

P Priority Register

Figures 10, 10A:
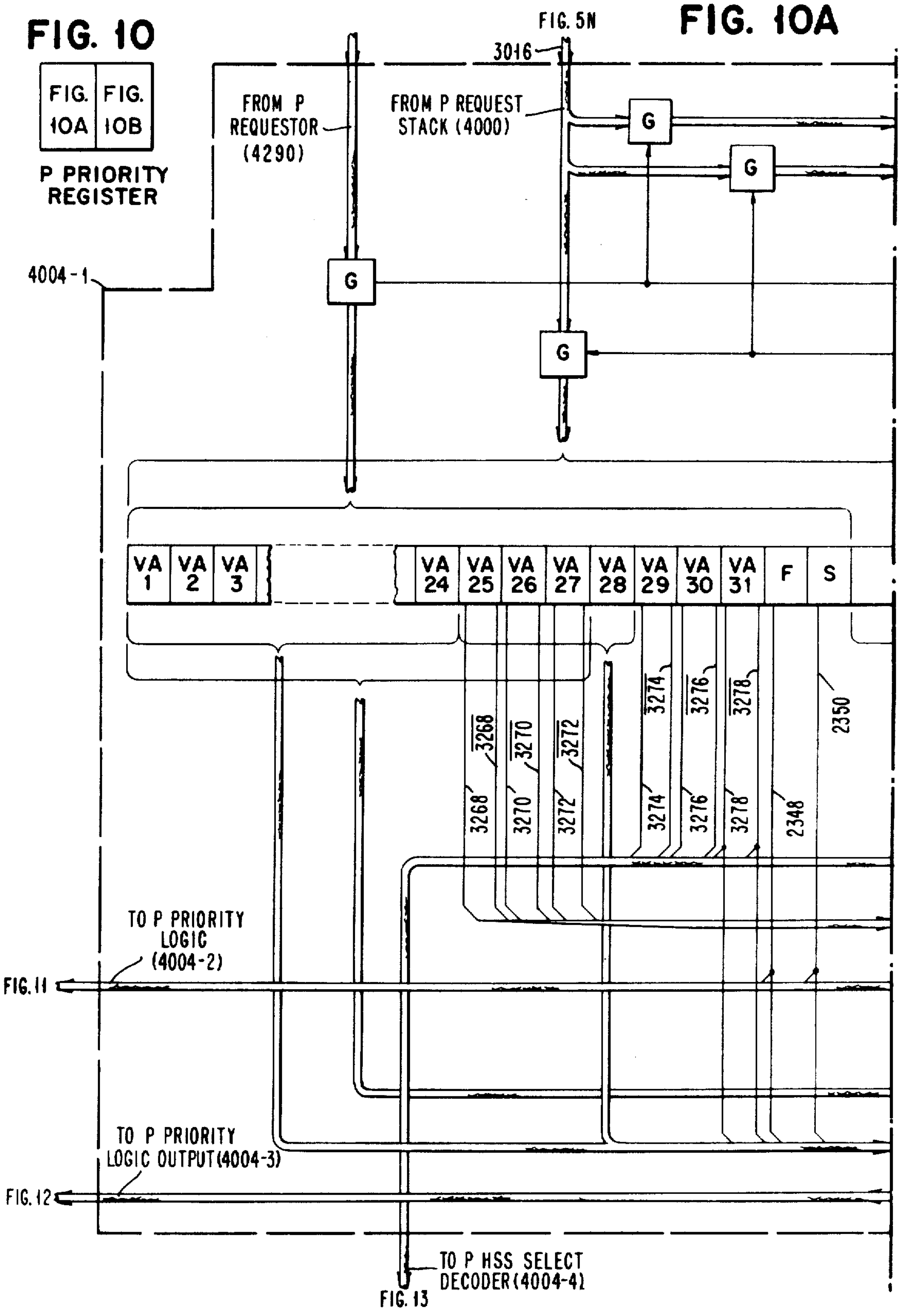
FIG. 10 shows the manner in which FIGS. 10A and 10B should be placed adjacent each other.
FIGS. 10A and 10B show the P priority register of the P priority apparatus of our invention.

Turning to FIG. 10, there is seen the P Priority Register and associated busing. Bus 3024 comes from the P Requestor and is gated into the P Priority Register by line 2148. Line 2148 is part of bus 100 which is from P Priority Logic Output 4004-3, which will be seen in detail in FIG. 12. The gating signal over line 2184 will also reset the D, T, P, A, CH, $\overline{IT}$, and H bits in the priority register which will clear them to keep the record of the next register as it passes to the priority area. Bus 3024 transmits the virtual address, as well as the F and S bits, to the Priority Register when a request enters the priority register via the bypass.

Bus 3016 from the P Request Stack is connected to the P Priority Register via gate 5050, 5052, and 5054. Gates 5050 and 5052 are gated by line 2180 from bus 100 from the P Priority Logic Output 4004-3. Gate 5054 is gated by line 2184. Bus 3016 transmits the virtual address and the indicated control bits via gate 5050. Gate 5052 transmits the outgate signals for each level, and gate 5054 transmits the ingate signals from each level, each pair of which are respectively OR'ed together to form an input to the source field bits 1, 2, 3, 4 to indicate from which level in the stack the virtual address originated.

Bus 100 from P Priority Logic Output 4004–3 also is used to set and reset the Priority Valid, Data Priority, and Tag Priority bits in the P Priority Register. As mentioned previously, the Priority Valid Bit (PRI V) indicates that the contents of the P Priority Register are currently valid. The D Priority (D PRI) and the T Priority (T PRI) bits indicate that this request has been given priority to access the requested area in the high-speed storage and the requested area in the tag storage, respectively. These are used as a history of the request's progress through priority contention.

P Priority Logic

Figures 11, 11A:
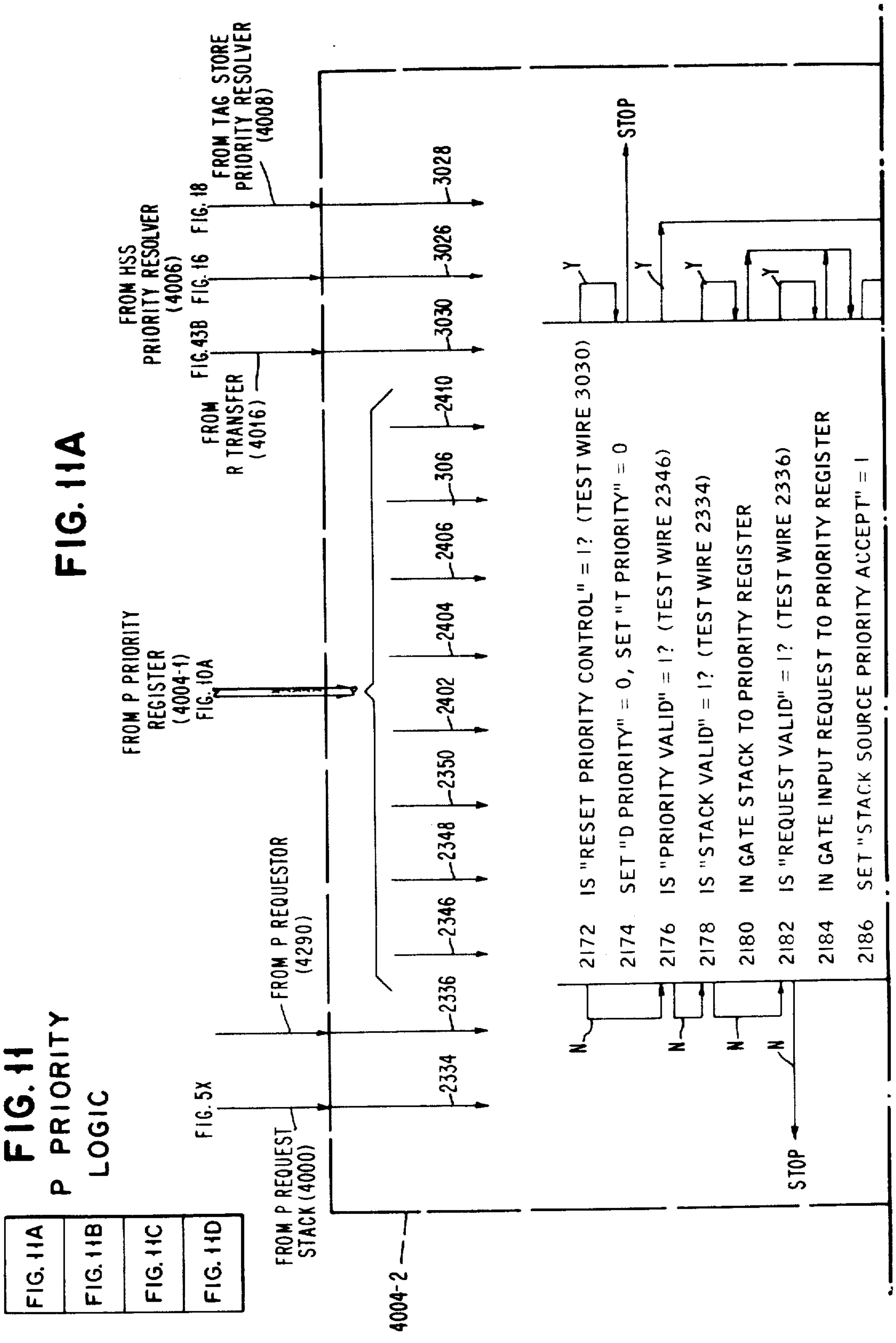
FIG. 11 shows the manner in which 11A-11D should be placed adjacent each other.
FIGS. 11A-11D show the priority logic of the P priority apparatus of our invention.

Referring to FIG. 11, there is seen the manner in which FIGS. 11A-11D should be placed adjacent each other to see the P Priority Logic of our invention. The P Priority Logic comprises a series of logical tests made on information from the following lines seen at the top of FIG. 12A: line 2334 from the P Request Stack which, when active, is an indication that the request being gated from the stack to the priority is valid; line 2336 from the P Requestor, used during a bypass function, which indicates that the requestor has a valid request; lines from the P Priority Register including line 2346 which transmits the priority valid bit; lines 2348 and 2350 which transmit the fetch or store indication, respectively; line 2402 which transmits the store tag bit (T), line 2404 which transmits the D priority bit (D PRI), line 2406 which transmits the P priority bit (P PRI), line 306 which transmits the Store data (D) bit, line 2410 which indicates the store $\overline{IT}$ bit; line 3026 from the high-speed storage priority resolver which, when active, indicates D data priority (that is, that the P request under consideration has been given priority to access the desired area of high-speed storage); line 3028 from the Tag Storage Priority Resolver which, when active, indicates P Tag Priority has been given; and line 3030 from the R Transfer Unit which, when active, resets priority controls to zero, that is, resets the stack source field to zero and resets PRI V, D PRI, and T PRI after an interstorage transfer in order to clear the priority register in preparation for priority contention. This group of logical tests on the above indicated information can be disclosed in many ways. One is to disclose gating circuitry which merely tests each wire in a given sequence, with the results of a previous test indicating the next gate to which to proceed in order to make subsequent tests. However, disclosing logic in this manner is complex and difficult to follow by virtue of the magnitude of the tests required to be made. Therefore, this logic has been disclosed as shown in FIGS. 11A–11D in terms of numbered steps which indicate which lines or wires are to be tested. For example, test 2172 in FIG. 12A indicates that wire 3030 is to be tested which is a test of whether or not Reset Priority Control is equal to 1. If it is, as indicated by the arrow on the right-hand side of the test, the next step is 2174 which sets the D priority and P priority bits to zero. Step 2174 is a stop point at which operation ceases, to begin again on the next cycle at the beginning, namely, step 2172. On the other hand, if the result of test 2172 is negative, as indicated on the left-hand side of test 2172, then the next step is to step 2176 which tests whether the priority valid bit is a 1 by testing wire 2346. If yes, the next step is 2190; if no, the next step is 2178. With this information, one of ordinary skill in the art can easily build proper gating circuitry to perform the proper tests and therefore practice the invention. Each step of the test on FIGS. 11A–11D will be explained in detail under the Priority Apparatus Operation section of this patent application.

Figure 11B:
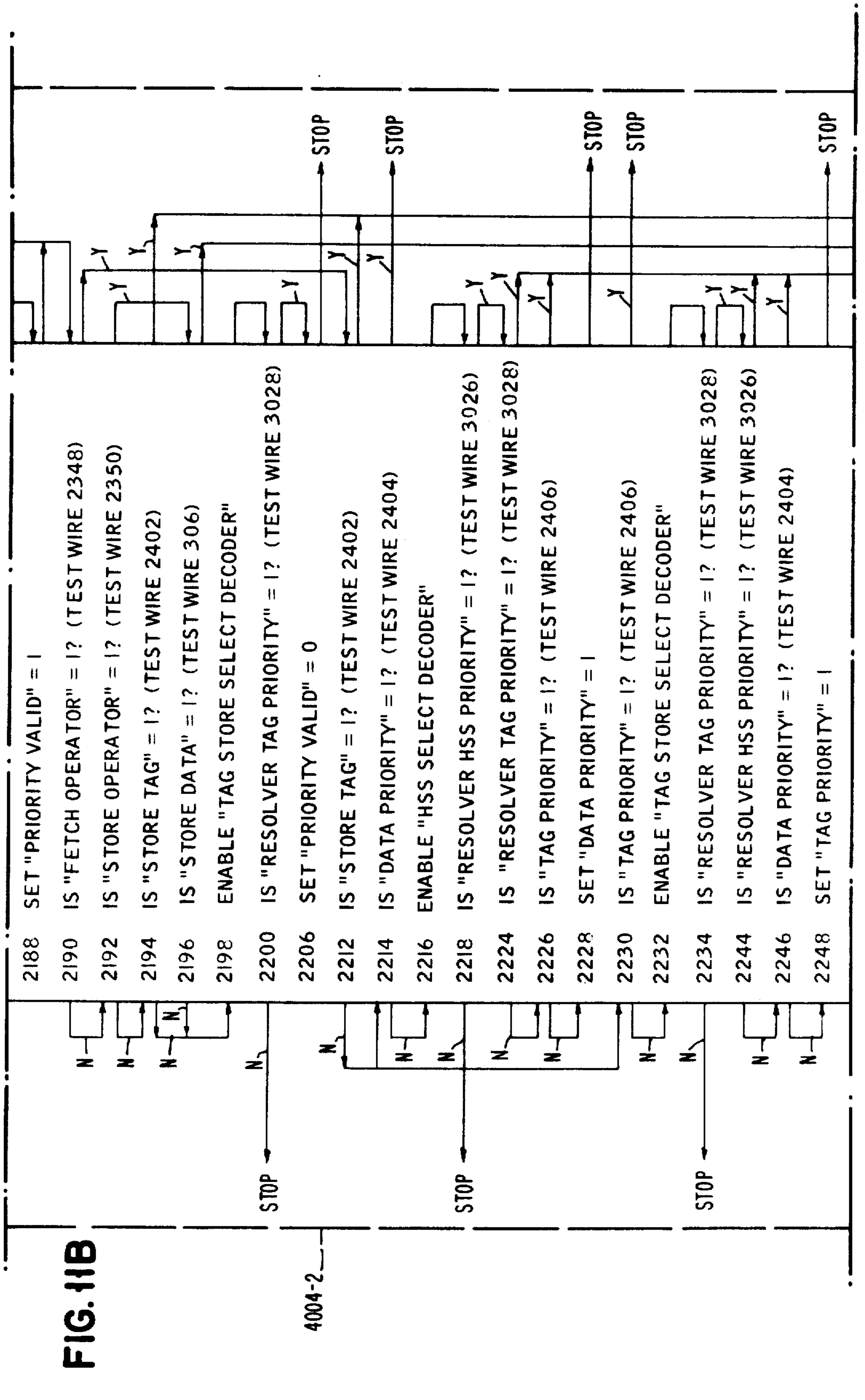
Figure 11C:
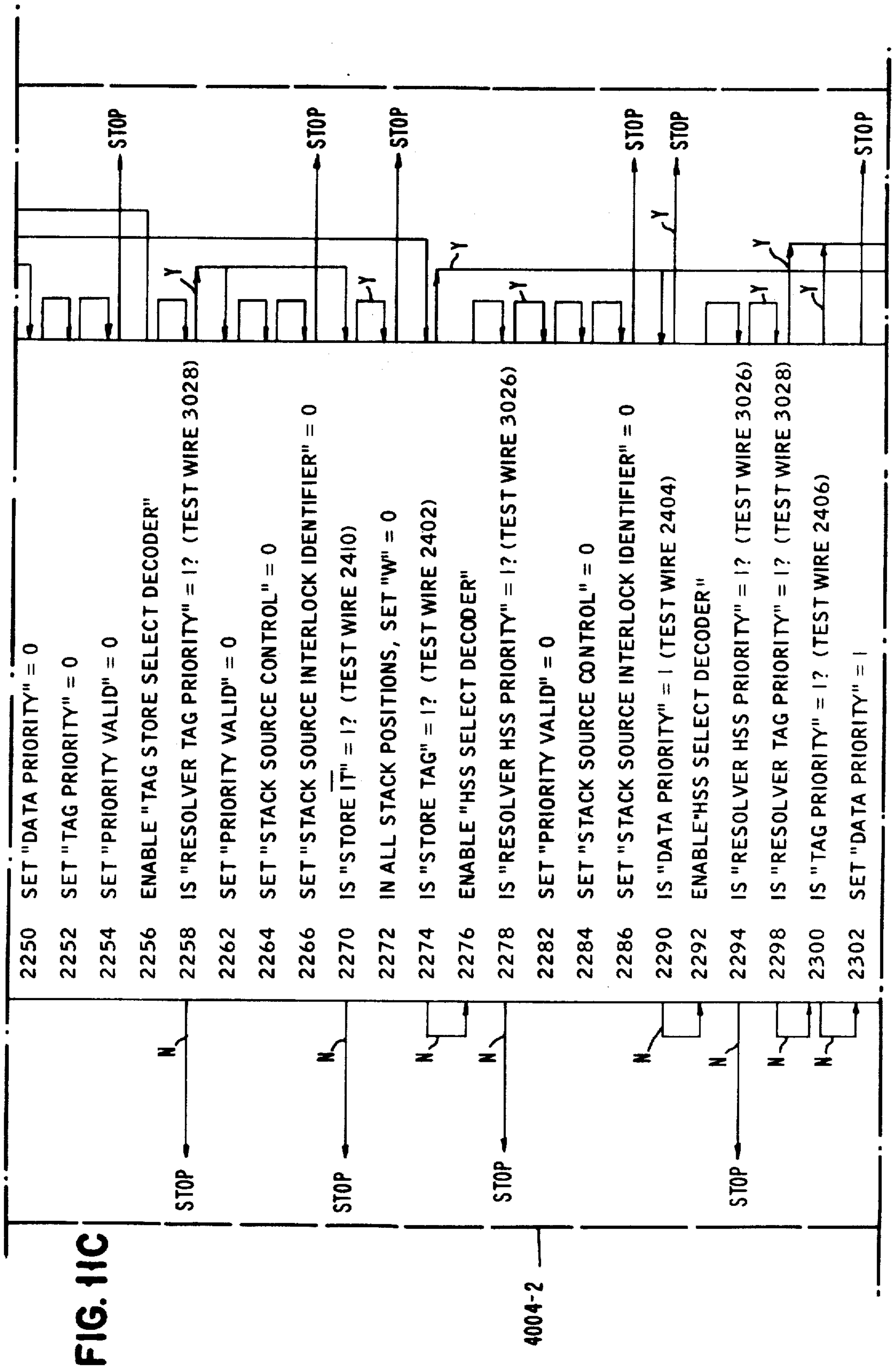
Figure 11D:
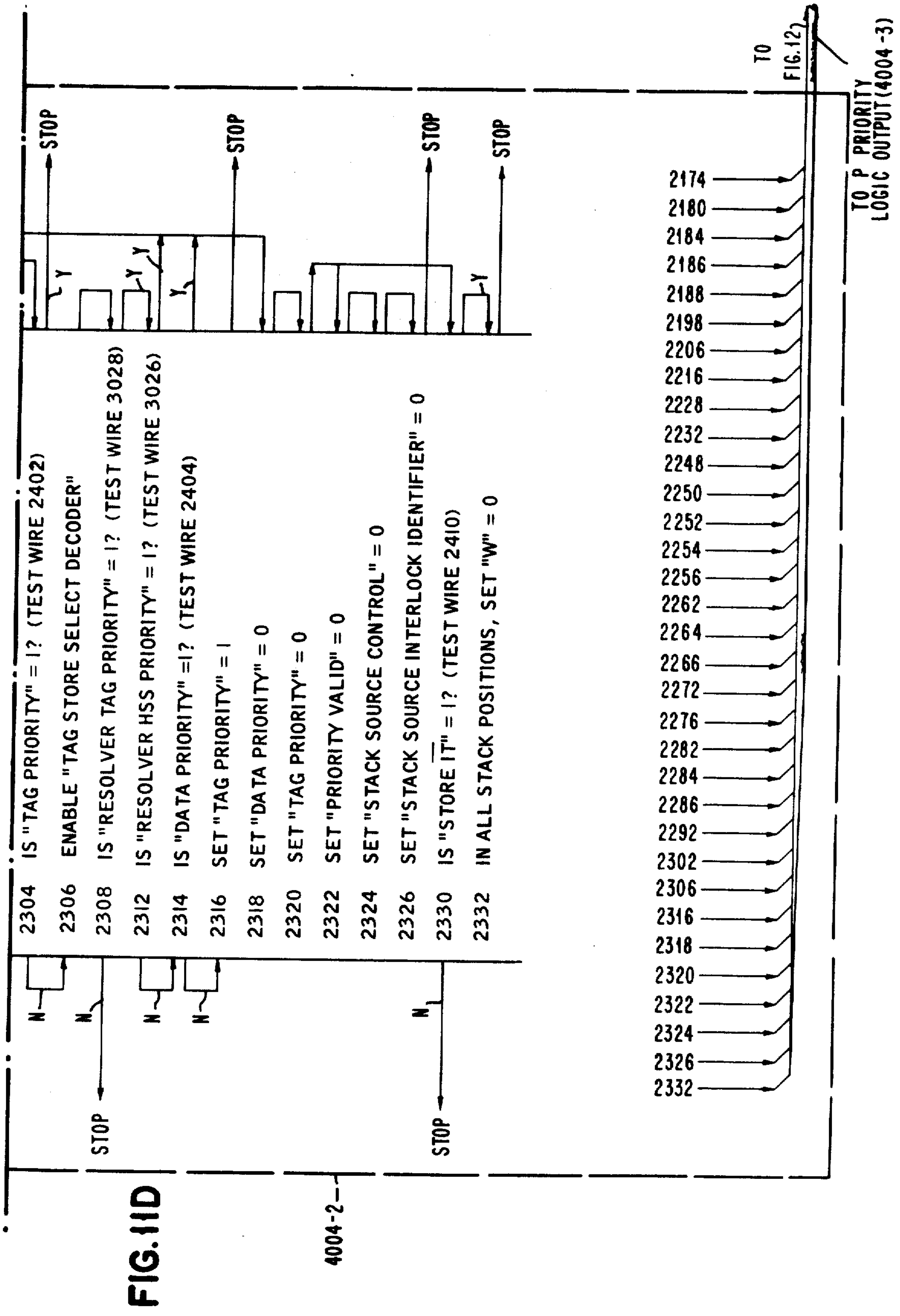

Referring to the bottom of FIG. 11D, there is seen a bus to the P Priority Logic Output of FIG. 11. The output bus comprises wires 2174–2332 as indicated. These wires, when active, individually perform the setting and gating functions indicated in the associated step. For example, in FIG. 11A, step 2174 sets D PRI and T PRI to zero. Line 2174 in the bus to the Priority Logic Output performs this function. The other lines function similarly.

P Priority Logic Output

Figure 12:
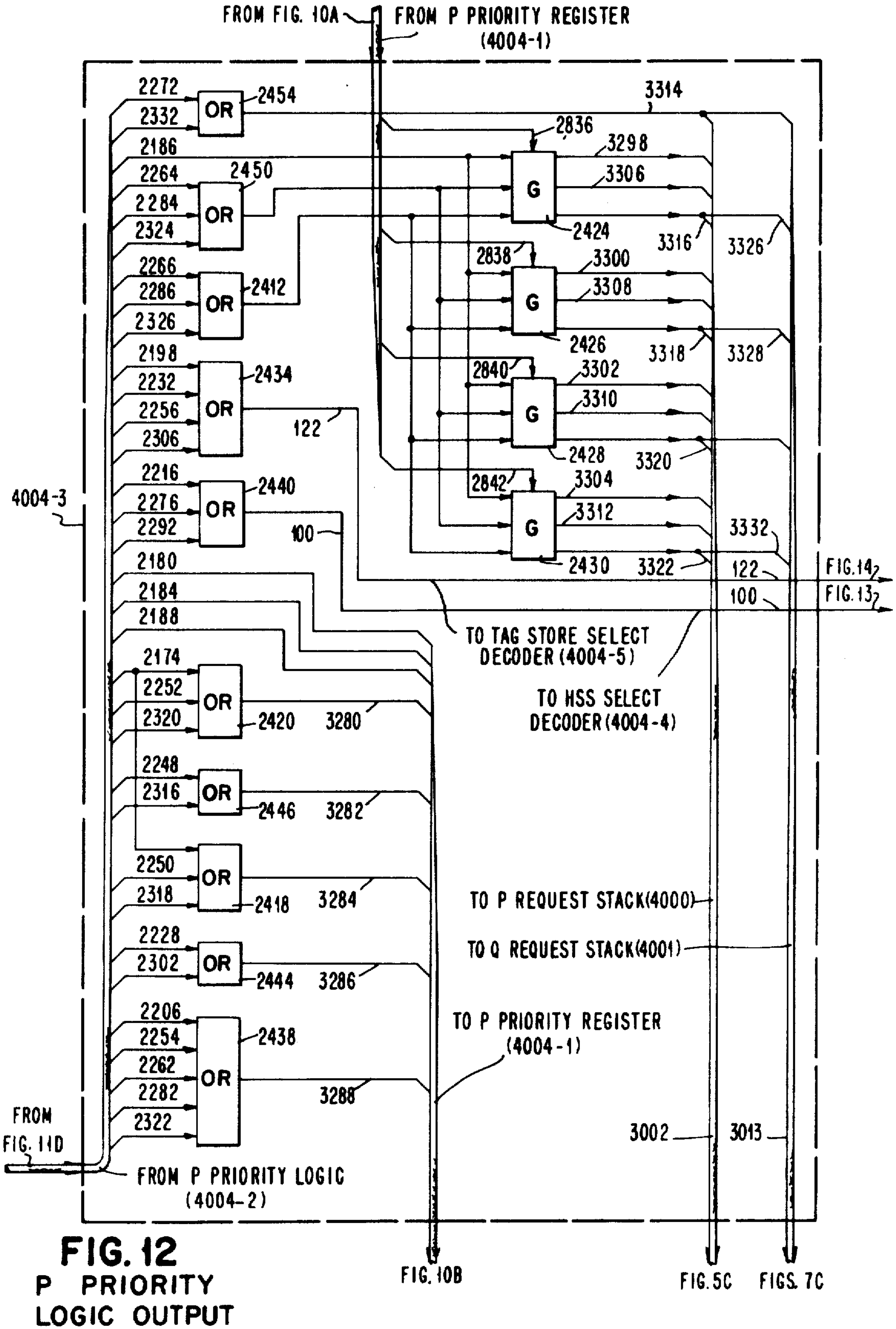
FIG. 12 shows the priority logic output of the P priority apparatus of our invention.

Referring to FIG. 12, there is seen the P Priority Logic Output. The input bus at the left of this figure comes from the P Priority Logic 4004–2 seen in FIG. 11D. The wires indicated are OR'ed together in OR gates 2438–2454, proceeding upwardly vertically in FIG. 12. Lines 2180, 2184, 2188, and 3280-3288 comprise a bus back to P Priority Register 4004–1. This bus provides gating signals as indicated in the P Priority Logic of FIGS. 11A–11D. For example, lines 2180, 2184, and 2188 provide ingating and set signals to ingate the appropriate P stack level to the P priority register, to ingate the input request to the priority register for the bypass and to set the PRI V bit to 1 as indicated in the correspondingly-numbered steps in the P Priority Logic. Lines 3282 and 3286 set the D PRI and T PRI bits while lines 3280, 3282, and 3288 reset the T PRI, D PRI and PRI V bits, respectively. The input bus from the P priority register which is an input to the P Priority Logic output of FIG. 12 contains gating signals 2836–2840. These gates indicate the stack source to which information is to be gated and serve as enabling inputs to gates 2424-2430. The inputs to these last-named gates include signals which are to be gated to the various levels of the P request stacks via output bus 3002. The proper setting signals are steered by the corresponding gating signals. For example, line 3298, which is the gated output of line 2186, as well as line 3306 which is the gated output of OR 2450, and line 3316 which is the gated output of OR 2412 are steered to level P1 in the P Request Stack by line 2836 which gates gate 2424. Line 3298, for example, sets the stack source PX bit to 1 in response to step 2186 in the P Priority Logic. The setting of the PX bit to 1 was explained with regard to FIG. 4B in the request stacks. The other information signals proceed similarly.

Bus 3013 also seen in FIG. 12 contains wires 3326–3332 which are similarly steered to the respective levels in the Q stack. Line 100 and 122 are to the tag store select decoder and high-speed store select decoder, to be explained subsequently in FIGS. 13 and 14, respectively. These lines serve to decode the high-speed storage and the tag storage addresses which are to be gated out. These addresses can be supplied, for example, from the P Priority Register 4000–1.

P High-Speed Storage Select Decoder

Figure 13:
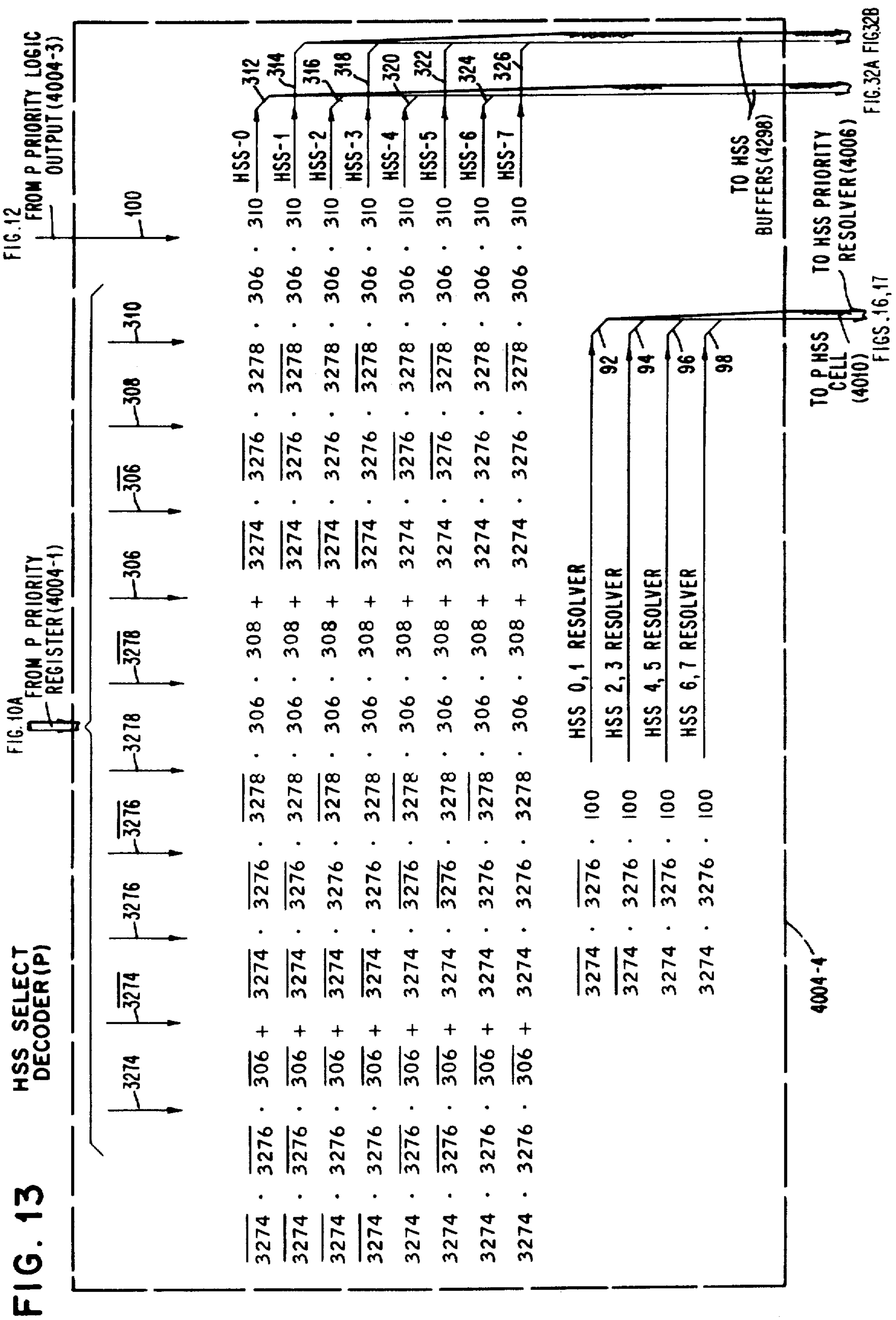
FIG. 13 shows the high-speed storage select decoder for the P priority apparatus of our invention.

Referring to FIG. 13 which shows the P High-speed Storage Select Decoder, it is seen that inputs to the P High-speed Storage Select Decoder are the 1 and 0 sides of lines 3274, 3276, 3278 and 306, as well as lines 308 and 310. As seen from FIG. 10A and B, these lines include virtual address bits 29, 30 and 31, as well as the primary and alternate bits of the P priority register. Line 100 which serves as the gating line from P Priority Output Logic 4003 is also included as an input. A typical decoder can be built according to the Boolean Statements in FIG. 13. Each output 312, 314, . . . ,326 addresses to one of the eight basic storage modules (BSM's) in high-speed storage, as noted. The high-speed storage resolver, to be explained subsequently, is divided into four areas, one each for BSM's 0,1; 2,3; 4,5; and 6,7 of the high-speed storage. The Boolean equations for the decoder for gating to the high-speed storage resolver are as shown and result in signals on lines 92, 94, 96 and 98 of FIG. 13.

P Tag Storage Select Decoder

Figure 14:
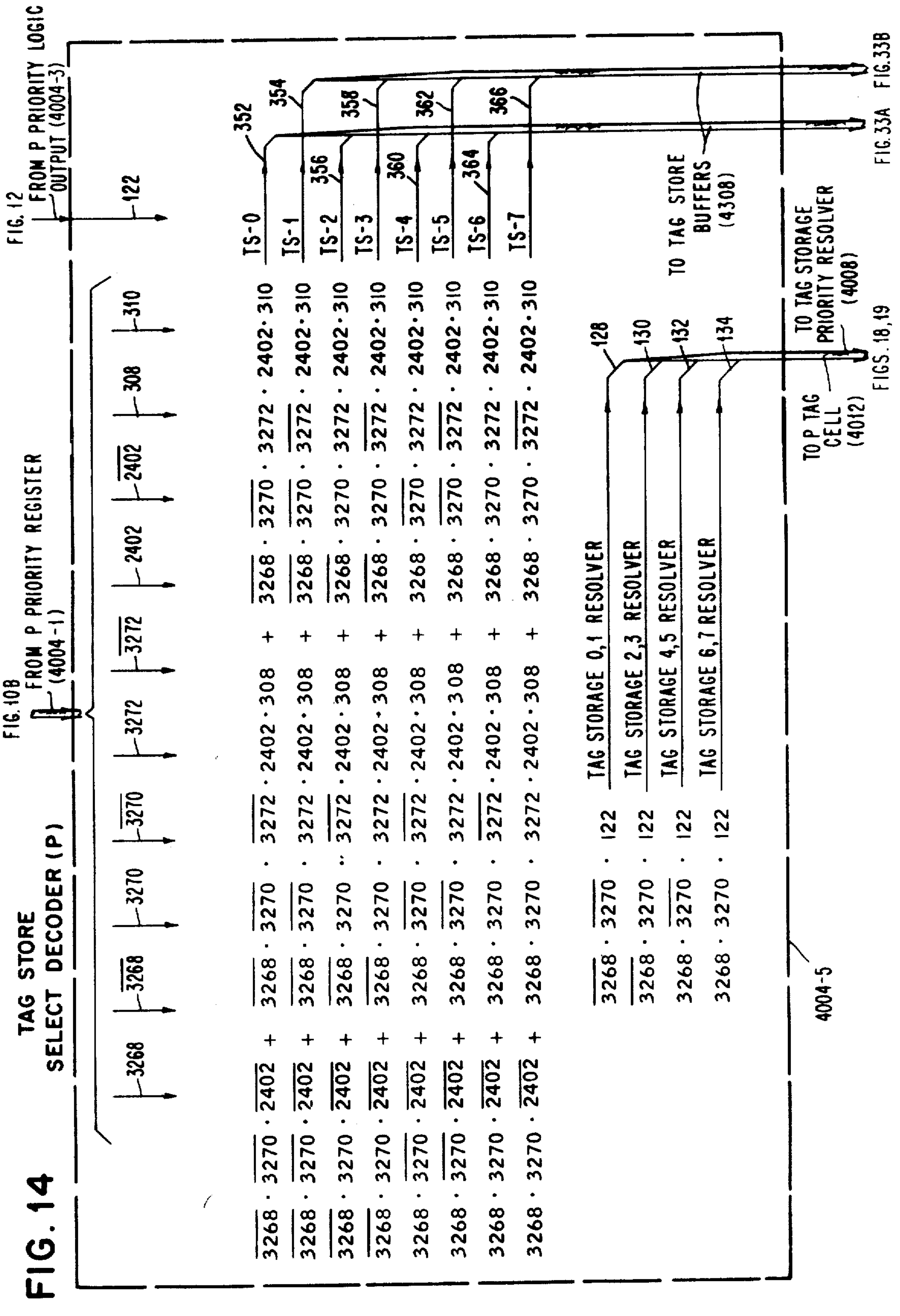
FIG. 14 shows the tag storage select decoder for the P priority apparatus of our invention.

Referring now to FIG. 14, there is seen the P Tag Storage Select Decoder. Inputs to the Tag Storage Select Decoder include the bits from the P Priority Register and line 122 from the P Priority Logic of FIG. 12. The eight Boolean statements decode the incoming lines, which are bits from the virtual address and the primary or alternate bits currently in the P Priority Register, into gating lines 352–366 for Tag Storage Module 0–7. These lines are gated in the buses shown to the tag buffers. The lower four Boolean statements decode virtual address bits with gating signal 122 and generates signals to the four pairs of tag storage resolver circuitry via lines 128–134.

P Hashing Logic

Figure 15:
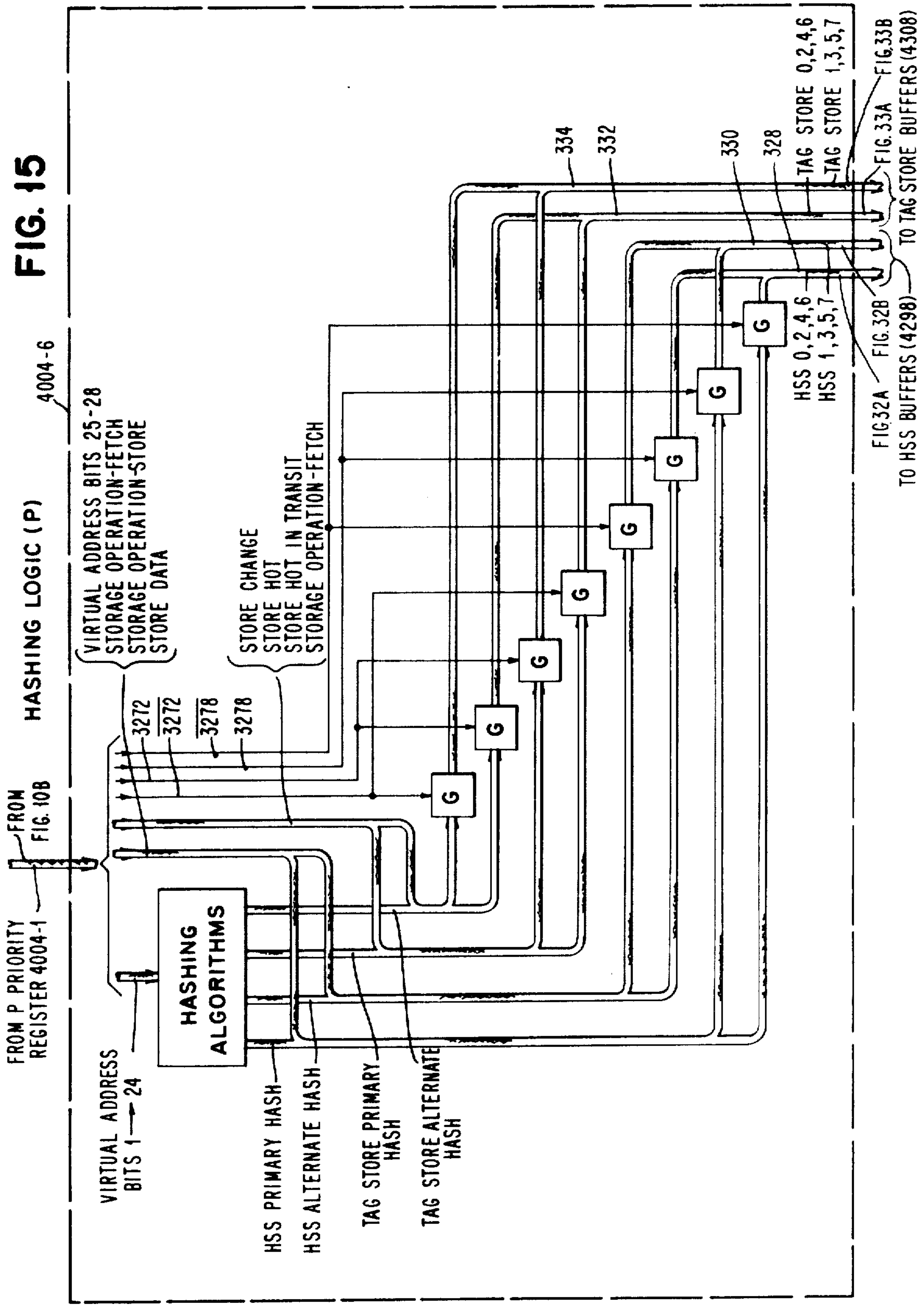
FIG. 15 shows the hashing logic for the P priority apparatus of our invention.

Referring to FIG. 15, there is seen the P Hashing Logic 4004–6. The P Hashing Logic has an input bus from the P Priority Register. This bus includes the virtual address bits 1–24 which are gated to the hashing algorithm box to be described in detail subsequently. The output of the hashing algorithm box are four buses which transmit the high-speed storage primary hash address, the high-speed storage alternate hash address, the tag storage primary hash address, and the tag storage alternate hash address, respectively. Along with each of the last-named buses are included certain control bits from the P priority register. The store change (CH), the store hot (H), store not-in transit ($\overline{\text{IT}}$), and store operation-fetch (F) bits are included in the tag store primary hash address and the tag store alternate hash address buses, since these control bits will ultimately be stored in the tag store when they are accessed. The virtual address bits 25–28, the store operation-fetch (F), the store operation-store (S), and the store data are included in HSS primary and HSS alternate buses since this information will be used in the operations involving the high-speed storage. Lines 3272, $\overline{\textbf{3272}}$, 3278 and $\overline{\textbf{3278}}$ are the 1 and 0 sides, respectively, of virtual address bits 27 and 31. The hashing logic can be built from the following Boolean expressions:

$$\text{PR1 HASH ADR0} = \text{VA}1 \veebar 7 \veebar 13 \veebar 19$$
$$\text{PR1 HASH ADR1} = \text{VA}2 \veebar 8 \veebar 14 \veebar 20$$
$$\text{PR1 HASH ADR2} = \text{VA}3 \veebar 9 \veebar 15 \veebar 21$$
$$\text{PR1 HASH ADR3} = \text{VA}4 \veebar 10 \veebar 16 \veebar 22$$
$$\text{PR1 HASH ADR4} = \text{VA}5 \veebar 11 \veebar 17 \veebar 23$$
$$\text{PR1 HASH ADR5} = \text{VA}6 \veebar 12 \veebar 18 \veebar 24$$

$$\text{ALT HASH ADR0} = \text{VA}1 \veebar 14 \veebar 4 \veebar 17$$
$$\text{ALT HASH ADR1} = \text{VA}7 \veebar 20 \veebar 10 \veebar 23$$
$$\text{ALT HASH ADR2} = \text{VA}13 \veebar 3 \veebar 16 \veebar 6$$
$$\text{ALT HASH ADR3} = \text{VA}19 \veebar 9 \veebar 22 \veebar 12$$
$$\text{ALT HASH ADR4} = \text{VA}2 \veebar 15 \veebar 5 \veebar 18$$
$$\text{ALT HASH ADR5} = \text{VA}8 \veebar 21 \veebar 11 \veebar 24$$

$$\text{HSS BSM 0,2,4,6 HASH ADR} = (\text{PR1 HASH} \cdot \overline{\text{VA31}}) + (\text{ALT HASH} \cdot \text{VA31})$$

$$\text{HSS BSM 1,3,5,7 HASH ADR} = (\text{PR1 HASH} \cdot \text{VA31}) + (\text{ALT HASH} \cdot \overline{\text{VA31}})$$

$$\text{TS BSM 0,2,4,6 HASH ADR} = (\text{PR1 HASH} \cdot \overline{\text{VA27}}) + (\text{ALT HASH} \cdot \text{VA27})$$

$$\text{TS BSM 1,3,5,7 HASH ADR} = (\text{PR1 HASH} \cdot \text{VA27}) + (\text{ALT HASH} \cdot \overline{\text{VA27}})$$

Thus, it is seen that the primary and alternate hash addresses have six bits each and can be generated from the exclusive OR function of the various virtual addresses as shown. The high-speed storage and the tag storage are divided into eight basic operating modules. The particular hash address ultimately generated for high-speed storage and tag storage is dependent upon the primary and alternate hash addresses generated and the values of virtual address bits 27 and 31, as indicated by the lower four Boolean equations above. This can be seen in FIG. 15 where lines 3272, 3272, 3278 and 3278 act as gating signals to gate the primary and alternate hash addresses to address the proper high-speed storage or tag storage modules.

HSS Priority Resolver

Figures 16, 19:
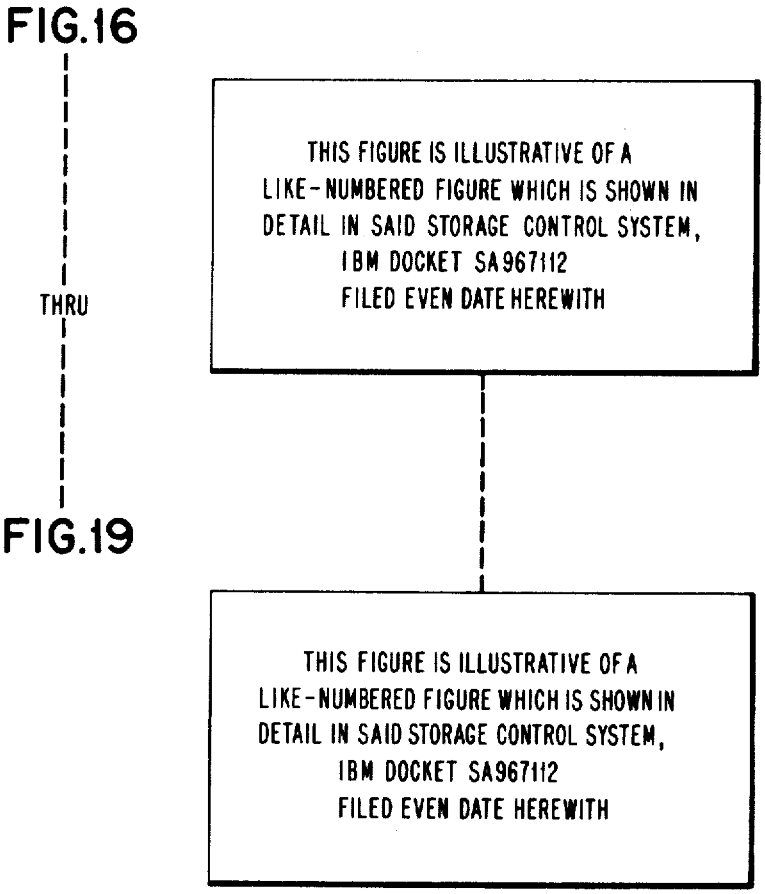
FIG. 16 shows the high-speed storage priority resolver.
FIG. 19 shows the P tag cell.

Turning now to FIG. 16, there is seen the High-Speed Storage Priority Resolver. The High-speed Storage Priority Resolver has as inputs buses 3032, 3033 and 3050 from P Priority, Q Priority and R Priority, respectively. Outputs include lines 3054 to the P high-speed storage cell, 3026 to the P Priority, 3056 to the Q High-speed Storage cell, 3027 to the Q priority, 3058 to the R High-speed Storage cell, and bus 3052 to the high-speed storage buffers. A schematic of one of the resolvers seen in FIG. 16 is noted in FIG. 16A, which shows it to be a blocking AND circuit with R having priority over P which has priority over Q. The outputs for each resolver circuit in FIG. 16 are gated to the proper P, Q and R areas. For example, if bus 3032, which contains a priority request to one of the pairs of high-speed storage basic operating modules, along with line $\overline{\textbf{306}}$ which is the signal which enables the P data cell gate, is provided as an input to the high-speed storage priority resolver, and there is no similar input from bus 3050 which is from the R priority area, then line 3026 will be activated to indicate that the request in the P priority register has priority to access its HSS module pair. Line 3026 is tested in the P priority logic in FIG. 11. Bus 3052 also provides ingating signals to the proper high-speed storage buffer module pairs for the respective P, Q or R ports. Lines 3054 and 3056, as well as line 3058, provide an ingating signal for the P, Q and R high-speed storage cells, respectively.

P HSS CELL

Referring to FIG. 17, there is seen the P high-speed storage cell. Bus 3044 from the P priority area, and ultimately from the P High-Speed Storage Select Decoder of FIG. 13 is supplied as an input. This bus comprises lines 92–98 which, when active, indicate that high-speed storage pairs 0,1; 2,3; 4,5; 5,6, respectively, are to be selected to be gated out. Line 3054 is from the high-speed storage priority resolver just described and is an input to AND 2866. Blocking line 3070 is from the R Transfer Unit and is connected through an inverter as an input to AND 2866. At clock pulse time, if line 3054 is active and 3070 is inactive, line 2864 will gate the selected high-speed storage pair indication into register 2860 where it will be delayed for one HSS cycle to time out data access and then will be gated through gate 2868 into register 2862 from which it will then gate the information from the selected high-speed storage module pairs to the fetch data registers. Line 3074 is connected to the P Decision Unit to indicate that the data in the fetch data registers is currently valid. FIG. 18 and 18A show the tag storage priority resolver of our invention which is similarly structured and operates similarly to the high-speed storage priority resolver of FIGS. 16 and 16A. Associated with the Tag Storage and Tag Storage Priority Resolver is the P Tag cell seen in FIG. 19 which is similar to the P high-speed storage cell in FIG. 17.

P Tag Cell

With reference to FIG. 19, it can be seen that the tag cell has inputs from bus 3046 from the P priority area and input lines 3064 and 3076 from the Tag Storage Priority Resolver and the R transfer area, respectively. The inputs to the P Tag Cell from P Priority include the stack source of the current request as well as the indication of the tag storage module pair which is to be selected. This information is clocked after a one-cycle delay to time out the tag storage, to enable lines 3222, 3224, 3226 and 3228 to serve as gating to the proper tag registers to which will be gated the selected information from the tag storage. Bus 3006 is connected from the P tag cell to the P Request Stack and serves to outgate the virtual address from the appropriate stack level to the decision unit for determination of whether the requested virtual address is in either the primary or alternate addresses in high-speed storage, by comparing it with the virtual address in the tags. Bus 3080 is connected to the P Decision Unit and contains lines which indicate the stack source for the given request and also indicate that the fetched tags in the fetch tag registers are presently valid.

Operation of Priority and Hashing Apparatus

Referring concurrently to FIGS. 11A-11D which delineate the P Priority Logic, and also the P Priority Register seen in FIGS. 10A-10B and the fetch and store diagrams of FIGS. 3A and 3B, an explanation of the operation of the priority area will be given. It will be recognized that priority contention may be going on in both the P, Q and R priority apparatus concurrently. referring to step 2172 of FIG. 11A, it is seen that the reset priority control is tested. If that line is set to a 1, it means that an interstorage transfer has taken place and, therefore, the D PRI and T PRI bits should be reset to zero as in step 2174 and that priority will be contended for again in the next cycle as indicated by the stop adjacent step 2174 of FIG. 11A. If, on the other hand, the reset priority control line is not on, operation can continue and a test is made to see whether the priority register contents are valid in step 2176. If the priority register has a valid request then step 2190 tests to see whether the operation is a fetch operation.

Priority Operation for Fetch

If it is a fetch operation, the store tag bit, or T bit, is tested in step 2212. If this T bit is a one, it indicates that control bits must be stored into the tag location for this virtual address. Such a situation would arise, for example, when the hot bit must be stored into after a data fetch as determined in the decision unit, to be explained subsequently. If test 2212 indicates that the tag does not have to be stored into, then the request will contend for priority to access the tag and data stores. Concurrently, tests 2214 and 2230 take place. That is, data priority and tag priority may be given in different cycles and, thus, a split request situation arises. For example, the chain of tests beginning with 2214 will ultimately result in the D PRI bit being set to 1, if successful. Therefore, test 2214 tests the D PRI bit in the priority register to see if data priority has been given on a previous cycle. If it already has been given, the test stops. If it has not been given, step 2216 enables the high-speed storage select decoder; and test 2218 tests to see whether the high-speed storage resolver has given data priority. If it has not, the logic stops and tries again the next cycle. If it has, the data will be accessed using the primary and alternate physical addresses from the Hashing logic, and test 2224 tests to see whether the tag resolver has also given this request priority to access the tag modules. If it has, then priority is essentially complete, the tags are similarly accessed, and steps 2250, 2252 and 2254 set D PRI to zero, P PRI to zero and set PRI V to zero in anticipation of the next request in the P Priority Register. On the other hand, if test 2224 indicates that the tag resolver has not given the request priority to access the tags on this cycle, test 2226 tests to see whether the T PRI bit is one, which would indicate that such priority has been given and tags accessed on a previous cycle. If it has been given, then all priority contention for this request is complete and steps 2250–2254 again reset the above control bits. If, however, step 2226 indicates the tag priority has not been given, then since step 2218 has indicated that the resolver has given data priority on this cycle, step 2228 sets the D PRI bit to 1 to record in the P Priority Register that the current request at least has been given priority to access its data modules in high-speed storage. On the next cycle, an attempt will be made to gain priority to access the tags.

Reference is made to test 2230 in FIG. 11B. It should be recalled at this point that test 2214 and 2230 are going on concurrently. It may be that both test 2214 and test 2230 will result in both data and tag priority being given on the same cycle and, therefore, the steps will ultimately converge in tests 2250-2254. Continuing, test 2230 tests to see whether tag priority has already been given. If it has, this series of tests for tag priority is complete, but the previous series of tests for data priority may still be going on. On the other hand, if test 2230 indicates that tag priority has not been given, the tests continue onward in an attempt to obtain tag priority. Therefore, step 2232 enables the P Tag Storage Select Decoder of FIG. 14. Test 2234 then tests line 3028 of the tag storage priority resolver of FIG. 18 to determine whether priority to access the given BSM pair for this request has been given. If it has not, then the contention for tag priority is unsuccessful, a stop point has been reached and contention for tag priority will be tried again next cycle. On the other hand, if test 2234 is successful, test 2244 tests the high-speed storage priority resolver to determine whether priority to access the corresponding high-speed storage BSM pair has also been given this cycle. If yes, there is no need to keep a record of tag priority since both tag and data priority have been given. Therefore, steps 2250–2254 are performed to reset the control bits in the P priority register. On the other hand, if test 2244 indicates that high-speed storage priority has not been given on this cycle, then test 2246 tests the D PRI bit to see whether such priority has been given on a previous cycle. If yes, the present combination of data priority and tag priority ends the test, and steps 2250-2254 end the procedure. On the other hand, if D PRI is not a 1, it means that data priority has not been given; and therefore a record of tag priority is kept in the P priority register by setting the T PRI bit to 1 by step 2248, indicating tag priority has been given and the tags accessed to the decision area.

Thus, it can be seen that the system goes as far as it can with either tags or data on a given priority cycle. If it can access tags, but not data, for example, it does so to gate the tags to the decision unit for early initiation of the decision process.

Returning now to step 2212, if it has been determined that the store tag or T bit is on in the priority register, it means that the tag in one of the tag storage physical addresses must be stored into with data contained in the control bit portion of the request in this request stack level. Therefore, step 2256 enables the tag storage select decoder of FIG. 14, and test 2258 tests the tag storage priority resolver of FIG. 18. If priority to access the tag storage has not been given, a stop point is reached and this test will be performed again on the next cycle. On the other hand, if test 2258 is successful then the tags are accessed with the primary and alternate physical addresses from the Hashing Logic of FIG. 15. Therefore, this request can be cleared and step 2262 resets the priority valid bit in the priority register. Step 2264 then resets the stack source control bit in the request stack since the request is essentially complete, and step 2266 sets the stack source interlock identifier to 0. This removes interlocks to this request in the various interlock vectors since this request is now complete. Concurrently, step 2270 tests to see whether the store $\overline{IT}$ is equal to 1.

If it is not equal to 1, a stop point is reached. If the Store $\overline{IT}$ is equal to 1, it means that the line of data in the corresponding high-speed storage location has just arrived there from an interstorage transit and the $\overline{IT}$ bit must be set to update the tag. As will be seen subsequently, if the $\overline{IT}$ bit is on in the request in the request stack level under consideration, that request must have been the interstorage transfer initiation. When the interstorage transfer was complete, the interstorage transfer initiator will have been the first request having its Wait (W) bit on which was allowed to compete for priority. Therefore, when the $\overline{IT}$ bit is stored in the tag, this ISI request, having been completed, will back and reset all W bits in the stack, thereby allowing other waiting requests to enter priority. This is done in step 2272.

Referring again to step 2190, if it is determined that the operation is not a fetch operation, then test 2192 tests to see whether the operation is a store operation.

Priority Operation for Store

Figure 10B:
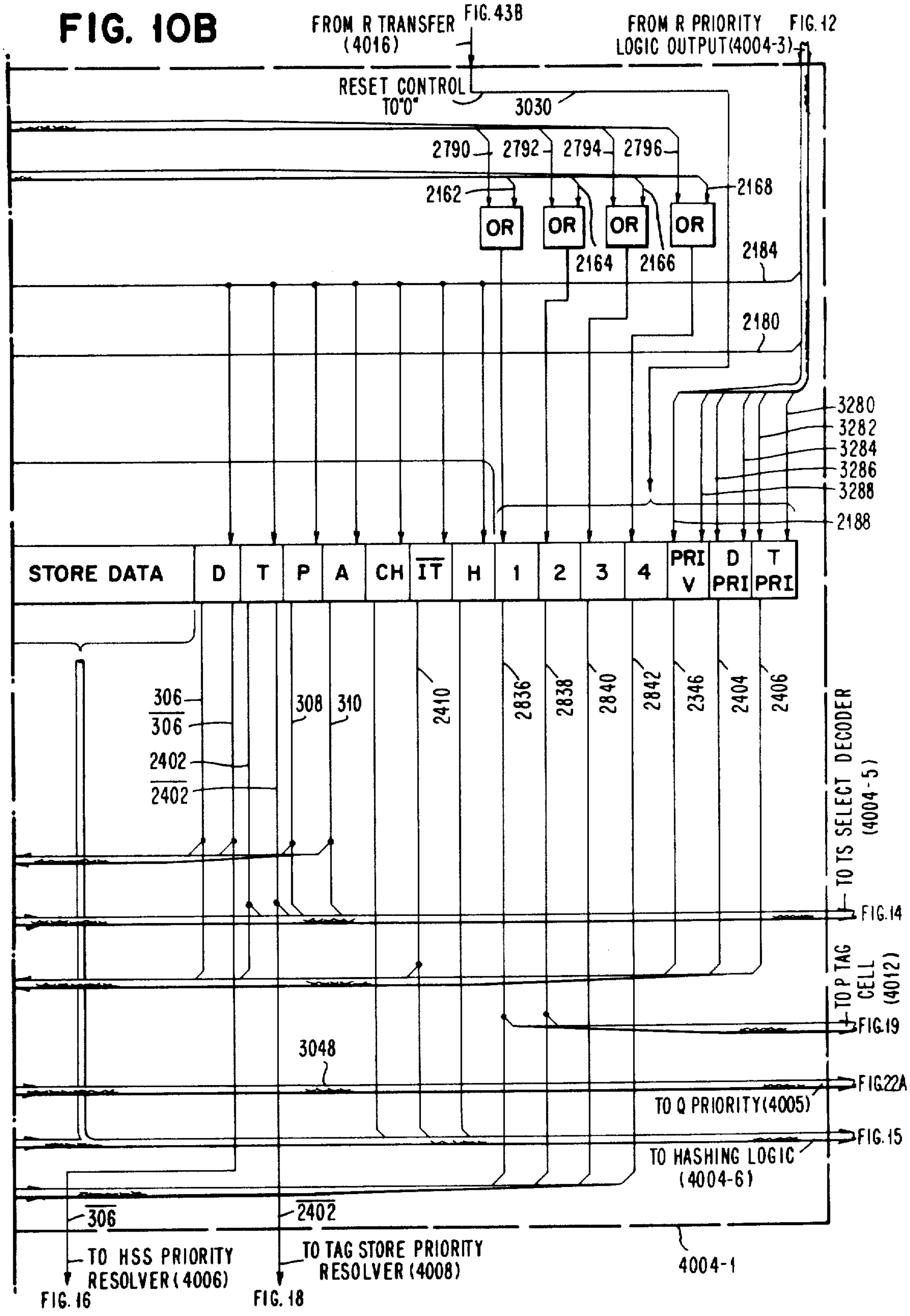

If it is a store operation, then step 2196 will test to see whether the store data, or D bit, in the P priority register of FIGS. 10A and 10B is equal to 1. If the D bit is 1 it means that this request has previously gone through priority to the decision unit which determined that the data word to be stored into is available in HSS, and therefore set the D bit in the stack. The request now contends for priority again to store the data. Test 2274 is made on the T bit to determine whether the tag must also be stored into. If this is the first time a store is made to this location, the 1 state of the Changed Bit (CH) and Hot bit (H) must be stored into the tag for this high-speed storage location. The decision to set the T bit will have been made previously in a decision unit. Assuming, for the moment, that test 2274 indicates that the T bit is not equal to 1, then step 2276 enables the high-speed storage select decoder, and 2278 determines whether the high-speed storage resolver is giving priority on this cycle to access the indicated area in high-speed storage. If no, a stop point is reached, and the request must try for priority again on the next cycle. However, if the high-speed storage resolver has given priority, then steps 2282, 2284, and 2286 go through the ending procedure to clear the request out of the request stack and remove all interlocks to this request inasmuch as the store operation will be completed. On the other hand, if test 2274 indicates that the tag also is to be stored into, then priority must be obtained for accessing both the high-speed storage, since the D bit is a 1, and also the tag storage, since it has been determined that the CH and/or H bit must be updated in the tag. Therefore, the changed bit must be set to 1. Test 2290 and 2304 are performed concurrently in the same manner in which tests 2214 and 2230 were performed for the fetch, explained previously. The main difference is that after step 2320 for the store operation, step 2330 is performed since this is essentially the end of the store operation. The distinction to be noted here is that the end of a store operation is completed in the priority area because the storage ends by obtaining priority in the high-speed storage or in the high-speed storage and tag storage and storing the data or the data and tag, respectively. On the other hand, a fetch operation can be completed in the decision logic. This is because for a fetch operation, once priority is given to access the data and tags, the decision logic determines whether the requested virtual address is in one of the two physical addresses in the high-speed storage. If so, it fetches the data and sends it to the requestor and the operation is complete, exclusive of the single case where the H bit must be stored, in which case the request goes through priority once more to update the tag. On the other hand, if the operation is a store, the request first obtains priority to access the tags and data. The decision logic then inspects the tags and data. If the requested virtual address is in one of the physical addresses in high-speed storage, the request is so informed in the request stack level and must then again obtain priority to access the high-speed storage if only data is to be stored, or to access both high-speed storage and tag storage if both data and tags are to be stored. To take care of this difference, the sequences beginning with test 2330 are performed after step 2320, in the same manner in which the sequences beginning with test 2270 and step 2262 were performed, as explained above.

With reference again to test 2196 of FIG. 11B, if the D bit is not equal to 1, it means that this is the first time this store request has gone through priority and its goal on this pass is to gate the tags to the decision area for inspection. Therefore, step 2198 enables the tag store select decoder. Test 2200 checks whether the tag priority resolver has given priority to this request to access the tag store. If priority is given, the tags are sent to decision and the priority valid bit is set to zero in step 2206 in preparation for the next request. If priority is not given, then this request tries again on the next cycle. When the decision unit ultimately inspects the tags, it will set the D bit on if the desired line is in the HSS, and next time through priority, this result will store its data.

Priority Operation for Prefetch

Returning to step 2192, it will be recalled that test 2192 proceeds from the determination that the present request is not a fetch operation. If test 2192 determines that the request is also not a store operation, then we have the situation in which the decision unit, to be described subsequently, has set up a dummy request to indicate a prefetch in a particular level of the request stack.

If the decision unit determines that the desired word for a given request is present in HSS, and that word is the first word in a line, the assumption is made that the next line will probably be desired shortly. Therefore, a dummy prefetch request is set up by setting both F and S to zero in the request in the request stack which requested word zero. This dummy request has now reached the priority area and is being processed. Therefore, if test 2194 indicates that the store tag (T) bit is not on, this indicates that the tags for the desired VA should be accessed and sent to the decision unit to determine if the next line in HSS should be prefetched. Therefore, step 2198 accesses the tags in the manner described previously.

On the other hand, if test 2194 indicates that the Store Tag (T) bit is on, it is on for the following reason, which will be seen in detail in the *Decision Unit and Interstorage Transfer Unit* sections of this specification: the decision unit has inspected the tags on a previous cycle and it was determined that the to-be-prefetched line was not in HSS and was not in transit by virtue of a previous request; the tag for this physical address was marked In-Transit; the line of data was brought into HSS by the interstorage transfer unit; the Not In-Transit bit in the request stack for this request was marked to be set and the T bit set on for this purpose. On the current cycle test 2194 detects that the $\overline{IT}$ bit must be set on in the tag to update it. Therefore, step 2256 is performed to begin to update the tag as described previously. After the tag is updated, the prefetch is complete.

Priority Operation If No Request In Priority Apparatus

Referring back now to test 2176, if it is determined that the priority valid bit is not on then the logic proceeds to test 2178. If the stack valid bit is on, it ingates a request into the priority register and step 2180 sets the stack source priority accept bit to 1 in step 2186 and sets the priority valid bit to 1 in step 2188 to indicate that the request is ready to begin contending for priority and then proceeds to step 2190 to begin priority contention. On the other hand, if step 2178 indicates that there is no request ready to go to priority (no stack valid bit is equal to 1) then test 2182 determines whether there is a request ready to bypass the request stack. If no, the priority logic begins anew; if yes, step 2184 ingates the incoming request directly to the priority register, and it is concurrently gated into one of the request stacks as mentioned previously, as well as to the Sequence Interlock Generator. The priority logic continues then with step 2186 as previously described.

Q Priority Logic

Figures 22, 22A:
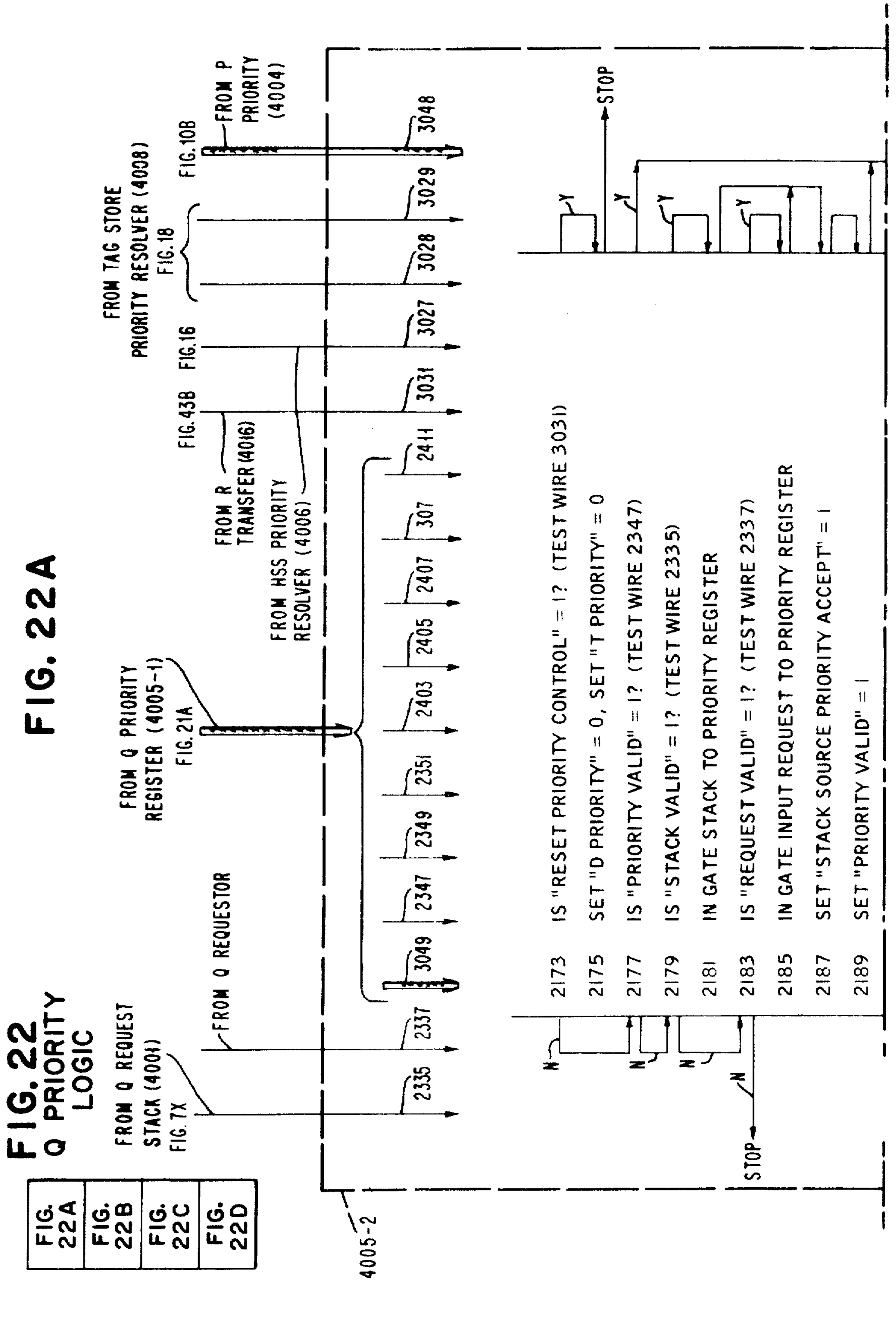
FIG. 22 shows the manner in which FIGS. 22A–22D should be place adjacent each other.
FIGS. 22A–22D show the priority logic of the Q priority apparatus of our invention.
Figure 22B:
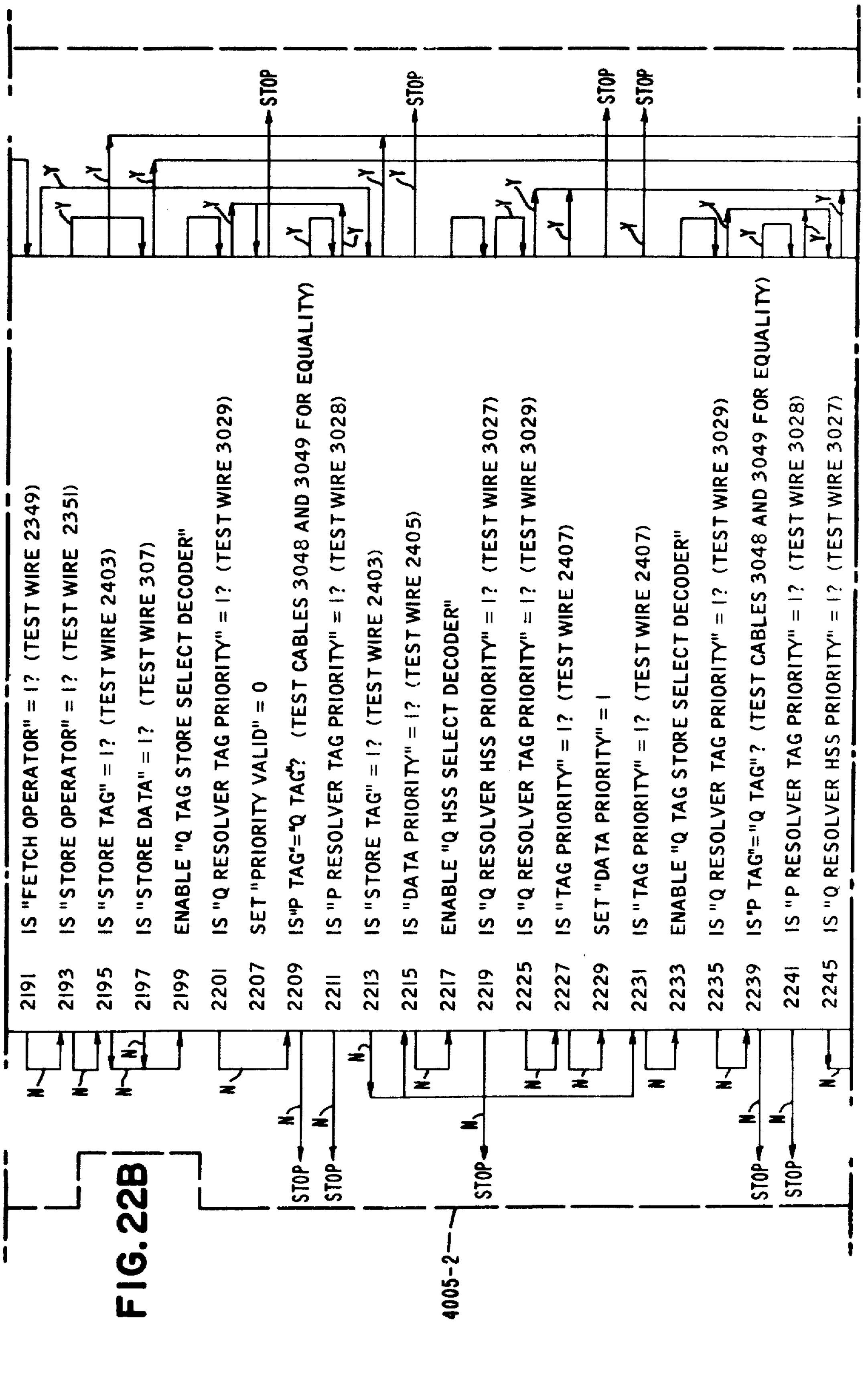
Figure 22C:
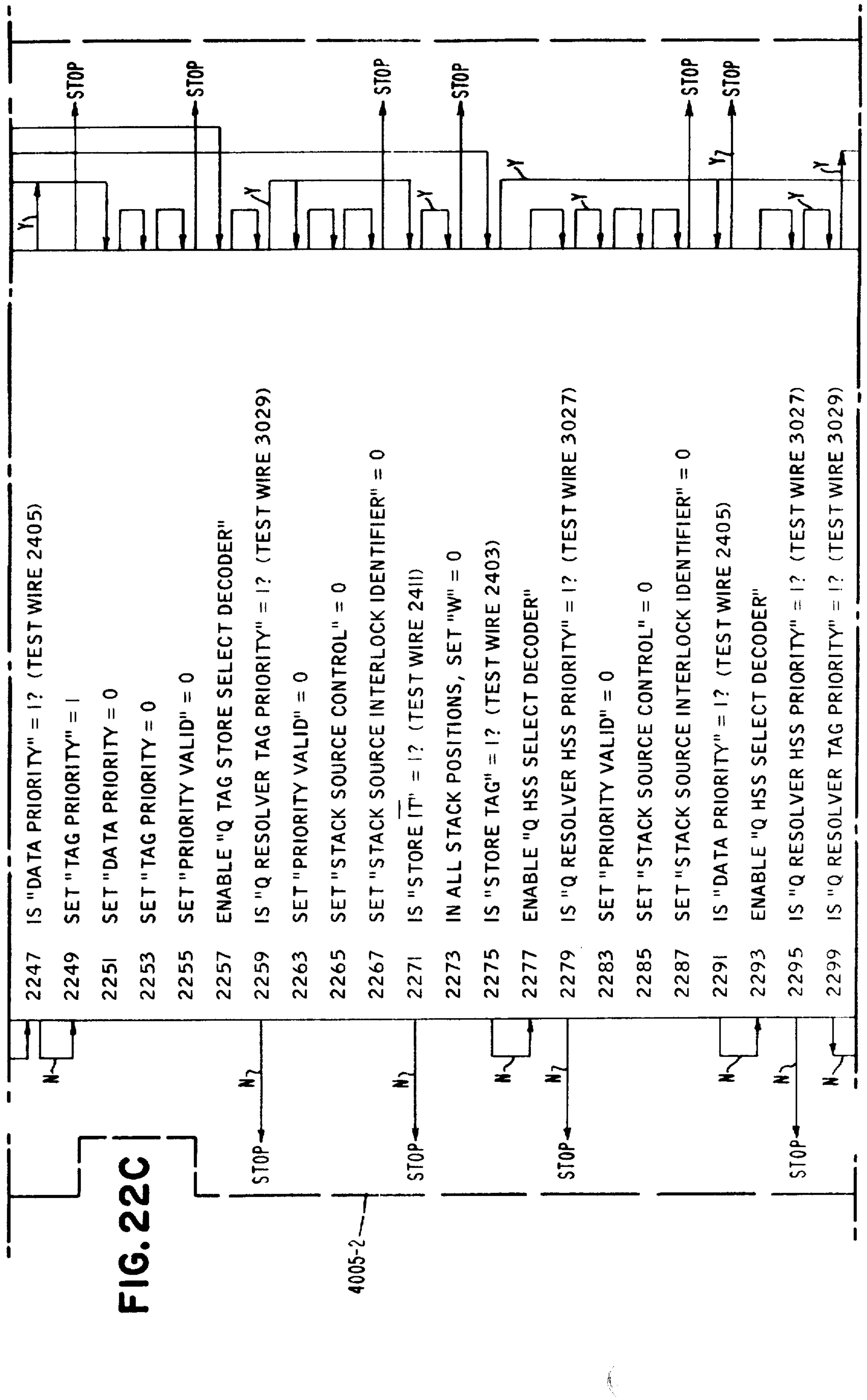
Figure 22D:
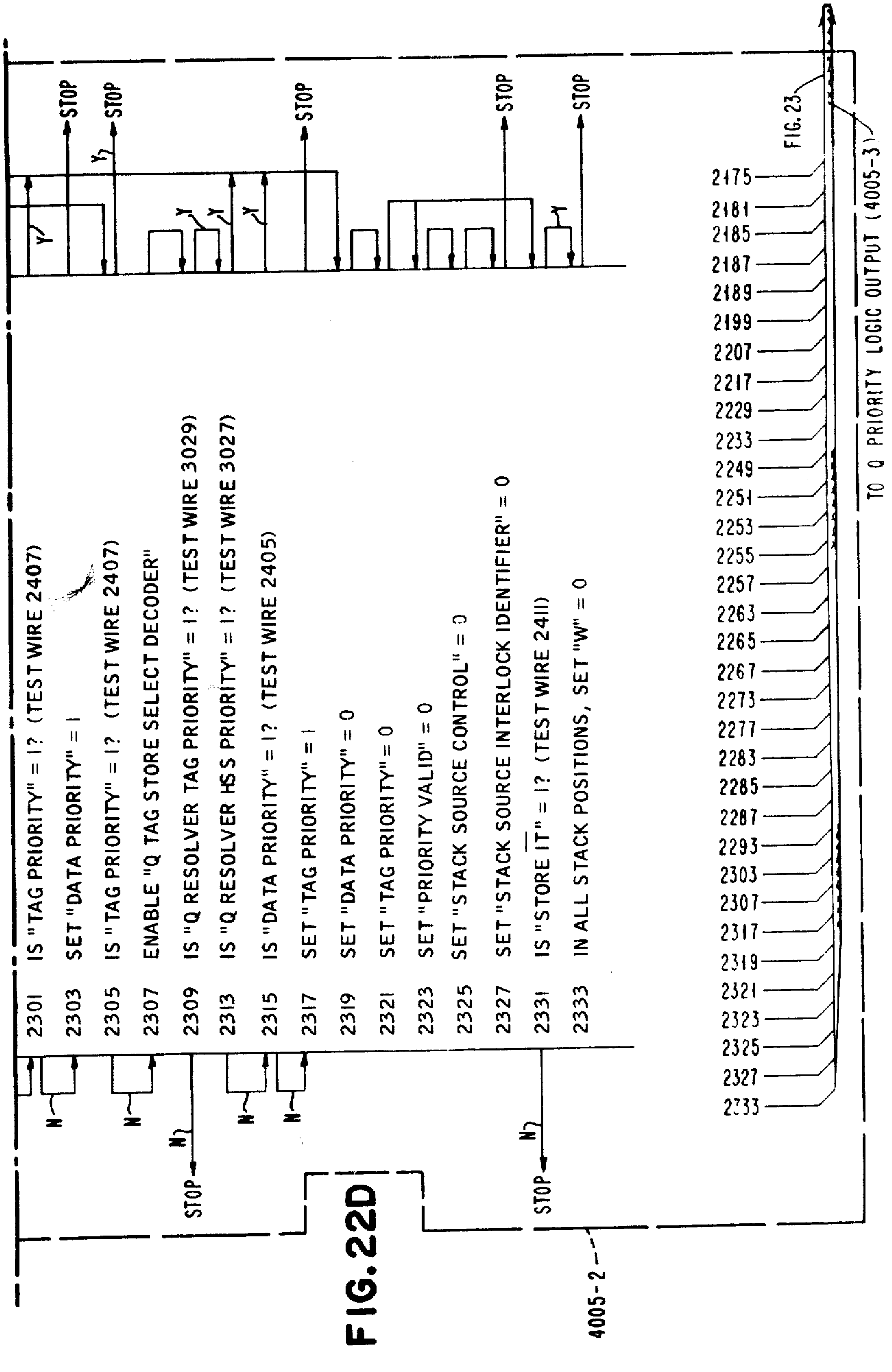
Figure 23:
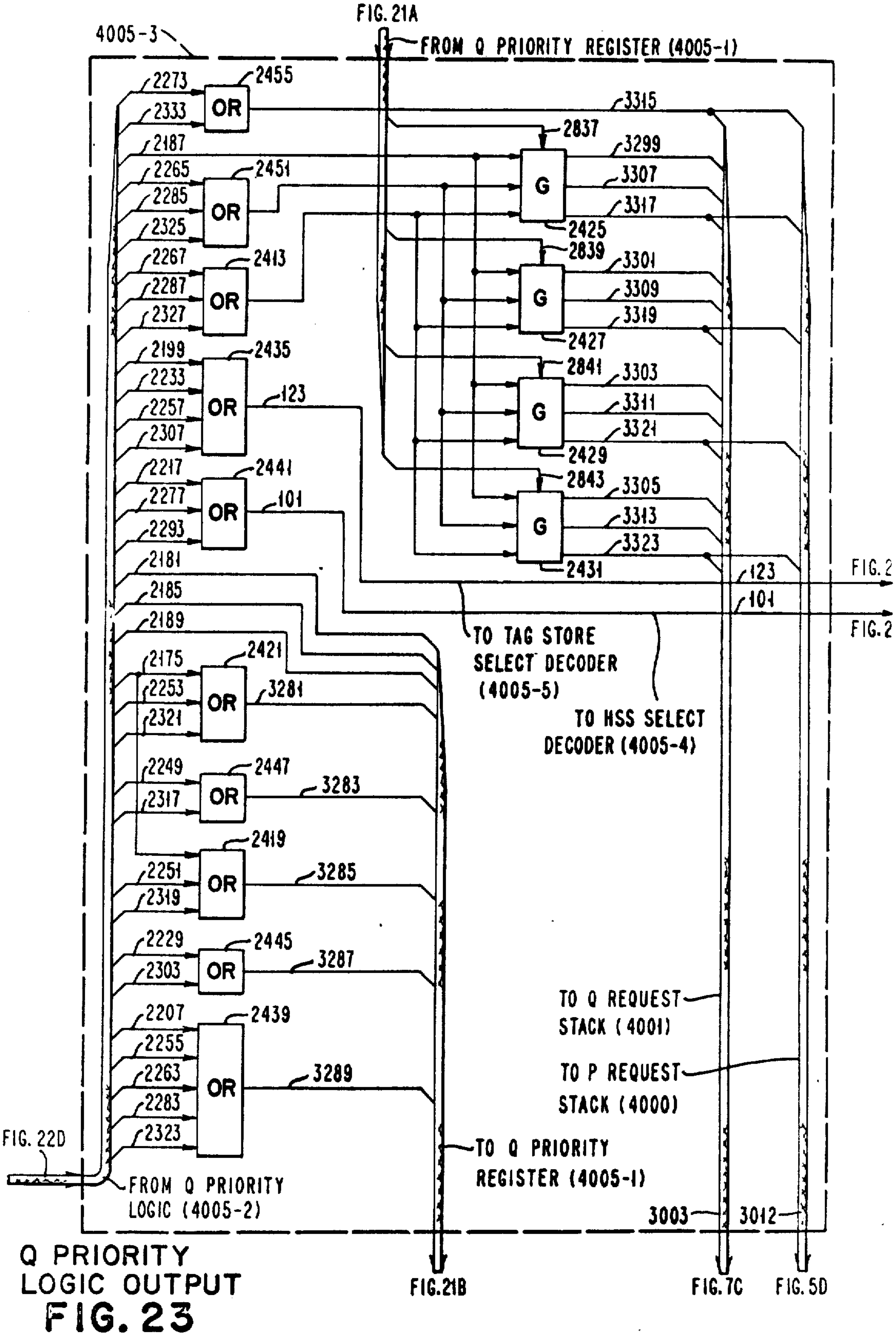
FIG. 23 shows the priority logic output of the Q priority apparatus of our invention.
Figure 24:
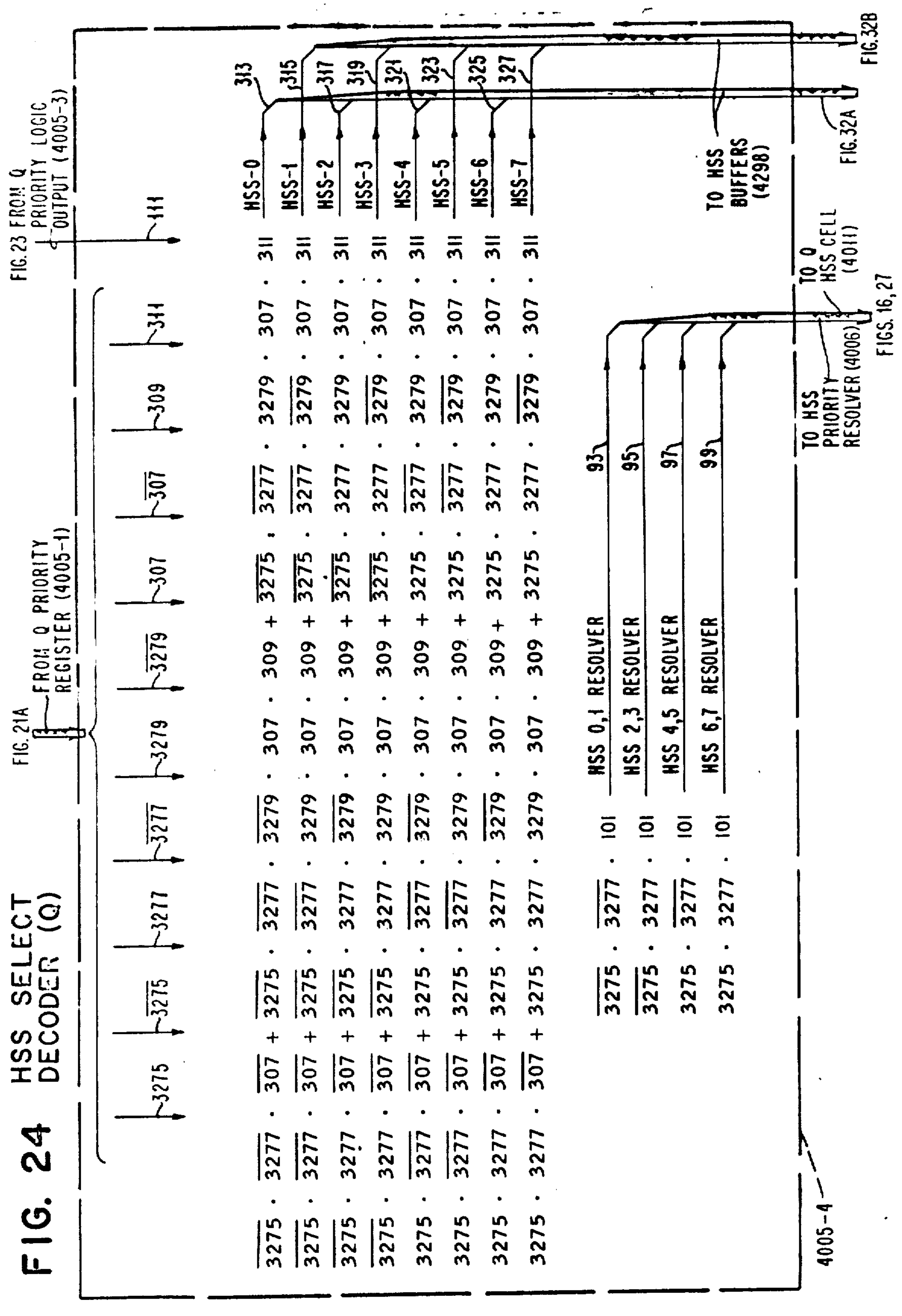
FIG. 24 shows the high-speed storage select decoder for the Q priority apparatus of our invention.
Figure 25:
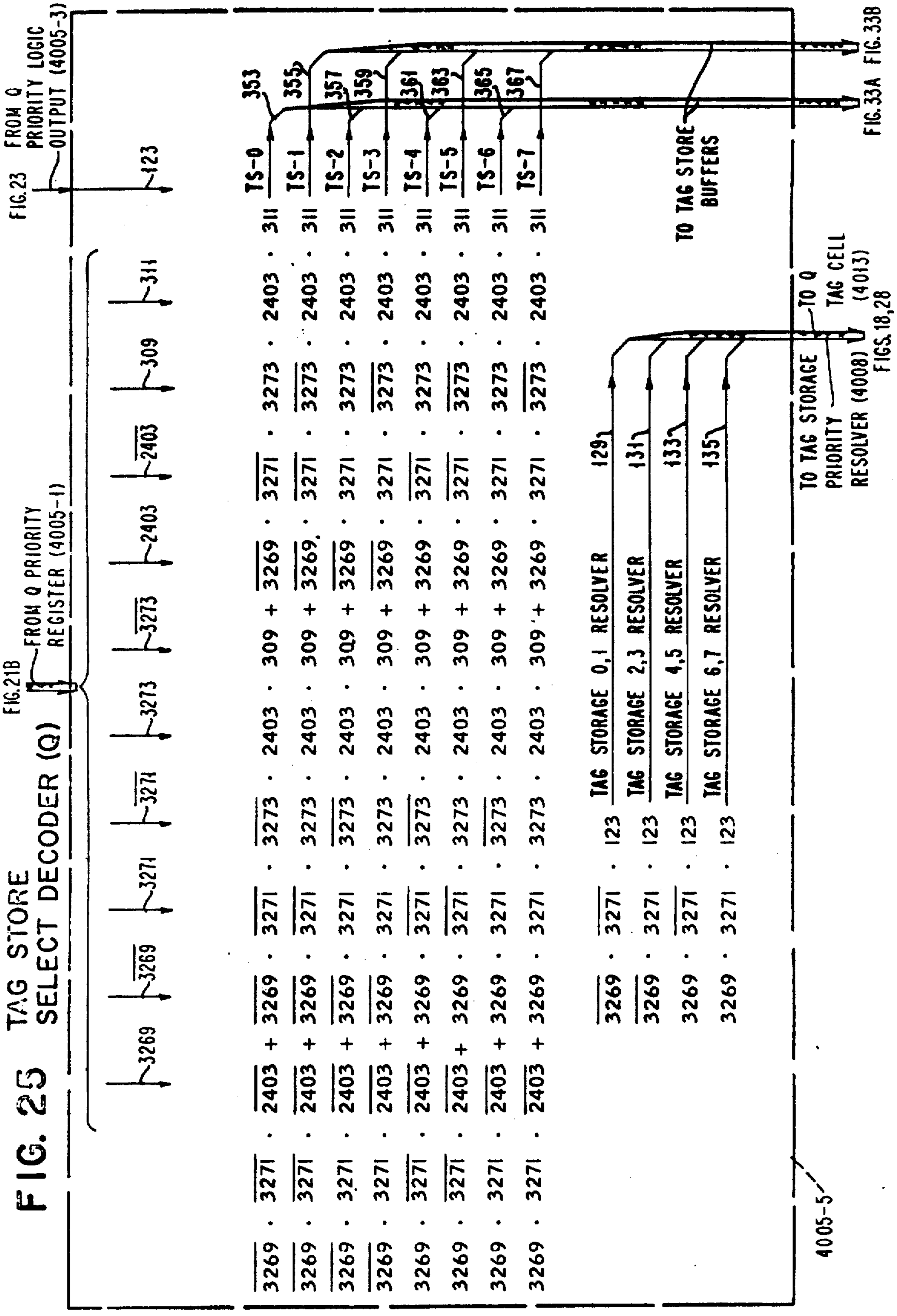
FIG. 25 shows the tag store select decoder for the Q priority apparatus of our invention.
Figure 26:
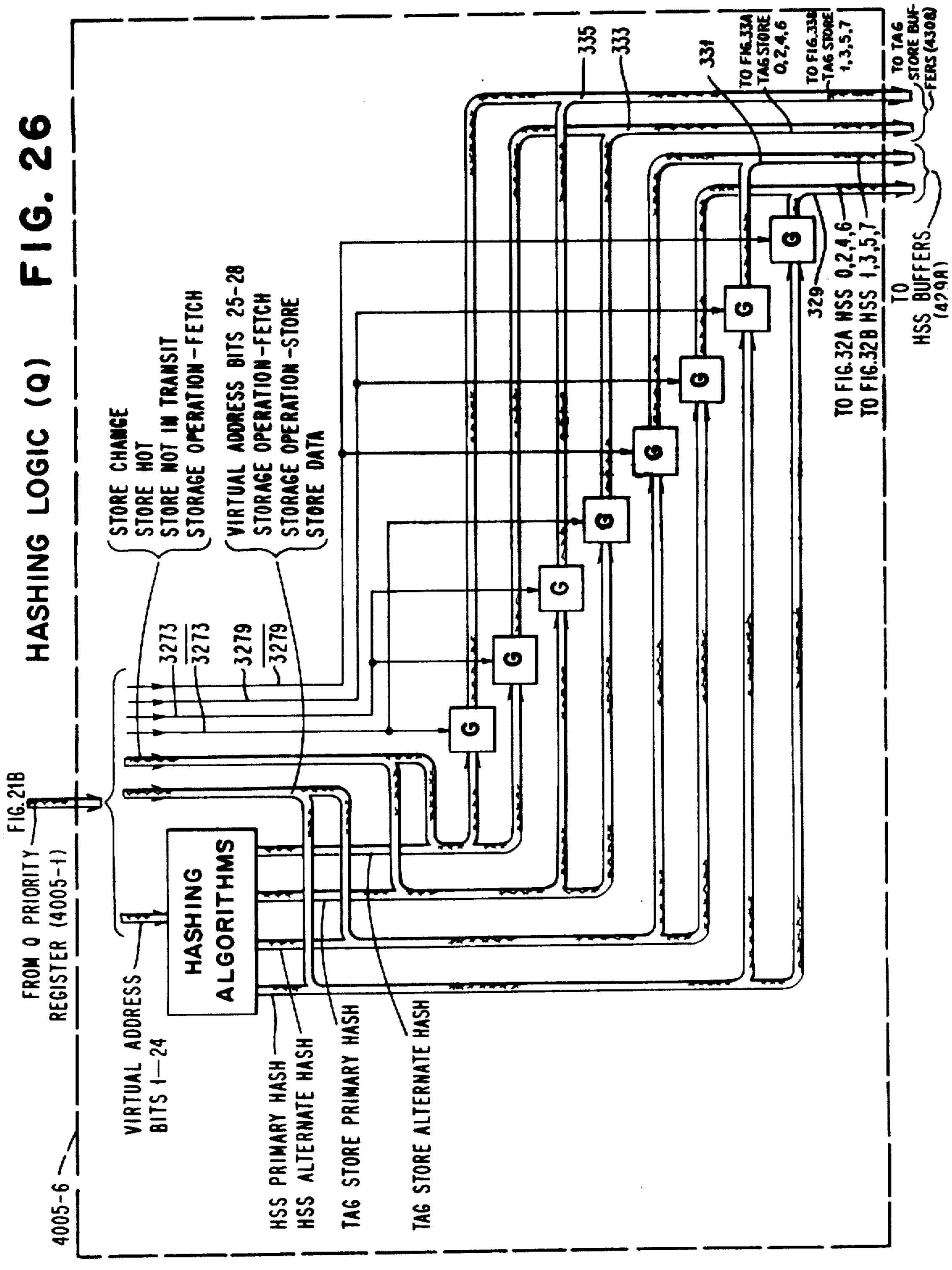
FIG. 26 shows the hashing logic for the Q priority apparatus of our invention.

It will be recalled that the Q priority logic of FIG. 22 may be contending for priority to access the tag and high-speed stores concurrently with P priority. However, in the case of concurrent contention, P will be given priority. The main difference between P priority logic explained above and the Q priority logic of FIG. 22 lies in tests 2209, 2211 and 2239, 2241 of FIG. 22B. It will be recalled from the P priority logic that once the conflict Resolver has determined that the P port should contend for tag priority, then test 2201, for the Q priority logic, is performed. This tests whether priority to access the tag storage has been given to the Q request. If it has not, then test 2209 is made which essentially compares the virtual addresses on buses 3048 and 3049 from both the P and the Q decision unit. If the virtual addresses are not the same, then a stop point is reached and this request in the Q priority register will contend on the next cycle. On the other hand, if it is determined that the virtual addresses are the same for both the P and Q requests, then test 2211 is made to determine whether the tag storage priority resolver has given priority to the P request (i.e., whether there is no R request). If so, then although P has priority to access the tags, the tags are gated out to the P and Q decision areas concurrently so that a decision can be made as to the availability of the desired virtual addresses in HSS. As will be seen in detail subsequently, the HSS is divided into basic storage modules (BSM's). It is possible for the P and Q requests to be for different words in the same data line in HSS. By virtue of this, it may be that different BSM's are to be accessed. This can be done concurrently in certain cases. Thus, although the P request is given priority to access the tags, if the P and Q requests are to different words in the same line, gating the tags to both P and Q decision units may result in the P and Q requests being serviced by concurrent accesses to different BSM's of HSS. Test 2239 and 2241 function similarly to 2209 and 2211.

Figure 2H:
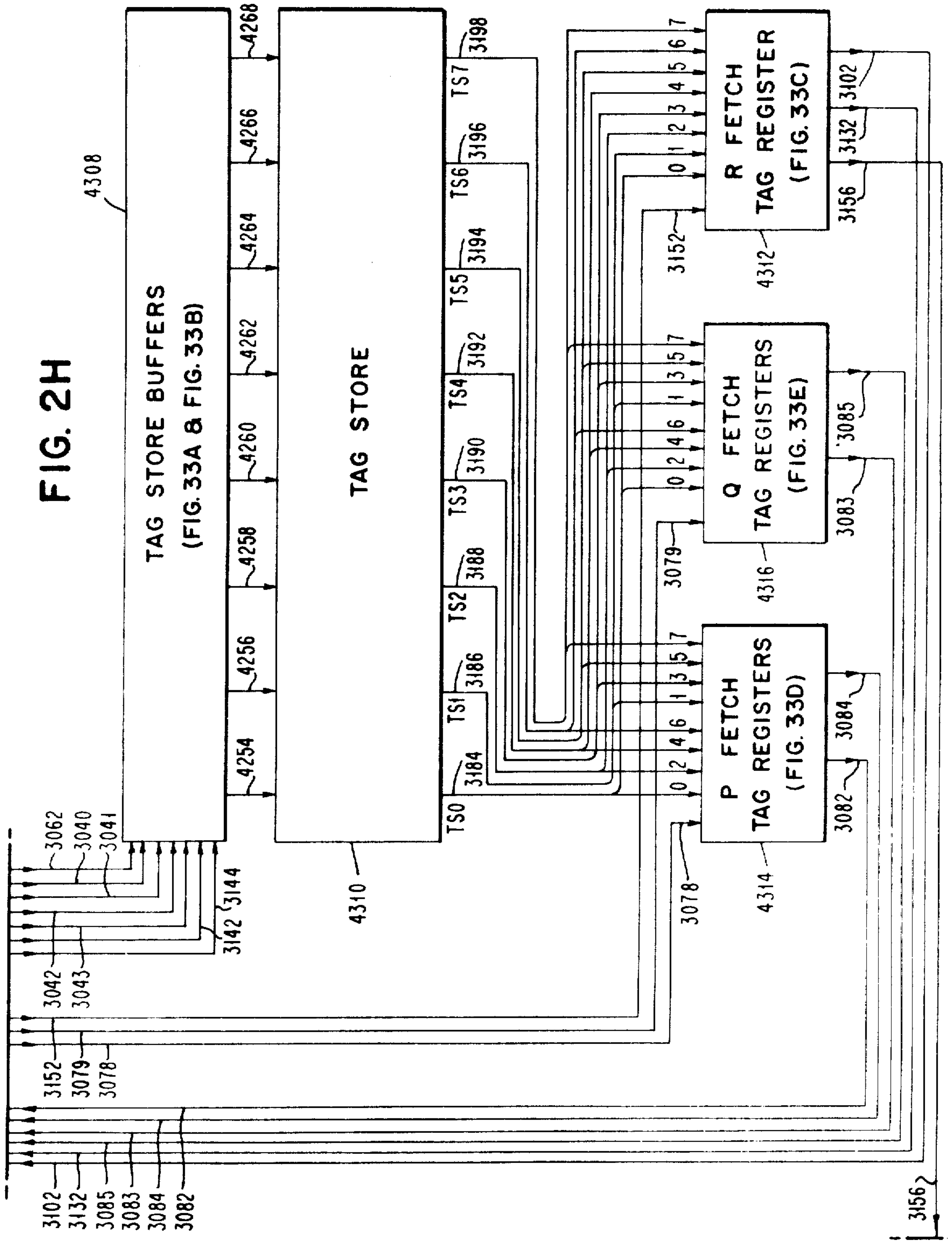

The main store and main storage buffer of FIG. 2F, as well as the high-speed storage and buffers of FIG. 2D and the tag store and buffers of FIG. 2H are seen in detail in FIGS. 29–32, respectively, and a subsequent detailed discussion thereof will clearly illustrate the simultaneous access situation alluded to here.

P Decision Unit

The P decision unit will now be described. It will be appreciated that the Q decision unit is similar in structure and operation.

P Decision Block Diagram

The block diagram of the P decision unit is seen generally in FIG. 33. The P decision unit includes P decision register 4014–1 which is seen in detail in FIGS. 34A and 34B, P decision logic 4014–2 seen in detail in FIGS. 35A–J and P decision logic output 4014–3 seen in detail in FIGS. 36A–36E.

Referring to FIG. 33, it is seen that line 308 is connected from the transfer priority 4020 to the P decision logic 4014–2. This line indicates that the P Decision Unit has been given priority acceptance to use the R Transfer, or Interstorage Transfer Unit. Bus 3086 is connected from the R transfer unit to the P decision logic and contains lines 7210 and 1058 which serve as a reset for the P decision control and as an indication that the R unit is busy, respectively. Buses 3082 and 3084 are connected from the P fetch tag register-1 and the P fetch tag register-2 to the P decision regester and the P decision logic. These buses transmit the line identifier, storage protect bit, and control bits, including the H, IT, CH, and tag valid bits from the primary and alternate addresses of the tag storage, as indicated in the P request. Bus 3020 is connected from the P request stack to the P decision register and transmits the virtual address, an indication of whether the operation is a fetch or store, the destination to which data is to be sent if the operation is a fetch, the sequence interlock bit for the request and whether or not the request is the interstorage transfer initiator. Bus 3080 is connected from the P tag cell 4012 to the P decidion register 4014–1 and transmits an indication that the tag is valid and also transmits the stack source to which this tag is relative. Line 3074 is connected from the P high-speed storage cell to the P decision register and indicates that fetch data is valid. Line 3096 is from the R Transfer Priority and indicates the P decision unit has priority for interstorage transfer.

Bus 3096 is connected from the P decision register to the R transfer unit. This bus transmits the virtual address currently in the P decision register, a prefetch indication, an indication of whether the primary or alternate address has been selected as target for interstorage transfer, and also the stack source to which the request applies. Lines 3090 and 3092 from the P decision logic outgate fetch data from P fetch data register 1 or P fetch data 2 to the P Requestor. Bus 3094 is connected from the P decision register and the P decision logic output to the P requestor and contains lines which indicate the destination of the data and that the data transfer is valid. Line 3098 is connected from the P decision logic output to the R transfer priority and comprises an interstorage transfer request. Bus 3015 is connected to the Q request stack to set the interlock vector bits to zero in the various levels of the Q request stack after a request is completed.

Bus 3010 is connected from the P decision logic output to the P request stack. This bus contains wires which set the appropriate interlock vector bits to zero in the respective levels of the P stacks; set the D and T bits after it is known that the desired line is in HSS and that data or tags are to be stored, set the primary and alternate bits, and set the change, not in-transit, hot, PX, W and interstorage transfer initiator bits; transmit the prefetch address and ingating for the prefetch address for the situation in which a dummy request is to be set up for a prefetch, and also reset the control bits in the various request stack levels to zero.

Replacement Algorithm

Referring to FIG. 35A, there is seen hardware embodying a replacement algorithm which is used when it is determined that a desired line is not in HSS, and it is necessary to select either the primary or alternate line into which to transfer the desired line from MS.

Buses 3082 and 3084 contain the tags from fetch tag registers 1 and 2, respectively. Line 756 is an indicator that tag 1 is valid. Line 756 is connected as an input to inverter 5500, the output of which is connected to OR 5514. The output of OR 5514 is a gating line to gate 5522. Line 756 is also connected as a gating line to gate 5508. Line 770 is an indication that tag 2 is valid. Line 770 is connected via inverter 5502 as one input to gate 5508, the corresponding output of which is an input to OR 5516. Line 770 is also connected as a second input to gate 5508, the corresponding output of which is an input gating line to gate 5510. Line 768 is an indication that tag 1 is "hot." Line 768 is an input to inverter 5504, the output of which is an input to gate 5510, the corresponding output of gate 5510 is an input to OR 5514. Line 768 is also directly connected to gate 5510, the corresponding output of which acts as a gating line to gate 5512. Line 774 is an indication that tag 2 is Line 774 is connected via inverter 5506 as one input to gate 5512. The corresponding output of gate 5512 is an input to OR 5516. Line 774 is also a direct input to gate 5512, the corresponding output of which is an input to OR 5528. Lines 5518 and 5520 come from the true and complement sides of the VA 27 bit, and both are inputs to gate 5522 and 5532. Line 5524 from the complement of VA27 is an input to OR 5528. Line 5526 which is from the true side of VA27 is an input to OR 5530. Line 5542 which is essentially from the true side of VA 27 is an input to OR 5528, while line 5544, which is essentially from the complement side of VA27 is an input to OR 5530. The output of OR 5528 is line 3096 which indicates that the primary has been selected as the target for interstorage transfer, while line 3906 is a line indicating that the alternate position in HSS has been selected as the target for the interstorage transfer.

P Decision Unit Operation

Decision unit operation will be explained with regard to FIG. 35, 36 and 37. Referring to FIG. 36A, it is seen that the first step 620 of the decision logic is to test whether the Reset Decision Control indication, which is wire 720 from the R transfer unit, is 1. If it is, all decision control bits will be reset to zero, for the request in the P Decision Register. This is because the interstorage transfer mechanism is about to change a tag in the tag storage. Thus, it is necessary to stop any requests which might conceivably refer to that tag, in order to preserve data integrity. This reset wipes this request out of the decision register in case it might have referred to the about-to-be-changed tag. This is done in step 622. If the Reset Decision Control indication is not 1, then test 624 determines whether the Decision Register VAL bit is equal to 1. If it is not, it means there is not valid information in the decision register and that a request must be gated thereto. Therefore, test 626 determines whether the tag which has been fetched, hereinafter referred to as the fetch tag, is valid. This is done by testing wire 3900 from the P decision register. If it is valid, then the request which initiated the fetching of these tags, and of which there is a copy yet resident in its level in the request stack, is gated in step 628 to the decision register. It will be recalled that the information relative to stack source was in the P tag cell for this purpose. Step 630 then sets the DRV bit, and test 632 determines whether the operation is a fetch operation. The virtual address in the decision register is compared with both tags as they become valid. This can be done by any well-known comparator which gives an output indicative of equal comparison.

If the operation is a fetch operation, step 636 determines whether the sequence interlock bit is on for this particular request. It will be recalled that the request, when ingated from the P requestor, may have bypassed waiting in the request stack, thereby being gated directly to the priority area and the sequence interlock generator concurrently. The request, then, could have successfully contended for priority concurrently with sequence interlock determination. Therefore, any sequence interlock would not have been discovered in time to prevent the request from progressing to the decision area. Test 636 tests for this eventuality. If the sequence interlock bit is on the request service will be aborted, and test 658 tests to determine whether the fetch data is valid. If it is not, a stop point is reached and the decision unit will begin again on the next cycle. This is because the tags may be gated to the decision unit before the data, and it is required to await the arrival of data before either completing the decision function or, in the present case where the sequence interlock bit is set, before re-initiating the request in the request stack and invalidating the request in decision. Therefore, if the fetch data is not valid, a stop point is reached and the decision unit begins again the next cycle to await the arrival of valid fetch data. On the other hand, if test 658 determines that the fetch data is valid, then it is permissible to reset the priority accept bit in the stack source level for this request, in order to allow it to contend again for priority after its sequence interlock vector indicates that it is appropriate for it to contend again. Step 662 then sets all decision control bits to zero to invalidate the request and to begin anew on the next cycle.

If test 636 determines that the sequence interlock bit for the request now in the decision register, a copy of which is also in its level in the request stack, is not on, then test 638 tests to see whether the fetch data from the primary and alternate locations in high-speed storage are in the fetch data registers. That is, a test is made to see whether the fetch data ia valid. If not, the decision unit begins anew. If yes, then test 640 determines whether the identifier in the tag in fetch tag register 1 has compared with the virtual address from bus 752 of the decision register by checking the comparator output mentioned above. If the tags compared, then it indicates that the data being sought is resident in the line of data corresponding to the tag in tag register 1, which tag was just gated out of either the primary or alternate locations of the tag store. Test 642 then tests to determine whether the tag which was just found to have compared is valid. If it is, then test 644 tests the in-transit IT bit of the tag. If the IT bit is a 1, it indicates that the contents of the line which should be in the physical location of high-speed storage is actually in transit between high-speed storage and main storage due to an interstorage transfer. Therefore, the data which is presently in this location in high-speed storage is the incorrect data and cannot be gated out to the requestor. It is further evident that this interstorage transfer has been initiated by the request which is termed the interstorage transfer initiator. This interstorage transfer initiator may, or may not, be the current request in the decision register. Therefore, test 816 tests to determine whether the request currently in the decision register is the interstorage transfer initiator. If it is not, then an effort must be made to protect the interstorage transfer initiator request by setting the wait (W) bit in this current request in its request stack level so that it must await the servicing of the interstorage transfer initiator request. This insures that a request subsequent to the ISI, such as the one currently in the decision register, will not again possibly move data out of the location in high-speed storage before the interstorage transfer initiator gets the data for which it initiated the currently in-progress interstorage transfer. Therefore, test 840 determines whether the interstorage transfer is busy by testing wire 1058 from R transfer unit 4016. If it is not busy, it indicates that the transfer is complete, but that the interstorage transfer initiator has not yet been completely serviced. Therefore, all decision control bits are set to zero and the priority accept bit (PX) in the current request in its level in the request stack is set to zero so that it must contend again. This is done in steps 842 and 846. This sets the stage for the interstorage transfer initiator request to be serviced before the current request. On the other hand, if test 840 indicates that the interstorage transfer is busy, this means that the interstorage transfer is still in progress. Therefore, it is necessary to set the wait bit for the request currently in the P decision register. Step 844 sets all decision register control bits to zero, while step 848 resets the PX bit to zero in the appropriate stack level. Step 850 sets the W bit to 1 in the request in the request stack level since it is not the interstorage transfer initiator and has to wait its turn until the interstorage transfer initiator is complete.

On the other hand, and referring back to test 816, if the interstorage transfer initiator bit in the decision register is currently a 1, it indicates that this request is the interstorage transfer initiator. Therefore, it will be serviced before any other request to the same high-speed storage physical address is serviced. Steps 818, 820 and 822 decode bits 27 and 31 which indicate whether the primary or alternate physical address of tag store or HSS has been specified. Depending upon the decoding of these bits, either step 824 or 826 outgates the fetch data from the appropriate fetch data register and step 828 sets the data transfer valid line to the requestor. It is then necessary to update the tags to indicate that the line is not in transsit ($\overline{IT}$ equal to 1) and, since the line of data has just been accessed, that it is hot (H= 1). This is done by setting the just-mentioned bits, as well as the T bit, indicating that the tags are to be stored into, and the bit indicating whether the data is alternate or primary in the copy of the request which is still in its level in the request stack. This is done by steps 832 and 834. Step 836 resets the PX bit and all decision register controls are reset to zero in step 838. The request itself, although the fetch data has been sent to the requestor, remains in the request stack and will again contend for priority to store the updated information including $\overline{IT}$ into the tag as indicated in either steps 832 or 834. Thus the ISI is protected by being the only request to reset the IT bit in the tags after an interstorage transfer. Any other requests trying for this data line will find the IT bit on and, thus, have to wait for the ISI (interstorage transfer initiator).

Returning to test 644, if tag 1 did not have its IT bit set to a 1, then test 646, 648, and 650 would decode whether the request referred to the primary or alternate physical address and outgate the fetch data from the appropriate one of fetch data register 1 or fetch register 2 in steps 652 and 654. It would then set the data transfer valid line in step 656 to the requestor, and that would be the end of the fetch operation. There would be no need to update the tags, inasmuch as there is no line in transit as there was relative to steps 832 and 834. Concurrently with step 646, step 664 decodes whether the virtual address refers to word 1 in a line of data. This is done by testing line 2060 from the P decision register. It can be seen from FIG. 34B that line 2060 is an output of an AND gate which essentially decodes the fact that this virtual address refers to the first word of a line by the fact that VA bits 28–31 are all 1's. If it is not, then test 666 determines whether the H, or hot, bit is on in the tag. If it is, then there is no need to set it to 1 because it means that this line has already been marked as hot, having recently been accessed. Therefore, step 678 resets all control bits in the stack level which contains this request. Step 680 resets the interlock vector bits corresponding to this stack level in appropriate stack levels of the P and Q request stack, and step 676 resets all decision control bits to zero. At this point, the fetch operation is complete and the request has been essentially erased from the request stack and interlocks until this request has been removed.

On the other hand, if test 666 indicates that the hot bit was not on in the tag, then test 668 determines whether the primary or alternate physical address is referred to and sets up the H bit for the alternate address, along with the store tag (T) bit in 670 or for the primary address in step 672 and resets the PX bit to zero in the appropriate stack level by step 674. Then step 676 resets all the decision control bits to zero. What this has essentially done was to set up in the appropriate stack level of the P request stack containing a copy of this request the tag information which must be stored into the tag storage at this address. Then on a future cycle, the request will again contend for priority; the fact that the T bit is on will be detected and the H bit, set up in step 670 and 672, will be stored into the appropriate tag which will then end the operation for this request. It will be noted that in the sequence starting with steps 668, the stack level control bits and the interlock vector bits were not reset as they were with the steps beginning with steps 678. This is because, as just mentioned, for this situation the request will not be completed until it contends successfully one more time for priority in order to store the tag bits.

Returning to step 664, if it is determined that the virtual address does refer to word number one of a line, then it is necessary to prefetch the next line. This is done on the assumption that if a request accesses the first word in a given line, it is logical to assume that the next line will also be accessed shortly. Therefore, the next line will be brought in, if it is not already in high-speed storage. Therefore, the prefetch sequence begins at step 974. Step 974 operates to ingate the prefetch address to the stack source. As can be seen from FIG. 34B, this can be done by prefetch address generator 1074 which essentially adds one to the virtual address currently in the decision register. Output bus 1076 contains the prefetch address generator, along with the appropriate stack source from one of lines 740, 742, 744 or 746, and is gated to the appropriate stack source level. The F and S bits will be turned off in that stack source level in order to essentially flag the request as a dummy request which will ultimately end up as a prefetch. This is noted in step 976 of FIG. 35H. Step 978 resets the PX bit for that request in the request stack so that it can contend just as a regular request would, with the exception that it is a prefetch rather than a regular request. Step 980 resets all decision control bits and step 982 resets the bits in the interlock vector to zero for the appropriate stack source levels.

Returning to test 640, it can be seen that if tag 1 did not compare, or if tag 1 did compare and test 642 indicated that tag 1 was not valid, then the next step is 682 which tests to see if tag 2 compares with the virtual address currently in the decision register. If it does, then 684 tests to see if the tag was valid. If it is, then step 686 is performed for tag 2, which corresponds to step 644 which was performed for tag 1. The sequence of steps beginning with step 686 is therefore similar to those beginning with step 644 and need not be further explained.

Store Operation

Referring back to step 632, if it was determined that the operation of the request currently in the decision register is not a fetch operation, then test 634 tests to see whether it is a store operation. If it is a store operation, the next test is test 852 of FIG. 36E. Test 852, the beginning of the store sequence, tests to see whether the sequence interlock bit is equal to 1. If it is, then steps 854 and 856 reset the PX bit in the request stack and reset all decision register control bits to zero. As explained previously with respect to the fetch operation, the sequence interlock bit can be a 1 if the request itself has bypassed waiting in the request stack and goes directly to priority, the interlock not being discovered until the request has successfully contended for priority; and, hence, the request will not be invalidated until the present step. On the other hand, if test 852 indicates that there is no sequence interlock for this request, then test 858 tests tag 1 for equal comparison with the virtual address in the decision register. If the comparison is successful and test 860 indicates that tag 1 is valid, then test 862 tests to see whether the IT bit is 1 in the tag. If it is, it means that the data for this line is in transit, much the same way as step 644 did for the fetch instruction. If the IT bit is not a 1, then 864 tests to see whether storage protect override is equal to 1. If it is, it means that this line of data is not storage protected; and test 866 then determines whether the primary or aternate test is to be stored into. Steps 868 and 870, respectively, set up the store data (D) bit; and the primary or alternate bits, depending upon the results of test 866, will be set into the request at its level in the request stack so that the next time it successfully contends for priority it will store the data which corresponds to this request. Test 872 then tests the Changed (CH) bit in the tag. If the CH bit is equal to 1, it means that the physical address has already been stored into previously and the change bit has already been set and therefore need not be set up again. Hence, test 874 will then test to see whether the hot (H) bit is a 1; if not, the store tag (T) and the hot (H) bits are set to 1 in the appropriate stack source level by step 876. On the other hand, if test 872 indicates that the changed bit is not one, then step 878 will set up the T, CH and H bits to a 1 for insertion into the stack source level for this request. Finally, if the H bit was determined in test 874 to already be on, it need not be set up for insertion into the tags. Summarizing, step 876 indicates that the tag must be updated to indicate that the line being accessed in high-speed storage is hot. Step 878 indicates that the CH and H bits in the tags must be updated, and thus this information is inserted into the stack source level for the request. The yes output of step 874 indicates that no tags need be stored into. These three outputs all converge at step 880 which resets the PX bit to zero in the appropriate stack source level, and then step 882 sets all decision control bits to zero. The next time this request contends for priority from its position in the request stack, the D bit will be on by virtue of either tests 868 or 870. This indicates that the requested physical address in high-speed storage is ready to accept the store data. Further, depending upon which, if any, tags were set on, the tags will be updated for this physical address in high-speed storage.

On the other hand, if test 884 indicated that tag 1 had its storage protection bit on, than a storage protection exception bit could be set to 1 as in step 886 and the requestor so notified. Steps 888 – 892 would then reset all control bits in that level of the request stack which held the request, would set the interlock vector bit corresponding to this level to zero in the levels which are interlocked to this level and set all control bits to zero in the decision register so that a decision cycle can begin on the next cycle. On the other hand, if tag 2 did not compare in test 860, then the next step is test 894. The steps following test 894 are the same as the tests following step 860 and need not be described further. The exception being that if test 894 indicates that tag 2 does not compare with the virtual address, then the next step is the interstorage transfer sequence because of the fact that both tag 1 and tag 2 have not compared with the virtual address by virtue of a negative result from test 860 and 894. Interstorage transfer begins at step 984 and will be discussed separately in another section.

Returning to step 862, if it were determined there that the IT bit of tag 1 was on, then it means that the line of data which should be in the associated physical address in high-speed storage is in transit from main storage. Hence, proceeding to step 930, it must be determined whether this request presently in the decision register is the interstorage transfer initiator. If yes, it will be given priority to access this line of data. Therefore, test 930 tests the ISI bit in the decision register. If it is on, test 932 checks virtual address bit 27 to determine whether it is the primary or alternate physical address which is being referred to. Depending upon which of the two addresses is being referred to, steps 934 and 936 set up the D bit, and then either the P or A bit, in the copy of the request currently resident in its level in its level in the request stack. Ten step 938 will set up the T bit, the $\overline{IT}$ bit, the H bit, and the CH bit in the copy of the request in the request stack. Step 940 will reset the PX bit in the copy of the request in the request stack, and step 942 will set all the control bits in the decision register equal to zero and thus wipe this request out of the request stack. The function of all this will be that the next time this request in the request stack contends for priority, it will be noted that it has priority to access data (D bit will be on) and either the primary or alternate address, depending upon whether the P or A bit has been set up in 934 or 936. The T bit will indicate that, once priority is given and the decision unit indicates that the IT bit in the tag is not 1, then the $\overline{IT}$ will be stored into the tag along with the H bit since the request is currently hot, or being accessed, and the CH bit, since the line of data is being changed by having data stored into it by this store request. The function of step 940 of setting the PX bit to zero will allow the copy of the request in the request stack to contend for priority.

On the other hand, if test 930 indicates that the ISI bit is not a 1, it indicates that this request in the decision register is not the interstorage transfer initiator. Test 944 then determines whether the interstorage transfer is complete. If it is complete, then the W bit for the copy of this request in the request stack is set to 1 so that it will have to wait completion by the interstorage transfer initiator once the interstorage transfer is complete. If the interstorage transfer is not complete, then the next step would be 948 which sets the PX bit to zero and 950 which sets all the control bits in the decision register to zero to wipe this request out of the decision register. Thus, by virtue of setting the PX bit to zero in 948 this request will be able to request priority again. Once it successfully contends for priority, test 862 or 898 in the decision unit will determine whether the referred-to line of data is in transit. If it is not, then this request will be allowed to store its data. If it is in transit, then step 930 will be performed again. The sequence will be continued until the request is finally given access to store its data.

If test 952 finds the ISI bit on, then the steps starting with 954 are taken, which function similarly to the steps beginning with 932, previously explained.

Interstorage Transfer

If neither tag has compared, as indicated by the no-output of either tests 894 or 896 of FIG. 36F, it means that the required line of data into which data is to be stored for this store request is not available in either the primary or alternate physical addresses in high-speed storage; and, therefore, an interstorage transfer must take place. The same is true for a fetch if tests 682 or 684 of FIG. 36B and 36C result in a no output. Therefore, test 984 begins a sequence in which the proper control bits are set up in this request for an interstorage transfer. Test 984 checks to see whether the interstorage transfer mechanism is busy by testing wire 1058 from the interstorage transfer mechanism. If it is not busy, test 986 checks to see whether the P decision unit has been given priority to initiate an interstorage transfer. It will be recalled that R has priority over P which has priority over Q. If the R (interstorage) transfer unit is not contending for transfer priority to perform one of its random replacements, then P will be given priority to initiate an interstorage transfer. But is the interstorage transfer unit does have priority, then test 1002 resets the PX bit in the stack; and step 1004 sets all decision control bits to zero. Since this request cannot get to the interstorage transfer unit, then it is essentially recycled to begin again through the priority unit until such time as it can gain access to an interstorage transfer. On the other hand, if test 986 indicates that the P port has priority to initiate an interstorage transfer, then step 988 sets the interstorage transfer initiator (ISI) bit to 1 in the copy of the request in the request stack; and step 1000 sets the W bit to 1. Steps 1000 and 988, respectively, set the control bits to indicate that although this request is waiting, it is also the interstorage transfer initiator and, therefore, gets first priority to access the data once it is transferred in. The next steps are 1002 and 1004, which merely set the PX bit to zero in the appropriate stack level and the decision register control bits to zero so that the decision unit can take the next request. The setting of the PX bit to zero will allow this request to go to the priority unit again subsequently after the interstorage transfer is complete.

Primary/Alternate Selection

When it is determined that an interstorage transfer is to be made, the primary or alternate HSS line must be selected for the new data to be brought in from MS. This is done by the selection hardware described above in FIG. 35A associated, in the present embodiment, with the decision register. In that figure, the tags are inspected. If tag 1 indicates that line 1 is empty (i.e., Tag 1 invalid, indicated by an output from inverter 5500, then the primary or alternate is selected, depending on the value of $\overline{VA27}$ and VA27, respectively, sampled in gate 5522. If line 1 is occupied and line 2 is empty as indicated by an output from inverter 5502, the primary or alternate line is selected based on the value of VA27 and $\overline{VA27}$, respectively, sampled in gate 5532. If both lines are occupied, indicated by an active enabling line input to gate 5510, then the hot bit is sampled for tag 1. If the line (1) is not hot, then the primary or alternate line is selected by sampling $\overline{VA27}$ and VA27, respectively, in gate 5522. If both tags are valid and tag 1 is hot but tag 2 is cold, as indicated by an output from inverter 5506 and an output on the enabling line to gate 5512, then the primary or alternate line is selected by sampling VA27 and $\overline{VA27}$, respectively, in gate 5532. If both tags are valid and both are hot, then the primary line is selected as the target is indicated by the activation of line 5540.

Another choice of target HSS line scheme which could be used would include looking at the Changed bit for both tags. Hardware to do such could be built by one of ordinary skill in the art by the following disclosure:

1. If only one line is filled, choose the empty line. If both lines are empty, choose the primary line. 2. If only one line is hot, choose the cold line. 3. If only one line is changed, choose the unchanged line. 4. Otherwise, choose the primary line.

Prefetch

It will be recalled from test 634 of FIG. 35A that if the store operator bit was not a 1, then, since test 632 had previously indicated the fetch operator bit was not a 1, the system is in prefetch mode. That is, on a previous cycle it had been determined that the word requested was the first word of a line. Therefore, it was anticipated that it was probable that the next line would ultimately be requested. Therefore the fetch and store operators in the request were reset to zero in the request stacks to set up a dummy request which will be used as a prefetch. When this situation is detected in step 634, then the next step is test 1006 which will set up prefetch information. A prefetch is essentially an interstorage transfer. Test 1006 checks to see whether the virtual address in tag 1 has compared with the virtual address for this request. If it has, and if test 1008 indicates that the tag is valid, then test 1010 tests to determine whether the data corresponding to that virtual address in high-speed storage is in transit by checking the IT bit in the tag. It will be recalled from step 974 that in the initial phase of a pre-fetch, the virtual address in that request in the request stack was incremented by 1. Step 1006 then tested the virtual address in tag 1, which was accessed by this updated address in the dummy request for equality. If it were equal and if test 1010 indicated that the IT bit for that tag was not 1, then it means that the anticipated line is already in high-speed storage; and no interstorage transfer for prefetch may be performed. Therefore the prefetch is complete, and steps 1062 and 1064 of FIG. 36J reset the stack source control bits and the decision register control bits to zero, and operation can continue on the next cycle for another request. On the other hand, if test 1010 indicated that the IT bit is 1 in the tag, it means that although the anticipated line of data is in high-speed storage, it is presently in transit and therefore is not valid. Therefore, test 1012 checks to see whether this request is the request which initiated this prefetch, by checking the ISI bit. If the ISI bit is not a 1, which means that this request is not the interstorage transfer initiator for this prefetch, then it is not worth the time and effort to continue; and tests 1062 and 1064 essentially end the prefetch. On the other hand, if the ISI bit is a 1, it means that this request was the request which initiated the interstorage transfer which, in this case, is a prefetch. Therefore test 1014 tests to see whether the physical address is the primary or alternate. In steps 1016 and 1018 the interstorage transfer initiator sets up the bits in the request stack which must be stored. For example, step 1016 indicates that the alternate tag, T,A, must be stored and that the bits in that tag which are to be stored are the $\overline{IT}$ and the H bits, which are both to be set to a 1 to indicate, respectively, that the next time this line is accessed, the tag will show it is not in transit, and that it is hot inasmuch as it has just been accessed. Steps 1020 and 1022, respectively set the PX bit and the decision register control bits to zero.

Returning to test 1006, if it is determined that either tag 1 did not compare with the virtual address in the dummy request or that tag 1 did compare and was invalid, then steps 1024 and 1026 essentially perform the same tests for tag 2. If the tag does compare and is valid, then test 1028 checks to determine whether the IT bit is on. If it is on, then the tests beginning with 1030 are performed which serves the same function for tag 2 as the tests which begin with test 1012 serve for tag 1. On the other hand, if tag 2 did not compare in test 1024 or if it was not valid in test 1026, this indicates that, since both tags have now been determined not to compare with the virtual address in the dummy request, then the anticipated line of data is not in high-speed storage. Therefore, test 1038 checks to see whether this dummy request is the interstorage transfer initiator. If it is, then it means that the interstorage transfer for this prefetch is currently in operation and therefore the dummy request is no longer needed for the prefetch. Hence, steps 1052 and 1054 of FIG. 36J essentially wipe out the prefetch by setting the proper control bits to zero. On the other hand, if it were not the interstorage transfer initiator, the exit from test 1038 would be to test 1040. Test 1040 determines whether the interstorage transfer unit is busy. If it is, then it is not worth the time to wait around and perform the prefetch, and the dummy request is essentially wiped out again through steps 1052 and 1054. If the interstorage transfer unit is not busy, then step 3894 sets the interstorage transfer request for the P decision unit in the transfer priority to 1, thus requesting the use of the interstorage transfer. Concurrently, test 1042 determines whether the PX bit from the transfer priority is a 1. This indicates whether or not priority to use the inter-storage transfer unit has been given. If it has not, then again it is not worth the time to wait for the prefetch; and steps 1052 and 1054 are again taken. If the PX bit is a 1, then step 1044 sets the ISI bit for this dummy request to a 1 in the stack source level. Step 1046 sets the Wait bit to a 1 for this dummy request. Step 1048 sets the PX bit to a zero for this request and test 1050 essentially resets the decision register control bits. This sets up the dummy request in the request stack where it will contend again for priority. It will ultimately come through test 1038, explained above, and determine that the ISI bit is 1. It will then essentially wipe itself out of the request stack by steps 1052 and 1054, thereby completing the prefetch.

INTERSTORAGE TRANSFER UNIT

The interstorage transfer (RP unit is the unit which transfers data between main storage and high-speed storage. If it is determined that a particular virtual address which is requested is not resident in either the primary or the alternate address in high-speed storage, then an interstorage transfer is performed. Broadly, the decision unit via hardware in FIG. 35A determines whether the primary or the alternate address in high-speed storage is the target address into which the line of data corresponding to the virtual address will be brought in from main storage to high-speed storage. It then checks the tag of that selected line and if the Changed bit (CH) is on in that line, it means that the line has been stored into and thereby changed since it was last brought in from main storage. Therefore, there is not a copy of that line resident in main storage, and it must be relocated to main storage to preserve system data integrity. Hence, if the changed bit is on for the selected line in high-speed storage, that line of data is moved out into main storage. The line in main storage corresponding to the requested virtual address is then determined and moved into the selected line in high-speed storage On the other hand, if it is determined that the selected line in high-speed storage does not have its Changed bit on, it means that this particular line has not been stored into since it was last brought in from main storage. Therefore, an identical copy of this line is already in main storage; and all that needs to be done in the interstorage transfer is to determine, from the directory, the main storage physical address of the virtual address being sought and transfer the line corresponding to the sought-after virtual address into the selected line in high-speed storage.

Main Storage-High Speed Storage Interface

Referring now to FIG. 29, there is seen a representation of the main storage-high speed storage interface. It will be recalled that a line of data comprises 16 words of data. A line of data when resident in main storage comprises four basic storage modules (BSM), namely, A, B, C and D. The words are numbered, as shown, leftwardly from word 0 through word 15. As previously mentioned, when an interstorage transfer takes place, the HSS primary line or the HSS alternate line in high-speed storage is selected. The HSS primary line comprises HSS addresses $n$ and $n+1$, while the HSS alternate line comprises HSS addresses $m$ and $m+1$. If the tag in tag storage for the selected line indicates that the high-speed storage line has not been changed, then the 16 words are directly transferred from main storage to high-speed storage in four MS cycles, namely, A, B, C and D, corresponding to one cycle per four main storage BSM's. There are, therefore, four data words transferred per cycle. If the line which was selected is the primary line, then on cycle A words 0 – 3 are transferred to HSS BSM's 0 – 3. On cycle B, words 4 – 7 are transferred to HSS BSM's 4 – 7. These eight words all go to a single physical address, namely, n in FIG. 29. On cycle C, words 8 – 11 are transferred from main storage to high-speed storage BSM's 0 – 3; and on cycle D, words 12 – 15 are transferred to high-speed storage B as same as D 4 – 7. The physical address in high-speed storage, now containing words 8 – 15, is $n + 1$, that is, an increment of one address from address $n$. If, on the other hand, the alternate line in high-speed storage were selected to receive the data, then the same words would be transferred on the same four cycles, but they would be cross-gated. That is, on cycle A instead of words 0, 1, 2, 3 being sent to HSS BSM's 0, 1, 2, 3, cross-gating is performed so that word 1 goes to HSS BSM 0, MS word 0 goes to HSS BSM 1, MS word 3 goes to HSS BSM 2, and MS word 2 goes to HSS BSM 3. This cross-gating also continues for cycles B, C and D, as indicated in the drawing. It will be noted from the high-speed storage representation in the drawing that both the primary line and the alternate line are broken into two physical addresses, each separated from the other by one address. However, it will be noted that the high-speed storage primary line and the alternate storage primary line are not necessarily contiguous, but are separated from each other.

Thus, it can be seen that due to the transfer taking four MS cycles, only half of the BSM's in the high-speed storage are busy on any given MS cycle. Therefore, overlap or concurrency is built into the system in that although the transfer itself has priority during any given cycle of the transfer, half of the high-speed storage BSM's are available for gating out to the P or Q sections of the machine so that therefore an interstorage transfer can be going on and a request for the P or Q port can be serviced concurrently. It will further be noted that one of the factors allowing this concurrency is the formats for the primary and alternate line. That is, the cross-gating in the alternate line format requires that only two BSM's need be accessed to gate out a given word in the primary or alternate line. For example, assume that HSS BSM's 0 – 3 are busy during cycle A of an interstorage transfer. Concurrently, a request might be made in the P port for word 4 in the same primary or alternate line. In this case, HSS BSM's 4 and 5 are busy in that word 4 is gated out of the primary line from HSS BSM 4, and word 4 is gated out of the alternate line from HSS BSM 5. Concurrently, the Q port may be requesting word 15. Therefore, word 15 can be gated out of the alternate line from HSS BSM 6 and also gated out of the primary line from HSS BSM 7. Thus, it can be seen that storage requests from the P and Q port are not necessarily halted when an interstorage transfer is in progress.

A conceptual representation of an interstorage transfer can be seen in FIG. 29A. If it is determined that the selected line in high-speed storage has been changed (CH=1), then it is necessary to fetch old data (i.e., the changed line) and by use of the old directory register, to be explained subsequently, to then store the old data in main storage. Thereafter, a fetch new data is performed from the new line in main storage, and a store new data is performed into the selected line of high-speed storage using the new directory register, to be explained subsequently. If the change bit was not equal to 1, then only the fetch new data-store new data sequence need be performed.

Turning to FIG. 30, there is seen a representation of the main store of our invention. As can be seen, the main store is segregated into the four sections mentioned previously, inputs of which come from the main store buffer of FIG. 31. In FIG. 31, it is seen that the main store buffer comprises storage which indicates the main storage address, whether the indicated operation is a fetch or a store, and bits for selecting any of the four modules of main storage. There are four sets of storage areas indicated as store data areas which hold the store data which are to be stored into the various sections of the main storage. The inputs to the store data areas are from the R fetch data registers. Input bus 3128 which transmits bits 25 –27 of the MS address and also the fetch and store and the selection information comes from the R transfer unit to be described in FIG. 40. Buses 3158 and 3160 come from the new directory register and the old directory register of FIGS. 31A and 31B, respectively.

The output of FIG. 30 is the main storage fetch data registers seen in FIG. 30A. As can be seen from FIG. 30A, buses 4230 – 4236 transmit data from sections A – D to MS data fetch registers 1 – 4. The output of these MS fetch data registers, in turn, over buses 3170 –3176 go to the HSS buffers as seen in FIGS. 32 and 32A. The output of the buffers are then connected via buses 4270 – 4284 to BSM's 0 – 7 of the high-speed storage. A detailed representation of a high-speed storage buffer is seen in FIG. 32B.

Turning to FIG. 33, 33A, and 33B, there is seen a representation of the tag storage buffers, the output of which connect to the indicated BSM's of the tag storage. FIG. 33 shows a detailed representation of a tag storage buffer. Inputs to the tag storage buffers are buses 3040 – 3044 of FIGS. 33A – 33B. Each of these buses carry the hash address and the store Change, Hot and Not In-Transit bits, the storage operation-fetch, and the select line for the appropriate tag storage buffers. Bus 3062 are select inputs from the tag storage resolvers. The outputs of the tag storage itself are to the R, P and Q fetch tag registers seen, respectively, in FIGS. 33C, 33D and 33E, respectively. The output of the R fetch tag register of FIG. 33C is bus 3156 to the directory buffer, as well as lines 3132 to the R priority, which indicates primary or alternate format, and lines 2894 and 2888 to the R transfer unit. The outputs of the P fetch tag register of FIG. 33D go to the P decision unit, while the outputs of the Q fetch tag registers of FIG. 33E go to the Q decision unit.

R Priority Unit

Turning now to FIG. 44, there is seen a block diagram of the R priority unit. As can be seen, the R priority unit comprises R priority register and R priority logic 4018-1 which will be seen in FIG. 45. Further included is high-speed storage select decoder 4018–2 of FIG. 46, tag store select decoder 4018–3 of FIG. 47, and nashing logic 4018–4 of FIG. 48.

Turning now to FIG. 45, there is seen a detailed representation of the R priority register and R priority logic. As can be seen, this piece of logic has inputs via bus 3136 from the cold address generator, bus 3130 from the R transfer unit, and line 3132 from the R tag register and 3132 from the new directory register. The R priority register itself contains the virtual address, an F bit and an S bit indicating whether a tag is to be fetched or stored, an F bit and an S bit indicating whether data is to be fetch or stored, and high-speed storage select bits A, B, C and D. It will be recalled from the explanation of the MS/HSS interface of FIG. 29 that when moving words of data between main storage and high-speed storage, the move is accomplished in four MS cycles from areas A, B, C and D of the main storage. Each of these are four-word moves. The first eight words go into physical address n for the primary format, and the second eight words go into physical address *n*+1 for the primary line format. Thus, whenever lines A or B are active in the priority register, high-speed storage address n will be accessed. Whenever bits C or D are active, then OR 6015 essentially adds 1 to the physical address accessed in high-speed storage, the virtual address remaining the same, so that the second eight words will go into the proper physical address within the primary or alternate line.

Continuing with the explanation of the priority register of the interstorage transfer unit, it can be seen that P, primary, and A, alternate, line indicator bits are present, which are connected to the hashing logic and also to the TS select decoder, to select the proper line. The P/A bit, having lines 3874 and $\overline{\textbf{3874}}$ emanating from the true and complement states thereof, are connected to the R high-speed storage cell to control the format of the word being gated into high-speed storage. Line 3874 is also connected to the hashing logic. Also included is the SC or Store Cold bit. The cold generator, to be explained subsequently will periodically turn off the hot bit for the indicidual HSS lines. This will be done by taking an R priority cycle and using the SC bit.

R Transfer Unit

Turning now to FIG. 40, there is seen a block diagram of the R transfer unit, which is the interstorage transfer mechanism of our invention. The R transfer unit comprises R transfer register and R transfer control register 4016–1, seen in detail in FIG. 41; R transfer logic 4016–2, seen in FIGS. 42A – G; and R transfer logic output 4016–3, seen in FIGS. 43A – C.

Turning to FIG. 41, there is seen a detailed representation of the R transfer register and R transfer control register 4016–1. The R transfer register contains the virtual address; a P and A bit; a PF bit, indicating a prefetch is in progress; P stack source bits 1 – 4; and Q stack source bits 1 – 4. This register has inputs from the Q decision via bus 3097 and from the P decision via bus 4014. These inputs are gated from R transfer logic output 4016–3 via lines 2464 and 2466. The output of the transfer register is connected to the R transfer logic output 4016–3 and also an output of the P stack source bits and the prefetch indicator is connected to R transfer logic 4016 of FIGS. 42.

The R transfer control register of FIG. 41 has the following control bits:

Transfer Status

XB — This indicates the transfer unit is busy
FN DR — Fetch new directory register
FO DR — Fetch old directory
FOT — Fetch old tag
SNT — Store new tag FND — Fetch new data
SND — Store new data
FOD — Fetch old data
SOD — Store old data
Directory Register Control
DR AV — Directory Address Valid
ND RV — New directory register valid
OD RV — Old directory register valid
MS Control
SEL A — Select A
SEL B — Select B
SEL C — Select C
SEL D — Select D
MSB — Main storage busy
HSS & Tag Control
SEL A — Select A
SEL B — Select B
SEL C — Select C
SEL D — Select D
XV — Transfer valid
FTV — Fetch tag valid Interstorage Transfer Operation Where Desired High-Speed Storage Data Line Has Not Been Changed Turning now to FIG. 42A, there is seen the beginning of the operation of the R transfer logic. In beginning an interstorage transfer, test 2458 checks to see whether the interstorage transfer unit is busy. This is accomplished by testing wire 2870 from the R transfer control register If the unit is not busy, then steps 2460 and 2462 check P Accept or Q Accept bits from the transfer priority. If neither of these two bits are on, it means that no request for interstorage transfer been accepted from either the P or Q port; and, therefore, a stop point is reached and operation will begin again on the next cycle at step 2458. If test 2460 indicates that a request for interstorage transfer has been accepted from the P port, then step 2464 gates the P decision register contents to the transfer register of FIG. 43. On the other hand, if test 2462 was successful, then test 2464 gates the Q decision register contents to the transfer register. In either event, the next step is 2468 which sets the interstorage transfer unit busy bit equal to 1. The following step is 2470 which sets the fetch new directory register bit in the transfer control register to 1. Step 2472 sets the directory register address valid bit to 1 and ingates the contents of the transfer register to the directory buffer of FIG. 31B. The directory functions essentially as an associative memory, searching through its entries to locate a main storage physical address corresponding to the virtual address transmitted from the transfer register to the directory buffer. When a match is found, the corresponding physical address is gated out into the new directory register for use in accessing the line of data in main storage. At this point, a stop point is reached and a new transfer cycle is begun by performing test 2458. Since the XB bit was set to 1, test 2458 will result in a yes output, so that the next step is test 2476 and other concurrent tests to be described subsequently. Test 2476 checks to see whether the fetch new directory register bit is a 1 in the transfer control register of FIG. 43. Since this bit was set to 1 in step 2740, it will be 1 for test 2476. Therefore, the next step is 2478 which checks to see whether the directory valid bit is on. The directory valid bit is set by line 3114 from the directory. After the directory has completed its search and its output is valid, this bit will be set to 1. If test 2478 determines that the directory valid bit is 1, then the new directory register valid bit is set to 1 in the transfer control register by step 2490, and the contents of the directory will be ingated to the new directory register. The contents of the directory which is ingated to the new directory register is the main store address which will be used to access the line of data in main storage, along with the missing page bit and the storage protect bit. The missing page bit will be set to 1 if a match was not found in the directory. The storage protect bit will be set to 1 if the main storage address is to be storage protected. At that point a stop will be reached, and the next interstorage transfer cycle will begin. On the other hand, if test 2478 indicated that the directory was not yet valid, then step 2480 checks to see whether the New Directory Register Valid bit is equal to 1 by testing line 2876 from the transfer control register. The directory valid bit from the directory will be up for only one cycle and, thereafter, the new directory register valid bit will have been set to a 1 by test 2490. On the next cycle through, then, the directory valid bit will be tested in test 2478 and determined to be not on. Therefore, test 2480 will find the new directory register valid bit on, indicating the new line's MS address is in the New Directory Register. Therefore, test 2480 will proceed to test 2482, which will check to see whether the missing page exception bit is on in the new directory register by testing wire 3112. The purpose of these steps is to determine whether the directory has gone through its search and determined that there was no match in the directory, which indicates that the desired line of data is missing in the directory. If test 2482 indicates that the new missing page bit is not on, then 2484 sets the fetch new directory register bit to 0 and the new directory register valid bit to 0 since they are no longer needed, 2486 sets the fetch old tag bit to 1 and 2488 sets the transfer valid bit to 1. On the other hand, if the new missing page bit was determined to be on in test 2482, then a missing page exception must be set up. However, it is first necessary to determine whether this is a prefetch by operating step 2494. If the prefetch bit is a 1, then no missing page exception need be sent back to the requestor, inasmuch as this is merely a prefetch in anticipation of data to be requested later. Therefore, all that need be done is to set the W bit to 0 in the stack source register, to reset the transfer busy bit to 0 for the beginning of the next cycle and to reset Fetch New Directory Register and New Directory Register Valid. On the other hand, if it were determined in test 2494 that the page is missing and the prefetch bit is not 1, then test 2496 determines whether the P stack source is one. If it is, then a missing page exception is sent back to the P requestor, as indicated in step 2498. If the P stack source was not on, then it indicates that this interstorage transfer was originated by a Q request; and therefore step 2500 sets the missing page exception for the Q port which can be sent back to the Q requestor. Steps 2502 and 2504 then reset the wait bit for the stack source level which caused this interstorage transfer and also reset the transfer busy bit to 0. Step 2505 then resets the fetch new directorys register bit and the new directory register valid bit to 0 since these registers are no longer required, inasmuch as the requested line of data is not resident in main storage.

If the new directory register was not valid in step 2480 or if there was no missing page exception in step 2482, a new transfer cycle will be begun. Step 2458 will then find the busy bit on and will proceed to test 2540 which will find the Fetch Old Tag bit on in the transfer control register, since it was set on in step 2486. It will be fetched in order to set therein information relative to the virtual address of the line being brought in from main storage and put into the corresponding line in high-speed storage. Therefore, the new virtual address and appropriate control bits will be sent to the R priority register and R priority logic of FIG. 45 via the R transfer logic output of FIG. 43C. A priority cycle is taken and the old tag fetched and inserted therein is the new virtual address and also the setting of the in-transit bit.

Returning to FIG. 42C, the tag and data cells for both P and Q port can be reset by step 2542 at this time, as well as the stack level controls for the P and Q stack. This interlocks all requests which are in process by wiping them out wherever they may be (i.e., in priority or decision) and requires them to contend again. This insures data integrity if these requests refer to the line identified by the old tag which is being changed. Step 2550 resets the Fetch Old Tag bit to 0 and step 2552 sets the Store New Tag bit to 1 in the transfer control register. On the next cycle after detecting the transfer busy bit, test 2540 will detect that the Fetch Old Tag is not equal to 1 since the old tag was fetched, above, and this indicator bit has just been set to 0 in step 2550. Therefore, the hardware will proceed to test 2554 which will check to see if the fetch tag is valid. The original setting of Fetch Old Tag bit to 1 in step 2486 set up the proper control information which was sent to the output bus of FIG. 43 to the R transfer logic output and from thence to the R priority area of FIG. 45. As can be seen in FIG. 45, the F or fetch bit would therefore have been set in the tag control bits of the R priority register, and a priority cycle will be taken to gate the required tag out of the tag store into the R fetch tag register. Therefore, step 2554 test to see whether the fetch tag is valid by testing wire 3104 from the R tag cell which, when active, indicates that the tag has been gated into the R fetch tag register. When this tag is valid, then the output of test 2554 will go to step 2556 which sets the tag valid bit to 1 in the transfer control register of FIG. 41. On the next interstorage transfer cycle, after test 2458 finds the transfer busy bit on, then test 2564 of FIG. 42 D will detect that the fetch tag valid is on; and test 2566 determines that the tag is valid in the R fetch tag register by testing line 2888, then the change bit in the old tag is checked in test 2568. If the change bit is not on, it indicates that the old data in the selected high-speed storage line has not been changed since it was last moved into high-speed storage, and therefore it need not be stored back into main storage before the new data from main storage is brought into high-speed storage, as was explained previously in reference to FIG. 29. Therefore, step 2570 will set the Fetch New Data bit to 1 in the transfer control register. Step 2572 sets select A in the MS control in order to gate the first four BSM's of the new data line out of main storage; and step 2574 sets the fetch tag valid bit equal to 0. Step 2576 sets the store new data bit to 1. On the next interstorage transfer cycle, test 2586 of FIG. 42D will detect the Fetch New Data bit on in the transfer control register; and therefore test 2588 will check to see whether the main storage is busy. If not busy, test 2590 will determine whether the Select A bit is one in the MS control section of the transfer control register. Since it was set on in test 2572, the SEL A bit will register on, and step 2592 will reset the SEL A bit and set the SEL B bit to 1. Step 2608 gates the main store buffer which now contains the address to be accessed and also gates information into the main storage data cell of FIG. 29B. This information which is gated in will be, in this case, line 2900 which should be on and also either line 3954 or 3956, depending upon whether the primary or alternate HSS line has been selected. These are stored in the register in the MS data cell; and after a delay equal to the MS access time while the data is accessed from MS, this information flows through to the R transfer logic and also the MS fetch data registers of FIG. 30A as lines 4216 or 4218 which control either straight-through or crossgating of the four words, depending upon which format has been selected, as was explained previously with respect to FIG. 29. On the next interstorage transfer cycle, test 2612 will detect that the store new data bit is on while step 2586 will begin again to go for the next MS BSM by way of 2594. Test 2416 will detect that wire 2908, which was just gated into the transfer logic from the MS data cell, is active, which indicates that the data is valid to be stored into high-speed storage. Therefore, steps 2616 and 2618 on this same first cycle set up the SEL A and transfer valid bits in the HSS and Tag Control section of the control transfer register, which then takes a priority cycle and stores the data in the high-speed storage at the proper address. Steps 2594, 2598, and 2602, in conjunction with steps 2620, 2626, and 2632 gate in main storage BSM's B, C, and D into the proper high-speed storage BSM's. The next cycle through the interstorage transfer, test 2682 will determine that all the MS fetch data valid bits are off, and therefore steps 2636–2644 will reset all the necessary control bits, including the wait bit in the stack source level which initiated the interstorage transfer, inasmuch as the interstorage transfer is now complete.

Interstorage Transfer Where High-Speed Storage Data Line Has Been Changed

If the data line in high-speed storage into which the new data is to be stored has itself been changed, then test 2568 will have determined the changed bit to have been a 1 in the tag. Therefore, steps 2578 – 2584 will set the Fetch Tag Valid bit to zero and set the Fetch Old Directory register indicator, as well as setting the Directory Address Valid bit equal to 1 and ingate the virtual address from the tag into the directory buffer, after which the directory will begin its search. On the next cycle through the interstorage transfer mechanism, test 2510 will detect the Fetch Old Directory Register bit to 1, inasmuch as it has just been set to 1 in step 2580.

If the directory has completed its search, then test 2512 will determine that the directory register contents (the MS address for relocating the old data from HSS) are valid. Steps 2528 and 2530 will then set the Old Directory Valid bit to 1 in the transfer control register and ingate the contents of the Old Directory Register into the MS address portion of the main store buffer of FIG. 31. On the next interstorage transfer cycle, test 2514 will determine that the Old Directory Register is valid and cause test 2516 to check the missing page bit. If the missing page bit is on, it means that the contents of this location in main store is missing. Therefore, action can proceed as if the changed bit had not been on in the tag for the HSS line. Therefore, steps 2532 reset the Fetch Old Directory Register and the Old Directory Register Valid bits and set the Fetch New data bit to 1 and the SEL A bit for the MS control to 1 and also set the Store New Data bit to 1. The next cycle of the interstorage transfer mechanism will begin the fetching of new data from main storage and the storage of new data into high-speed storage as was previously discussed in the steps beginning with tests 2586 and 2612, respectively.

On the other hand, if test 2516 indicates that the old data in main storage is not as a missing page, then steps 2518 – 2527 reset the Fetch Old Directory Register and Old Directory Register Valid bits in the transfer control register, set up the Fetch Old Data bit and the Store Old Data bit. They also set up Select A for high-speed storage in the transfer control register, the transfer valid bit and the main storage busy bit. This sets the stage for moving the changed target line contents from HSS to MS as a prelude to the MS to HSS transfer. On the next cycle through the interstorage transfer, a cycle by cycle transfer will be initiated between HSS and main storage by virtue of the steps beginning with test 2650 fetching out the old data from high-speed store and those beginning with 2670 concurrently storing that same data into main storage, observing appropriate timing and priority as explained above relative to the MS HSS transfer without a changed line. The new data is fetched from main storage and stored into HSS by the interplay of steps 2586 and 2612, as explained above.

Cold Generator

It will be recalled that the hot bit indicates whether or not the line in high-speed storage has recently been referenced. When the line is originally brought in from main storage, the Hot bit is reset or made cold by way of the store cold (SC) bit of the R priority register of FIG. 45. When that newly brought-in line is referenced, the bit is set to hot. Every eight cycles, the cold generator generates a random tag entry address. The tag is fetched and the SC bit of FIG. 45 operates to reset the hot bit. It will be appreciated that HSS lines are usually used in clusters according to the dictates of the program being executed. The cold generator ultimately resets the hot bit for every HSS line over a period of time. If the line is not used soon thereafter, it remains cold and is a candidate for replacement. However, if it is in one of the in-use clusters, it will again be referenced by a request and set hot, thus destroying its current candidacy for replacement when an interstorage transfer is required.

The cold generator will be described with respect to FIG. 38. In that figure is seen a counter which emits a Cold Generator Valid signal every eight cycles. Equivalently, a random number generator or any other suitable address source could be used. When the cold Generator is valid, that generated virtual address (VA1–27) is gated to the R priority register and R priority register of FIG. 45, along with the Primary Selected and Store Cold bit if the XV line in FIG. 45 is not valid (to make certain there are no cold generator conflicts with a valid interstorage transfer). An R priority cycle is taken, and the hot bit for that HSS line is reset to zero in the corresponding tag. As mentioned above, subsequent reference of that line will set the hot bit to its hot condition.

While the invention has been particularly shown and described with reference to a preferred embodiment thereof, it will be understood by those skilled in the art that various changes in the form and details may be made therein without departing from the spirit and scope of the invention.

What is claimed is:

1. In a storage system including a plurality of input ports for receiving access requests from a plurality of requestors, request stacks for temporarily storing said requests while they are being serviced, high-speed storage means against which said requests are processed, tag storage means serving as an index to the information in said high-speed storage, main storage means containing system information, priority contention means for allowing requests to contend for access to tag and high-speed storages, decision means for determining whether said desired information is resident in said high-speed storage means, and interstorage transfer means for transferring said data from said main storage to said high-speed storage if said desired data is not resident in high-speed storage, the improvement comprising:

sequence interlock generating means connected to said inputs and to said request stacks and including means for comparing each incoming request with prior requests stored in said request stacks and with any concurrent request from any other requestor and means for calculating, a single time only for each incoming request, a sequence interlock vector identifying with other requests in said request stacks must be serviced before an incoming request can be serviced.

2. The combination of claim 1, further including means for concurrently feeding an incoming request into an empty request stack level in the respective request stacks in said request ports;

means for appending each said sequence interlock vector to its request;

means for setting a sequence interlock bit in each incoming request whose sequence interlock vector is not zero;

means for periodically resetting to zero individual bits in the sequence interlock vector for each individual request as individual requests to which said individual requests are interlocked are serviced; and means for allowing an interlocked request to contend for service when all of the bits in its interlock vector have been reset to zero.

3. The combination of claim 1 comprising:

a plurality of registers for holding said plurality of incoming requests;

said comparing means includes a plurality of comparators connected to said plurality of registers and to each level in said plurality of request stacks for comparing the address portions of said incoming requests to the address portions of each of said requests in each of said levels of any of said plurality of request stacks;

means responsive to an equal comparison in any of said comparators for setting a bit in said interlock vector for said request, said bit corresponding to the request stack designation and request stack level to which said request is interlocked; and means responsive to any comparison for setting a sequence interlock bit in said incoming request.

4. In a storage system including a plurality of input ports for receiving requests from a plurality of requestors, multi-level request stacks for temporarily storing said requests while they are being serviced each level of said request stacks having associated therewith an interlock vector including a settable sequence interlock indicator, high-speed storage means against which said requests are processed, tag storage means serving as an index to the information in said high-speed storage, main storage means containing system information, priority contention means for allowing requests to contend for access to tag and high-speed storages, decision means for determining whether said desired information is resident in said high-speed storage means, interstorage transfer means for transferring said data from said main storage to said high-speed storage if said desired data is not resident in high-speed storage, and sequence interlock generating means, the improvement comprising:

means for providing a signal if any of said plurality of request stacks to which said incoming requests are destined are empty;

means responsive to said signal for gating said incoming requests destined for said empty request stacks directly to said priority contention means and to said sequence interlock generator;

testing means in said decision means for providing a signal if said sequence interlock indicator is set; and means responsive to said last-named signal for invalidating requests gated directly to said priority contention means.

5. The combination of claim 4 further including:

testing means providing a signal if any non-empty ones of said plurality of request stacks has no request available for priority contention;

means responsive to said signal for gating said requests destined for said any of said non-empty ones of said plurality of said request stacks directly to said priority contention means, to said sequence interlock generator and to a level in said request stack; and testing means in said decision area for invalidating any request gated directly to said priority contention means if said sequence interlock bit is on.

6. In a storage system including a plurality of input ports for receiving requests from a plurality of requestors, request stacks for temporarily storing said requests while they are being serviced, high-speed storage means against which said requests are processed, tag storage means serving as an index to the information in said high-speed storage, main storage means containing system information, priority contention means for allowing requests to contend for access to tag and high speed storages, access conflict resolution means, decision means for determining whether said desired information is resident in said high-speed storage means, and interstorage transfer means for transferring said data from said main storage to said high-speed storage if said desired data is not resident in high-speed storage and sequence interlocking means, an improvement in said plurality of priority contention means comprising:

storage register means for receiving a request for priority contention;

testing means for testing said conflict resolution means to determine whether a conflict exists with a higher priority port;

means for accessing said tag storage and high-speed storage if no conflict exists; and means for resetting said request in said storage register in preparation for a subsequent request.

7. The combination of claim 6 further including means for accessing the tag storage only if a conflict in the data storage access has occurred;

means for setting a marker in said storage register indicating that tag storage has been accessed; and means for enabling the request in said storage register for contending again for high-speed storage priority.

8. The combination of claim 7 further including means for accessing the high-speed storage only if a conflict in the data storage access has occurred;

means for setting a marker in said storage register indicating that high-speed storage has been accessed; and means for enabling the request in said storage register for contending again for tag storage priority.

9. The method, carried out in a data processing system, of accessing first and second storage entities wherein plural access requests, of different priorities, are allowed to simultaneously contend for access to both of said entities, comprising the steps of:

determining relative to each request whether a higher priority request exists for accessing both of said storage entities;

and, in response to each request, accessing of said storage entities if the determination from said prior step is that no such higher priority request exists.

10. The method, carried out in a data processing system, of accessing plural storage entities in said system, wherein plural access requests of different priorities, simultaneously contend for access to one or more of said storage entities, comprising the steps of:

1. determining that a first request of higher priority than a second request, has priority to access one of said storage entities;
2. accessing, in response to said second request, said storage entities other than the one which said first request has priority to access;
3. setting a mark indicating that priority has been given to said second request to access said storage entities in step (2);
4. and causing said second request to re-contend for priority to access said one storage entity.

11. The method of claim 10 wherein said storage entities comprise a first high-speed storage device having a multiplicity of addressable storage locations, and a second tag storage containing entries serving as indicies to the contents of said first high-speed storage device.

* * * * *